Figure 1:
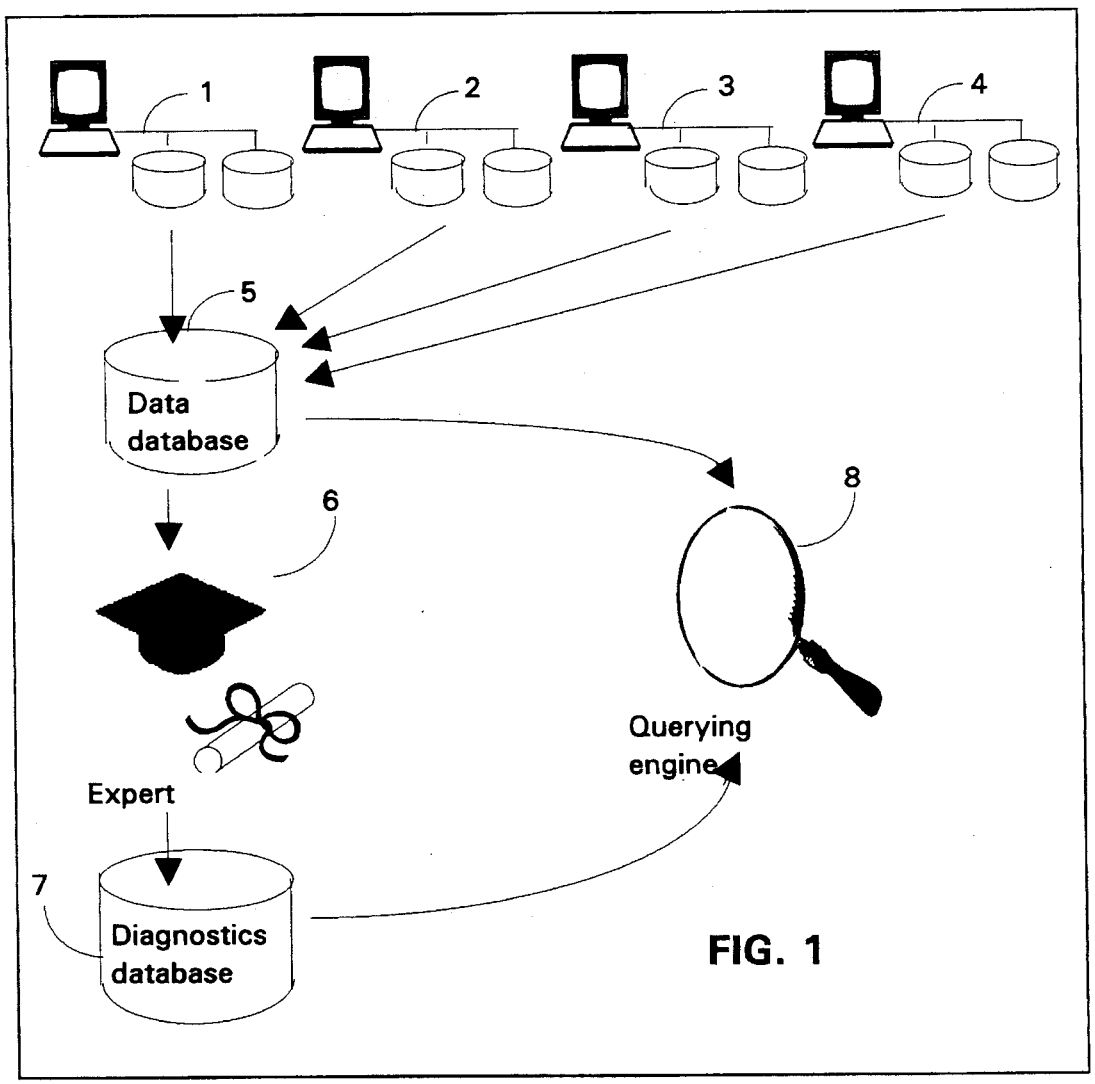

United States Patent [19]

Amado

[11] Patent Number: 5,537,590
[45] Date of Patent: Jul. 16, 1996

[54] APPARATUS FOR APPLYING ANALYSIS RULES TO DATA SETS IN A RELATIONAL DATABASE TO GENERATE A DATABASE OF DIAGNOSTIC RECORDS LINKED TO THE DATA SETS

[76] Inventor: Armando Amado, 4 Avenida 20-38 Zona 14, Guatemala, Guatemala

[21] Appl. No.: 102,581

[22] Filed: Aug. 5, 1993

[51] Int. Cl.$^6$ .............................. G06F 17/00; G06F 17/30
[52] U.S. Cl. ............................... 395/600; 395/50; 395/51; 395/52; 395/153; 395/157; 364/225; 364/274.2; 364/283.4; 364/286.3; 364/DIG. 1
[58] Field of Search .................................. 395/600, 575, 395/50, 51, 52, 55, 911, 153, 157; 371/15.1, 29.1, 19, 21.1

[56] References Cited

U.S. PATENT DOCUMENTS

| | | | |
|---|---|---|---|
| 4,658,370 | 4/1987 | Erman et al. ............................. | 364/130 |
| 4,754,409 | 6/1988 | Ashford et al. .......................... | 364/513 |
| 4,847,784 | 7/1989 | Clancey .................................... | 364/513 |
| 4,866,635 | 9/1989 | Kahn et al. ............................... | 364/513 |
| 4,884,218 | 11/1989 | Agnew et al. ............................. | 395/54 |
| 4,891,766 | 1/1990 | Derr et al. ................................. | 395/76 |
| 4,920,499 | 4/1990 | Skeirik ...................................... | 395/12 |
| 4,928,236 | 5/1990 | Tanaka et al. ............................. | 364/513 |
| 4,945,476 | 7/1990 | Bodick et al. ....................... | 364/413.02 |
| 4,949,278 | 8/1990 | Davies et al. ............................. | 364/513 |
| 4,974,196 | 11/1990 | Iwami et al. .............................. | 395/157 |
| 4,982,344 | 1/1991 | Jordan ....................................... | 395/157 |
| 5,006,992 | 4/1991 | Skerik ....................................... | 364/513 |
| 5,025,392 | 6/1991 | Singh ........................................ | 395/54 |
| 5,034,898 | 7/1991 | Lu et al. ................................... | 364/513 |
| 5,043,915 | 8/1991 | Suwa et al. ............................... | 384/513 |
| 5,099,436 | 3/1992 | McCown et al. ......................... | 364/550 |
| 5,103,498 | 4/1992 | Lanier et al. ............................. | 395/68 |
| 5,121,496 | 6/1992 | Harper ...................................... | 395/600 |
| 5,127,005 | 6/1992 | Oda et al. ................................. | 371/15.1 |
| 5,131,087 | 7/1992 | Warr ......................................... | 395/425 |
| 5,159,669 | 10/1992 | Trigg et al. ............................... | 395/159 |
| 5,164,912 | 11/1992 | Osborne et al. .......................... | 364/580 |
| 5,167,012 | 11/1992 | Hayes et al. .............................. | 395/76 |
| 5,193,143 | 9/1993 | Kremmer et al. ......................... | 395/51 |
| 5,204,974 | 4/1993 | Bernstein et al. ......................... | 395/157 |
| 5,214,653 | 5/1993 | Elliott, Jr. et al. ...................... | 371/15.1 |
| 5,228,116 | 7/1993 | Harris et al. .............................. | 395/54 |
| 5,257,185 | 10/1993 | Farley et al. ......................... | 364/419.19 |

OTHER PUBLICATIONS

Timeworks, "Swift Call St User's Manual", 1982, pp. 93–97, 108–109.

*Primary Examiner*—Paul V. Kulik
*Assistant Examiner*—Paul Harrity
*Attorney, Agent, or Firm*—Ron Fish; Falk, Vestal & Fish

[57] ABSTRACT

This invention addresses the need to map information from databases and reports to a new dimension of structured, intelligent interpretations or diagnostics of that information, and then querying in a coordinated manner both the original information and the resultant diagnostics databases. The invention combines elements currently available in decision support tools, programming languages and expert system building tools. First, querying mechanisms for the information in reports and databases is provided. Second, both a test processing engine and an Expert System run a set of if-then-else tests and expert rules on said information, and the resulting coded diagnostics are stored in a diagnostics database. In a simple implementation, first, the information database contains a single flat database file, second each if-then-else test compares particular data items in this file against other data items or against absolute values and, if true, generates one or more data pairs containing the test identifier and each one of the data item identifiers involved in the test. The invention is completed, third, by a querying engine and a EIS-like reporting system, both capable of structuring, filtering, linking and querying in a coordinated manner both the original information and the resultant diagnostics databases, and capable of building reports.

8 Claims, 43 Drawing Sheets

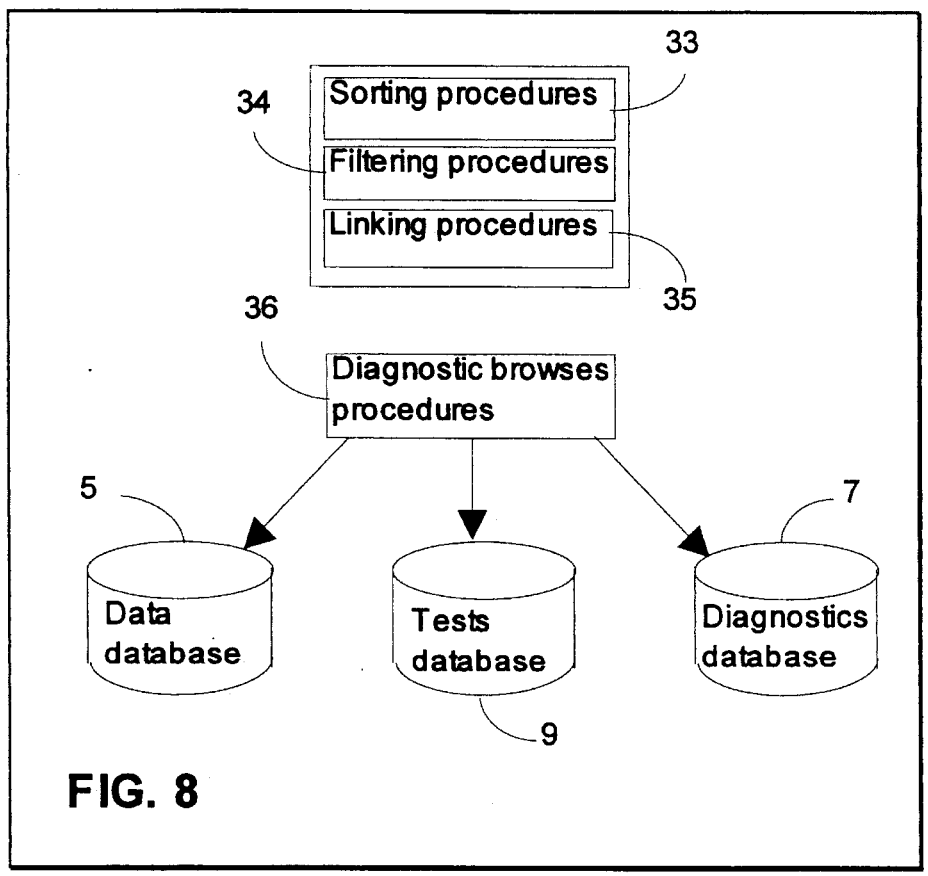

FIG. 8

```
F1-Help F2-Diagnostics F3-Reports F4-Periods F9-Graphs F10-Menus
BALANCE STATEMENT  01.92    02.92    03.92    04.92    05.92    06.92
------------------ -------- -------- -------- -------- -------- --------
ASSETS
  Current Assets     538.8  | 545.1|  517.4    558.9    605.0    538.8
  Property,Plant&Eq. 646.0    634.1   622.2    610.3    598.4    646.0
  Other Assets        85.0     85.0    85.0     85.0     85.0     85.0
TOTAL ASSETS       1,269.8  1,264.2 1,224.6  1,254.2  1,288.4  1,269.8

1. CURROK - Current Ratio (current assets/liabilities) indicates
   no problem paying short term debt, but check long term debt
   structure.
2. DBTOK  - Debt Ratio (liabilities / assets) has declined, and
   Common
   Stock is expected to appreciate in the short term.
3. DBTOK  - Debt Ratio (liabilities / assets) declined the
   previous month, and Common Stock is expected to appreciate in
   the short term.
4. CASHRSK - Cash flow shortage could be expected next quarter,
   given trend & seasonality indexes for sales and receivables.
5. EFF3RSK - Inventory levels for Input B require a large order
   from supplier; make a deal this month.
       SUMMARY OF DIAGNOSTICS -  Positive: 3.   Risk: 2.  Total: 5.
```

FIG. 9

```
F1-Help  F2-Diagnostics  F3-Reports  F4-Periods  F9-Graphs  F10-Menus

BALANCE SHEET          01.92   02.92   03.92   04.92    | CURROK   |
-------------                                             CURRSK
BALANCE ST. SUMMARY                                      CURR!!
ASSETS                                                   DBTRSK1
  Current Assets       | 538.8 | 545.1   517.4   558.9   DEBT!!
  Property, Plant&Equip         634.1   622.2   610.3    INTRSK
  Other Assets           85.0    85.0    85.0    85.0    INT!!
TOTAL ASSETS          1,269.8 1,264.2 1,224.6 1,254.2    ACIDOK
                                                         ACIDRSK
LIABILITIES                                              ACID!!
  Current Liabilities   184.9   153.2    86.9    86.4    EFF1OK
    Accounts Payable     34.9    35.4    35.4    36.4    EFF1RSK
    Short-Term Notes Pay 100.0   67.8     1.5     0.0    EFF1!!
    Taxes Payable         0.0    0.0     0.0     0.0     EFF2OK
  Long-Term Liabilities 281.3   261.8   241.6   220.7    EFF2!!
    Liabilities, banks  281.3   261.8   241.6   220.7    EFF3OK 1. CURROK - Current Ratio (current assets/liabilities) indicates no
   problem paying short term debt, but check long term debt structure.
```

FIG. 10

|               | BANKS | CALL | MEET | TOTAL |
|---------------|-------|------|------|-------|
| *High priority* | 3     | 5    | 2    | 10    |
| Low priority  | 9     | 12   | 5    | 26    |
| TOTAL         | 12    | 17   | 7    | 36    |

FIG. 11

| HIGH PRIORITY               | BANKS | CALL | MEET | TOTAL |
|-----------------------------|-------|------|------|-------|
| Weakness    - High priority | 1     | 2    | 1    | 4     |
| Menace      - High priority |       | 3    |      | 3     |
| Strength    - High priority | 1     |      | 1    | 2     |
| Opportunity- High priority  | 1     |      |      | 1     |
| TOTAL                       | 3     | 5    | 2    | 10    |

FIG. 12

|               | BANKS | CALL | MEET | TOTAL |
|---------------|-------|------|------|-------|
| High priority | 3     | 5    | 2    | 10    |
| Low priority  | 9     | 12   | 5    | 26    |
| TOTAL         | 12    | 17   | 7    | 36    |

FIG. 13

| LOW PRIORITY | DAN | ERNIE | FRANK | FRED | GEORGE | GLADYS | TOTAL |
|---|---|---|---|---|---|---|---|
| Weakness | 1 | 2 | | 2 | | | 5 |
| Menace | | 1 | | 1 | 1 | | 3 |
| Strength | 2 | | | | | | 2 |
| Opportunity | | | 1 | | 1 | | 2 |
| TOTAL | 3 | 3 | 1 | 3 | 2 | 0 | 12 |

FIG. 14

| | | | | |
|---|---|---:|---:|---:|
| 1.BALANCE.00 | BALANCE SHEET ($) | | | |
| 1.BALANCE.01 | ASSETS ($) | | | |
| 1.BALANCE.02 | Current Assets ($) | 1,039.56 | 1,113.92 | 706.84 |
| 1.BALANCE.03 | Long-Term Investments ($) | 50.00 | 50.00 | 50.00 |
| 1.BALANCE.04 | Property, Plant&Equip.(Net $ | 574.60 | 562.70 | 610.30 |
| 1.BALANCE.05 | Other Assets ($) | 35.00 | 35.00 | 35.00 |
| 1.BALANCE.06 | TOTAL ASSETS ($) | 1,699.16 | 1,761.62 | 1,402.14 |
| 1.BALANCE.07 | LIABILITIES ($) | | | |
| 1.BALANCE.08 | Current Liabilities ($) | 102.35 | 96.82 | 95.95 |
| 1.BALANCE.09 | Long-Term Liabilities ($) | 553.03 | 579.71 | 207.52 |
| 1.BALANCE.10 | TOTAL LIABILITIES ($) | 655.38 | 676.53 | 303.47 |
| 1.BALANCE.11 | EQUITY ($) | | | |
| 1.BALANCE.12 | Capital Stock ($) | 500.00 | 500.00 | 500.00 |
| 1.BALANCE.13 | Capital Reserves ($) | 66.35 | 70.96 | 46.88 |
| 1.BALANCE.14 | Retained Earnings ($) | 477.43 | 514.13 | 551.79 |
| 1.BALANCE.15 | TOTAL EQUITY ($) | 1,043.78 | 1,085.09 | 1,098.67 |
| 1.BALANCE.16 | TOTAL LIABILITIES & EQUITY ($ | 1,699.16 | 1,761.62 | 1,402.14 |
| 1.BALANCE.17 | BALANCE SHEET (%) | | | |
| 1.BALANCE.18 | ASSETS (%) | | | |
| 1.BALANCE.19 | Current Assets (%) | 61.2% | 63.2% | 50.4% |
| 1.BALANCE.22 | Other Assets (%) | 2.1% | 2.0% | 2.5% |
| 1.BALANCE.23 | TOTAL ASSETS (%) | 100.0% | 100.0% | 100.0% |
| 1.BALANCE.24 | LIABILITIES (%) | | | |
| 1.BALANCE.25 | Current Liabilities (%) | 6.0% | 5.5% | 6.8% |
| 1.BALANCE.26 | Long-Term Liabilities (%) | 32.5% | 32.9% | 14.8% |
| 1.BALANCE.27 | TOTAL LIABILITIES (%) | 38.6% | 38.4% | 21.6% |
| 1.BALANCE.32 | TOTAL EQUITY (%) | 61.4% | 61.6% | 78.4% |
| 1.BALANCE.33 | TOTAL LIABILITIES & EQUITY (%) | 100.0% | 100.0% | 100.0% |
| 1.FRATIOS.00 | FINANCIAL RATIOS (%) | | | |
| 1.FRATIOS.01 | LEVERAGE RATIOS (%) | | | |
| 1.FRATIOS.02 | Debt Ratio | 20.0% | 10.0% | 20.0% |
| 1.FRATIOS.03 | Earnings / Interests | 2.710 | 3.337 | 2.776 |
| 1.FRATIOS.04 | LIQUIDITY | | | |
| 1.FRATIOS.05 | Current Ratio | 10.160 | 11.510 | 7.370 |
| 1.FRATIOS.06 | Acid Test | 9.440 | 10.630 | 6.650 |
| 1.FRATIOS.07 | EFFICIENCY MEASURES (#) | | | |
| 1.FRATIOS.08 | Sales / Total Assets | 2.640 | 2.340 | 2.620 |
| 1.FRATIOS.09 | Sales / Net Working Capital | 4.780 | 4.050 | 6.020 |
| 1.FRATIOS.10 | Inventory Turnover | 12.880 | 12.530 | 12.940 |
| 1.FRATIOS.11 | Accts. Receivable Turnover | 20.620 | 18.800 | 18.750 |
| 1.FRATIOS.12 | Net Earnings / Sales | 10.0% | 10.0% | 10.0% |
| 1.FRATIOS.13 | Net Earnings / Assets | 40.0% | 20.0% | 20.0% |
| 1.FRATIOS.14 | Net Earnings / Equity | 40.0% | 20.0% | 30.0% |
| 1.FRATIOS.15 | Z SCORE MODEL (#) | | | |
| 1.FRATIOS.16 | X1 = Working Capital/Tot.Asse | 0.550 | 0.580 | 0.440 |
| 1.FRATIOS.17 | X2 = Retained Earnings/Tot.As | 0.520 | 0.550 | 0.380 |
| 1.FRATIOS.18 | X3 = Net Earn.b.Taxes/Tot.Ass | 0.180 | 0.100 | 0.090 |
| 1.FRATIOS.19 | X4 = Equity/Total Liabilities | 5.650 | 6.810 | 3.430 |
| 1.FRATIOS.20 | X5 = Sales/Total Assets | 2.640 | 2.340 | 2.620 |
| 1.FRATIOS.21 | Z1 INDEX = | 6.400 | 6.390 | 4.990 |

FIG. 15

```
                          DATA TABLE

Line        | Description              |   Aug93  4 |  Sep93  5 | Oct
  ------------+--------------------------+------------+-----------+----
  1.BALANCE.00| BALANCE SHEET ($)        |            |           |
  1.BALANCE.01| ASSETS ($)               |            |           |
  1.BALANCE.02| Current Assets ($)       |     803.28 |    906.60 |
  1.BALANCE.03| Long-Term Investments($) |      50.00 |     50.00 |
  1.BALANCE.04| Property,Plant&Equip.(Net$|    598.40 |    586.50 |
  1.BALANCE.05| Other Assets ($)         |      35.00 |     35.00 |
  1.BALANCE.06| TOTAL ASSETS ($)         |   1,486.68 |  1,578.10 |
  1.BALANCE.07| LIABILITIES ($)          |            |           |
  1.BALANCE.08| Current Liabilities ($)  |      99.74 |    101.53 |
  1.BALANCE.09| Long-Term Liabilities ($)|     198.95 |    176.41 |
  1.BALANCE.10| TOTAL LIABILITIES ($)    |     298.69 |    277.94 |

DIAGNOSTICS

Line        | Period  | Test   | Description
  ------------+---------+--------+------------------------------------------
  1.BALANCE.08| Sep93 5 | DEBT~  | The debt ratio is too low (lowerthan 0.25)
  1.BALANCE.08| Sep93 5 | LIABI- | Liabilities have gone up twoconsecutivePer 4.DATA BROWSE VIEW   DATA TABLE  F5:Switch window  Ctrl-F10:Zoom    Escape
```

FIG. 20

```
                          DATA TABLE

Line        | Description                    | Aug 93   4 | Sep 93   5
  ------------+--------------------------------+------------+-----------
  1.BALANCE.08| Current Liabilities ($)        |      99.74 |    101.53
  1.BALANCE.09| Long-Term Liabilities ($)      |     198.95 |    176.41
  1.BALANCE.10| TOTAL LIABILITIES ($)          |     298.69 |    277.94
  1.BALANCE.11| EQUITY ($)                     |            |
  1.BALANCE.12| Capital Stock ($)              |     500.00 |    500.00
  1.BALANCE.13| Capital Reserves ($)           |      52.45 |     58.55
  1.BALANCE.14| Retained Earnings ($)          |     635.54 |    741.62
  1.BALANCE.15| TOTAL EQUITY ($)               |   1,187.99 |  1,300.16
  1.BALANCE.16| TOTAL LIABILITIES & EQUITY ($  |   1,486.68 |  1,578.10
  1.FRATIOS.00| FINANCIAL RATIOS (%)           |            |
  1.FRATIOS.02| Debt Ratio                     |     20.0 % |    20.0 %

DIAGNOSTICS
                                                     RDEB+-The debt ratio is
  Line        | Period  | Test  | Class1 | Class2    too -low (lower than
  ------------+---------+-------+--------+-------    0.25).  You may be
 •1.BALANCE.08| Sep 93 5| DEBT~ | ALARM2 | FRED      losing business
  1.BALANCE.08| Sep 93 5| LIABI=| ALARM1 | FRED      opportunities, or your
                                                     company's accounting
                                                     practices mix several
                                                     businesses in one
                                                     accounting practice.

4.DATA BROWSE VIEW   DIAGNOSTICS  F5:Switch window  Ctrl-F10:Zoom   Escape
```

FIG. 21

```
|                   DIAGNOSTICS                                                  |
| Line           |Period |Test   |Description                                    |
|----------------+-------+-------+-----------------------------------------------|
|1.FRATIOS.11|Sep93 5|ARECDN|Accounts receivables turnover is going           |
|1.BALANCE.04|Sep93 5|ASSET-|Assets have gone down two consecutive per.       |
|1.BALANCE.08|Sep93 5|DEBT~ |The debt ratio is too low, lower than 0.25       |
|1.BALANCE.09|Sep93 5|DEBT~ |The debt ratio is too low, lower than 0.25       |
|1.BALANCE.10|Sep93 5|DEBT~ |The debt ratio is too low, lower than 0.25       |
|1.FRATIOS.02|Sep93 5|DEBT~ |The debt ratio is too low, lower than 0.25       |
|1.FRATIOS.14|Sep93 5|EAR3UP|The net earnings/equity ratio is going up        |
|1.FRATIOS.10|Sep93 5|FRATI-|Efficiency ratios have gone down two conse       |
|1.FRATIOS.10|Sep93 5|INVEDN|Inventory efficiency (i.e. turnover)             |
|1.BALANCE.08|Sep93 5|LIABI-|Liabilities  have gone up two consecu            |

|                      DATA TABLE                                                |
| Line          |Description              | Aug 93 4 | Sep 93 5 |                |
|---------------+-------------------------+----------+----------+----------------|
|1.FRATIOS.11|Accts. Receivable Turnover|  19.720  |  19.480  |                 |

3.DIAGNOSTICS BROWSE VIEW DIAGNOSTICS F5:Switch window Ctrl-F10:Zoom Esc
```

FIG. 22

```
|                   DIAGNOSTICS                                                  |
| Line           |Period |Test   |Description                                    |
|----------------+-------+-------+-----------------------------------------------|
|1.FRATIOS.11|Sep93 5|ARECDN|Accounts receivables turnover is going           |
|1.BALANCE.04|Sep93 5|ASSET-|Assets have gone down two consecutive per.       |
|1.BALANCE.08|Sep93 5|DEBT~ |The debt ratio is too low,lower than 0.25        |
|1.BALANCE.09|Sep93 5|DEBT~ |The debt ratio is too low,lower than 0.25        |
|1.BALANCE.10|Sep93 5|DEBT~ |The debt ratio is too low,lower than 0.25        |
|1.FRATIOS.02|Sep93 5|DEBT~ |The debt ratio is too low,lower than 0.25        |
|1.FRATIOS.14|Sep93 5|EAR3UP|The net earnings/equity ratio is going           |
|1.FRATIOS.10|Sep93 5|FRATI-|Efficiency ratios have gone down two conse       |
|1.FRATIOS.10|Sep93 5|INVEDN|Inventory efficiency (i.e. turnover)is           |
|1.BALANCE.08|Sep93 5|LIABI-|Liabilities  have gone up two consecutive        |

|                       DATA TABLE                                               |
| Line          |Description              |Aug 93 4 | Sep 93 5 | Oct             |
|---------------+-------------------------+---------+----------+-----------------|
|1.FRATIOS.02|Debt Ratio                  | 20.0 %  |  20.0 %  |                  |
|1.FRATIOS.10|Inventory Turnover          | 12.930  |  12.660  |                  |
|1.FRATIOS.11|Accts. Receivable Turnover  | 19.720  |  19.480  |                  |
|1.FRATIOS.12|Net Earnings / Sales        | 10.0 %  |  10.0 %  |                  |
|1.FRATIOS.14|Net Earnings / Equity       | 40.0 %  |  40.0 %  |                  |

3.DIAGNOSTICS BROWSE VIEW DATA TABLE F5:Switchwindow Ctrl-F10:Zoom Esc
```

FIG. 23

```
                        FREQUENCIES
   # |Class1|Description1
  ----+------+------------
  •5 |ALARM1|Weakness - Low priority
   1 |ALARM2|Menace   - Low priority
   1 |GOOD1 |Strength - Low priority DIAGNOSTICS
 Line         |Test  |Class1|Class2|Class3|Period   |Description
 -------------+------+------+------+------+---------+-----------
 1.FRATIOS.11|ARECDN|ALARM1|FRED  |CALL  |Sep93  5|Accounts receivables
 1.FRATIOS.10|INVEDN|ALARM1|ROBERT|CALL  |Sep93  5|Inventory efficiency
 1.BALANCE.04|ASSET-|ALARM1|PETER |CALL  |Sep93  5|Assets have gone down
 1.FRATIOS.10|FRATI-|ALARM1|PETER |CALL  |Sep93  5|Efficiency ratios
 1.BALANCE.08|LIABI-|ALARM1|FRED  |CALL  |Sep 93  5|Liabilities have 2.FREQUENCY BROWSE VIEW FREQUENCIES  F5:Switch window Ctrl-F10:Zoom Esc
```

FIG. 24

```
                        FREQUENCIES
   # |Clase1|Clasificación 1
  ----+------+---------------
   5 |ALARM1|Weakness - Low priority
   1 |ALARM2|Menace   - Low priority
   1 |GOOD1 |Strength - Low priority DIAGNOSTICS
 Linea        |Prueba|Clase1|Clase2|Clase3| P
 -------------+------+------+------+------+---         ARECD    Accounts
 •1.FRATIOS.11|ARECDN|ALARM1|FRED  |CALL  |Sep         receivables turnover is
  1.FRATIOS.10|INVEDN|ALARM1|ROBERT|CALL  |Sep         going down. Whenever
  1.BALANCE.04|ASSET-|ALARM1|PETER |CALL  |Sep         there's a change in
  1.FRATIOS.10|FRATI-|ALARM1|PETER |CALL  |Sep         receivables turnover
  1.BALANCE.08|LIABI-|ALARM1|FRED  |CALL  |Sep         ratios,find which
                                                      products are responsible
                                                      for it.
 2.FREQUENCY BROWSE VIEW DIAGNOSTICS  F5:Switch window Ctrl-F10:Zoom  Esc
```

FIG. 25

```
                         SUMMARIES
 Period      |Analysis|Description
-------------+--------+----------------------------------+--------
•Nov 93    7|DANGER  |Downturn:  sales, income, profits,
 Dec 93    8|GOOD    |Upturn:  sales, income, profits, inventory
 Jan 94    9|GOOD    |Upturn:  sales, income, profits, invent
```

DANGER   -   Downturn:  There has been a
                consistent downward trend for three months.  This
                involves sales, income, profits and inventory.
                TAKE EMERGENCY MEASURES

```
                         DIAGNOSTICS
 Analysis|Test   |P|Class1|Class2|Class3|Description
 --------+-------+-+------+------+------+------------------------
 DANGER  |DEBT-  | |URGNT2|LOUIS |MEET  |The debt ratio is too
 DANGER  |EAR1UP | |GOOD1 |ERNIE |CALL  |The net earnings/Sales
 DANGER  |ARECDN |P|ALARM1|FRED  |CALL  |Accounts receivables
 DANGER  |EAR3DN |P|ALARM1|FRANK |CALL  |The net earnings/equi
 DANGER  |INVEDN |P|ALARM1|ROBERT|CALL  |Inventory efficiency 1.SUMMARY BROWSE VIEW RESUMENES F5:Cambia ventana Ctrl-F10:Zoom
```

FIG. 26

```
                         SUMMARIES
 Period      |Analysis|Description
-------------+--------+----------------------------------+--------
 Nov 93    7|DANGER  |Downturn:  sales, income, profits, inventory
 Dec 93    8|GOOD    |Upturn:  sales, income, profits, inventory
 Jan 94    9|GOOD    |Upturn:  sales, income, profits, inventory
```

RDEB-   The debt ratio is too high (higher than
                0.40).  This represents a high financial risk
                position.  If income or profit goes down in your
                firm, you may run into cash trouble.

```
                         DIAGNOSTICS
 Analysis|Test   |P|Class1|Class2|Class3|Description
 --------+-------+-+------+------+------+------------------------
•DANGER  |DEBT-  | |URGNT2|LOUIS |MEET  |The debt ratio is too high
 DANGER  |EAR1UP | |GOOD1 |ERNIE |CALL  |The net earnings / sales ratio
 DANGER  |ARECDN |P|ALARM1|FRED  |CALL  |Accounts receivables turnover
 DANGER  |EAR3DN |P|ALARM1|FRANK |CALL  |The net earnings / equity
 DANGER  |INVEDN |P|ALARM1|ROBERT|CALL  |Inventory efficiency (i.e.

1.SUMMARY BROWSE VIEW DIAGNOSTICS  F5:Switch window   Ctrl-F10:Zoom Esc
```

FIG. 27

```
         ┌──────────────────────────────────────────────────────────────────┐
         │                     FREQUENCY BROWSE VIEW                        │
         │    Line    ┌──────┐         Test  ┌──────┐       Period ┌──┬─┐   │
         │    Class1  └──────┘         Class2│DAN   │       Class3 └──┴─┘   │
         │                             ┌─────┴──────┴────────────────────┐  │
         │                             │         CLASS2 CODES            │  │
         │                             │        (Select one)             │  │
         │                             │ ·DAN     Sales   -  D.Vadim     │  │
         │                             │  ERNIE   Administrative - E.Becker │
         │                             │  FRANK   Management  -  F.Villela │
         │                             │  FRED    Administrative - F.Anderson│
         │                             │  GEORGE  Technical  -  G.Bosch  │  │
         │                             │  GLADYS  Technical  -  G.Coffey │  │
         │                             │  JUDITH  Sales      -  J.Mason  │  │
         │                             └─────────────────────────────────┘  │
         └──────────────────────────────────────────────────────────────────┘
```

FIG. 31

```
  ┌──────────────────────────────────────────────────────────────────────────┐
  │                            FREQUENCIES                                _  │
  │   #  │Class1│Description1         │                  │                   │
  │──────┼──────┼─────────────────────┼──────────────────┼───────────────────│
  │ · 4  │ALARM1│Weakness - Low priority                                     │
  │   5  │ALARM2│Menace   - Low priority                                     │
  │   5  │GOOD1 │Strength - Low priority                                     │
  │                                                                          │
  │                                                                          │
  │                                                                          │
  ├──────────────────────────────────────────────────────────────────────────┤
  │                             DIAGNOSTICS                                  │
  │ Line         │Test    Class1│Class2│Class3│Period  │Description          │
  │──────────────┼──────────────┼──────┼──────┼────────┼─────────────────────│
  │ 1.FRATIOS.11 │ARECDN│ALARM1 │FRED  │CALL  │Sep93  5│Accounts receivables │
  │ 1.BALANCE.08 │LIABI-│ALARM1 │FRED  │CALL  │Sep93  5│Liabilities  have    │
  │ 1.BALANCE.08 │LIABI-│ALARM1 │FRED  │CALL  │Oct93  6│Liabilities  have    │
  │ 1.FRATIOS.11 │ARECDN│ALARM1 │FRED  │CALL  │Nov93  7│Accounts receivables │
  │                                                                          │
  │2.FREQUENCIES BROWSE VIEW FREQUENCIES F5:Switch window Ctrl-F10:Zoom Esc  │
  └──────────────────────────────────────────────────────────────────────────┘
```

FIG. 32

```
.-----------------------------------------------------------------.
|                       FREQUENCY BROWSE VIEW                     |
|      Line     |=========|     Test    |=========|  Period |  0  ||
|      Class1   |         |     Class2  |         |  Class3 |BANKS||
|               •----------------------------------------------.  |
|                                CLASS3 CODES                  |  |
|                                 (Select one)                 |  |
|               • BANKS   Prepare approp. banking arrangement  |  |
|                 CALL    Call or contact responsible persons  |  |
|                 MEET    Internal organizational meeting      |  |
|               •----------------------------------------------•  |
•-----------------------------------------------------------------•
```

FIG. 33

```
.------------------------------------------------------------------------------.
|                                 FREQUENCIES                                  |
|    # |Class1|Description1                        |                           |
|------+------+------------------------------------+---------------------------|
|   15 |ALARM1|Weakness - Low priority             |                           |
|    9 |GOOD1 |Strength - Low priority             |                           |
|      |      |                                    |                           |
|      |      |                                    |                           |
|      |      |                                    |                           |
|      |      |                                    |                           |
|      |      |                                    |                           |
•------------------------------------------------------------------------------•

•------------------------------------------------------------------------------•
|                                 DIAGNOSTICS                                  |
|Line          |Test    |Class1|Class2 |Class3|Period  |Description            |
|--------------+--------+------+-------+------+--------+-----------------------|
|1.FRATIOS.11  |ARECDN  |ALARM1|FRED   |CALL  |Sep93 5 |Accounts receivables   |
|1.FRATIOS.10  |INVEDN  |ALARM1|ROBERT |CALL  |Sep93 5 |Inventory efficiency   |
|1.BALANCE.04  |ASSET-  |ALARM1|PETER  |CALL  |Sep93 5 |Assets have gone dow   |
|1.FRATIOS.10  |FRATI-  |ALARM1|PETER  |CALL  |Sep93 5 |Efficiency ratios      |
|1.BALANCE.08  |LIABI-  |ALARM1|FRED   |CALL  |Sep93 5 |Liabilities have gon   |
•------------------------------------------------------------------------------•
2.FREQUENCY BROWSE VIEW FREQUENCIES  F5:Switch window Ctrl-F10:Zoom Esc
```

FIG. 34

```
.-----------------------------------------------------------------.
|                       FREQUENCY BROWSE VIEW                     |
|      Line     |=========|     Test    |=========|  Period |  0  ||
|      Class1   |ALARM1   |     Class2  |         |  Class3 |BANKS||
|                              Escape=Exit                        |
•-----------------------------------------------------------------•
```

FIG. 35

```
 _____
|                         FREQUENCIES                    |
|     # |Class2 |Description2                            |
|-------+-------+----------------------------------------|
|  • 1  |FRANK  |Management - F.Villela                  |
|    4  |FRED   |Administrative - F.Anderson             |
|    6  |PETER  |Management - P. Welch                   |
|    4  |ROBERT |Management - R.Andreu                   |
|       |       |                                        |
|       |       |                                        |
|       |       |                                        |
|_____|

_____
|                         DIAGNOSTICS                    |
| Line         |Test   |Class1 |Class2|Class3|Period   |Description      |
|--------------+-------+-------+------+------+---------+-----------------|
| 1.FRATIOS.14 |EAR3DN |ALARM1 |FRANK |CALL  |Nov 93  7|The net earnings /|
|              |       |       |      |      |         |                 |
|_____|

2.FREQUENCY BROWSE VIEW FREQUENCIES F5:Switch window Ctrl-F10:Zoom Esc
```

FIG. 36

| Test identifier | Test description | Related data item |
|---|---|---|
| ZSCO- | Z1 Score indicates extreme danger of bankrupcy. | 1.FRATIOS.21 |
| ZLIQ- | Z1(X1) Score indicates liquidity's TOO low! | 1.FRATIOS.16 |
| ZLIQ~ | Z1(X1) Score indicates liquidity's risky. | 1.FRATIOS.16 |
| ZGRO- | Z1(X2) Score indicates sustainable growth is bad. | 1.FRATIOS.17 |
| ZPRO+ | Z1(X3) Score indicates profits (efficiency) are OK | 1.FRATIOS.18 |
| ZPRO~ | Z1(X3) Score indicates a spotty profit record. | 1.FRATIOS.18 |
| ZDEB- | Z1(X4) Score indicates the debt level is too high. | 1.FRATIOS.19 |
| ZSAL~ | Z1(X5) Score indicates a spotty sales record. | 1.FRATIOS.20 |
| RDEB~ | The debt ratio is too low (lower than 0.25) | 1.BALANCE.08 |
| RINT_H | The debt interest ratio may be too high. | 1.FRATIOS.03 |
| RCUR~ | The currents ratio is too high (> 2.0). | 1.FRATIOS.05 |
| RACI- | The acid test ratio is too low (<1.3). | 1.BALANCE.02 |
| REFF1D | Sales eff. (sales / total assets) is going down. | 1.FRATIOS.08 |
| REFF2D | Efficient use of working capital is going down. | 1.BALANCE.08 |
| INVEND | Inventory efficiency (i.e. turnover) is going down | 1.FRATIOS.10 |
| ARECD | Accounts receivables turnover is going down. | 1.FRATIOS.11 |
| EARN1D | The net earnings / sales ratio is going down. | 1.FRATIOS.12 |
| EARN2D | The net earnings / assets ratio is going down. | 1.FRATIOS.13 |
| EARN3D | The net earnings / equity ratio is going down. | 1.FRATIOS.14 |
| EARN- | The net earnings / equity ratio is too low. | 1.FRATIOS.14 |

| Test description | Formula |
|---|---|
| Z1 Score indicates extreme danger of bankrupcy. | F("1.FRATIOS.21",0) <0.15 |
| Z1(X1) Score indicates liquidity's TOO low! | F("1.FRATIOS.16",0) <-0.06 |
| Z1(X1) Score indicates liquidity's risky. | F("1.FRATIOS.16",0) >-0.06 AND F("1.FRATIOS.16",0) <0.414 |
| Z1(X2) Score indicates sustainable growth is bad. | F("1.FRATIOS.17",0) <-0.63 |
| Z1(X3) Score indicates profits (efficiency) are OK | F("1.FRATIOS.18",0) >0.154 |
| Z1(X3) Score indicates a spotty profit record. | F("1.FRATIOS.18",0) >-0.31 AND F("1.FRATIOS.16",0) <0.154 |
| Z1(X4) Score indicates the debt level is too high. | F("1.FRATIOS.19",0) <0.49 |
| Z1(X5) Score indicates a spotty sales record. | F("1.FRATIOS.19",0) >1.5 AND F("1.FRATIOS.16",0) <1.9 |
| The debt ratio is too low (lower than 0.25) | F("1.FRATIOS.02",0) <0.25 |
| The debt interest ratio may be too high. | F("1.FRATIOS.03",0) >6.0 |
| The currents ratio is too high (> 2.0). | F("1.FRATIOS.05",0) >2.0 |
| The acid test ratio is too low (<1.3). | F("1.FRATIOS.06",0) <1.3 |
| The net earnings / equity ratio is too low. | F("1.FRATIOS.14",0) <0.15 |

FIG. 37

| Test identifier | Test description | Related data group |
|---|---|---|
| ASSET- | Assets have gone down two consecutive periods | ASSETS |
| LIABI- | Liabilities have gone up two consecutive periods | LIABIL |
| EQUIT- | Equity has gone down two consecutive periods | EQUITY |
| FRATI- | Efficiency ratios have gone down two consecutive | FRATIO |

| Test description | Test formula |
|---|---|
| Assets have gone down two consecutive periods | G(0)+ '<' +G(-1)+ '.AND.' +G(-1)+ '<' +G(-2) |
| Liabilities have gone up two consecutive periods | G(0)+ '>' +G(-1)+ '.AND.' +G(-1)+ '>' +G(-2) |
| Equity has gone down two consecutive periods | G(0)+ '<' +G(-1)+ '.AND.' +G(-1)+ '<' +G(-2) |
| Efficiency ratios have gone down two consecutive | G(0)+ '<' +G(-1)+ '.AND.' +G(-1)+ '<' +G(-2) |

FIG. 38

File
- Application
- Open Database
- Import
- Export

---
- Print standard report
- Create custom report
- Print custom Report

---
- Foxpro environment
- Exit

Edit
- Browse records
- Modify records
- Add records

---
- Browse Erased records
- Pack database

Diagnostics
- Summary browse view
- Frequency browse view
- Diagnostics browse view
- Data Browse view ---
- Add/modify Line test
- Add/modify Group test
- Copy test ---
- Run tests

Maintenance
- Generate indexes

---
- Backup databases
- Restore databases

---
- Release Fifth year

FIG. 39

| DATA |
|---|
| ○ data DBF file (*tabla.dbf*) |
| ○ group descriptions DBF file (*grupos.dbf*) |
| ○ group elements DBF file (*detalle.dbf*) |

| TESTS |
|---|
| ○ tests DBF file (*prueba.dbf*) |
| ○ classes1 DBF file (*clase1.dbf*) |
| ○ classes2 DBF file (clase2.dbf) |
| ○ classes3 DBF file (*clase3.dbf*) |
| ○ summary test DBF file (*presumen.dbf*) |
| ○ summary elements DBF file (*dresumen.dbf*) |

| DIAGNOSTICS |
|---|
| ○ diagnostics DBF file (*result.dbf*) |
| ○ summary diagnostics DBF file (*prresult.dbf*) |
| ○ summary diagnostics elements DBF file (*drresult.dbf*) |

FIG. 40

| FILE: TABLA.DBF | | |
|---|---|---|
| Name | Type, Width, Dec | |
| LINEA | Character, 12 | 49 |
| NOMBRE | Character, 30 | 50 |
| P1 | Numeric, 14, 3 | 51 |
| P2 | Numeric, 14, 3 | 51 |
| P3 | Numeric, 14, 3 | 51 |
| ... | | |
| P58 | Numeric, 14, 3 | 51 |
| P59 | Numeric, 14, 3 | 51 |
| P60 | Numeric, 14, 3 | 51 |
| VALOR | Numeric, 14, 3 | 68 |
| FORMAT | Character, 12 | 69 |
| FACTOR | Character, 12 | 70 |
| TYFACE | Character, 12 | 71 |

FIG. 41

```
Linea         |Nombre                         |P1        |P2       |P3
--------------+-------------------------------+----------+---------+---------
1.BALANCE.00  |BALANCE SHEET ($)              |          |    0.000|    0.000
1.BALANCE.01  |ASSETS ($)                     |          |    0.000|    0.000
1.BALANCE.02  |Current Assets ($)             |          | 1039.560| 1113.920
1.BALANCE.03  |Long-Term Investments ($)      |          |   50.000|   50.000
1.BALANCE.04  |Property, Plant&Equip.(Net $   |          |  574.600|  562.700
1.BALANCE.05  |Other Assets ($)               |          |   35.000|   35.000
1.BALANCE.06  |TOTAL ASSETS ($)               |          | 1699.160| 1761.620
1.BALANCE.07  |LIABILITIES ($)                |          |    0.000|    0.000
1.BALANCE.08  |Current Liabilities ($)        |          |  102.350|   96.820
1.BALANCE.09  |Long-Term Liabilities ($)      |          |  153.030|  128.760
1.BALANCE.10  |TOTAL LIABILITIES ($)          |          |  255.380|  225.580
1.BALANCE.11  |EQUITY ($)                     |          |    0.000|    0.000
1.BALANCE.12  |Capital Stock ($)              |          |  500.000|  500.000
1.BALANCE.13  |Capital Reserves ($)           |          |   66.350|   70.960
1.BALANCE.14  |Retained Earnings ($)          |          |  877.430|  965.080
1.BALANCE.15  |TOTAL EQUITY ($)               |          | 1443.780| 1536.040
1.BALANCE.16  |TOTAL LIABILITIES & EQUITY ($  |          | 1699.160| 1761.620
1.FRATIOS.00  |FINANCIAL RATIOS (%)           |          |    0.000|    0.000
1.FRATIOS.02  |Debt Ratio                     |          |    0.200|    0.100
1.FRATIOS.10  |Inventory Turnover             |          |   12.880|   12.530
```

FIG. 42

```
P60          |Valor    |Format          |Factor |Tyface
-------------+---------+----------------+-------+------
      0.000  |   0.000 |                |1      |
      0.000  |   0.000 |-               |1      |
   5966.370  |   0.000 |₮,###,###.##    |1      |
     50.000  |   0.000 |#,###,###.##    |1      |
    -68.000  |   0.000 |#,###,###.##    |1      |
     35.000  |   0.000 |#,###,###.##    |1      |
   5983.370  |   0.000 |#,###,###.##    |1      |
      0.000  |   0.000 |                |1      |
  17792.310  |   0.000 |₮,###,###.##    |1      |
  -3923.290  |   0.000 |#,###,###.##    |1      |
  13869.020  |   0.000 |#,###,###.##    |1      |
      0.000  |   0.000 |                |1      |
    500.000  |   0.000 |₮,###,###.##    |1      |
    355.830  |   0.000 |#,###,###.##    |1      |
  -8741.490  |   0.000 |#,###,###.##    |1      |
  -7885.660  |   0.000 |#,###,###.##    |1      |
   5983.360  |   0.000 |#,###,###.##    |1      |
      0.000  |   0.000 |                |1      |
      2.300  |   0.000 |#######.# %     |100    |
     26.970  |   0.000 |,###,###.###    |1      |
```

FIG. 43

| FILE: RESULT.DBF | | |
|---|---|---|
| Name | Type, width, Dec | |
| LINEA | Character, 12 | 49 |
| NPER | Numeric, 2, 0 | 52 |
| PRUEBA | Character, 6 | 53 |
| CLASE1 | Character, 6 | 61 |
| CLASE2 | Character, 6 | 61 |
| CLASE3 | Character, 6 | 61 |

FIG. 44

```
Linea          |Nper|Prueba|Clase1|Clase2 |Clase3|
---------------+----+------+------+-------+------+--
1.FRATIOS.11|  5|ARECDN|ALARM1|FRED   |CALL  |
1.BALANCE.08|  5|DEBT~ |ALARM2|FRED   |BANKS |
1.BALANCE.09|  5|DEBT~ |ALARM2|FRED   |BANKS |
1.BALANCE.10|  5|DEBT~ |ALARM2|FRED   |BANKS |
1.FRATIOS.02|  5|DEBT~ |ALARM2|FRED   |BANKS |
1.FRATIOS.14|  5|EAR3UP|GOOD1 |PETER  |CALL  |
1.FRATIOS.10|  5|INVEDN|ALARM1|ROBERT |CALL  |
1.BALANCE.04|  5|ASSET-|ALARM1|PETER  |CALL  |
1.FRATIOS.10|  5|FRATI-|ALARM1|PETER  |CALL  |
1.BALANCE.08|  5|LIABI-|ALARM1|FRED   |CALL  |
1.FRATIOS.11|  6|ARECUP|GOOD1 |FRED   |CALL  |
1.BALANCE.08|  6|DEBT~ |ALARM2|FRED   |BANKS |
1.BALANCE.09|  6|DEBT~ |ALARM2|FRED   |BANKS |
1.BALANCE.10|  6|DEBT~ |ALARM2|FRED   |BANKS |
```

FIG. 45

| FILE: PRUEBA.DBF | | |
|---|---|---|
| Name | Type, Width, Dec | |
| CODIGO | Character, 6 | 54 |
| NOMBRE | Character, 50 | 55 |
| LINEA | Character, 12 | 49 |
| GRUPO | Character, 6 | 58 |
| CONDEXPR | Character, 254 | 57 |
| CONDNOTE | Character, 200 | 56 |
| CLASE1 | Character, 6 | 61 |
| CLASE2 | Character, 6 | 61 |
| CLASE3 | Character, 6 | 61 |

FIG. 46

```
Codigo|Nombre
------+-----------------------------------------------------------
DEBT~ |The debt ratio is too low (lower than 0.25)
DEBT+ |The debt ratio is adequate (between 0.25 and 0.40)
DEBT- |The debt ratio is too high (higher than 0.40)
DEBT~ |The debt ratio is too low (lower than 0.25)
DEBT+ |The debt ratio is adequate (between 0.25 and 0.40)
DEBT- |The debt ratio is too high (higher than 0.40)
DEBT~ |The debt ratio is too low (lower than 0.25)
DEBT+ |The debt ratio is adequate (between 0.25 and 0.40)
DEBT- |The debt ratio is too high (higher than 0.40)
DEBT~ |The debt ratio is too low (lower than 0.25)
DEBT+ |The debt ratio is adequate (between 0.25 and 0.40)
DEBT- |The debt ratio is too high (higher than 0.40)
INVEUP|Inventory efficiency (i.e. turnover) is going up.
INVEDN|Inventory efficiency (i.e. turnover) is going down
```

FIG. 47

```
Codigo|Nombre                                                   |Linea        |Grupo
------+---------------------------------------------------------+-------------+-----
DEBT~ |The debt ratio is too low,lower than 0.25                |1.FRATIOS.02 |
DEBT+ |The debt ratio is adequate,btween 0.25 and .40           |1.FRATIOS.02 |
DEBT- |The debt ratio is too high,higher than 0.40              |1.FRATIOS.02 |
DEBT~ |The debt ratio is too low, lower than 0.25               |1.BALANCE.08 |
DEBT+ |The debt ratio is adequate,btween 0.25 and .40           |1.BALANCE.08 |
DEBT- |The debt ratio is too high,higher than 0.40              |1.BALANCE.08 |
DEBT~ |The debt ratio is too low,lower than 0.25                |1.BALANCE.09 |
DEBT+ |The debt ratio is adequate,btween 0.25 and .40           |1.BALANCE.09 |
DEBT- |The debt ratio is too high, higher than 0.40             |1.BALANCE.09 |
DEBT~ |The debt ratio is too low, lower than 0.25               |1.BALANCE.10 |
DEBT+ |The debt ratio is adequate,btween 0.25 and .40           |1.BALANCE.10 |
DEBT- |The debt ratio is too high, higher than 0.40             |1.BALANCE.10 |
INVEUP|Inventory efficiency(i.e.turnover) is going up           |1.FRATIOS.10 |
INVEDN|Inventory efficiency(i.e.turnover)is going dwn           |1.FRATIOS.10 |
ARECUP|Accounts receivables turnover is going up.               |1.FRATIOS.11 |
ARECDN|Accounts receivables turnover is going down.             |1.FRATIOS.11 |
EAR1UP|The net earnings / sales ratio is going up.              |1.FRATIOS.12 |
EAR1DN|The net earnings / sales ratio is going down.            |1.FRATIOS.12 |
EAR3UP|The net earnings / equity ratio is going up.             |1.FRATIOS.14 |
EAR3DN|The net earnings / equity ratio is going down.           |1.FRATIOS.14 |
```

FIG. 48

```
Codigo    DEBT~
Nombre    The debt ratio is too low, lower than 0.25
Linea     1.FRATIOS.02
Grupo
Condexpr  F("1.FRATIOS.02",0) <0.25
Condnote  RDEB+-    The debt ratio is too low (lower than 0.25).You may
Clase1    ALARM2
Clase2    FRED
Clase3    BANKS
-------------------------------------------------------------------------
Codigo    DEBT+
Nombre    The debt ratio is adequate (between 0.25 and 0.40)
Linea     1.FRATIOS.02
Grupo
Condexpr  F("1.FRATIOS.02",0) >0.25 AND F("1.FRATIOS.02",0) <0.40
Condnote  RDEB+    The debt ratio is adequate (between 0.25 and 0.40).
Clase1    GOOD1
Clase2    ERNIE
Clase3    BANKS
-------------------------------------------------------------------------
Codigo    DEBT-
Nombre    The debt ratio is too high (higher than 0.40)
```

FIG. 49

| FILE: GRUPOS.DBF | | |
|---|---|---|
| Name | Type, Width, Dec | |
| CODIGO | Character, 6 | 59 |
| NOMBRE | Character, 35 | 60 |

FIG. 50

```
Codigo|Nombre
------+-----------------------------------------+--
ASSETS|Assets (current, long term, total)       |
LIABIL|Liabilities (current, long term, to      |
EQUITY|Equity (assets, earnings)                |
FRATIO|Efficiency ratios (turnover, earnin      |
```

FIG. 51

| FILE: DETALLE.DBF | | |
|---|---|---|
| Name | Type, Width, Dec | |
| GRUPO | Character, 6 | 58 |
| LINEA | Character, 12 | 49 |

FIG. 52

```
Grupo |Linea
------+------------+-
ASSETS|1.BALANCE.02|
ASSETS|1.BALANCE.03|
ASSETS|1.BALANCE.04|
ASSETS|1.BALANCE.05|
ASSETS|1.BALANCE.06|
LIABIL|1.BALANCE.08|
LIABIL|1.BALANCE.09|
LIABIL|1.BALANCE.10|
EQUITY|1.BALANCE.12|
EQUITY|1.BALANCE.13|
EQUITY|1.BALANCE.14|
EQUITY|1.BALANCE.15|
FRATIO|1.FRATIOS.10|
FRATIO|1.FRATIOS.11|
```

FIG. 53

| FILE: CLASE1.DBF | | |
|---|---|---|
| Name | Type, Width, Dec | |
| CLASE1 | Character, 6 | 61 |
| NOMBRE1 | Character, 35 | 62 |

FIG. 54

```
  Clase1 Nombre1
 --------+----------------------------------+--
  EXCEL2 Opportunity - High priority
  URGNT2 Menace - High priority
  EXCEL1 Strength - High priority
  URGNT1 Weakness - High priority
  GOOD2  Opportunity - Low priority
  ALARM2 Menace - Low priority
  GOOD1  Strength - Low priority
  ALARM1 Weakness - Low priority
```

FIG. 55

| FILE: PRESUMEN.DBF | | |
|---|---|---|
| Name | Type, Width, Dec | |
| ANALISIS | Character, 6 | 63 |
| NOMBRE | Character, 50 | 64 |
| CONDNOTE | Character, 200 | 65 |
| PMIN | Numeric, 2, 0 | 66 |

FIG. 56

```
BROWSE VIEW.   FILE: PRESUMEN.

Analisis Nombre
 ----------+----------------------------------
   GOOD    Upturn:   sales, income, profits, inventory
   DANGER  Downturn: sales, income, profits, inventory
```

FIG. 57

```
  Analisis GOOD
  Nombre   Upturn: sales, income, profits, inventory
  Condnote GOOD-Upturn:  There has been a consistent,
  Pmin     3
 ----------------------------------------------------
  Analisis DANGER
  Nombre   Downturn:sales, income, profits, inventory
  Condnote DANGER-ownturn: There has been a consist
  Pmin     3
```

FIG. 58

| FILE: DRESUMEN.DBF | | |
|---|---|---|
| Name | Type, Width, Dec | |
| ANALISIS | Character, 6 | 63 |
| PRUEBA | Character, 6 | 53 |

FIG. 59

```
Analisis│Prueba│
────────┼──────┼──
GOOD    │DEBT+ │
GOOD    │INVEUP│
GOOD    │ARECUP│
GOOD    │EAR1UP│
GOOD    │EAR3UP│
DANGER  │DEBT- │
DANGER  │INVEDN│
DANGER  │ARECDN│
DANGER  │EAR1UP│
DANGER  │EAR3DN│
```

FIG. 60

| FILE: PRRESULT.DBF | | |
|---|---|---|
| Name | Type, Width, Dec | |
| ANALISIS | Character, 6 | 63 |
| NPER | Numeric, 2, 0 | 52 |

FIG. 61

```
Analisis│Nper│
────────┼────┼──
DANGER  │  7 │
GOOD    │  8 │
GOOD    │  9 │
```

FIG. 62

| FILE: DRRESULT.DBF | | |
|---|---|---|
| Name | Type, Width, Dec | |
| ANALISIS | Character, 6 | 63 |
| NPER | Numeric, 2, 0 | 52 |
| PRUEBA | Character, 6 | 53 |
| LINEA | Character, 12 | 49 |
| POSITIVA | Character, 1 | 67 |

FIG. 63

| Analisis | Nper | Prueba | Linea | Positiva |
|----------|------|--------|-------|----------|
| DANGER   | 7    | ARECDN |       | P        |
| DANGER   | 7    | DEBT-  |       |          |
| DANGER   | 7    | EAR1UP |       |          |
| DANGER   | 7    | EAR3DN |       | P        |
| DANGER   | 7    | INVEDN |       | P        |
| GOOD     | 8    | ARECUP |       | P        |
| GOOD     | 8    | DEBT+  |       |          |
| GOOD     | 8    | EAR1UP |       |          |
| GOOD     | 8    | EAR3UP |       | P        |
| GOOD     | 8    | INVEUP |       | P        |
| GOOD     | 9    | ARECUP |       | P        |
| GOOD     | 9    | DEBT+  |       |          |
| GOOD     | 9    | EAR1UP |       | P        |
| GOOD     | 9    | EAR3UP |       | P        |

FIG. 64

| FILE: IBASES.DBF | |
|---|---|
| *Name* | *Type, Width, Dec* |
| NOMBRE | Character, 8 |
| BYTES | Numeric, 4, 0 |
| RECORDS | Numeric, 5, 0 |
| MENSAJE | Character, 50 |
| CARACTER | Character, 1 |

FIG. 65

| Nombre | Bytes | Records | Mensaje |
|--------|-------|---------|---------|
| TABLA    | | | Back-up de Tabla de Datos ....... |
| RESULT   | | | Back-up de Resultados Obtenidos . |
| PRUEBA   | | | Back-up de Pruebas o Fórmulas ... |
| GRUPOS   | | | Back-up de Grupos de Datos....... |
| DETALLE  | | | Back-up de Detalle de los Grupos  |
| CLASE1   | | | Back-up de Clasificación Clase 1  |
| CLASE2   | | | Back-up de Clasificación Clase 2  |
| CLASE3   | | | Back-up de Clasificación Clase 3  |
| PRESUMEN | | | Back-up de Pruebas Resumen ...... |
| DRESUMEN | | | Back-up de Pruebas Resumen Detall |
| PRRESULT | | | Back-up de Resultados Resumen ... |
| DRRESULT | | | Back-up de Resultados Resumen Det |

FIG. 66

```
|              window TABLA      title: DATA TABLE                  |
|-------------------------------------------------------------------|
|                                       CURSOR ACTIVE HERE          | 72
| Browse data from file:   tabla.dbf                                |

|              window RESULT     title: DIAGNOSTICS                 |
|-------------------------------------------------------------------| 73
| Browse data from file:   result.dbf                               |
```

```
·─────────────────────────────────────────────────────────·
|           window TABLA      title: DATA TABLE           |
|---------------------------------------------------------|  74
| Browse data from file: tabla.dbf                        |
·─────────────────────────────────────·───────────────────·
| window RESULT1  title: DIAGNOSTICS  | Text from file PRUEBA.DBF
|-------------------------------------| syncronized to active cursor ──76
|         CURSOR ACTIVE HERE          | in window RESULT1
| Browse data from file: result.dbf   | indexed by fields:
|                 Â                   | prueba.codigo=result.prueba
·────────────────Â75─────────────────·
```

FIG. 76

```
·─────────────────────────────────────────────────────────·
|           window TABLA      title: DATA TABLE           |
|---------------------------------------------------------|  77
| Browse data from file: tabla.dbf                        |
·─────────────────────────────────────·───────────────────·
| window RESULT1  title: DIAGNOSTICS  | Text from file PRUEBA.DBF
|-------------------------------------| syncronized to active cursor ──79
|         CURSOR ACTIVE HERE          | in window RESULT1
| Browse data from file: result.dbf   | indexed by fields:
|                 Â                   | prueba.codigo=result.prueba
·────────────────Â78─────────────────·
```

FIG. 77

```
·─────────────────────────────────────────────────────────·
|           window TABLA      title: DIAGNOSTICS          |
|---------------------------------------------------------|
|                                     CURSOR ACTIVE HERE  |  80
| Browse data from files: result.dbf and prueba.dbf       |
·─────────────────────────────────────────────────────────·
|           window RESULT     title: DATA TABLE           |
|---------------------------------------------------------|  81
| One-line browse data from file: tabla.dbf               |
·─────────────────────────────────────────────────────────·
```

FIG. 78

```
·─────────────────────────────────────────────────────────·
|           window TABLA      title: DIAGNOSTICS          |
|---------------------------------------------------------|──82
| Browse data from files: result.dbf and prueba.dbf       |
·─────────────────────────────────────────────────────────·
|           window RESULT     title: DATA TABLE           |
|---------------------------------------------------------|
|                                     CURSOR ACTIVE HERE  |──83
| Browse data from files: tabla.dbf                       |
·─────────────────────────────────────────────────────────·
```

FIG. 79

```
.———————————————————————————————————————————————————————.
|            window TABLA      title: FREQUENCIES       |
|--------------------------------------------------------|
|                                    CURSOR ACTIVE HERE |————84
| Browse data from files: temp.dbf                       |
|                                                        |
.————————————————————————————————————————————————————————.
|            window RESULT     title: DIAGNOSTICS        |
|--------------------------------------------------------|
|                                                        |————85
| Browse data from files: temp1.dbf                      |
.————————————————————————————————————————————————————————.
```

FIG. 80

```
.————————————————————————————————————————————————————————————————————————.
|                    window TABLA      title: FREQUENCIES                 |
|-------------------------------------------------------------------------|————86
| Browse data from files: temp.dbf                                        |
|                                                                         |
.———————————————————————————————————.—————————————————————————————————————.
| window RESULT1  title: DIAGNOSTICS | Text from file PRUEBA.DBF          |
|------------------------------------| syncronized to active cursor       |————88
|               CURSOR ACTIVE HERE   | in window RESULT1                  |
| Browse data from files: temp1.dbf  | indexed by fields:                 |
|                                    | prueba.codigo=temp1.prueba         |
.——————————————Â————————————————————.—————————————————————————————————————.
               Â87
```

FIG. 81

```
.————————————————————————————————————————————————————————————————.
|                 window TABLA      title: SUMMARIES              |
|-----------------------------------------------------------------|
|                                             CURSOR ACTIVE HERE |————89
| Browse data from files: prresult.dbf and presumen.dbf          |
|                                                                 |
.—————————————————————————————————————————————————————————————————.
|       Middle text from file PRESUMEN.DBF                        |
|          syncronized to active cursor in window TABLA           |————91
|       indexed by fields: prresult.analisis=presumen.analisis    |
.—————————————————————————————————————————————————————————————————.
|                 window RESULT    title: DIAGNOSTICS             |
|-----------------------------------------------------------------|
|                                                                 |————90
| Browse data from files: drresult.dbf                            |
.—————————————————————————————————————————————————————————————————.
```

FIG. 82

Menu administration
- Creates and activates main menus (*vcambio.prg*)
- Calls main menu routines (*vmenu.prg*)
- Calls diagnostics menu routines (*vacti.prg*)

Applications
- Change application path default (*vdrive.prg*)
- Checks structure for each file (*vverif.prg*)

Add/modify tests
- Add/modify line tests (*vcond.prg*)
- Add/modify group tests (*vcondg.prg*)
- Duplicate a line test (*vdup.prg*)

Apply tests
- Apply line tests (*vapl.prg*)
- Apply group tests (*vaplg.prg*)
- Apply summary tests (*vaplr.prg*)

Diagnostics coordinated browses
- Data browse view (*vman.prg*)
- Diagnostics browse view (*vmanr.prg*)
- Frequency browse view (*vresu.prg*)
- Summary browse view (*vsumm.prg*)

Maintenance and other
- File import from *ASCII* file (*vbases.prg*)
- Calls file print routines (*vlista.prg*)
- Moves data twelve periods back (*vaño.prg*)

FIG. 89

APPARATUS FOR APPLYING ANALYSIS RULES TO DATA SETS IN A RELATIONAL DATABASE TO GENERATE A DATABASE OF DIAGNOSTIC RECORDS LINKED TO THE DATA SETS

BACKGROUND OF THE INVENTION

The invention as a whole relates to the fields of decision-support software and expert systems.

More specifically, the invention relates to computer software integrating the functions of expert systems and database query systems for executive report analysis.

Current software implementations do not address directly the need for a system integrating (a) report analysis via the generation of diagnostics using an expert system, (b) storage of said diagnostics in a database related to the original information in the reports, and (c) a query system, empowering the user to search for any information in both reports and diagnostics in a coordinated manner.

Heretofore, no instruments have been involved in a similar idea as that dealt with in the invention. However, its individual elements respond to prior art in the following areas: (A) decision-support software and executive information systems, and (B) expert systems, expert system building tools and other artificial intelligence technologies such as neural networks. Other prior art of lesser relevance to this invention includes: (C) programming tools and languages, (D) relational database systems and (E) management information systems.

A. Referring to DECISION-SUPPORT SOFTWARE, existing tools do not address the specific functionality of this invention.

Decision-support software and executive information systems (EISs) have been primarily designed for business managers. These systems allow managers to see very simple summary reports from huge amounts of information stored in databases. Simplicity is foremost in these systems, since managers don't want to deal with menus, and even less with any programming. So, new concepts such as "downdrilling" are introduced. Typically, the first screen the manager will see is a very summarized report. This report could show a few numbers. The manager will want to know more about some number in the screen, so he simply points at that particular number and he will get a more detailed report associated to it. And in this detailed report, he can again do the same, and get another more detailed and specific report. This is called "downdrilling." EISs also provide a programming language and a set of tools for developing simple reports. In other words, EIS systems are for programmers to build simple reporting applications for managers. And then the managers run the EISs with the applications that have already been developed for them.

A few tools will be now discussed as good examples of the current state of prior art.

The DECISION PAD (V.2.0)™ decision-support tool, by Apian Software of Menlo Park, Calif., combines facts and opinions in spreadsheet-style matrix. Applications include purchasing, employee evaluations, hiring, vendor evaluations, investing, project prioritization, and sales. The product handles up to 250 Alternatives, 250 Criteria, and 60 Evaluators. Weights are by numbers in 1 or 2 levels or by words. Pre-formatted reports include worksheet, bar graphs, sensitivity analysis, scatter plots and logged what-if cases. The product imports and exports files.

The MAXCIM DECISION SUPPORT SYSTEMS II™ decision-support tool, by ASK Computer Systems, Inc. of Mountain View, Calif., provides budget upload function supporting file updates, multiple spreadsheet formats, multiple budgets, selective period updating, quarterly spreading and audit trail. The product includes financial report writer with column and row report definitions, user definable formats, financial management reporting and GL integration.

The DECISIONMAKER™ decision-support tool, by ASK Computer Systems, Inc. of Mountain View, Calif., gathers information and presents it on screen. The product provides exception reporting; summary information for manufacturing, marketing and financial areas of company; and supporting detail information for specific inquiries.

The EIS™ (Executive Information Services™) decision-support tool, by Boeing Computer Services of Seattle, Wash., solves business planning and control problems. Its features include consolidation, modeling, graphics, reports, statistics and financial functions, backward iteration and sensitivity analysis. It is capable of solving simultaneous equations, recording equations, forecasting, estimating, planning, budgeting and performance tracking. It belongs to the class of systems called 'authoring systems'.

The Business Insight™ decision-support tool, by Business Resource Software of Austin, Tex., is a powerful tool for business analysis, strategic planning, and forecasting. It is capable of providing expert help in the development of promotional strategies, sales methods and inventory management applications. It is related to financial planning systems, spreadsheets and expert systems.

The Decision Support System™ (DSS™) decision-support tool, by Definitive Software Inc. of Bloomington, Ind. is an end-user report writing tool. It provides access to computer files and writes reports using menus.

The EIS Tool Kit™ decision-support tool, by Executive Performance Systems of Glendale, Ariz., is a complete executive information system (EIS) which includes all programs and drivers necessary to construct complete and functional EIS applications. It enables user to select input and output devices, arrange hierarchy of data to be displayed and customize display screens.

The EIS Toolkit™ decision-support tool, by Ferox Microsystems, Inc. of Alexandria, Va., allows the user to build a financial executive information system using his own account structure. This product provides EIS capabilities such as drill-down from summary detail, color exception reporting, trend analysis, graphics and textual annotation of numeric data.

The Executive Information System™ decision-support tool, by Global Software, Inc. of Raleigh, N.C., provides icon-based, graphical views of summarized information. It features host logon and delivery of data through scheduled, unattended batch jobs to individual stations. It generates reports through the use of a mouse or with touch screen drivers.

The Forest & Trees™ decision-support tool, by Channel Computing Inc. of Newmarket, N.H., is a data access software tool that monitors vital signs of small to large business. It works in the background alerting the user of any unusual data. It provides access and monitoring capabilities to databases and spreadsheets on individual PCs, networked PCs and minicomputers. It provides drill-down capabilities that allow users to access supporting data. It restructures data into visual set of business vital signs that summarize enterprise's status and health. It includes graphics capabilities.

The LightShip™ decision-support tool, by Pilot Executive Software, of Boston, Mass., is another popular authoring system for the development of executive information systems.

Of all other executive information systems examined, none provides the specific functionality of this invention. Many of these EIS tools are simply multidimensional spreadsheets, interesting for managers because of the flexibility to recalculate and examine information in different manners and dimensions. A good example of these systems is the CA-COMPUTE™ multi-dimensional spreadsheet program, by Computer Associates Corporation of Islandia, N.Y.

B. Referring to EXPERT SYSTEMS and expert systems building tools, it is important to state that Expert systems, commonly known as knowledge systems, have been widely known for at least ten years. However, their technology is an important prior art reference to this invention, so it will be briefly described here.

Researchers define expert systems (also called knowledge systems) in the following way: Intelligent computer programs that use knowledge and inference procedures to solve problems that are hard enough as to require in their solution, significant expertise.

Expert systems typically consist of (a) an interpretive language where the user may write his or her program statements and the conditions associated with those statements, (b) an inference engine, which provides the mechanism through which the expert rules are interpreted and fired, and (c) an executive front-end or expert shell, that helps users write application programs using the language, and that helps them run the expert applications developed, and that also helps them develop and query reports or the generated diagnostics.

With expert systems, in contrast than with other types of programs, users tell the computer what to know, not what to do. To build a traditional program, any developer creates a set of instructions. To build an expert system, the developer creates knowledge. Traditional programs execute by following every step of the algorithms contained in the program. Expert systems execute in different ways.

If an algorithm has to execute step by step to find a solution, that algorithm is really a traditional program. If there isn't a step-by-step method available to solve a particular problem, then artificial intelligence techniques such as expert systems (knowledge systems) and neural networks must be used.

Expert (knowledge) systems contain two basic elements: inference engine and knowledge base. The knowledge base holds all information related to the tasks at hand: (a) the rules and (b) the data on which they will be applied. The inference engine is a mechanism that can operate the information contained in the knowledge base.

In a rule-based system, the knowledge base is divided into a set of rules and working memory (or database).

Just like an IF-THEN sentence, each rule has two parts: a premise and a conclusion. A rule is said to be fired when the inference engine finds the premise is stored as TRUE in working memory (the knowledge base) and it incorporates the conclusion of the rule to the working memory (knowledge base) too.

Working memory is the database contained in the knowledge base. This holds all facts that describe the current situation. Generally, the expert system will start with very few facts. These will expand as the system learns more about the situation at hand, and as far as some rules are executed.

The inference engine or rule interpreter has two tasks. First, it examines facts in working memory and rules in the rule base, and adds new facts to the database (memory) when possible. That is, it fires rules. Second, it determines in what order rules are scanned and fired.

The inference engine can determine the order in which rules should be fired by different methods such as forward chaining, backward chaining, breadth- or depth-wise scan techniques, etc. Applications that use forward chaining, such as process control are called data-driven. Applications that use backward chaining are called goal-driven. Forward chaining should be used for small sets of relevant facts, where many facts lead to few conclusions. A forward chaining system must have all its data at the start, rather than asking the user for information as it goes. Backward chaining should be used for applications having a large set of facts, where one fact can lead to many conclusions. A backward-chaining system will ask for more information if needed to establish a goal.

Some systems' inference engines are designed to ask the user for more information, and to inform the user about the conclusions that have been reached. After the inference engine shows a conclusion to the user, the user may ask "how" and the system will explain how that given value was found. After the inference engine asks a question to the user, the user may also ask "why" and the system will explain why the current question is being asked.

Development of serious expert system implementations is a non-trivial task, usually left to a programmer experienced in the art. Typically, expert system development kits provide a programming language for the development of specific expert applications. A separate element in expert system building tools, commonly known in the industry as an expert shell, also provides the programmer and the user with a front-end application designed to ease the design-program-run cycle in the development and use of an expert system application.

Many expert system building tools are available to the public, such as the VP-EXPERT™ expert shell by Paperback Software, the CLIPS™ expert system development tool and language by NASA, Nexpert Object™ expert system development tools by Neuron Data, and the KnowledgeMaker™ development system by Knowledge Garden. On their part, NEURAL NETWORKS attempt to mimic the human brain by "learning" different sets of stimulus patterns (such as medical symptoms) and their associated responses (diagnoses). Incomplete and/or overlapping sets of stimuli can be presented to the neural network, which can then return several responses matching those stimuli using probability weightings to produce an ordered list of responses.

Each neural network problem session contains a set of defined stimuli, a set of defined responses, and a set of relationships between specific groups of stimuli and the response that each group is to produce. The set of stimuli (responses) is represented by a group of stimulus (response) nodes at what is called the "input (output) layer". Then, there is usually one or more intermediate layers, containing nodes that are each linked to every input layer node and every output layer node in the network. The number of the middle layer nodes is usually equal to the average of the number of input and output nodes. Probability values (weights) are then associated with each of these connections and are constantly being updated as the network "learns" new information.

None of the expert systems, expert system building tools or neural network building tools in the prior art are capable of automatically creating an integral database of diagnostics that can be queried simultaneously and in a synchronized manner with the original data. A few existing systems would allow the replication of the operations of this invention using their general-purpose programming languages, but it would be very complicated to program to do the functions equivalent to the claimed invention. To do such a thing would require a fair degree of sophistication in the user, and to do what the claimed invention does is not at all suggested by any prior art expert system or expert system tool, since their teachings are very general in this respect. Only with the benefit of hindsight and a great deal of programming skill would one skilled in the art appreciate that what is done by the claimed invention could be done with the prior art tools and be able to do it. The claimed invention is not obvious from any prior art, because prior art products, tools and theories do not mention building a diagnostics data structure and linking of this structure with the original data along the lines of the claimed invention.

The same could be said of existing languages that are particularly oriented to the development of expert systems other artificial intelligence products and technologies, such as LISP, PROLOG and others.

C. Referring to PROGRAMMING TOOLS AND LANGUAGES, technology and prior art allow the user to easily integrate the operation of independent programs running concurrently, by defining how specific predetermined data should be shared. Good examples of this technology comprise the MICROSOFT WINDOWS™ graphical operating environment, by Microsoft Corporation, the NEWWAVE™ front-end tool, by Hewlett Packard corporation, the X-WINDOWS™ graphical operating environment and the X-MOTIF™ graphical operating environment. However, these tools only provide a very general framework where all the programming would still have to be done, if possible, to create a logic procedure equivalent to that of this invention. Furthermore, given the current state of technology and the prior art, it was considered much more practical and easier to develop the best-mode implementation of this invention using from a general-purpose programming language.

D. Referring to relational database systems, a wide number of these systems exist in the market today, but all of these should be interpreted as general-purpose programming languages for the operation of information stored in the relational database format. None of these systems can replicate the operation of this invention without a sizable programming investment.

E. Referring to management information systems (MIS), most current implementations of these systems do not incorporate decision-support tools, expert systems, or an integrated system of generating and querying reports and their associated diagnostics. When a MIS incorporates a decision-support tool, this tool should be interpreted as a separate instrument. MIS systems may integrate data from a whole distributed organization, but nothing has been suggested in the prior art about the generation of a diagnostics database linked to the original data.

As it has already been said, the prior art tools described in sections A to E would be very complicated to program to do a function equivalent to the claimed invention. To do such a thing would require a fair degree of sophistication in the user, and to do what the claimed invention does is not at all suggested by these tools in the prior art. The teachings of the prior art's instruments and programming tools are very general. Only with the benefit of hindsight and a great deal of programming skill would one skilled in the art appreciate that what is done by the claimed invention could be done with the existing programming tools.

The cited PRIOR-ART references are important because the invention provides the benefits of integrating their main characteristics. (A) Like decision—support software and executive information systems, the invention allows managers to see very simple summary reports from huge amounts of information stored in databases. Simplicity is foremost in the invention, as it has been proved in the preferred embodiment implementation. Typical EIS tools such as downdrilling are also used in the invention Typically, the first screen the manager will see is a very summarized report, then the user can get more and more detailed information on those choices he makes. The invention can alert the user of any unusual data. Only very few EIS systems can do this, and they do it only by coloring the data or sounding audible alarms in the computer while the invention builds a whole structured database of diagnostics. Like EIS systems, the invention is capable of restructuring data into visual set of business vital signs that summarize any enterprise's status and health, but the invention will also be able to do this structuring of the information, based on the associated diagnostics' structure. No other system can do this.

(B) Like expert system building tools, the invention allows the definition of expert rules and clauses, and data can be integrated and processed through an inference engine, presenting the final results of the process to the user. Like expert systems, neural networks and other artificial intelligence techniques, the invention is capable of finding solutions to expert analysis problems, summarizing a large body of information into a compact, structured knowledge database.

(C) Like programming tools and languages, the invention allows flexible development of applications in many fields of human knowledge. The expert system—inference engine module in the invention comprises, in fact, a full development programming language.

(D) Like relational database systems, the invention allows data structuring of its basic input information and diagnostic results: relational database indexing, filtering, and data query operations of all types. Full applications can be integrated with the invention through indexing operations between their key files.

(E) Finally, like management information systems, the invention can integrate information of all kinds in a unified environment. The invention is capable of operating this information and presenting appropriate results to managers.

The invention adds a scheme for the integration of data handling benefits and querying techniques from relational database systems, flexible development of applications from programming tools, integration of information from MIS tools, expert analysis from expert systems, and decision support and reporting capabilities from decision support tools. This form of integration that the claimed invention does is not at all suggested by these tools in the prior art.

OBJECTS AND ADVANTAGES OF THE INVENTION

Accordingly, the following paragraphs describe several OBJECTS AND ADVANTAGES of the invention.

The invention is useful for the analysis of reports and structured data in almost all types of information and applications. The invention can process and generate in just seconds large structured databases of diagnostics to be queried immediately. The analysis of these same reports using any prior art product or concept may require a valuable time investment of many hours on the part of the user.

The invention lets managers concentrate in action and strategy, that is, in their final goals and results. The invention executes all repetitive report analysis, ratios and number comparisons, signals for dangers, menaces, strengths and opportunities. While all other products are only able of showing averages of all available information, the invention is capable of showing either database summaries or individual case analysis classified by degree of importance and relevance to the management process. And all these concepts can respond to state-of-the-art artificial intelligence, neural networks, and expert system analysis techniques.

Therefore, the invention represents important time and cost reductions to managers, administrators, technical people, manufacturing engineers, etc.

With state-of-the-art technologies, data integration has meant easy access to all data, and the production of summary reports representing the condition of the organization, firm or institution based on a set of averages. For end-users, all this translates to data accumulation and proliferation. This makes data handling ever more complicated as time goes on. On the other hand, the invention immediately shows priorities according to the managers' own needs, preferences and criteria. The invention could substitute current EIS and data analysis technologies, but it can better serve the needs of end-users by integrating this new technology to existing tools. Thus, the invention can help managers and end-users determine which information and which tool they should check and when they should do so.

As information grows, data classification schemes become more important. The invention allows data organization by function, action and end-user preferences, rather than by type of data.

Consulting expertise, managerial expertise and technical expertise in many fields is often lost as soon as the person responsible leaves the firm and the organization. This is, for example, a common problem in most consulting firms. These firms would like to be able to use a tool that will extend the results of that expertise with their clients. By leaving an embodiment of the invention with a client, programming with the consulting firm's expertise, the consulting firm will be able to extend their presence with the client. Also, the invention can be applied to strategic planning, organizational analysis, decision-analysis, manufacturing control, quality control, and many other fields.

Up to now, artificial intelligence and expert systems have been able to work on a case-by-case strategy. The typical expert system is given one simple problem and it suggest one practical solution to the problem. But these tools are more useful when dealing with vast amounts of data, chaining recommendations and their logical expert inferences in a structured database of diagnostics. The invention allows this.

The invention addresses all information analysis problems, receiving as input all relevant information from structured databases and reports. The invention replicates the typical manager's mechanical ratio analyses on the data, number comparisons and many other operations with the data. The invention may then apply If-then-else clauses, Expert system clauses and other artificial intelligence techniques to the data, such as neural network technologies. All results from these expert data analysis techniques is stored in a relational database, keeping two-directional pointers to and from the particular data the results have been obtained from. The invention finally presents a query system, allowing end users to structure, organize and classify all diagnostics and the original data queries according their own interests, such as people responsible, urgency of relevant matters, actions that should be taken, etc.

Prior art tools such as the Forest & Trees™ decision-support tool, by Channel Computing Inc., are capable of differentiating relevant data by using different colors to those numbers that require the manager's attention. In order to do this, these programs allow the definition of If-then-else formulas that can be linked to individual data items in reports and databases. But prior art tools don't allow the creation, storage and coordinated query of a structured database of diagnostics.

The invention is the only tool that shows where is the problem, in a much more efficient and functional way than prior art tools: the invention can present sorted, filtered and structured lists of all diagnostics and their results, according to related actions, persons responsible, priorities, or any other criteria selected by the user.

The invention builds and keeps links between all diagnostics and the original data (reports, typical business databases, etc.). If the end-user queries the invention about a symptom, then the invention will show the related diagnostic or diagnostics, and then the invention can show the original data item or items those diagnostics come from.

The invention's structure and logic allow its integration to most existing applications. In one window, the user will still operate with his favorite application (such as an accounting application). While he moves the cursor over the data in that application, he will be able to see related diagnostics, generated by the invention. If the user switches control to the invention's window, then he will be able to generate, filter, sort and query lists of diagnostics resulting from the data in the linked application. By moving the cursor over each resulting diagnostic, the linked application's data related to the particular diagnostic will be shown in the application's window.

The invention can also be linked in the same way to other typical applications that process or contain data such as statistical analysis applications, spreadsheet or database applications, inventory analysis applications, accounting programs, financial or market analysis programs, etc.

Probably the most powerful feature of the invention is that users will be able to develop all kinds of practical and even self-modifiable strategic analysis applications. Recursive expert analysis techniques can work in the following way: (a) A first pass at the data, using If-then-else formulas will generate a large number of diagnostics. (b) These diagnostics will be stored in a diagnostics database. (c) Now the invention sees these resulting diagnostics as additional data. (d) A second set of formulas is run using these diagnostics as data. (e) More diagnostics are generated and stored in the diagnostics database. (f) Steps 'c', 'd' and 'e' are repeated over and over until no more diagnostics are generated.

Particular diagnostics generated by the invention can trigger specific actions. Several examples follow: phones calls can be made, machines can be turned on to run specific tasks, computer programs can be triggered and run.

In the same manner, particular diagnostics generated by the invention can trigger a routine in the invention, generating new tests for data analysis, modifying formulas or erasing previous tests in the invention. In this manner, the invention becomes a learning mechanism, under the teachings of artificial intelligence.

Therefore, the invention represents cost reductions in the development of many types of large and complicated data-analysis applications. The resulting applications are easily customizable by the user.

Further objects and advantages of the invention will become apparent in the consideration of the drawings and ensuing description.

SUMMARY OF THE INVENTION

Definition:

Expert systems are intelligent computer programs that use knowledge and inference procedures to solve problems that are hard enough as to require, in their solution, significant expertise.

Expert system building tools typically comprise (a) special data structures for the storage of knowledge, (b) a so-called inference engine for the logical operation of knowledge through the inference process, (c) interface mechanisms for the user to define goals and data, when required, (d) mechanisms for handling uncertainty and missing data and knowledge. All these mechanisms are designed in a form most efficient and appropriate to the operation of expert systems.

The invention combines expert system building tools with database management instruments (a) applying expert knowledge to any information contained in databases and reports, (b) linking the expert system results, hereby called diagnostics, with selected related data on the databases and reports, as defined by the user, and (c) presenting a query interface capable of structuring and showing the resulting diagnostics and the original linked data according to user preferences such as actions and priorities.

Figure 2:
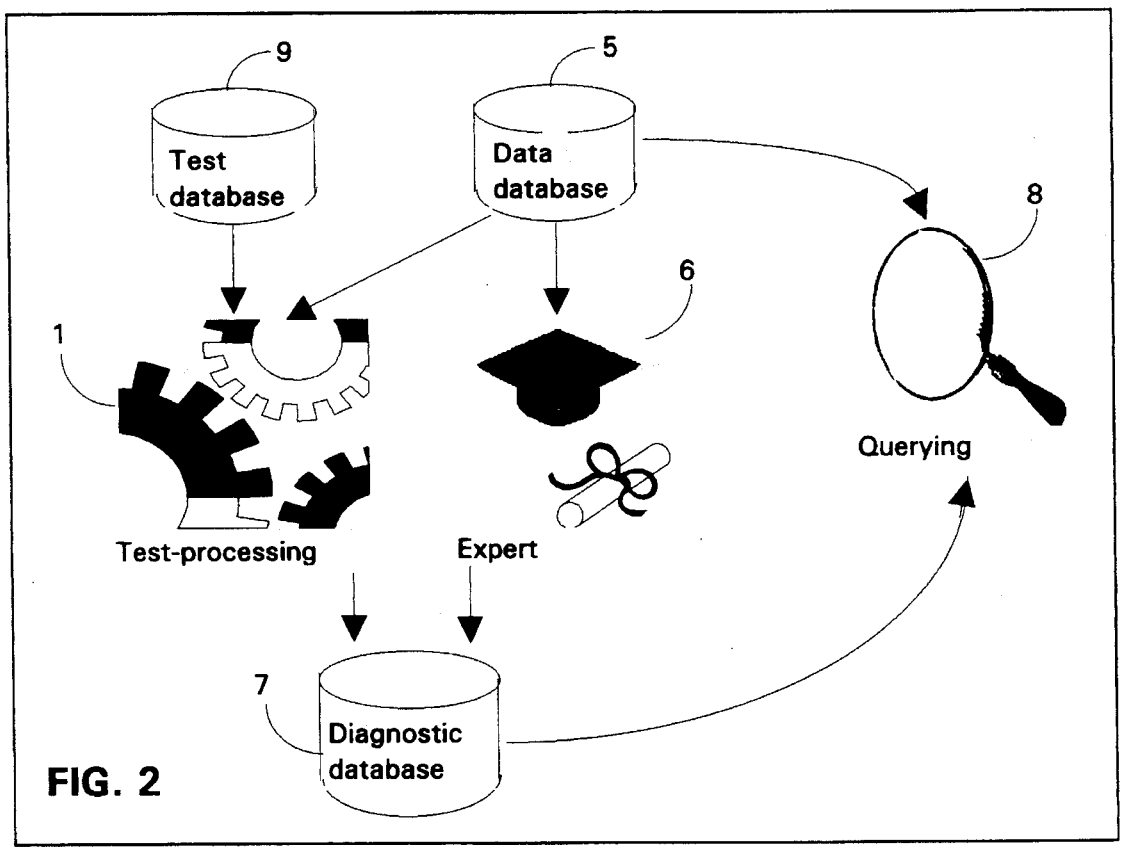

Structure:

The invention's components are, as shown in FIG. 2, and also in FIG. 1 and FIGS. 3 to 8: data database (5), tests database (9), test-processing engine (10), diagnostics database (7), querying engine (8) and inference engine (6).

Figure 3:
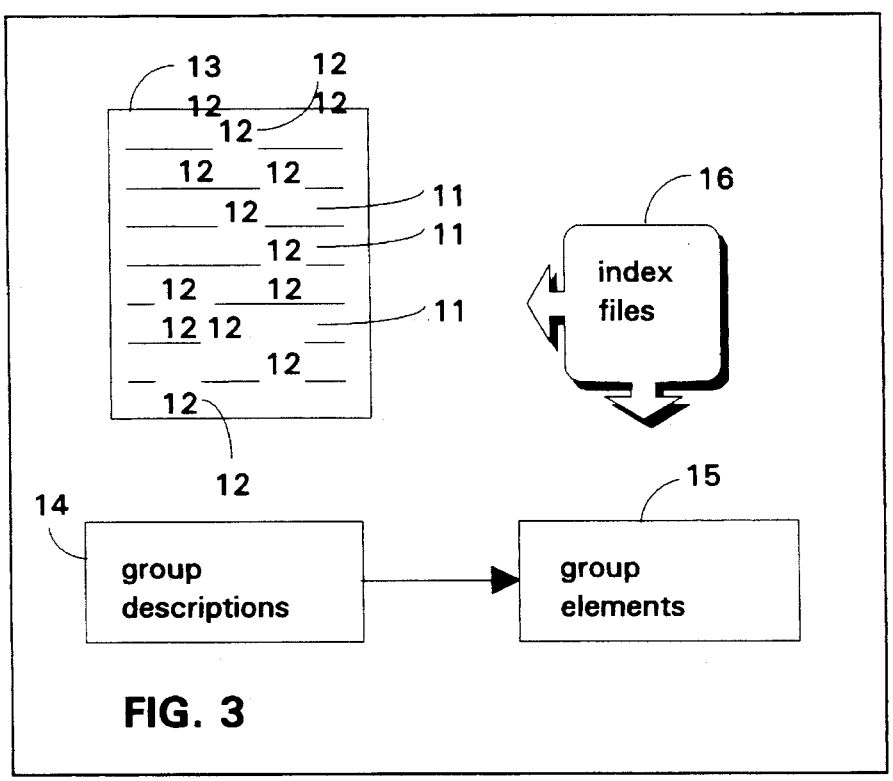

The data database (5), as shown in FIG. 3, may contain one or more of the following: (A) data tables (13) and related index files (16) for identifying each individual data item (12), (B) group elements data tables (15) that state which data items correspond to each group, so as to perform a common test on all these data items, and (C) group descriptions data tables (14).

Figure 4:
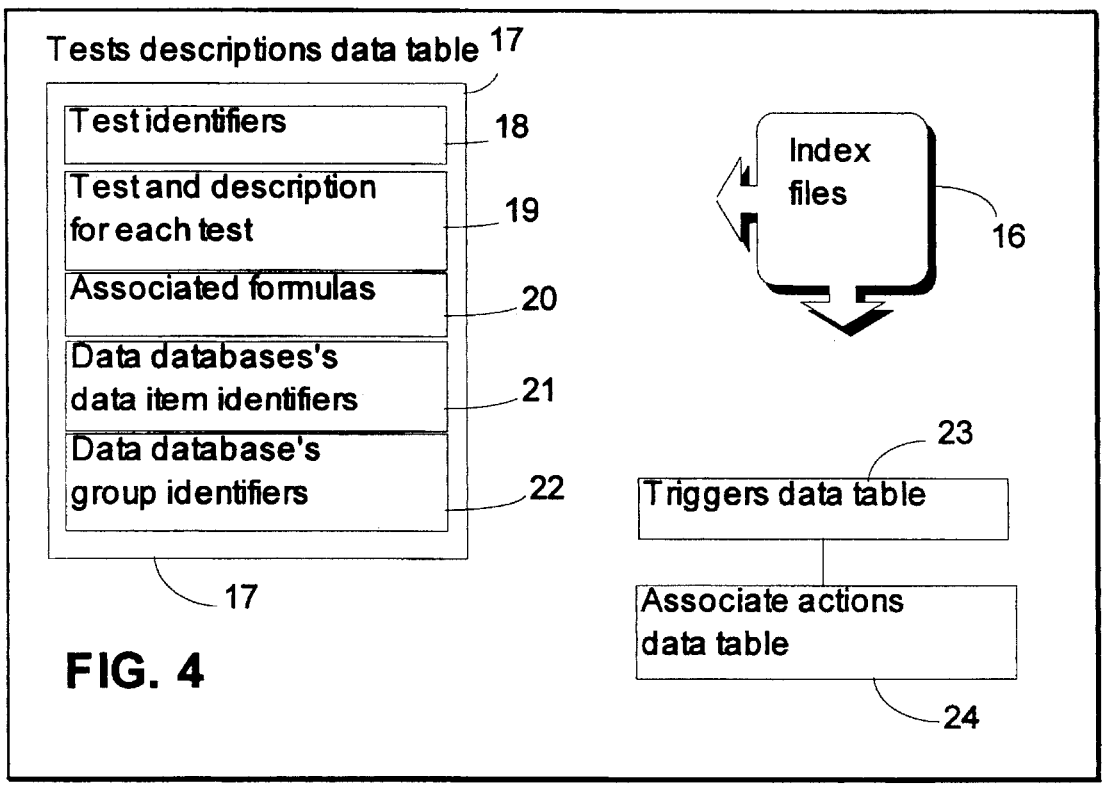

The tests database (9), as shown in FIG. 4, may contain one or more of the following: (A) tests descriptions (17) and associated formulas data tables (20), (B) data items identifiers (21) or group identifiers identifying the set of items to which the test will be applied (22), and (C) triggers data table (23), where each test is associated to a particular set of triggers, and one or more triggers may produce an action (24), where an action is any activity defined by the user.

Figure 5:
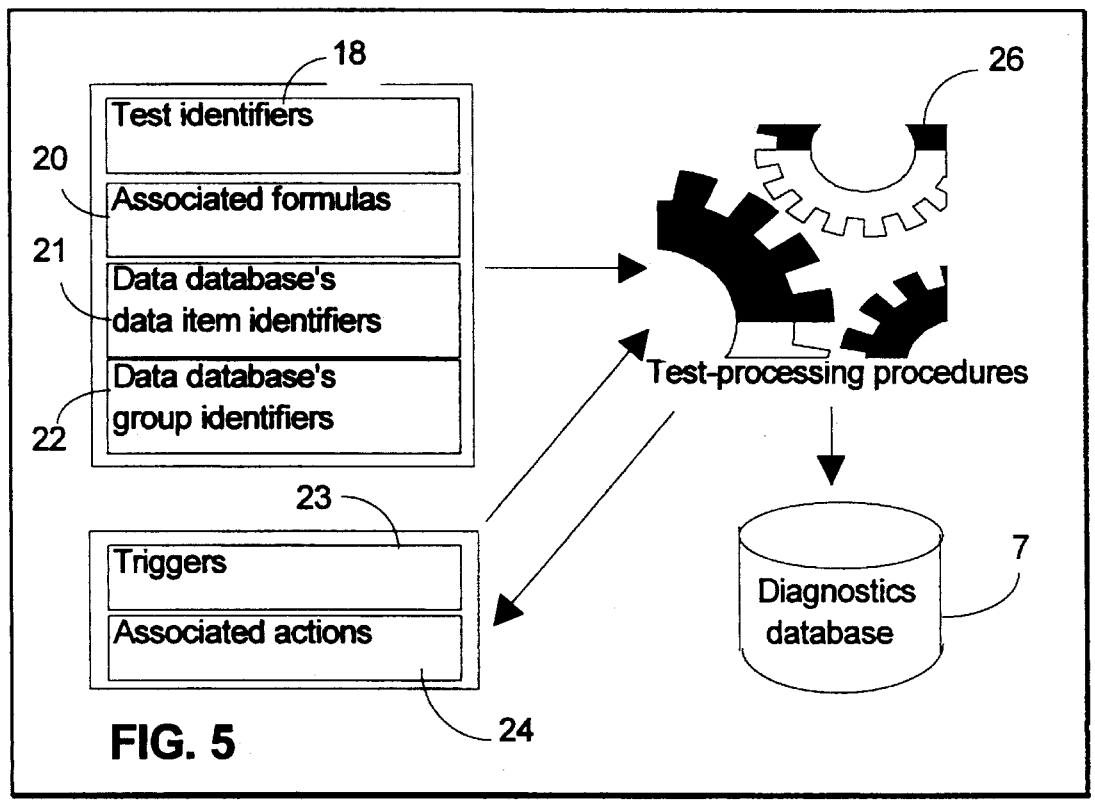

The tests-processing engine (10), as shown in FIG. 5, is capable of interpreting each if-then-else test (18 and 20), group (22) and data item identifiers (21) and triggers (23), so as to produce the diagnostics (7) corresponding to the data database (5).

Figure 6:
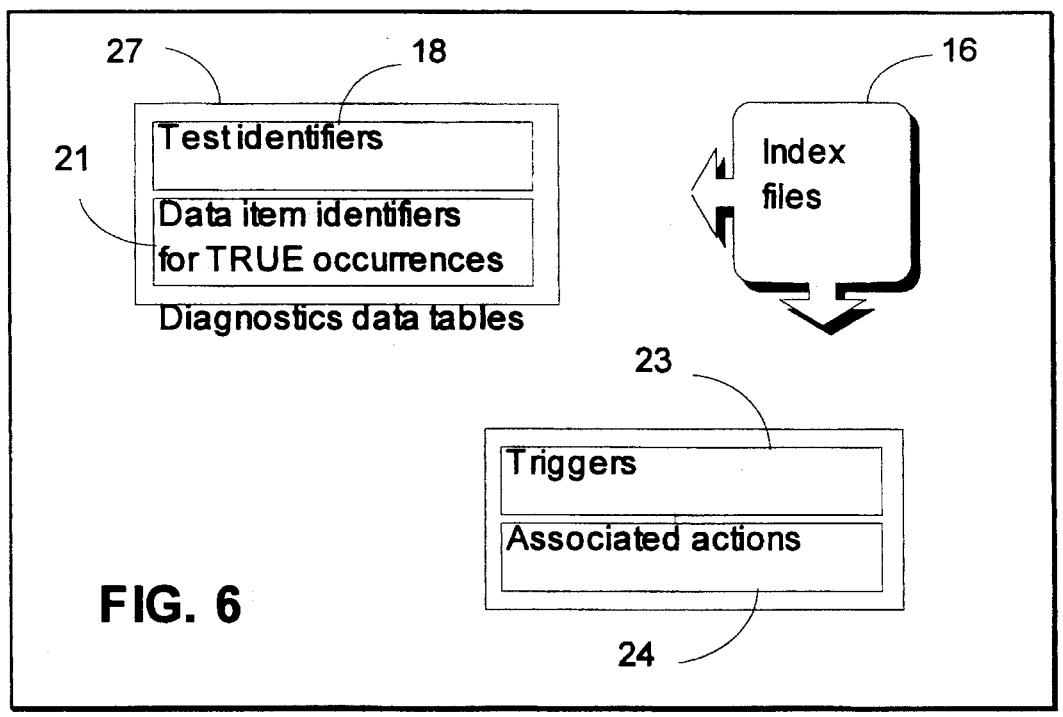

The diagnostics database (7), as shown in FIG. 6, may contain one or more diagnostics data tables (27). Each record in these data tables will contain two sets of fields. One set of fields contains identifiers (18) of those tests that produced the TRUE condition, and the other set of fields contains data item identifiers (21) for the particular data items where the tests produced the TRUE condition. Triggers (23) and their associated actions (24) may be reached immediately in the test database (9), through the associated index files (16).

The querying engine (8), as shown in FIG. 8, is capable of sorting (33), filtering (34), linking (35) and showing synchronized database browse views (36) of the previous three databases, according to the user selections and preferences.

Figure 7:
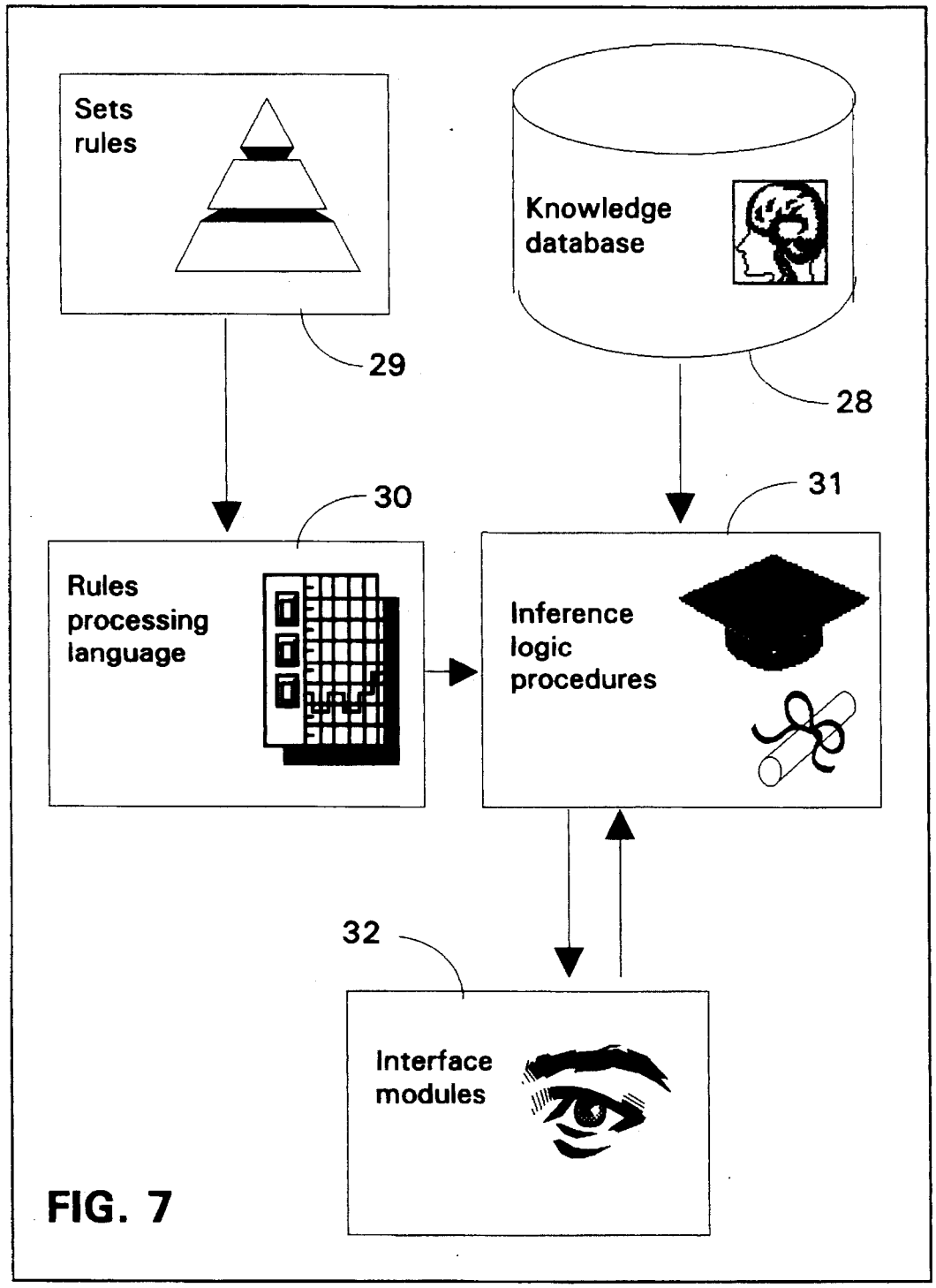

The expert system and its associated inference engine (6), as shown in FIG. 7, comprise a knowledge database (28), sets of rules (29), a rules processing language (30), inference logic procedures (31), and interface modules (32).

The invention may be implemented in different manners. In certain implementations, tests processing language would be the same. However, some practical implementations will keep these separate in order to present a simpler operating interface to the user. The description of the preferred embodiment will show these principles more clearly.

Operation:

In general, to operate, this invention proceeds through three logical stages: (1) It creates a relational database with information retrieved from different computer sources. (2) Through use of test processing procedures and, optionally, an expert system building tool, applications built with it emulate expert reasoning processes to associate data with concepts, and it calculates and evaluates indexes to generate diagnostics databases. (3) It permits users to query these diagnostics databases.

This invention can be used to develop a wide variety of applications in areas as diverse as financial analysis, organizational evaluation, and project control. As it has already been explained, the preferred embodiment of the invention will be mostly applied for the development of executive information systems. In the following paragraphs, we will primarily refer to the particular example where this invention embodies an executive information system (EIS).

At the first logical step outlined previously, in the case where this invention embodies an EIS, the relational database retrieves information from the firm's distributed information system, which could be a network of personal computers, workstations, mainframes and minicomputers. This invention, like other typical current database query systems, will be able to access information from a wide variety of computers and data formats, and thus it should be able to build the first relational database from a set of queries from all these sources. The nature of these queries shouldn't be a constraint to this invention, given that the originality of the invention lies in the novel and useful combination of the database, the expert system, the building of the diagnostics database and the coordinated query system thereof. However, in the best embodiment, the first database could be built in a manner similar to a database reporting system. That is, just as a typical reporting system generates a set of printed reports from the queries over the distributed database, this invention's queries generate a set of tables as files in the computer disk or memory. Remember that all reports are really printed tables, that is, tables that are later formatted and sent to a different device.

However, this first step may be implemented in an entirely different way. For example, a driver or set of drivers may allow the program the direct access of all distributed databases in the firm, as tables. In that case, the first step could almost be eliminated, since no new data files need be created: the data database (5) wouldn't be necessary, and the business database (1 to 4) would take its place. Such a scheme would be more efficient in terms of database storage space, but less efficient in terms of program complexity and speed of operation of the expert system—the next logical step—.

At the second logical step outlined previously, an expert system emulating human reasoning processes to associate data with concepts calculates and evaluates indexes to generate a diagnostics database. If, for example, the databases contain financial information and financial ratios, the expert system will generate the diagnostics associated to those financial ratios. If the company's debt ratio is too high, the expert system could generate a diagnostic database entry stating that "the company's debt is to large". This diagnostic statement could later be analyzed in subsequent passed of the rule system, together with all other diagnostic statements generated from the firm's financial statements, so as to suggest strategies and priorities for management.

This invention will also work if instead of the of an expert system, (a) a simpler language with a simpler set of if—Then logical condition statements and (b) an engine consisting of an appropriate set of test-processing procedures are provided. This particular case will be presented in the best embodiment implementation. Such a system could also be completely integrated with other expert systems and inference engines.

Every diagnostic generated by the expert system or the if—Then condition statements engine may be linked to the data it originated from. The links between particular data items in the database and the corresponding diagnostic items in the diagnostics database may be bi-directional or unidirectional, depending on the particular application and user preferences. In a bi-directional linking scheme, it's possible to go from every particular data item to the diagnostics that are linked to it, and it's also possible to go each diagnostic to the corresponding data item(s) this diagnostic has originated from.

These linkings may be defined by the user, or they may also be created automatically. If the links are created automatically, they simply connect every diagnostic with each one of all the data items needed to calculate the logical/mathematical test in the diagnostic. On the other hand, many times it's preferable to let the user define what data items to link each diagnostic to. For example, if the quantitative database contains numbers for sales, costs of sales and profits, and a particular diagnostic test checks if profits are going down, then quite probably the user would prefer to link this resulting diagnostic to the sales numbers, to the costs numbers and to the profits numbers, so that he'll be reminded that the profits are going down when looking at the sales or at the costs figures. Another example: if the quantitative database contains numbers for total debt (liabilities), total assets and the debt ratio (which calculates as debt/assets), then if the debt ratio is too high (for example, higher than 0.50) a diagnostic should be issued indicating "careful: the debt is too high". Again, the user will probably want to link this diagnostic to the assets numbers, to the debt numbers and to the profit ratio numbers, so that he'll be reminded that debt is too high when looking at the assets or at the liabilities figures.

Finally, at the third logical step outlined previously, this invention lets users query, in a synchronized manner, the diagnostics database and the original data database.

The invention's design lets the user do this easily: the user only needs to point the cursor at any data item, and he'll simultaneously see the key diagnostics associated with it in a separate window in the screen.

For example, FIG. 9 shows a snapshot from a computer screen. The upper half shows a few concepts from a fictional Balance Sheet for ABC Inc. The lower half of the screen shows the diagnostics associated to the data item selected by the cursor. FIG. 20 shows a similar screen, as it has been developed in the best mode implementation.

The invention stores the diagnostics in a parallel database which allows the user to sort and organize all the diagnostics information in any way he likes.

For example, with a single keystroke, the user can call a "speed bar" with the names of the diagnostics as shown in FIG. 10. Notice that only the highlighted cells meet the diagnostic's criteria. The user may sort the information in any way that he may choose to, such as by department, by product or service, or by year. The user can scroll through the diagnostics, or through the application's original data. Whenever the user scrolls through the diagnostics, he will see, in a synchronized manner, the associated data from which these diagnostics originated, and vice versa.

The invention incorporates downdrilling techniques to navigate through the data. While looking at any screen, the user only needs to point at the desired cell, press ENTER, and a more detailed report relating to the corresponding data will instantly appear on the monitor. The invention may use these downdrilling techniques on information based on the diagnostics, on the original data, or on actions (also defined by the user) that should ensue whenever a predefined test and its associated diagnostic are met.

FIGURES (brief description of drawings)

FIG. 1 represents a general but simplified view of the invention's components: the organization's—i.e., firm or institution—distributed computers and databases (1 to 4), the invention's data database (5), the expert system with its inference engine (6), the diagnostics database (7) and the querying engine (8). The invention proceeds through three logical stages: First, it creates a data database (5) with information retrieved from different computer sources (1 to 4). Second, through use of an expert system building tool (6), it generates a diagnostics database (7). Third, the querying engine (8) allows users to query these diagnostics databases.

FIG. 2 shows the general components in the best embodiment implementation: The invention's data database (5) which is built from the information on the organization's databases, the tests database (9), the test-processing engine (10), the expert system with its inference engine (6), the diagnostics database (7) and the querying engine (8). Notice the differences when compared with the structure in FIG. 1: The organization's databases (1 to 4) aren't shown, since these are non-essential to the invention's operation and the invention's data table contains all their information. Two components are added: the tests database (9) and the test-processing engine (10). Inference engines and expert systems (6) typically contain a tests database and test-processing engine, but in the best-embodiment implementation, an additional set of these components is provided.

FIG. 3 shows the data database's (5) basic components: one or more database tables containing lines or records (11) containing individual data items (12) of the data to be analyzed (13), group descriptions data tables (14), group elements data tables (15) listing the individual data items (12), and/or lines or records (11) of the data that comprise each group, and related index files (15).

FIG. 4 shows the tests database's (9) components: the tests descriptions table (17) containing the test identifier (18), name and description for each test (19), the associated formula for each test (20), identifiers for individual data items in the data database (21) on which the tests will be applied; group identifiers (22) of the data items in the data database on which the tests will be applied; the triggers data table (23) and their associated actions database (24) and related index files (25).

FIG. 5 shows a simplified outline of the tests-processing engine's (10) operation: Each test's formula (20) is read from the test database (9). The test-processing procedures (26) apply this formula to the corresponding data database's (5) data items, according to the data database's data item identifiers (21) and the group identifiers (22) associated to each test. When the result of any of these test's formulas (20) is TRUE, some information associated to that particular test is written to the diagnostics database (7). The TRUE test's— i.e., the diagnostic's—information includes: the test identifier (18), the data item identifiers (21) associated to the particular formula turned TRUE, and the associated triggers (23) and actions (24).

FIG. 6 shows the diagnostics database's (7) contents: diagnostics data tables (27) containing, for each test that turned TRUE—i.e. for each diagnostic—, the test identifier (18), the data item identifiers (21), the associated triggers (23) and actions (24).

FIG. 7 shows the expert system and associated inference engine (6). This instrument contains a knowledge database (28), one or more sets of rules (29), a rules processing language (30), inference logic procedures (31) so as to develop a heuristic sequence of steps to achieve the stated goals, and several interface modules (32) for the user to input his data, new rules, or to respond to the expert system's questions. These elements don't need to be described more thoroughly here, since expert systems have been, for the past ten years, a widely known type of artificial intelligence application system in the computer science community.

FIG. 8 shows the querying engine (8), a set of procedures for sorting (33), filtering (34), linking index tables (35) associated to data database (5), the tests database (9), and the diagnostics database (7), and showing synchronized database browse views (36) of the data database (5), tests database (9), and diagnostics database (7).

FIG. 9 shows a typical query browse view of the data database (5) and the associated individual diagnostics from the diagnostics database (7). Before looking at this screen, the user executed the test-processing engine (10) to apply all tests in the tests database (9) to all data items in the data database (5). The screen's cursor is positioned on '545.1', a data database's data item (12) representing the current assets for February 1992. The lower part of the screen shows five diagnostics associated to that particular data item.

FIG. 10 shows the data database (5), one associated diagnostic from the diagnostics database (7) at the bottom of the screen, and a list of test identifiers (18) at the right edge of the screen. The user first selected '538.8', a data database's data item (12), then the user pressed a key to switch cursor action to the list of test identifiers. In FIG. 10, the active cursor is positioned on CURROK, a test identifier. Those data items where the CURROK test turned TRUE (517.4, 558.9, 86.9, 86.4) are highlighted and underlined. If the user moves the cursor from CURROK to any other test identifier, the highlighted data items will change. Highlighted data items always correspond to the data items where the test identifier selected by the cursor turned TRUE.

FIG. 11 shows a summary diagnostics screen. The invention querying engine (8) is capable of generating this type of reports. The titles at the top and left side of the table (such as 'high priority', 'banks') are the triggers (23) and actions (24) associated to all diagnostics in the diagnostics database (7). The numbers in the table represent the number or frequency counts of diagnostics associated to each combination of triggers and actions. The user may point with a pointing device such as a mouse or keyboard cursor, and thus select any number in the table, or any title at the top or left side of the table. In FIG. 11, the cursor is positioned on 'high priority'.

FIG. 12 shows a summary diagnostics screen. This is the screen the invention could show right after executing the cursor selection ('high priority') in FIG. 11. This shows more detail on the high priority actions and triggers.

FIG. 13 shows the same summary diagnostics screen in FIG. 11, but the cursor selection is now positioned on number '12', which, when executed by pressing a key, would select the 'low priority' and 'CALL' actions and triggers.

FIG. 14 shows a summary diagnostics screen. This is the screen the invention could show right after executing the cursor selection ('low priority' and 'CALL') in FIG. 13. This shows more detail on these actions and triggers.

FIG. 15 shows a sample data database (5). This example contains the numbers of a small balance sheet summary and a few associated financial ratios.

Figure 16:
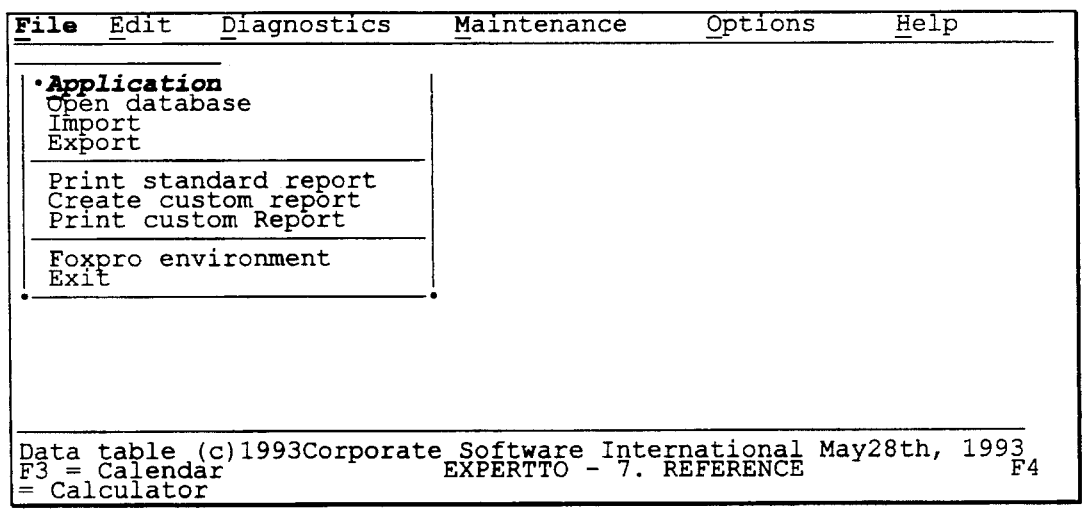
Figure 17:
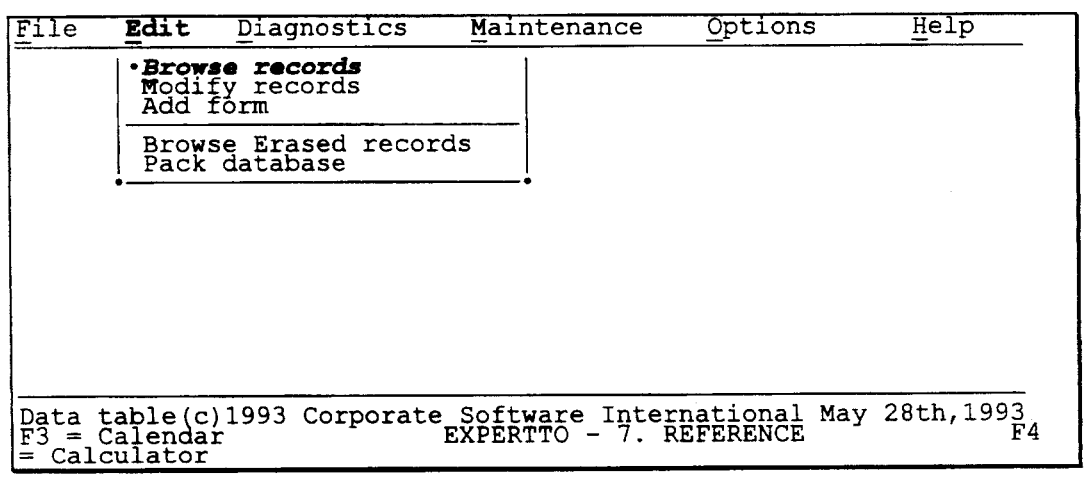
Figure 18:
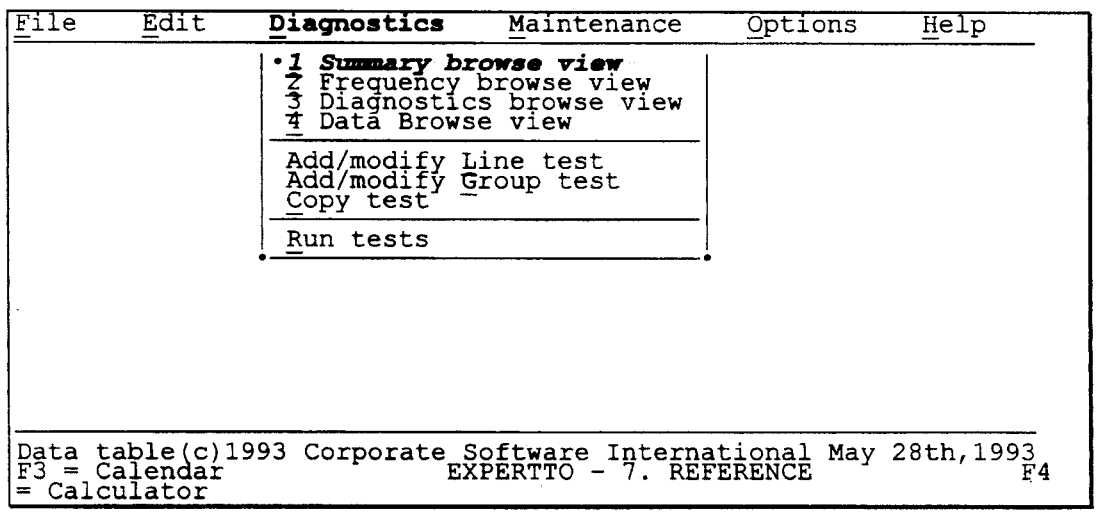

FIGS. 16, 17 and 18 show partial listings of the preferred embodiment's menu interface. File menu options let the user select an application and which files he will operate on, importing data from other applications and exporting it back to them, and printing options. Edit menu options let the user browse, look at, modify and add information in any of the individual files of the database in the invention's preferred embodiment implementation. The diagnostics menu options let the user create new tests and formulas, apply tests to selected data items on the data database (5), and execute the querying engine (8) as to query the diagnostics database (7) and the data database (5) in a coordinated manner. Notice there are four browse options in the diagnostics menu: data browse view, diagnostics browse view, frequency browse view, summary browse view. These are described in more detail in FIGS. 20 to 36.

Figure 19:
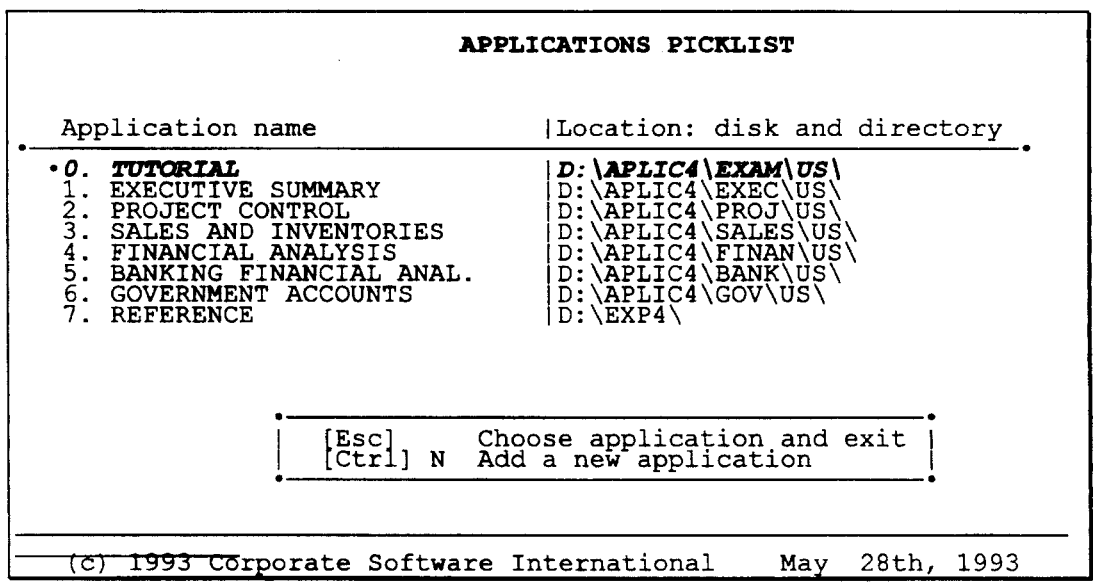

FIG. 19 shows the preferred embodiment's applications picklist. The invention is capable of handling many types of applications. The preferred embodiment allows the user to select an application to execute.

FIG. 20 shows a sample screen of the best embodiment's data browse view. This browse view shows the data table in the upper half of the screen. By moving with the cursor, the user can move over the data table's contents. The lower half of the screen shows a listing of those diagnostics associated to the data item selected by the cursor at any time. This is the most convenient browse option to use when the user prefers to look at his original firm's data, and looking at the associated diagnostics at the same time. In FIG. 20, the cursor is positioned on '101.53', a data item (12) representing the value of 'Current Liabilities ($)' for September, 1993. As shown, the user may select, with the cursor, any individual data item in the data database (5). The cursor's current position is signaled on the screen by the underline and highlight. Two diagnostics that correspond to that particular data item are shown on the lower part of the screen.

FIG. 21 shows a sample screen of the best embodiment's data browse view. All browse screens generated by the browse options in the diagnostics menu are composed of two tables, at the upper and lower half of the screen and, optionally, may also show at any time a more detailed description corresponding to the diagnostic selected by the cursor. In all browse view screens, cursor control can either be in the table at the upper half of the screen, or in the table at the lower half of the screen. The user can switch cursor control over any of the two tables by pressing a special key. In the preferred embodiment's implementation, this special key is the F5 key. Thus, the F5 key acts like a switch, transferring control between the upper and lower portions of the screen. The screen shown in FIG. 21 is reached after pressing the F5 key in the screen shown in FIG. 20. The cursor is now positioned on the first diagnostic, identified by the "•" symbol, and by underlined and highlighted text. The user can scroll over the diagnostics in this list. At the right of this list, the screen shows a longer description of the diagnostic selected by the cursor at any time. In FIG. 21, this longer description reads: "RDEB$_+$—The debt ratio is too—low (lower than 0.25). You may be losing business opportunities, or your company's accounting practices mix several businesses in one accounting practice".

FIG. 22 shows a sample screen of the best embodiment's diagnostics browse view. This browse view shows the diagnostics in the upper half of the screen. By moving with the cursor, the user can move over the diagnostics. The lower half of the screen shows the data item associated to the diagnostic selected by the cursor at any time. This is the most convenient browse option to use when the user prefers to look at the diagnostics, but when it's also important to know where these diagnostics have come from. Also, this browse view is appropriate when there are lots of data and not too many diagnostics to look at. Refer to FIGS. 20 and 21 for a more complete description of the diagnostic browse options and screens.

FIG. 23 shows a sample screen of the best embodiment's diagnostics browse view. The screen shown in FIG. 23 is reached after pressing the F5 key in the screen shown in FIG. 22. The cursor is now positioned on the line identified by the "•" symbol, and by underlined and highlighted text. Refer to FIGS. 20 and 21 for a more complete description of the diagnostic browse options and screens.

FIG. 24 shows a sample screen of the best embodiment's frequency browse view. This browse view shows, in the upper half of the screen, the main diagnostics classes. These correspond to the summary description's triggers and associated actions data tables (23, 24). If the user previously selected to look at a particular case in a class, the invention will show the classification in the following class. The lower half of the screen shows the diagnostics corresponding to the class or group selected by the cursor at any time. This is the most convenient browse option to use when the user prefers to define priorities, actions, individual persons' responsibilities, or any other classification of diagnostics according to their classes as defined by the user. Refer to FIGS. 20 and 21 for a more complete description of the diagnostic browse options and screens.

FIG. 25 shows a sample screen of the best embodiment's frequency browse view. The screen shown in FIG. 25 is reached after pressing the F5 key in the screen shown in FIG. 24. The cursor is now positioned on the line identified by the "•" symbol, and by underlined and highlighted text. Refer to FIGS. 20 and 21 for a more complete description of the diagnostic browse options and screens.

FIG. 26 shows a sample screen of the best embodiment's summary browse view. By definition, in the invention a summary diagnostic turns ON only when a predefined set of individual diagnostics have turned ON before. For example, a summary diagnostic may verify that sales and profits have gone down and costs have gone up for five different products, and would tell the manager that there's a crisis with the financial margins' of the firm. This browse view shows, in the upper half of the screen, those summary diagnostics that turned TRUE. By moving with the cursor, the user can move over the summary diagnostics. The lower half of the screen shows the individual diagnostics corresponding to the summary diagnostic selected by the cursor at any time. This is the most convenient browse option to use for looking at the overall picture according to the diagnostics. Refer to FIGS. 20 and 21 for a more complete description of the diagnostic browse options and screens.

FIG. 27 shows a sample screen of the best embodiment's summary browse view. The screen shown in FIG. 27 is reached after pressing the F5 key in the screen shown in FIG. 26. The cursor is now positioned on the line identified by the "•" symbol, and by underlined and highlighted text. Refer to FIGS. 20 and 21 for a more complete description of the diagnostic browse options and screens.

Figure 28:
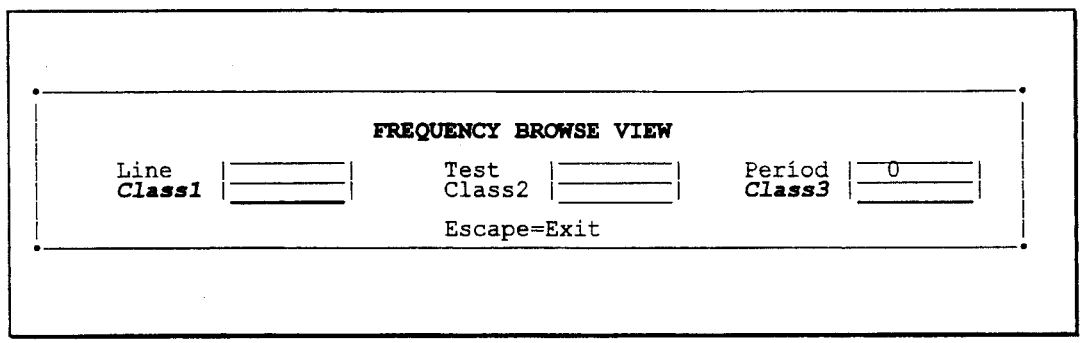

FIG. 28 shows the data selection screen for the best embodiment's frequency browse view. In fact, the four browse view options in the diagnostics menu use the same data selection screen. In order not to be forced to navigate through all diagnostics or all through data in each browse view option, the user may select which lines, classes or periods he will limit the search to. The program filters data using an AND combination of all selected fields. There's only one exception: the line option is not a filter, but a go-to switch that makes the browse view go to the selected line but will always show all data database's lines.

Figure 29:
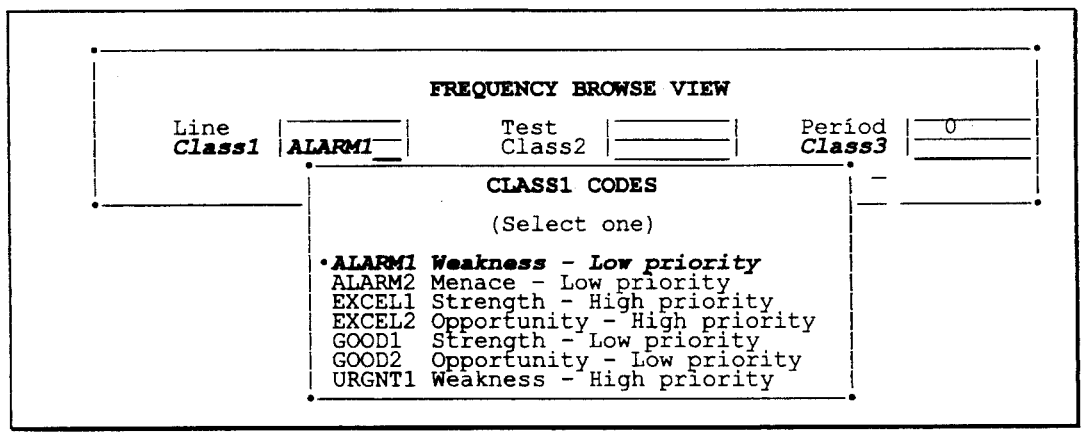

FIG. 29 shows the data selection screen for the frequency browse view as described in FIG. 28. The user is selecting an option for class1, one of the trigger fields (23).

Figure 30:
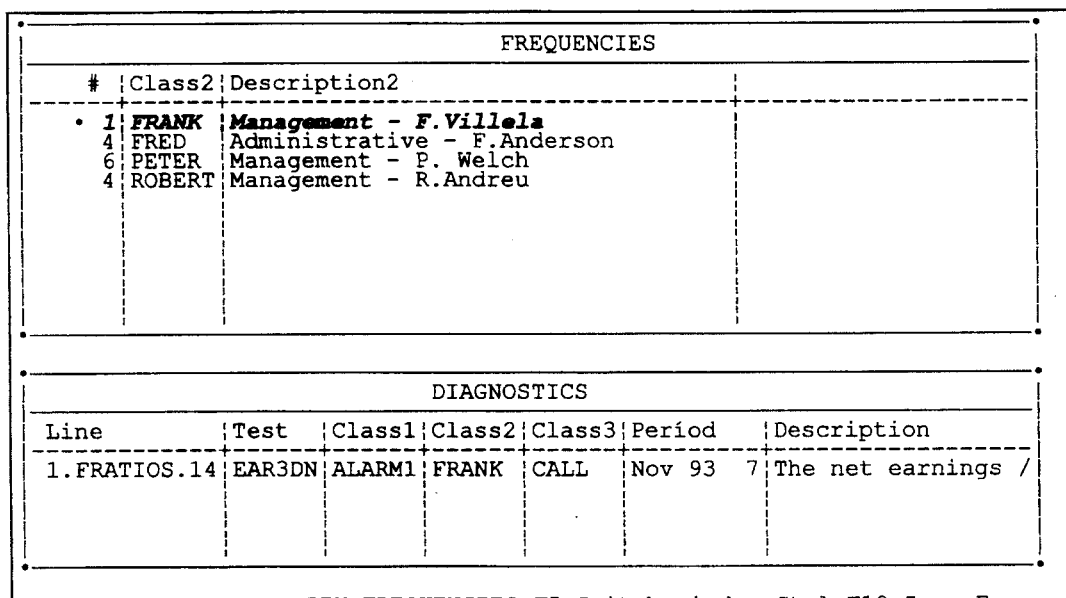

FIG. 30 shows the frequency browse view the user would get after making the choice shown in FIG. 29. The list of diagnostics and the related frequencies refer only to the selection on class1: 'weakness—low priority'. Notice that the program's frequency list shows the classification by the triggers in class2.

FIG. 31 shows the data selection screen for the 'frequency browse view', as described in FIG. 28. The user is selecting an option for class2, one of the trigger fields.

FIG. 32 shows the frequency browse view the user would get after making the choice shown in FIG. 31. The list of diagnostics and the related frequencies refer only to the selection on class2: 'Sales—D. Vadim (Dan)'. Notice that the program's frequency list shows the classification by the triggers in class1.

FIG. 33 shows the data selection screen for the frequency browse view, as described in FIG. 28. The user is selecting an option for class3, one of the trigger fields.

FIG. 34 shows the frequency browse view the user would get after making the choice shown in FIG. 33. The list of diagnostics and the related frequencies refer only to the selection on class3: 'BANKS'. Notice that the program's frequency list shows the classification by the triggers in class1.

FIG. 35 shows the data selection screen for the frequency browse view, as described in FIG. 28. The user has selected an option for class1 ('ALARM1') and for class3 ('BANKS'), two of the trigger fields.

FIG. 36 shows the frequency browse view the user would get after making the choice shown in FIG. 35. The list of diagnostics and the related frequencies refer to the selections on class1 AND (logical AND) class3 ('weakness—low priority', and 'prepare appropriate banking arrangements'). Notice that the program's frequency list shows the classification by the triggers in class2, the only class for which a selection hasn't been made yet.

FIG. 37 shows a listing of typical line tests and formulas for the best embodiment implementation. This listing only shows partial contents of the test database. The full contents (fields, type, size) of each record in this database file is described in FIG. 46. FIGS. 47 and 48 show two snapshots of the full contents of a few selected records. Let's come back to FIG. 37. The formulas in FIG. 37 mostly compare the financial ratios in the data database with absolute references that may be established for the firm. For example, the first line after the headings in each table means that, if the Z1 score falls below 0.15 (as shown in the formula), that indicates extreme danger of bankruptcy (as told in the test_description). In the best embodiment implementation shown here, the data database contains 60 months of periodic information (September '93, October '93, etc.). For practical purposes, the formulas may be applied to any of these periods in exactly the same manner. The identification of each data item is of the form F("1.BALANCE.18",0), where "1.BALANCE.18" is the line or record identifier, and 0 is a relative period identifier: it means current data period (−1 means previous data period, etc.). The user tells the program which period or periods he wishes the tests performed on. Then, the program will define each one of those periods as the current period. It will do it one period at a time. Each one of these formulas can only be applied to one set of data items, identified in the formula. And, if the formula turns out to be TRUE, then a diagnostic is generated and written to the diagnostics database. That diagnostic only needs to identify the test that originated it and the data item to which it refers.

FIG. 38 shows a listing of typical group tests and formulas. Refer to FIG. 37 for a related description on line formulas. The group tests shown here have been selected mostly for their clarity, not because they are the most useful and practical tests in this case. In this example, there are four groups, which are ASSETS, LIABIL, EQUITY, and FRATIO. One group formula is applied to each group. Applying a group formula to a group means applying that group formula to all data items in that group. The typical data identifier in each group formula looks like G(0), where '0' means CURRENT data period. No identifier for a line or record is needed, since all group formulas can only be applied to one line at a time, and can only compare different elements within the same line. Thus, group formulas are applied one line at a time, for all lines that belong to the particular group referred to by the group formula. In this example, group formulas can only be used for inter temporal comparisons. It is fairly easy to extend this standard as to allow for more complete variations to these formulas.

FIG. 39 shows the preferred embodiment's implementation menu structure: The File menu contains options to select an application and which files he will operate on, importing data from other applications and exporting it back to them, and printing options. The Edit menu contains options to browse, look at, modify and add information in any individual database. The Diagnostics menu contains options to create new tests and formulas, apply tests to selected data items, and query the diagnostics database and the data database in a coordinated manner. The Maintenance menu contains options for the generation of index files, file backups, and other maintenance operations on the data. The Options menu contains password and security options, options for the selection of the initial period, other options controlling the display and printout formats. The Help menu contains options for activating and modifying context help screens.

FIG. 40 shows the general structure of the best embodiment's file structure. There are twelve essential DBF files for each application. Conceptually, these files may be organized in three groups: data files (table.dbf, which contains the data to be analyzed; grupos.dbf and detalle.dbf, which contains the data items grouping definitions), test files and diagnostic files (for simple diagnostics and for summary diagnostics). For more detailed information on the whole file structure, see FIGS. 73 and 74.

FIG. 41 shows the structure of the data database file and its contents (13) in the best embodiment's implementation. This database file is called TABLA.DBF, and the fields contained in each record are called: LINEA (49), NOMBRE (50), P1 to P60 (51), VALOR (68), FORMAT (69), FACTOR (70), TYFACE (71). LINEA (49) contains the data line or record identifier (11), NOMBRE (50) contains the data item description, P1 to P60 (51) contain the actual data items (12), in this case, simple numbers, VALOR (68) contains a temporary value only used for importing and exporting data for other applications—this is non-essential to the invention and to this patent application—, FORMAT (69), FACTOR (70) and TYFACE (71) contain formatting information for each data item—non-essential here—.

FIGS. 42 and 43 show partial browse views of database file TABLA.DBF, as described in FIG. 41.

FIG. 44 shows the structure of the diagnostics database file and its contents (13) in the best embodiment's implementation. This database file is called RESULT.DBF, and the fields contained in each record are called: LINEA (49), NPER (52), PRUEBA (53), CLASE1 (61), CLASE2 (61), CLASE3 (61). LINEA (49) contains the data line or record identifier (11), NPER contains the period identifier for the related data item (12), PRUEBA (53) contains the test's identifier (18), CLASE1 (61), CLASE2 and CLASE3 contain the triggers' identifiers (23). Important note: the diagnostic identifiers are the same as the test identifiers (18), since a test turned true is automatically called a diagnostic.

FIG. 45 shows a partial browse view of database file RESULT.DBF, as described in FIG. 44.

FIG. 46 shows the structure of the tests database file (9) in the best embodiment's implementation. This database file is called PRUEBA.DBF, and the fields contained in each record are called: CODIGO (54), NOMBRE (55), LINEA (49), GRUPO (58), CONDEXPR (57), CONDNOTE (56), CLASE1 (61), CLASE2 (61), CLASE3 (61). CODIGO (54) contains the test identifier (18), NOMBRE (55) contains the test's short description (17), LINEA (49) contains the identifier (21) for the data database's line or record to which the resulting diagnostic will be related in case the test turns true, GRUPO (58) contains the identifier for the associated group of data items on which the test should be performed, CONDEXPR (57) contains the test's formula (20), CONDNOTE contains a long description for the test (17), CLASE1 (61), CLASE2 and CLASE3 contain the associated triggers and actions (23, 24). Important note: the diagnostic identifiers are the same as the test identifiers (18), since a test turned true is automatically called a diagnostic.

FIGS. 47, 48 and 49 show partial browse views of database file PRUEBA.DBF, as described in FIG. 46.

FIG. 50 shows the structure of the groups' definitions database file (14) in the best embodiment's implementation. This database file is called GRUPOS.DBF, and the fields contained in each record are called: CODIGO (59), NOMBRE (60). CODIGO (59) contains the groups' identifier (22), NOMBRE (60) contains the groups' descriptions (14).

FIG. 51 shows a partial browse view of database file GRUPOS.DBF, as described in FIG. 50.

FIG. 52 shows the structure of the groups' elements database file (15) in the best embodiment's implementation. This database file is called DETALLE.DBF, and the fields contained in each record are called: GRUPO (58), LINEA (49). GRUPO (58) contains the groups' identifiers (22), LINEA (49) contains the identifier for the data database's line or record (21) that added to each particular group.

FIG. 53 shows a partial browse view of database file DETALLE.DBF, as described in FIG. 52.

FIG. 54 shows the structure of the triggers database file (23, 24) in the best embodiment's implementation. This database file is called CLASE1.DBF, and the fields contained in each record are called: CLASE1 (61), NOMBRE1 (62). CLASE1 (61) contains the triggers identifiers (23, 24), NOMBRE1 (62) contains the triggers descriptions. The preferred embodiment's implementation also contains two files called CLASE2.DBF and CLASE3.DBF. Their structure is exactly the same as in file CLASE1.DBF. Their contents are completely definable according to the user's needs. No additional explanation is needed.

FIG. 55 shows a partial browse view of database file CLASE1.DBF, as described in FIG. 54.

FIG. 56 shows the structure of the summary test definition database file in the best embodiment's implementation. This database file is called PRESUMEN.DBF, and the fields contained in each record are called: ANALISIS (63), NOMBRE (64). CONDNOTE (65), PMIN (66). ANALISIS (63) contains the summary test identifiers, NOMBRE (64) contains the summary tests descriptions, CONDNOTE (65) contains summary tests' short descriptions, and PMIN (66) contains the minimum number of individual diagnostics that will turn a summary test on.

FIGS. 57 and 58 show partial browse views of database file PRESUMEN.DBF, as described in FIG. 56.

FIG. 59 shows the structure of the summary tests elements database file in the best embodiment's implementation. This database file is called DRESUMEN.DBF, and the fields contained in each record are called ANALISIS (63), PRUEBA (53). ANALISIS (63) contains the summary test identifiers, PRUEBA (53) contains the diagnostics identifiers.

FIG. 60 shows a partial browse view of database file DRESUMEN.DBF, as described in FIG. 58.

FIG. 61 shows the structure of the summary diagnostics database file i.e., those summary tests that have turned out to be true, in the best embodiment's implementation. This database file is called PRRESULT.DBF, and the fields contained in each record are called: ANALISIS (63), NPER (52). ANALISIS (63) contains the summary test's identifier, NPER (52) contains the period number identifier of the summary diagnostic (i.e., for those periods where the summary test turned out to be true).

FIG. 62 show partial browse views of database file PRRESULT.DBF, as described in FIG. 61.

FIG. 63 shows the structure of the summary diagnostic elements database file in the best embodiment's implementation. This file lists the individual diagnostics for those summary tests that turned out to be true. This database file is called DRRESULT.DBF, and the fields contained in each record are called: ANALISIS (63), NPER (52), PRUEBA (53), LINEA (49), POSITIVA (67). ANALISIS (63) contains the summary test's identifier, NPER (52) contains the period number identifier, PRUEBA (53) contains the individual tests identifiers (i.e., the identifiers for the components or individual elements in the summary test), LINEA (49) contains the identifier for the associated data database's lines or records, POSITIVA (67) contains a single character indicator which can either be "P" when an individual test turned true or blank when not.

FIG. 64 show padial browse views of database file DRRESULT.DBF, as described in FIG. 63.

FIG. 65 shows the structure of the files database file in the best embodiment's implementation. This database file is non-essential to the invention, and is only necessary for consistency checking in this particular implementation. This file is called IBASES.DBF, and the fields contained in each record are called: NOMBRE, BYTES, RECORD, MENSAJE, CARACTER.

FIG. 66 show partial browse views of database file IBASES.DBF, as described in FIG. 65.

Figure 67:
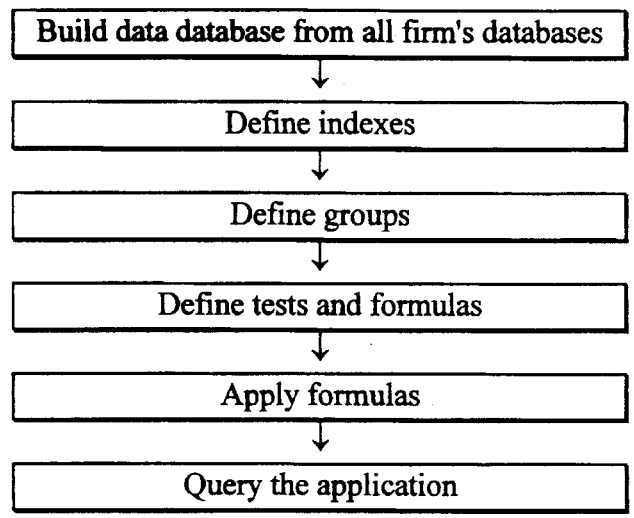

FIG. 67 shows the overall flow diagram of the best embodiment's implementation: FIRST, the invention must access all the firm's databases (see 1 to 4 in FIG. 1) to build the data database (5). SECOND, the invention generates a complete database structure and related index files (16). The just-generated test and diagnostic database files (7) are empty, but ready to receive information. The detailed database structure, index files contents and relations between the files will be made evident in the next Figures of this application. THIRD, define data groups. This is potentially one of the most powerful features of the invention. The user can define any groups (14, 15) of data items (12), and even groups of groups, in a multilevel structure. These groups are useful for the application of common tests to all data items in any particular group, for the definition of reports and queries, and for the definition of the associated triggers and actions (23, 24). FOURTH, define tests (17, 18, 19) and formulas (20, 21, 22). Formulas can be as simple as IF—THEN tests applied to one or more data items or data groups, or as sophisticated as expert system clauses and rules can be. FIFTH, apply formulas. The test-processing engine (10) then interprets and executes all formulas, reading and comparing all relevant data items, and whenever a test's conditions turn TRUE, generating one or more diagnostic records in the diagnostics database (7). Any diagnostic reference stored in the diagnostic database will also contain an associated reference to one or more data items (12). These data items will be defined by the user, or they will simply be the data items examined when the test condition turned true and the ensuing diagnostic was generated. SIXTH, query the application. The user may query the diagnostics database and the data database simultaneously in two or more separate windows, linked through several index files (16).

Figure 68:
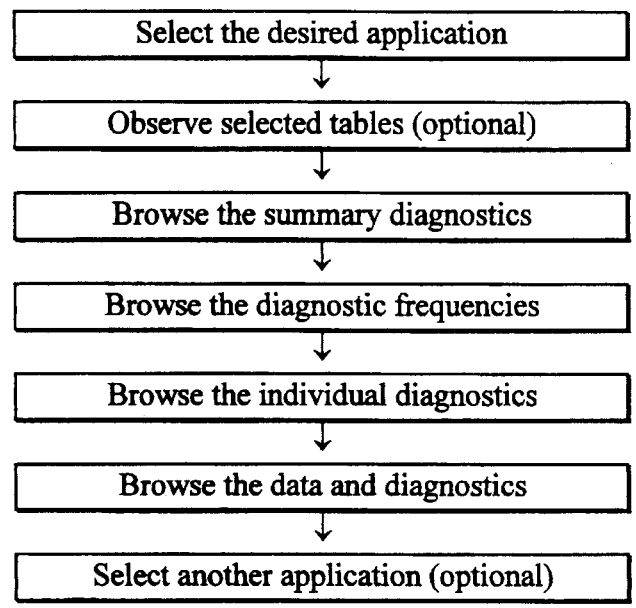

FIG. 68 shows the steps required to use and query an application: (a) Select the desired application. Use command File—Application. (b) Observe selected tables (optional). Use command Edit—Browse records. Observe selected tables from the application's database (5+7+9). This is optional. The user will do it only if he/she wants to. (c) Browse the summary diagnostics. Use command Diagnostics—Summary browse view. Observe or browse the summary diagnostics, for example, to understand the general condition of the firm. (d) Browse the diagnostic frequencies. Use command Diagnostics—Frequency browse view. Observe or browse the diagnostic frequencies classified by appropriate triggers and actions, according to the user preferences. (e) Browse the individual diagnostics. Use command Diagnostics—Diagnostics browse view. Observe or browse the diagnostics trying different trigger and action combinations (class1, class2, class3) to identify the original data related to key diagnostics. (f) Browse the data and diagnostics. Use command Diagnostics—Data Browse view. Observe or browse the original data for a final review, since this is the option closest to traditional report-analysis methods. (g) Select another application (optional). Use command File—Application.

Figure 69:
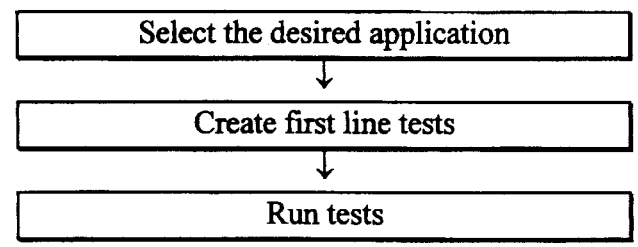

FIG. 69 shows the steps required to create an application: (a) Select the desired application. Use command File—

Application. (b) Create first line tests. Use command Diagnostics—Add/modify Line test. Create the first line tests for a simple application. (c) Run tests. Use command Diagnostics—Run tests. Run all tests for the set of periods desired.

Figure 70:
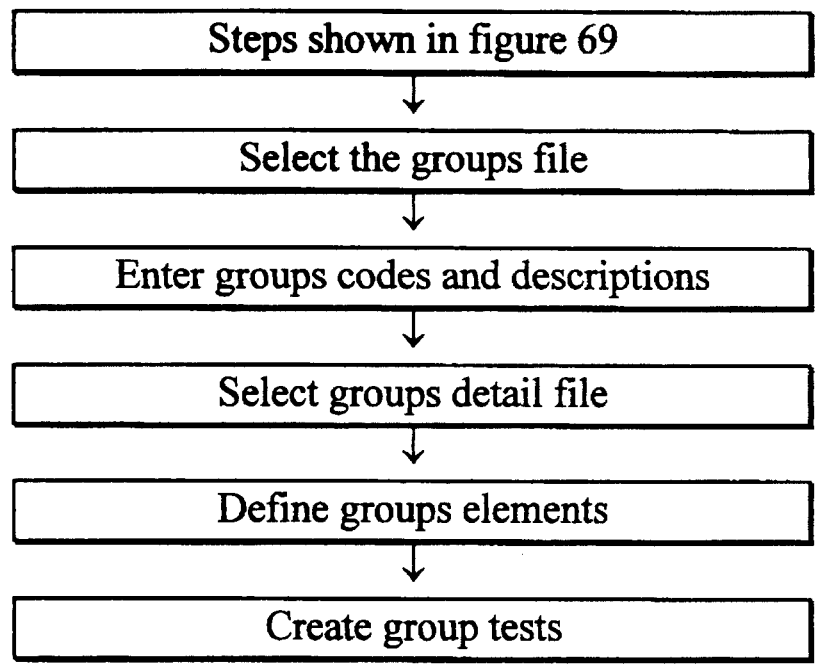

FIG. 70 shows the steps required to create an application with group tests: (a) Follow steps shown in FIG. 69, steps to create an application. (b) Select the groups file. Use command File—Open database (grupos.dbf). Select the groups database file. (c) Enter groups codes and descriptions. Edit—Add records (grupos.dbf). Enter the codes and descriptions for all lines and data items groups the user wishes to create to later operate with group formulas. (d) Select groups detail file. Use command Use command File—Open database (detafie.dbf). Select the groups database detail file (detalle.dbf). (e) Define groups elements. Use command Edit—Add records (detafie.dbf). Enter the identifiers for all data database's lines and data items belonging to each group recently defined. (f) Create group tests. Use command Diagnostics—Add/modify Group test. Create the group tests desired (review the samples presented in this document).

Figure 71:
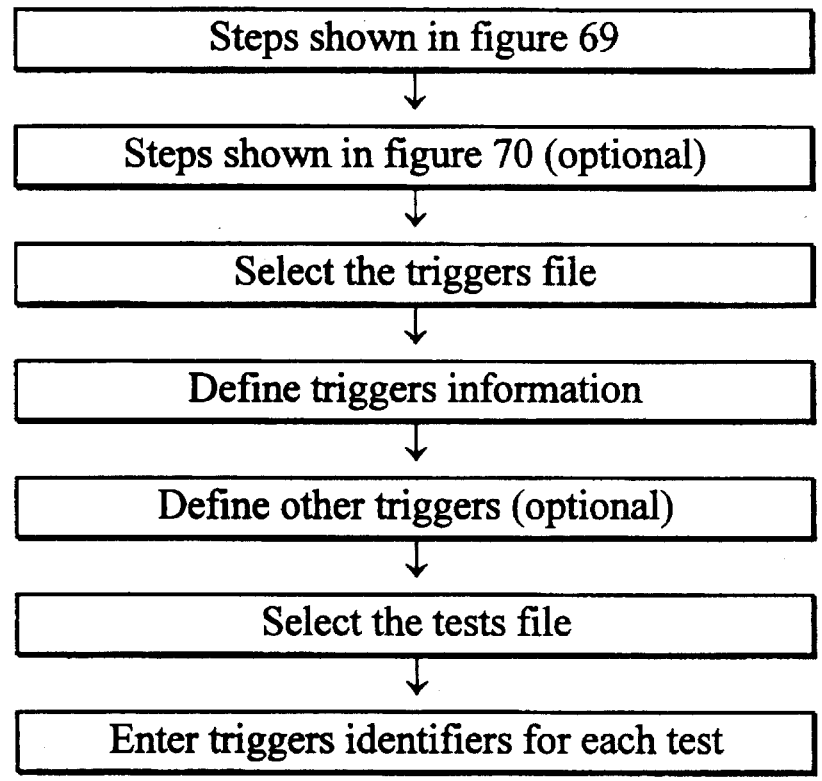

FIG. 71 shows the steps required to create an application with group tests and triggers: (a) Follow steps shown in FIG. 69: steps to create an application. (b) Now, follow steps shown in FIG. 70. optional steps to create an application with group tests. (c) Select the triggers file. Use command File—Open database (clasel.dbf). Select the triggers and actions (class1) database file. (d) Define triggers information. Use command Edit—Add records (clasel.dbf). Define all codes and descriptions for the triggers and actions (class1) that you will use in the application (for example, strengths and weaknesses, high and low priorities, departments, responsible persons). (e) Define other triggers (optional). Define other triggers and actions (optional). Replicate the procedure followed for file class1, with class2 (file clase2. dbf) and class3 (file clase3.dbf). (f) Select the tests file. Use command File—Open database (pruebas.dbf). Select the tests database file (pruebas.dbf). (g) Enter triggers identifiers for each test. Use command Edit—Add records (pruebas.dbf). Enter all codes (identifiers) for those triggers and actions that were defined (clase1, clase2, clase3), and for each test created.

Figure 72:
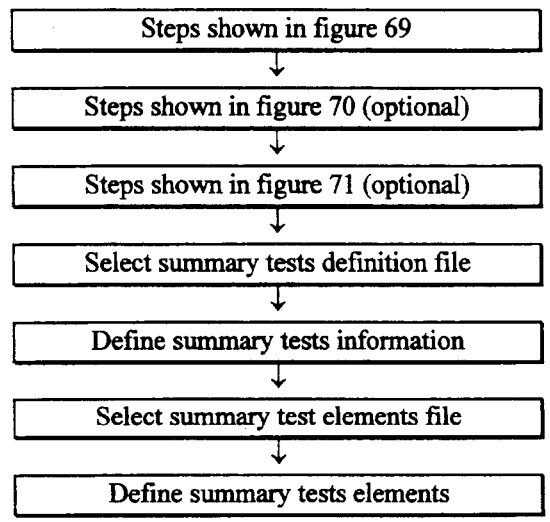

FIG. 72 shows the steps required to create an application with summary tests and diagnostics: (a) Follow steps shown in FIG. 69: steps to create an application. (b) Now, follow steps shown in FIG. 70: optional steps to create an application with group tests. (c) Then, follow steps shown in FIG. 71: optional steps to create an application with group tests and triggers. (d) Select summary tests definition file. Use command File—Open database (resumen.dbf). Select the summary tests definition database file (resumen.dbf). (e) Define summary tests information. Use command Edit—Add records (resumen.dbf). Define codes and descriptions for all summary tests, and the minimum number of diagnostics required for each summary diagnostic to show. (f) Select summary test elements file. Use command File—Open database (drresumen.dbf). Select the summary tests detail database file (drresumen.dbf). (g) Define summary tests elements. Use command Edit—Add records (drresumen.dbf). Define all tests identifiers (i.e., diagnostics) that should be examined in each summary test.

Figure 73:
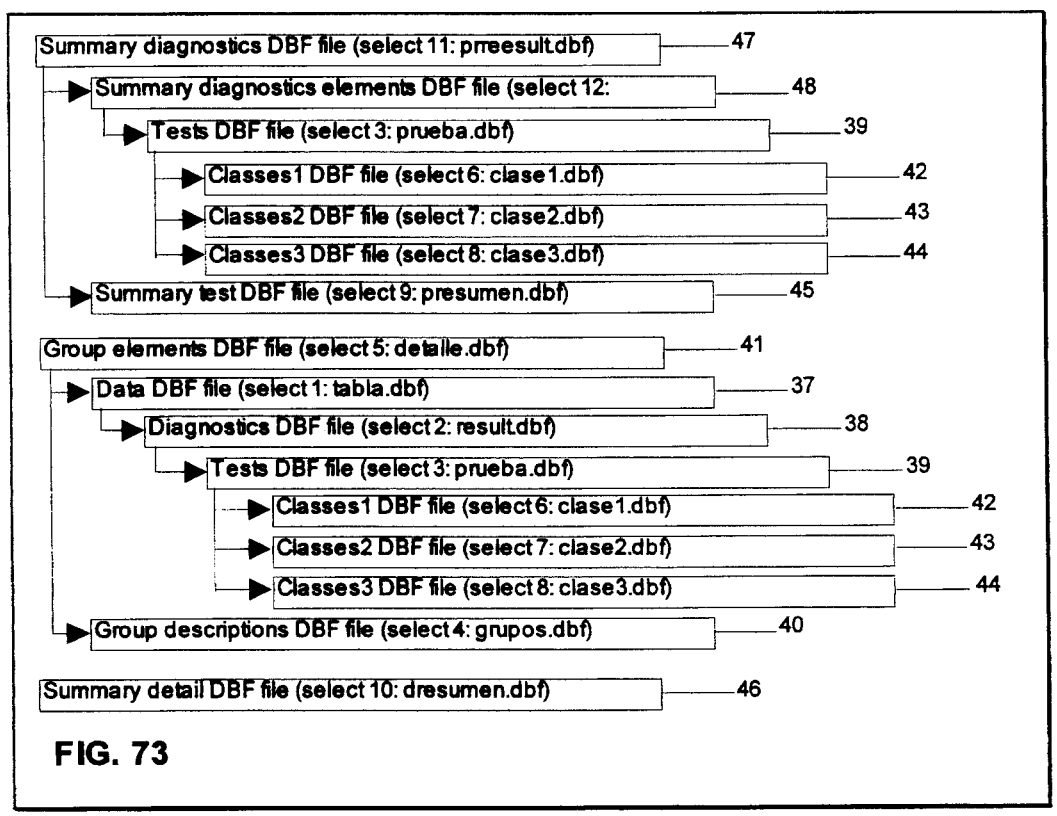

FIG. 73 shows a diagram of the best implementation's database (DBF) files structure. It shows the files' select numbers as they are consistently used in the best embodiment's code, and it graphically shows the relations (one to one, one to many, many to many) in the relational file structure. (Also see FIG. 74.)

The data DBF file (37) is identified in the program's code by Select 1: tabla.dbf. This file contains the data to be analyzed (13), as described in the summary of the invention.

The diagnostics DBF file (38) is identified in the program's code by Select 2: result.dbf. This file corresponds, in the best embodiment, to the diagnostics data tables (27) described in the summary of the invention.

The tests DBF file (39) is identified in the program's code by Select 3: prueba.dbf. This file corresponds to the tests database (9) and its component elements (17 to 24) as described in the summary of the invention.

The group descriptions DBF file (40) is identified in the program's code by Select 4: grupos.dbf. This file corresponds to the group descriptions data tables (14) described in the summary of the invention.

The group elements DBF file (41) is identified in the program's code by Select 5: detalle.dbf. This file corresponds to the group elements data tables (15) described in the summary of the invention.

The clase1 DBF file (42) is identified in the program's code by Select 6: clase1.dbf. This file corresponds to the triggers and associated actions data tables (23, 24) described in the summary of the invention.

The clase2 DBF file (43) is identified in the program's code by Select 7: clase2.dbf. This file corresponds to the triggers and associated actions data tables (23, 24) described in the summary of the invention.

The clase3 DBF file (44) is identified in the program's code by Select 8: clase3.dbf. This file corresponds to the triggers and associated actions data tables (23, 24) described in the summary of the invention.

The summary test DBF file (45) is identified in the program's code by Select 9: presumen.dbf. This part of the tests database (9) wasn't separately in the summary description of the invention.

The summary detail DBF file (46) is identified in the program's code by Select 10: dresumen.dbf. This is part of the tests database (9), although it wasn't explicitly described in the summary of the invention.

The summary diagnostics DBF file (47) is identified in the program's code by Select 11: prresult.dbf. This file corresponds to the diagnostics data tables (27) described in the summary of the invention.

The summary diagnostics elements DBF file (48) is identified in the program's code by Select 12: drresult.dbf. This file corresponds to the diagnostics data tables (27) described in the summary of the invention.

Figures 74, 75:
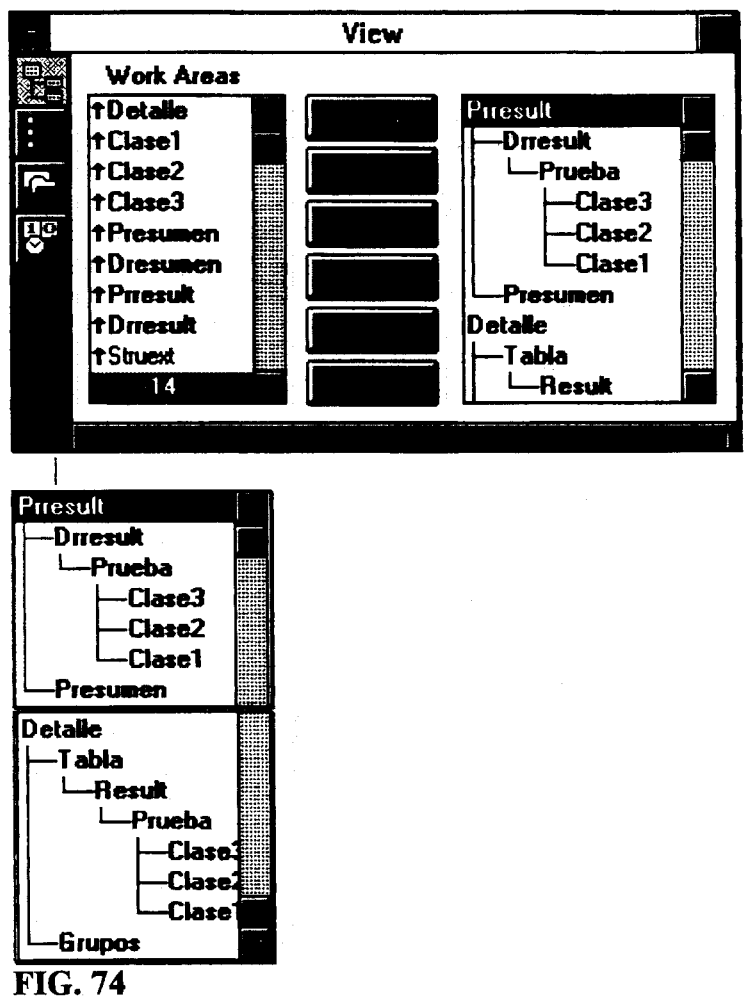

FIG. 74 shows the FoxPro™ database language by Microsoft's set view listing of best embodiment's database relations. This option can be reached by selecting windows-view from FoxPro™ 2.5's main menu. FIG. 74 shows the default database files relations structure. This is changed frequently during execution, but reset again to this structure.

FIG. 75 shows a schematic view of the first Data browse view screen. Compare it with FIG. 20. The cursor is active in the data browse window (72) showing selected contents from the data database (5), i.e. the best mode's data DBF file (37) tabla.dbf. The diagnostics browse window (73) shows selected contents from the diagnostics database (7), i.e. the best mode's diagnostics DBF file (38) result.dbf.

FIG. 76 shows a schematic view of the second Data browse view screen. Compare it with FIG. 21. The cursor is active in the diagnostics browse window (75), showing selected contents from the diagnostics database (7), i.e. the best mode's diagnostics DBF file (38) result.dbf. The data browse window (74) shows related records from the data database (5), i.e. the best mode's data DBF file (37) tabla.dbf. The text window (76) shows the test description (19) related to the active record in the diagnostics database (7).

FIG. 77 shows a schematic view of the third Data browse view screen. Compare it with FIG. 21. The cursor is active in the diagnostics browse window (78), showing selected contents from the diagnostics database (7), i.e. the best mode's diagnostics DBF file (38) result.dbf. The data browse window (77) shows related records from the data database (5), i.e. the best mode's data DBF file (37) tabla.dbf. The text window (79) shows the test description (19) related to the active record in the diagnostics database (7).

FIG. 78 shows a schematic view of the first Diagnostics browse view screen. Compare it with FIG. 22. The cursor is active in the diagnostics browse window (80), showing selected contents from the diagnostics database (7), i.e. the best mode's diagnostics DBF file (38) result.dbf. The data browse window (81) shows related records from the data database (5), i.e. the best mode's data DBF file (37) tabla.dbf.

FIG. 79 shows a schematic view of the second Diagnostics browse view screen. Compare it with FIG. 23. The cursor is active in the data browse window (83), showing selected contents from the data database (5), i.e. the best mode's data DBF file (37) tabla.dbf. The diagnostics browse window (82) shows related records from the diagnostics database (7), i.e. the best mode's diagnostics DBF file (38) result.dbf.

FIG. 80 shows a schematic view of the first Frequency browse view screen. Compare it with FIG. 24. The cursor is active in the frequencies browse window (84). The diagnostics browse window (85) shows related records from the diagnostics database (7), i.e. the best mode's diagnostics DBF file (38) result.dbf.

FIG. 81 shows a schematic view of the second Frequency browse view screen. Compare it with FIG. 25. The cursor is active in the diagnostics browse window (87), showing selected contents from the diagnostics database (7), i.e. the best mode's diagnostics DBF file (38) result.dbf. The frequencies browse window (86) shows related records from a temporary diagnostics file (for immediate frequency counts). The text window (88) shows the test description (19) related to the active record in the diagnostics database (7).

FIG. 82 shows a schematic view of the first Summary browse view screen. Compare it with FIG. 26. The cursor is active in the summaries browse window (89), showing selected contents from the summary diagnostics DBF file (47) prresult.dbf. The diagnostics browse window (90) shows related records from the diagnostics database (7), i.e. the best mode's diagnostics DBF file (38) result.dbf. The text window (91) shows the summary test description related to the active record in the summary test DBF file (45) presumen.dbf.

Figure 83:
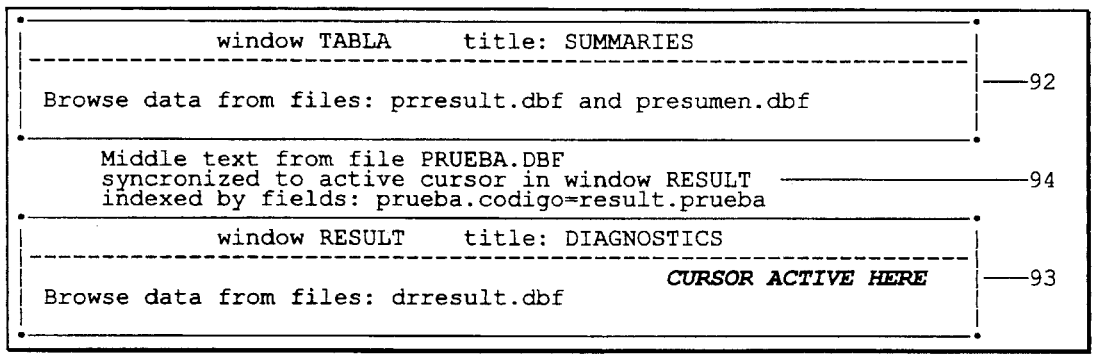

FIG. 83 shows a schematic view of the second Summary browse view screen. Compare it with FIG. 27. The cursor is active in the diagnostics browse window (93), showing selected contents from the diagnostics database (7), i.e. the best mode's diagnostics DBF file (38) result.dbf. The summaries browse window (92) shows related records the summary diagnostics DBF file (47) prresult.dbf. The text window (94) shows the test description (19) related to the active record in the diagnostics database (7).

Figure 84:
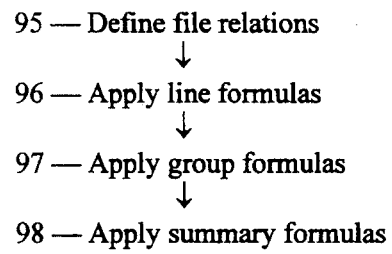

FIG. 84 shows procedure Apply_formulas as it is executed in the best embodiment implementation. This procedure executes four routines: first, the structure for all files involved must be defined (95), then this procedure executes line tests and formulas (96), group tests and formulas (97) and summary tests (98). These three routines are always executed one immediately after the other, and in that order. The program modules involved are: vapl.prg for line tests, vaplg.prg for group tests and vaplr.prg for summary tests. For more details about these modules and their associated algorithms, see Section C below: description of formula application procedures.

Figure 85:
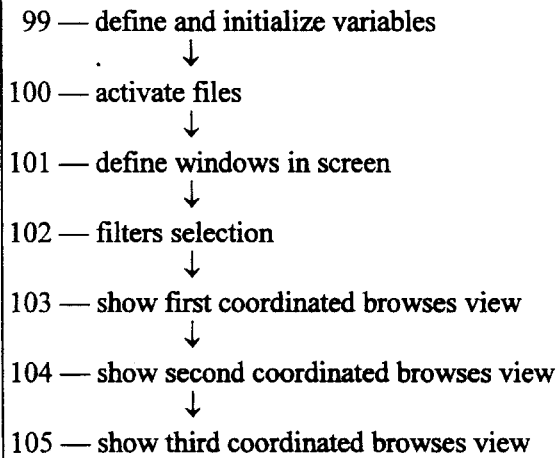

FIG. 85 shows procedure Data_browse_view. This represents the algorithm to generate the screens shown in FIGS. 20 and 21. This algorithm is described in more detail below in Section D: Description of diagnostic browse operations, and the associated schematic Figures are 75 to 77. First, procedure (99) initializes all variables and procedure (100) selects the data DBF file tabla.dbf (37), the diagnostics DBF file result.dbf (38) and the test DBF file prueba.dbf (39). These files can now be accessed by commands Select 1, 2 and 3, respectively. Now procedure (101) defines windows tabla, result and result1. These windows are described in FIGS. 75 to 77. Then, procedure (102) allows the user to choose which filters to apply on the data, using the filter screen described in FIGS. 31 to 36. Procedure (103) shows the first coordinated browses view as shown in FIG. 20 and described in FIG. 75. If the user presses the F5 key, procedure (104) will execute and generate the second coordinated browses view as shown in FIG. 21 and described in FIG. 76. If the user presses the F6 key, procedure (105) will show the third coordinated browses view, which is described in FIG. 77.

Figure 86:
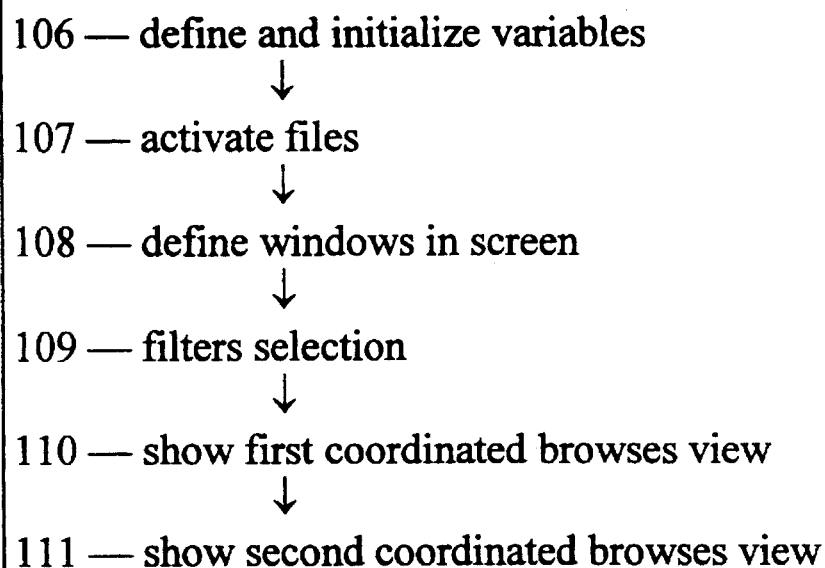

FIG. 86 shows procedure Diagnostics_browse_view. This represents the algorithm to generate the screens shown in FIGS. 22 and 23. This algorithm is described in more detail below in Section D: Description of diagnostic browse operations, and the associated schematic Figures are 78 and 79. First, procedure (106) initializes all variables and procedure (107) selects the diagnostics DBF file result.dbf (38), the data DBF file tablaodbf (37) and the test DBF file prueba.dbf (39). These files can now be accessed by commands Select 2, 1 and 3, respectively. Now procedure (108) defines windows tabla and result. These windows are described in FIGS. 78 and 79. Then, procedure (109) allows the user to choose which filters to apply on the data, using the filter screen described in FIGS. 31 to 36. Procedure (110) shows the first coordinated browses view as shown in FIG. 22 and described in FIG. 78. If the user presses the F5 key, procedure (101) will execute and generate the show second coordinated browses view as shown in FIG. 23 and described in FIG. 79.

Figure 87:
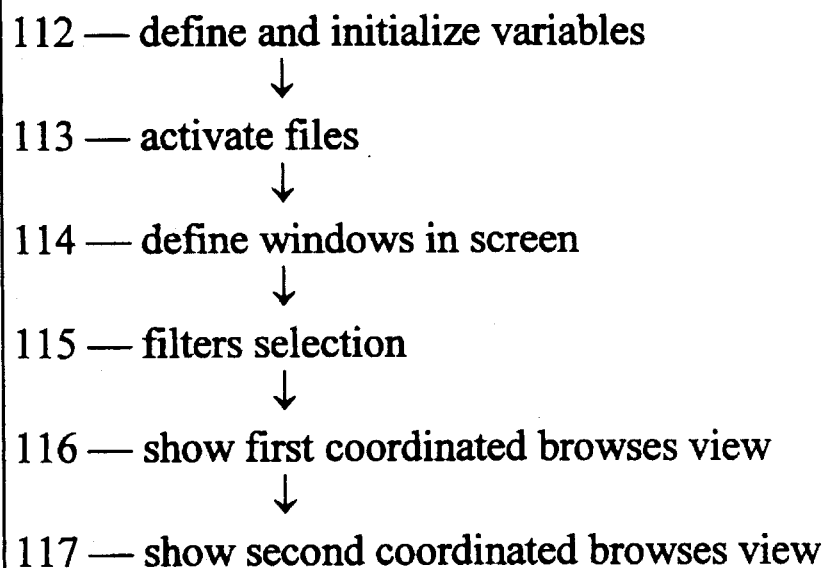

FIG. 87 shows procedure Frequencies_browse_view. This represents the algorithm to generate the screens shown in FIGS. 24 and 25. This algorithm is described in more detail below in Section. D: Description of diagnostic browse operations, and the associated schematic Figures are 80 and 81. First, procedure (112) initializes all variables and procedure (113) selects the diagnostics DBF file result.dbf (38), the test DBF file prueba.dbf (39), the temporary DBF file temp1.dbf and the temporary DBF file temp2.dbf. File temp.dbf will contain the results of the frequency count operations. File temp1.dbf will contain a selection of the diagnostics DBF file result.dbf (38). Now procedure (114) defines windows tabla, result and result1. These windows are described in FIGS. 80 and 81. Then, procedure (115) allows the user to choose which filters to apply on the data, using the filter screen described in FIGS. 31 to 36. Procedure (116) shows the first coordinated browses view as shown in FIG. 24 and described in FIG. 80. If the user presses the F5 key, procedure (117) will execute and generate the show second coordinated browses view as shown in FIG. 25 and described in FIG. 81.

Figure 88:
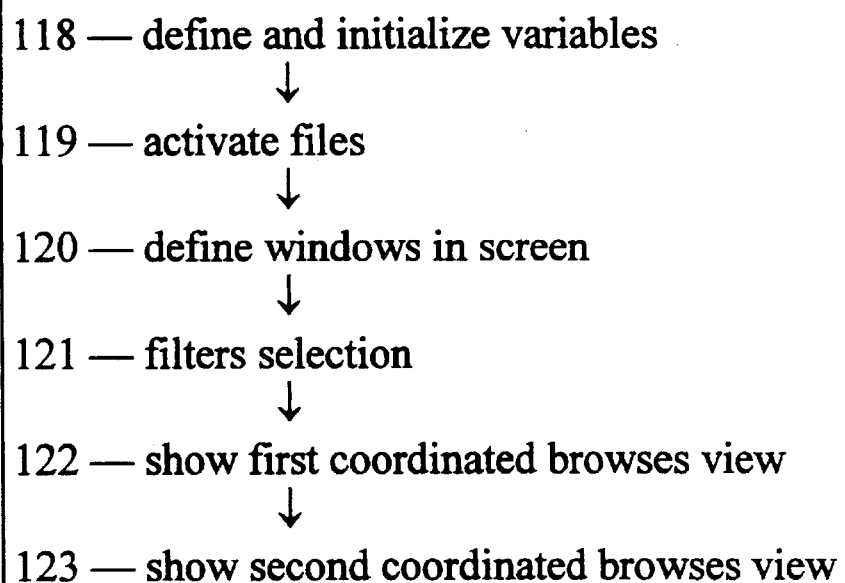

FIG. 88 shows procedure Summary_browse_view. This represents the algorithm to generate the screens shown in FIGS. 26 and 27. This algorithm is described in more detail below in Section D: Description of diagnostic browse operations, and the associated schematic FIGS. are 82 and 83. First, procedure (118) initializes all variables and procedure (119) selects the summary tests DBF file presumen.dbf (45), the summary tests elements DBF file dresumen.dbf (46) and the summary diagnostics DBF file prresult.dbf (47). These files can now be accessed by commands Select 9, 10 and 11, respectively. Now procedure (120) defines windows tabla, result and result1. These windows are described in FIGS. 82 and 83. Then, procedure (121) allows the user to choose which filters to apply on the data, using the filter screen described in FIGS. 31 to 36. Procedure (122) shows the first coordinated browses view as shown in FIG. 26 and described in FIG. 82. If the user presses the F5 key, procedure (123) will execute and generate the show second coordinated browses view as shown in FIG. 27 and described in FIG. 83.

FIG. 89 shows an outline of the most important code routines used in the best-mode implementation of the invention. There are menu administration routines to create and activate the main menus, to call the main menu routines and to call the diagnostic menu routines. The corresponding program source files are called vacambio.prg, vmenu.prg and vacti.prg. Similarly, vdrive.prg and vverif.prg let the user select an application by chaing the application path default, and check the structure of each file. Vcond.prg, vcondg.prg and vdup.prg let the user add, modify or duplicate line and group tests. Vapl.prg, vaplg.prg and vaplr.prg apply the logic tests to the quantitative database, adding new records to the diagnostics database whenever the corresponding tests turn out to be true. Vman.prg, vmanr.prg, vresu.prg and vsumm.prg are the four main browse views that let the user look at the diagnostics and the quantitative data in a coordinated manner, according to the links defined previously. Finally, vbases.prg, vlista.prg and vaño.prg provide maintenance services to the program.

Figure 90:
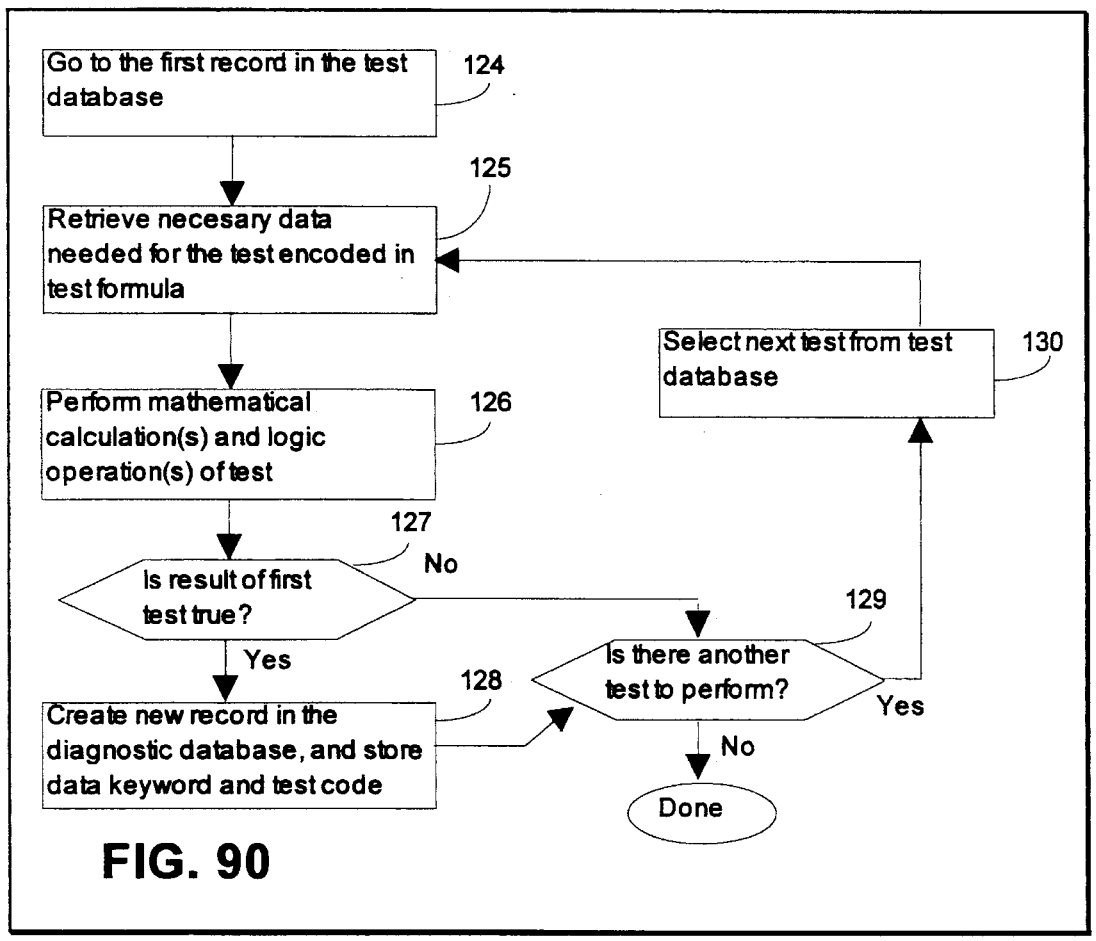

FIG. 90 shows the basic operation of the invention, which involves the selection of an item or items of quantitative data and the application of the corresponding analysis rule(s) to generate diagnostic records. The linking pointers are added to the new diagnostic records and this information is stored in the diagnostic database. In the best embodiment implementation, all these operations are performed in the following manner, as exemplified in FIG. 90: First, the program makes the first record in the test database the current test record (124). It must be noted that each test record contains a test code unique to this particular test record, and a description of the mathematical calculation(s) and logic operation(s) to be performed. The program now retrieves the necesary data needed for the test encoded in the test formula in the current test record (125). Then the mathematical calculation(s) and logic operation(s) in the first test are performed (126). After these operations, if the result of the test just applied is true, a new record in the diagnostic database is created (128), and the following information is written into this new diagnostic record: the keyword identifying the particular data item and a test code identifying the test record and encoding the result of the test. Finally, if this is not the last test record in the test database, that is, if there are more tests to perform, as tested by block 129, then the next test record is selected from the test database (130), and the procedure is repeated again starting at step (125), retrieving the necessary data needed for the corresponding test just selected.

Figure 91:
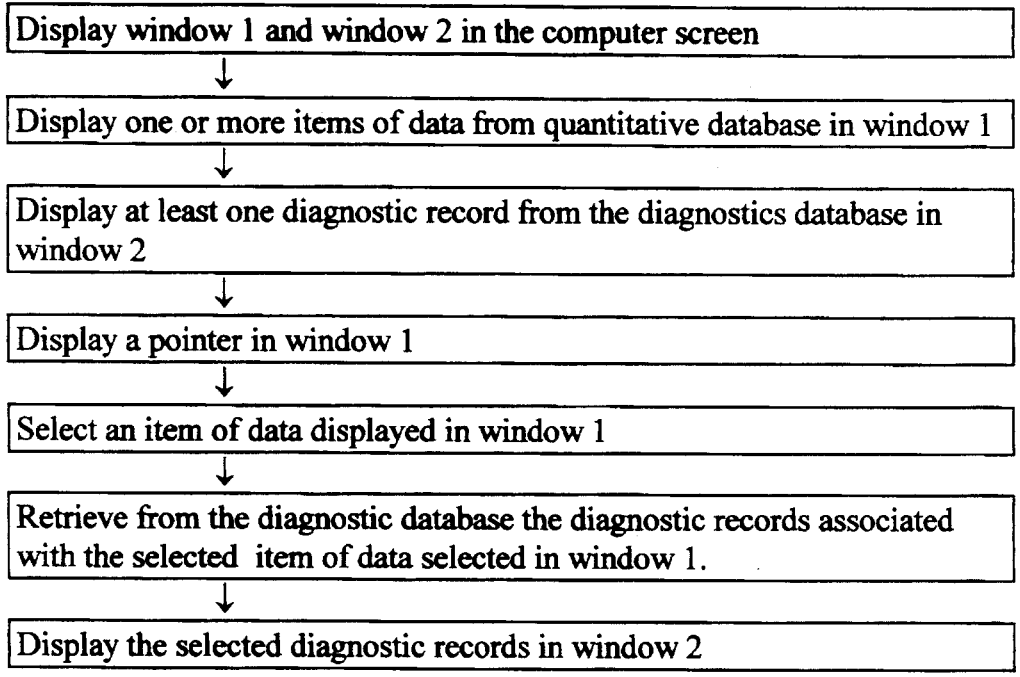

FIG. 91 shows, in a simplified manner, the procedure followed to display and select a particular data item and to see or browse through the diagnostics related to the particular data item selected. The sequence of steps is: (a) display window 1 and window 2 in the computer screen; (b) display one or more items of data from quantitative database in window 1; (c) display at least one diagnostic record from the diagnostics database in window 2; (d) display a pointer in window 1; (e) receive user commands to move the pointer and enter a select command so as to select an item of data displayed in window 1; (f) retrieve from the diagnostic database the diagnostic records associated with the selected item of data selected in window 1 using the link pointer programmed by the user when the test which generated the diagnostic was programmed by the user, and (g) display the selected diagnostic records in window 2.

Figure 92:
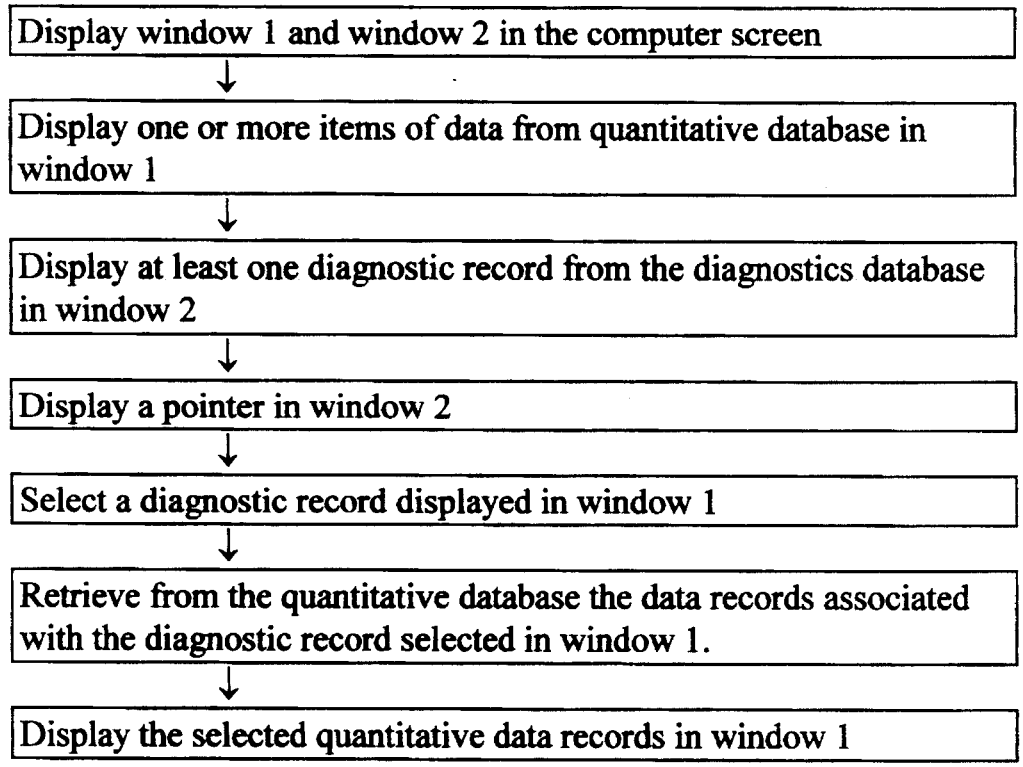

FIG. 92 shows, in a simplified manner, the procedure followed to display and select a particular data item and to see/browse through the diagnostics related to the particular data item selected. The sequence of steps is: (a) display window 1 and window 2 in the computer screen; (b) display one or more items of data from quantitative database in window 1; (c) display at least one diagnostic record from the diagnostics database in window 2; (d) display a pointer in window 2; (e) receive commands from the user to move the pointer and issue a select command to select a diagnostic record displayed in window 2; (f) retrieve from the quantitative database the data records associated with the diagnostic record selected in window 2 using the link pointer programmed by the user when the test which generated the diagnostic was programmed by the user, and (g) display the selected quantitative data records in window 1.

Figure 93:
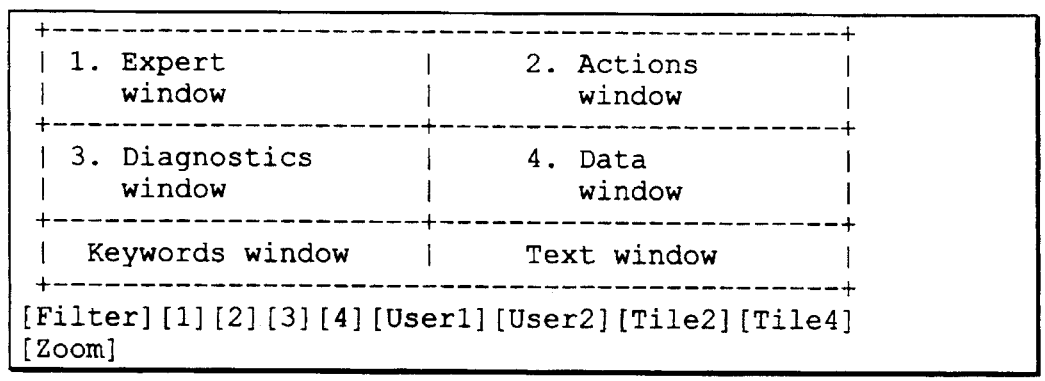

FIG. 93 shows a four-way browse view where four simultaneous browse views are shown. Just like in the best embodiment, here each browse view is the result of a particular BROWSE command from the FoxPro™ language. The four browse views mentioned are identified in the figure by the titles: "1 expert window", "2 actions window", "3 diagnostics window", "4 data window". There are also two more windows, called "keywords window" and "text window". Here, if the user selects the "4 data window" by use of some pointing mechanism, the program will then operate in a manner similar to that shown in FIG. 20. That is, the user may scroll through the data and the associated diagnostics will appear on window "3. diagnostics window". Similarly, if the user selects the "3 diagnostics window", the program will operate in a manner similar to that described in FIG. 22. If the user selects the "2 actions window", the program will operate in a manner similar to that described in FIG. 24, the frequencies view. If the user selects the "3 expert window", the program will operate in a manner similar to that described in FIG. 26, the summaries view. Also, the keywords window is really a filter window, and it operates in a manner similar to the screen shown in FIG. 28. Finally, the text window is the same window shown at the lower right corner of FIG. 21, and showing the full text of the description of a particular selected diagnostic.

PREFERRED EMBODIMENT

Structure:

A list of all parts identified by reference numerals in FIGS. 1 to 89 follows:

1. to
4. business database
5. data database
6. inference engine and expert system
7. diagnostics database
8. querying engine
9. tests database
10. test-processing engine
11. lines or records containing individual data items
12. individual data items of the data to be analyzed
13. data to be analyzed
14. group descriptions data tables
15. group elements data tables
16. related index files
17. tests descriptions table
18. test identifiers
19. name and description for each test
20. associated formulas
21 data database's data item identifiers
22. group identifiers
23. triggers data table
24. associated actions database
25. related index files
26. test-processing procedures
27. diagnostics data tables
28. knowledge database
29. sets of rules
30. rules processing language
31. inference logic procedures
32. interface modules
33. sorting procedures
34. filtering procedures
35. linking procedures
36. procedures for showing synchronized database browse views
37. data DBF file (select 1: tabla.dbf)—this file contains the data to be analyzed (13)
38. diagnostics DBF file (select 2: result.dbf)—this file corresponds to the diagnostics data tables (27)
39. tests DBF file (select 3: prueba.dbf)—this file corresponds to the tests database (9) and its components
40. group descriptions DBF file (select 4: grupos.dbt)—this file corresponds to the group descriptions data tables (14)
41. group elements DBF file (select 5: detalle.dbf)—this file corresponds to the group elements data tables (15)
42. clase1 DBF file (select 6: clase1.dbf)—this file corresponds to the triggers and actions data tables (23, 24)
43. clase2 DBF file (select 7: clase2.dbf)—this file corresponds to the triggers and actions data tables (23, 24)
44. clase3 DBF file (select 8: clase3. dbf)—this file corresponds to the triggers and actions data tables (23, 24)
45. summary test DBF file (select 9: presumen.dbf)—this file is a part of the tests database (9)
46. summary elements DBF file (select 10: dresumen.dbf)
47. summary diagnostics DBF file (select 11: prresult.dbf)—this file corresponds to the diagnostics data tables (27)
48. summary diagnostics elements DBF file (select 12: drresult.dbf)—this file corresponds to the diagnostics data tables (27)
49. data record identifier—field: LINEA—files: tabla.dbf, result.dbf, prueba.dbf, detalle.dbf, drresult.dbf
50. data record description—field: NOMBRE—files: tabla.dbf
51. data fields—fields: P1 to P60—files: tabla.dbf
52. data field identifier—field: NPER—files: result.dbf, prresult.dbf, drresult.dbf
53. test identifier—field: PRUEBA—files: result.dbf, dresumen.dbf, drresult.dbf
54. test identifier—field: CODIGO—files: prueba.dbf. Same as test identifier (53)
55. test description—field: NOMBRE—files: prueba.dbf
56. long test description—field: CONDNOTE—files: prueba.dbf
57. test formula—field: CONDEXPR—files: prueba.dbf
58. group identifier—field: GRUPO—files: prueba.dbf, detalle.dbf
59. group identifier—field: CODIGO—files: grupos.dbf. Same as group identifier (58)
60. group description—field: NOMBRE—files: grupos.dbf
61. class identifier—fields: CLASE1, CLASE2, CLASE3—files: result.dbf, prueba.dbf, clase1.dbf, clase2.dbf, clase3.dbf
62. class description—fields: NOMBRE1, NOMBRE2, NOMBRE3—files: clase1.dbf, clase2.dbf, clase3.dbf
63. summary test identifier—field: ANALISIS—files: presumen.dbf, dresumen.dbf, prresult.dbf, drresult.dbf
64. summary test description—field: NOMBRE—files: presumen.dbf
65. summary test long description—field: CONDNOTE—files: presumen.dbf
66. minimum number of positive tests—PMIN—files: presumen.dbf
67. test occurrence flag—field: POSITIVA—files: drresult.dbf
68. non-essential field: temporary data—field: VALOR—files: tabla.dbf
69. non-essential field: formatting information 1—field: FORMAT—files: tabla.dbf
70. non-essential field: formatting information 2—field: FACTOR—files: tabla.dbf
71. non-essential field: formatting information 3—field: TYFACE.—files: tabla.dbf
72. data browse window of the first Data browse view screen
73. diagnostics browse window of the first Data browse view screen
74. data browse window of the second Data browse view screen
75. diagnostics browse window of the second Data browse view screen
76. text window of the second Data browse view screen
77. data browse window of the third Data browse view screen
78. diagnostics browse window of the third Data browse view screen
79. text window of the third Data browse view screen
80. diagnostics browse window of the first Diagnostics browse view screen
81. data browse window of the first Diagnostics browse view screen
82. diagnostics browse window of the second Diagnostics browse view screen
83. data browse window of the second Diagnostics browse view screen
84. frequencies browse window of the first Frequency browse view screen
85. diagnostics browse window of the first Frequency browse view screen
86. frequencies browse window of the second Frequency browse view screen
87. diagnostics browse window of the second Frequency browse view screen
88. text window of the second Frequency browse view screen
89. summaries browse window of the first Summary browse view screen 90. diagnostics browse window of the first Summary browse view screen
91. text window of the first Summary browse view screen
92. summaries browse window of the second Summary browse view screen
93. diagnostics browse window of the second Summary browse view screen
94. text window of the second Summary browse view screen
95. define file relations (procedure Apply_formulas)
96. apply line formulas (procedure Apply_formulas)
97. apply group formulas (procedure Apply_formulas)
98. apply summary formulas (procedure Apply_formulas)
99. setup screen options (procedure Data_browse_view)
100. activate files (procedure Data_browse_view)
101. define windows in screen (procedure Data_browse_view)
102. filters selection (procedure Data_browse_view)
103. show first coordinated browses view (procedure Data_browse_view)
104. show second coordinated browses view (procedure Data_browse_view)
105. show third coordinated browses view (procedure Data_browse_view)
106. setup screen options (procedure Diagnostics_browse_view)
107. activate files (procedure Diagnostics_browse_view)
108. define windows in screen (procedure Diagnostics_browse_view)
109. filters selection (procedure Diagnostics_browse_view)
110. show first coordinated browses view (procedure Diagnostics_browse_view)
111. show second coordinated browses view (procedure Diagnostics_browse_view)
112. setup screen options (procedure Frequencies_browse_view)
113. activate files (procedure Frequencies_browse_view)
114. define windows in screen (procedure Frequencies_browse_view)
115. filters selection (procedure Frequencies_browse_view)
116. show first coordinated browses view (procedure Frequencies_browse_view)
117. show second coordinated browses view (procedure Frequencies_browse_view)
118. setup screen options (procedure Summary_browse_view)
119. activate files (procedure Summary_browse_view)
120. define windows in screen (procedure Summary_browse_view)
121. filters selection (procedure Summary_browse_view)
122. show first coordinated browses view (procedure Summary_browse_view)
123. show second coordinated browses view (procedure Summary_browse_view)
124. make the first record in the test database the current test record
125. retrieve the necesary data needed for the test encoded in the test formula in the current test record
126. perform the mathematical calculation(s) and logic operation(s) in the first test
127. check if the result of the test just applied is true
128. create a new record in the diagnostic database and write to it the keyword identifying the particular data item and a test code identifying the test record
129. check if this is the last test record in the test database
130. select the next test Referring to FIG. 2, the best mode implementation's entire program storage area is divided in the data database (5), the tests database (9), the test-processing engine (10), the inference engine and expert system (6), the diagnostics database (7) and the querying engine (8). Inference engines and expert systems (6) typically contain a tests database and test-processing engine, but in the best-embodiment implementation, an additional set of these components is provided.

There are twelve essential DBF files for each application, as shown in FIG. 40. Conceptually, these files may be organized in three groups: data files (table.dbf, which contains the data to be analyzed; grupos.dbf and detalle.dbf, which contains the data items grouping definitions), test files and diagnostic files (for simple diagnostics and for summary diagnostics).

FIG. 74 shows FoxPro™'s set view listing of these files' relations. FIG. 73 shows these relations in more detail. It also shows the files' select numbers as they are consistently used in the best embodiment's code.

The data DBF file (37) is identified in the program's code by Select 1: tabla.dbf. This file contains the data to be analyzed (13), as described in the summary of the invention. Also see FIGS. 42 and 43.

The diagnostics DBF file (38) is identified in the program's code by Select 2: result.dbf. This file corresponds, in the best embodiment, to the diagnostics data tables (27) described in the summary of the invention. Also see FIGS. 44 and 45.

The tests DBF file (39) is identified in the program's code by Select 3: prueba.dbf. This file corresponds to the tests database (9) and its component elements (17 to 24) as described in the summary of the invention. Also see FIGS. 46 to 49.

The group descriptions DBF file (40) is identified in the program's code by Select 4: grupos.dbf. This file corresponds to the group descriptions data tables (14) described in the summary of the invention. Also see FIGS. 50 and 51.

The group elements DBF file (41) is identified in the program's code by Select 5: detalle.dbf. This file corresponds to the group elements data tables (15) described in the summary of the invention. Also see FIGS. 52 and 53.

The clase1, clase2 and clase3 DBF files (42, 43, 44) are identified in the program's code by Select 6, 7 and 8: clase#.dbf. This files correspond to the triggers and associated actions data tables (23, 24) described in the summary of the invention. Also see FIGS. 54 and 55.

The summary test DBF file (45) is identified in the program's code by Select 9: presumen.dbf. This part of the tests database (9) wasn't separately in the summary description of the invention. Also see FIGS. 56 to 58.

The summary detail DBF file (46) is identified in the program's code by Select 10: dresumen.dbf. This is part of the tests database (9), although it wasn't explicitly described in the summary of the invention. Also see FIGS. 59 and 60.

The summary diagnostics DBF file (47) is identified in the program's code by Select 11: prresult.dbf. This file corresponds to the diagnostics data tables (27) described in the summary of the invention. Also see FIGS. 60 and 61.

The summary diagnostics elements DBF file (48) is identified in the program's code by Select 12: drresult.dbf. This file corresponds to the diagnostics data tables (27) described in the summary of the invention. Also see FIGS. 61 and 62.

The invention's best embodiment implementation has been designed to run as a stand-alone system, or in an integrated manner with an expert system and its associated inference engine. As stated previously, researchers define expert systems in the following way: Intelligent computer programs that use knowledge and inference procedures to solve problems that are hard enough as to require in their solution, significant expertise. The expert system and its associated inference engine (6), as shown in FIG. 7, comprise a knowledge database (28), sets of rules (29), a rules processing language (30), inference logic procedures (31), and interface modules (32).

Operation:

As shown in FIG. 67, after building the data table and the associated empty files with the structure described in the previous paragraphs, in broad terms, the user will (a) define the tests to perform on the data, either in the test database or in the associated expert system, (b) will apply these tests and generate the associated diagnostics and classes, i.e. triggers and actions, and (c) the user will finally be able to query the diagnostics and the data in a coordinated manner.

FIG. 15 shows an excerpt of a typical application data table. FIG. 41 shows the data table's fields structure, and FIG. 42 shows another partial browse view of this table. In the best embodiment's data table, also called data DBF file (37) each record represents a different concept, such as sales, costs or profits, and each field represents a different time period. In a typical case, each field will represent a different consecutive month.

The user will usually start his work with the data by defining data item groups. These groups are useful for the application of common tests to all data items in any particular group, for the definition of reports and queries, and for the definition of the associated triggers and actions. FIG. 52 shows the structure of the group elements DBF file detalle.dbf (41), and FIG. 53 shows a partial browse view of this sample file. In this file, groups are defined by a simple list of pairs: the group identifier CODIGO and the data record identifier LINEA. Remember that, to completely identify a data item, only the record and field are needed, but as it may be seen in the data file's structure, data fields correspond to data periods. The user will later select the CURRENT data period on which all operations will be made.

The group definition process is complete when filling out the information required in the group descriptions DBF file grupos.dbf (40). FIG. 50 shows the fields structure of this file, and FIG. 51 shows a partial sample browse view of the same file.

Now the user will define tests and formulas. It will help now to know that, later, when the program applies user's tests on the data, it will do so only for a particular data period at a time. Thus, the user may tell the invention to work, for example, only on the data on September '93, which could be data field P7. Then, that data period, or field P7, would become period 0. Period 0 is the formula reference for CURRENT period. The previous period is then referred as −1, the period previous to that as −2, etc.

Formulas can be as simple as IF-THEN tests applied to data items, but they may become as sophisticated as expert system rules can be. The tests DBF file prueba.dbf holds both line tests and group tests. Line tests contain a record reference in field LINEA, while group tests contain a group reference in field GRUPO. FIG. 46 shows the file's fields structure. FIGS. 47 and 48 show two snapshots of the full contents of a few selected records.

FIG. 37 shows a listing of typical line tests and formulas of the IF-THEN type. The identification of each data item is of the form F("1.BALANCE.18",0), where "1.BALANCE.18" is the line or record identifier, and 0 is a relative period identifier: it means current data period (−1 means previous data period, etc.). The identification of each data item is of the form F("1.BALANCE.18",0), where "1.BAL-ANCE.18" is the line or record identifier, and 0 is a relative period identifier: it means current data period (−1 means previous data period, etc.). If the formula turns out to be TRUE, then a diagnostic is generated. That diagnostic only needs to identify the test that originated it (test_identifier, field PRUEBA) and the data item to which it refers, referred by the record identifier, field LINEA.

FIG. 38 shows a listing of typical group tests and formulas. Applying a group formula to a group means applying that group formula to all data items in that group. The typical data identifier in each group formula looks like G(0), where 0 means current data period. No identifier for a line or record is needed, since all group formulas can only be applied to one line at a time, and can only compare different elements within the same line. Thus group formulas may be used for inter temporal comparisons.

The test-processing engine (10) then interprets and executes all formulas for a particular data period at a time, reading and comparing all relevant data items, and whenever a test's conditions turn TRUE, generating one or more diagnostic records in the diagnostics DBF file result.dbf (38).

FIG. 44 shows the diagnostics DBF file's structure, and FIG. 45 shows a sample partial browse view of the same file. Whenever a test turns out to be true, a new record is added on the diagnostics DBF file. Each of these records simply stores two fields: the test identifier, and the data item identifier.

The test identifier is field PRUEBA in file result.dbf, which is read from field CODIGO in file prueba.dbf. In xBase notation (or FoxPro™ notation), this is written as RESULT.PRUEBA=PRUEBA.CODIGO. The data item identifier is composed of two fields: the data record identifier, which is field LINEA in file data.dbf, and the CURRENT period identifier, which is stored in field NPER of the file diagnostic DBF file result.dbf. Remember that the CURRENT period identifier had to be determined by the user just before running all tests.

The procedures executed to apply line and group tests to the data are described in all detail below in Section C: Description of formula application procedures.

The test DBF file prueba.dbf also holds fields CLASE1, CLASE2 and CLASE3. The operation and meaning of these fields can best be understood by reviewing FIGS. 29 to 36, and their associated descriptions. These fields serve several purposes: they are a means to classify all tests, and hence their derivative diagnostics; these classifications may represent anything the user fancies, such as the people responsible, whether the tests and diagnostics represent opportunities, dangers, etc., what should be done about each one of them, etc. These fields can also be interpreted as triggers and actions (23, 42, 43, 44), since whenever a test containing a particular code in a CLASE# field turns true, a particular action, procedure or program may be executed. The code to develop such an application should be obvious to anyone skilled in the art.

After the diagnostics have been generated, the user may query the diagnostics database and the data database simultaneously in two or more separate windows. The mapping of the data into the diagnostics combined with the coordinated query of both the data and the derivative diagnostics are the qualities that make this invention particularly innovative. The fact that the formulas may be an expert system's rules, and the diagnostics its own associated expert diagnoses only point out to the flexibility of this arrangement. The fact that no other implementation generating and querying diagnostics in any way similar to this, at least in functionality, has ever appeared in the market, only underlines the uniqueness and unobviousness of the invention.

The query procedures produce at least four different types of coordinated browse views, which may be seen in FIGS. 20 to 27. It is also recommended to study the associated descriptions.

The algorithms that produce each one of these four coordinated browse views are explained in detail below in Section D: description of diagnostic browse operations. The operation of the frequency browse view is more complicated since two temporary DBF files, temp.dbf and temp1.dbf have to be generated to hold the frequency counts for each class of diagnostics, depending on the filters applied on the query, as shown in FIGS. 29 to 36, and to hold the individual diagnostics associated to each frequency count and to each class of diagnostics defined in the query.

The operation of the summary browse view also involves a new set of files to hold and define the summary tests and diagnostics.

The summary diagnostics are capable of representing the overall condition of the problem under analysis by the invention. They can even foretell dangers, opportunities and scenarios for the near term future.

For example, a firm may have the following goals: (a) yearly 20% sustained growth on sales, (b) cost growth at no more than 10% per year, and (c) reducing the debt ratio to no more than 45%. In this case, the user may ask The invention to show him when these three conditions are met in five products or more.

Summary diagnostics are turned on only when the individual diagnostics in their definition are ON simultaneously.

Individual diagnostics that have turned ON are identified by letter P. Those individual diagnostics not identified with letter P have not turned on. If those individual diagnostics not identified with letter P happened to turn TRUE, then all diagnostics in the summary diagnostic would be TRUE.

Summary diagnostics could, because of their nature, also be named checklist diagnostics.

Summary diagnostics are defined in the summary elements DBF file dresumen.dbf (46). The field structure for this file is shown in FIG. 60. FIG. 61 shows a partial sample browse view of the same file. To define a summary test, the user only needs to define a set of data pairs: the summary test identifier, and an identifier for another individual diagnostic that must be true for the summary test to be true too. The summary test identifier is field ANALISIS (63), and the individual diagnostic is field PRUEBA (53). To complete the summary test definition, the user may also write a longer description for the test in file presumen.dbf (45), with the structure shown in FIGS. 58 and 59. The user may also define the minimum number of individual diagnostics that will set the summary diagnostic on.

Finally, the summary diagnostics are stored in files prresult.dbf and drresult.dbf in a manner similar to the storage of individual diagnostics and summary tests. For more details, see the description for the associated procedures in Section D below.

It's also necessary to describe the linking procedure. It can be clearly understood from the rest of the best-embodiment's description, particularly that of files tabla.dbf (containing the quantitative data), prueba.dbf (containing the tests and its associated formulas) and result.dbf (containing the diagnostics, which are those tests that have turned out to be true for specific data items).

Each particular data item needs may be identified by identifying the data record and the data field it's read from. Field LINEA is used to identify each data record in the quantitative database. The field identifier (1 to 60, since there are sixty period numbers) is used to identify the particular data field where the data item is located. In this discussion, we will call this field identifier "period number".

Each test is identified by its code CODIGO. Finally, individual diagnostics ARE NOT identified by any particular code. The way the linking is done is simple: whenever a particular test identified by CODIGO turns out to be true, then a new record is added to the diagnostic database (PRUEBA.DBF). The new diagnostic record will contain the test identifier CODIGO, which will now be stored in field PRUEBA, and it will also contain the identifier for one particular data item the diagnostic will be linked to (fields LINEA and NPER for period number identifier).

In this way, each diagnostic record will contain the test code (PRUEBA) and the data item identifier (LINEA, NPER). Thus, when looking at a particular diagnostic, it's easy to find the related (linked) test and the related (linked) data item. On the other hand, when looking at a particular data item, it's relatively easy to find all those diagnostics that are related to it by simply searching for the data item identifier (with the corresponding values for LINEA and NPER) in all diagnostic records. This search operation could take some time. In order to speed up the search operation, the files may be indexed following database indexing procedures commonly used in the industry: a single statement INDEX should be issued, indicating which fields (LINEA, CODIGO, PRUEBA, NPER) the index is going to be built on. The rest is automatically done by the database administrator. In the case of the invention's best embodiment, the FoxPro™ 2.0 database manager was used.

FIG. 90 shows the basic operation of the invention, which involves the selection of an item or items of quantitative data and the application of the corresponding analysis rule(s) to generate diagnostic records. The linking pointers are added to the new diagnostic records and this information is stored in the diagnostic database. In the best embodiment implementation, all these operations are performed in the following manner, as exemplified in FIG. 90: First, the program makes the first record in the test database the current test record (124). It must be noted that each test record contains a test code unique to this particular test record, and a description of the mathematical calculation(s) and logic operation(s) to be performed. The program now retrieves the necesary data needed for the test encoded in the test formula in the current test record (125). Then the mathematical calculation(s) and logic operation(s) in the first test are performed (126). After these operations, if the result of the test just applied is true, a new record in the diagnostic database is created (128), and the following information is written into this new diagnostic record: the keyword identifying the particular data item and a test code identifying the test record and encoding the result of the test. Finally, if this is not the last test record in the test database, that is, if there are more tests to perform, as tested by block 129, then the next test record is selected from the test database (130), and the procedure is repeated again starting at step (125), retrieving the necessary data needed for the corresponding test just selected.

FIG. 91 shows, in a simplified manner, the procedure followed to display and select a particular data item and to see or browse through the diagnostics related to the particular data item selected. The sequence of steps is: (a) display window 1 and window 2 in the computer screen; (b) display one or more items of data from quantitative database in window 1; (c) display at least one diagnostic record from the diagnostics database in window 2; (d) display a pointer in window 1; (e) receive user commands to move the pointer and enter a select command so as to select an item of data displayed in window 1; (f) retrieve from the diagnostic database the diagnostic records associated with the selected item of data selected in window 1 using the link pointer programmed by the user when the test which generated the diagnostic was programmed by the user, and (g) display the selected diagnostic records in window 2.

FIG. 92 shows, in a simplified manner, the procedure followed to display and select a particular data item and to see/browse through the diagnostics related to the particular data item selected. The sequence of steps is: (a) display window 1 and window 2 in the computer screen; (b) display one or more items of data from quantitative database in window 1; (c) display at least one diagnostic record from the diagnostics database in window 2; (d) display a pointer in window 2; (e) receive commands from the user to move the pointer and issue a select command to select a diagnostic record displayed in window 2; (f) retrieve from the quantitative database the data records associated with the diagnostic record selected in window 2 using the link pointer programmed by the user when the test which generated the diagnostic was programmed by the user, and (g) display the selected quantitative data records in window 1.

Ramifications and Scope of Invention

While the previous description contains many specificities, these should not be construed as limitations on the scope of the invention, but rather as an exemplification of one preferred implementation thereof. The following paragraphs explain many other alternative schemes:

If the previous description of the preferred embodiment is compared to the description of Expert Systems in section. (B) under Background of the Invention, it can be seen that in one possible implementation, this invention may be implemented as an add-in tool to existing database programming languages or to Expert System programming languages and development environments. In that case, this invention would add specific facilities for creating a database from the diagnostics generated by the expert system's programming statements. Other additions or modifications that could be done to the invention include: (A) drilldown reporting, (B) the transparent, automatic and synchronized operation of tests and diagnostics to data in any kind of computer application, even through concurrent programming operations or multitasking environments, (C) different data structures for the data DBF file, allowing the easy operation of case-oriented applications such as high-speed real-time industrial processes, (D) recursive expert analysis techniques where the tests themselves become data for the expert system and the test-processing engine, and (E) different schemes for integrating the invention with expert systems, neural networks. Most of these implementations will be briefly discussed here.

A. Referring to DRILLDOWN REPORTING:

Drilldown reporting is a feature particularly important to managers and all those people that need to work with summary information but still reach the details that originate from those summaries and at the same time explain them. With drilldown reporting, a manager must be able to look at a very abbreviated summary report, showing only grand totals of all the operation. By pointing at any particular data in the summary, the drilldown program will immediately show the detail components of the particular data element pointed to. Many different levels may be defined, and the drilldown-drillup process goes only one step at a time. Thus, from grand totals, the user may go to totals, partial detail, and full detail. Then, the user may go back up again to the totals.

The best mode implementation defines drilldown reporting by defining groups of lines, and defining classes within tests and diagnostics. Whenever the user chooses any particular combination of line filters and classes filters, he automatically gets a summary report in which he may downdrill as much as he wants by looking at the summary data in one screen and the detail screen in the other (like in the summary browse view, and the frequency browse view, which show totals and summaries in the upper half of the screen, and the detail information in the lower half). A more sophisticated implementation of this scheme would allow the recursive definition of groups. Currently, groups can only be composed of individual data items, i.e. records or lines in the tabla.dbf file. Also, classes can only be composed of individual class items. In an expanded version, groups may also contain groups as long as a strict hierarchy of groups is respected, that is, no circularities are involved, since these would most probably result in logical contradictions. Groups containing groups and classes containing classes would mean an unlimited possible number of downdrilling levels. The user would define a summary report by simply listing the groups, classes and periods (or groups of periods) that should show on the vertical and horizontal axis of the summary report, and the filter that should be applied to all the data on that report. From then on, whenever the user selects any data item on the report, the next subsequent group in the hierarchical definition scheme would be displayed in the report instead. For an example of this class of application, see again FIGS. 11 to 14 and their associated descriptions.

Also, as shown on FIG. 93, the particular way the browse screens and browse view are created and shown in the preferred embodiment isn't the best way to do this type of analysis. FIG. 93 shows a four-way browse view where four simultaneous browse views are shown. Just like in the best embodiment, here each browse view is the result of a particular BROWSE command from the FoxPro™ language. The four browse views mentioned are identified in the figure by the titles: "1 expert window", "2 actions window", "3 diagnostics window", "4 data window". There are also two more windows, called "keywords window" and "text window". Here, if the user selects the "4 data window" by use of some pointing mechanism, the program will then operate in a manner similar to that shown in FIG. 20. That is, the user may scroll through the data and the associated diagnostics will appear on window "3. diagnostics window". Similarly, if the user selects the "3 diagnostics window", the program will operate in a manner similar to that described in FIG. 22. If the user selects the "2 actions window", the program will operate in a manner similar to that described in FIG. 24, the frequencies view. If the user selects the "3 expert window", the program will operate in a manner similar to that described in FIG. 26, the summaries view. Also, the keywords window is really a filter window, and it operates in a manner similar to the screen shown in FIG. 28. Finally, the text window is the same window shown at the lower right corner of FIG. 21, and showing the full text of the description of a particular selected diagnostic. The advantage of the arrangement shown in FIG. 93 over those described in the best embodiment is that here all windows will be active at all times. That is, the user only needs to point at a particular window to find a particular action (or class), a particular expert diagnostic (or summary diagnostic, as it was called during the description of the best embodiment), etc. The user will be able to directly jump from the expert (summary) diagnostics to the associated quantitative data, etc.

B. Referring to the INTEGRATION with other software APPLICATIONS: the invention can also be applied to current implementations of accounting programs, spreadsheet applications, statistical analysis packages, etc. This could be implemented through several ways. In the simplest possible way, the invention remains as described in the best embodiment. That is, all tests are evaluated on the data contained in the tabla.dbf file. However, the tabla.dbf file could contain extracts of particular data from these programs, obtained earlier by reading it from these programs. Then, whenever the invention executes the coordinated diagnostic browse view operations, the invention would work as described in the best mode implementation but, instead of showing the data DBF file tabla.dbf, the invention would show the original data from the associated program. In order to do this, the associated program would only need to dynamically generate and send to the invention two indexes to identify the field and record position of the corresponding data item in the data DBF file tabla.dbf. That is, an index file linking the application's screens and tabla.dbf would have to be generated. Multitasking environments such as the Microsoft Windows™ environment by Microsoft Corporation of Redmond, Wash. state, allows the simultaneous operation of several applications in separate open and visible windows, and the dynamic sending of live data between these applications, through what are called DDE (dynamic-data-exchange) channels. Schemes such as this could also allow the simultaneous execution of all types of applications and the invention. This would be important to managers and users of all kinds, since it would allow them to look at the data in a different way, organized by their own priorities and responsibilities, and the ensuing actions.

C. Referring to DIFFERENT DATA STRUCTURES for the data DBF file: the best embodiment implementation as shown here is appropriate for time-based applications such as the analysis of financial reports (balance sheets, financial ratios, profit and loss statements, etc.). For case-oriented applications such as high-speed real-time industrial processes, quality control applications, inventory applications for the control of individual transactions and items, etc., a different data DBF file structure should be proposed. In the best embodiment, records represent concepts such as sales and costs, and fields represent time periods. In an alternative case-oriented scheme, fields would be individual cases, which could well be repetitive instances of the same readings. Each field would represent a particular element of a reading. For example, in a toy manufacturing plant, the statistics for each particular toy manufactured may be stored in a database. The reading for serial product #10358 could be: time 3:58 minutes, plastics grade A 12.15 grams, weight 8.15. There could be many other data elements. Every three seconds a new reading for a new manufactured toy could be generated, adding a new record with those three fields (and probably many more) to the data DBF file. In such an implementation of the invention, the formulas would have to be redesigned. In the best mode implementation, before issuing the test application order, the user must identify a CURRENT data period. Under the case-oriented scheme, the user would use a filter to select the desired data DBF file's records, since he would most probably desire to run the tests on a particular set of 'readings' (using the terminology just defined in the previous toy factory example). The rest of the application could remain the same, or at least very similar. There would still exist line and group tests (of these, most operations would be group operations). But a new class of group+line tests would have to be defined, in this way: in the best mode implementation there is only one line or record identifier in file tabla.dbf (field LINEA). In the case-oriented scheme there could be more than one. In this way, it would be possible to design formulas that could act on a particular structure of lines. For example, a particular toy could generate not one, but two records for each reading. The user may always want to relate the two lines as if they were one, and thus would like to issue formulas comparing fields in these two records. Similar situations may rise with more than two records, and for different reasons, needs or applications. All these could be solved by the use of more than one record identifier for the tabla.dbf file.

D. Referring to RECURSIVE expert analysis TECHNIQUES: Expert systems are capable of emulating human reasoning through learning the development of multi-layer rule based systems. However, also a simple test-processing scheme could easily emulate these artificial-intelligence techniques in the invention, even before the integration of the expert system within the invention.

In a simple implementation, whenever a particular test turns true, a diagnostic is generated, and the associated classes (and thus actions and triggers) are identified and generated, an action such as a program or program routine may be executed. This program routine may generate a new set of data within the data DBF file tabla.dbf, it may delete sets of data or even modify existing data within the application. In the same manner, tests could be modified, eliminated or added, depending on the class, action and procedure involved. Whenever this happens, the invention would immediately run the tests all over again. This implies the invention may become a self-learning mechanism with recursion, since the loop would stop only when a state of equilibrium is reached. The same procedure could be applied to the summary tests, since the apparition of a particular summary diagnostic may trigger the modification of the summary tests, the original data, or the individual diagnostics on which the summary tests depend. These operations would also, automatically, involve the associated expert system and inference engine.

In another implementation which could be developed by itself or in combination with the previously described implementation, tests could be applied on diagnostics more than once. In the best embodiment, only summary tests are based on previous diagnostics. One summary test is turned on, that is, a summary diagnostic is generated, only when a predetermined set of diagnostics exists. In a multi-layered recursive scheme for summary tests definition, the predetermined set of diagnostics may also include summary diagnostics, and procedure vaplr.prg would be applied on the diagnostics and summary diagnostics repeatedly, until no more summary diagnostics are generated. However, for this procedure to run, a small change needs to be done to vaplr.prg, as described in Section—C: before the first iteration, step 0 would erase all diagnostics for the selected periods before applying the tests; in all other subsequent iterations, no diagnostics would be erased but, instead, all duplicate diagnostics would be erased after applying the test.

In a third possible implementation, summary tests could follow the syntax of procedural logic, or even of the Lisp language and predicate calculus. In the best embodiment, a summary diagnostic is activated whenever a certain number of diagnostics in a predetermined list are true. But requiring all diagnostics to be true is equivalent to an AND list of conditions on all individual diagnostics. In an expanded version, summary diagnostics could respond to combinations of OR, AND and other logical conditioners in procedural logic or in the predicate calculus language.

Expert system building tools such as the VP-EXPERT™ expert shell by Paperback Software allow the definition of rules and sets of rules entirely in a database DBF file. These are called induction tables, and are fully documented in available literature. Integrating procedural language techniques into the summary diagnostics is equivalent to developing of an expert system's knowledge base in the invention. In order to convert the invention into a full-fledged expert system, only the inference engine procedures need to be considered. As it was stated previously, the inference engine or rule interpreter has two tasks. First, it examines facts in working memory (the diagnostics that have been turned on) and rules in the rule base (the summary diagnostics), and adds new facts (diagnostics) to the database when possible. Second, it determines in what order rules (summary diagnostics) are scanned and fired. But, the goal in this expert system building tool is to build as many summary diagnostics as possible and, for that goal, the procedure already described, however crude, is an example of a simple but complete forward chaining algorithm; it's not the most efficient, but it serves its task.

These three examples show a few alternative paths that can be followed to turn the invention into a complete expert system.

E. Referring to the invention's integration with EXPERT SYSTEMS and NEURAL NETWORKS: An expert system and inference engine, even a neural network or other kinds of artificial intelligence procedures and techniques, could be integrated with the invention through several procedures. In a simple scheme, the invention would retain its structure and operation as stated in the best embodiment implementation. The inference engine would contain a separate, additional and independent set of rules. Only the data DBF file tabla.dbf, all diagnostics and summary diagnostics and all query operations would be common to both platforms.

In such an implementation, the expert system's inference engine would read its data from the diagnostics DBF file result.dbf, and optionally also from the data DBF file tabla.dbf. It would run its sets of rules on this data, and it would finally generate a set of expert solutions. These solutions would be written as new diagnostics in the diagnostics DBF file result.dbf, using the best embodiment's scheme: a reference (or a list of reference) to the data items involved, and an identifier for the ensuing diagnostic. For compatibility with the invention's current structure, a test DBF file entry would also be generated whenever the corresponding test is missing. The test entry will contain the test's short and long description, and the associated classes, triggers and actions, as described. Thus, the user will be able to also reach the diagnostics generated by the expert system by using the querying engine and the corresponding coordinated diagnostic browse views in the same way described previously. The expert system's diagnostics could be distinguished from all others by using appropriate values for the CLASS1, CLASS2 and CLASS3 fields in file prueba.dbf.

One such possible example of this implementation would involve the VP-EXPERT™ expert shell by Paperback Software. In its version 2.0, VP-EXPERT™ may read and write DBF database files, accessing them with the GET clause (see sections 5.9 and 9.46 in the VP-EXPERT's user's manual), adding records to them with the APPEND clause (sections 5.19 and 9.8 in the same manual), using DBF files as information base (section 5.3 in the user's manual), etc. Even rules may be created from DBF induction tables (see sections 5.22, 8.4 in the user's manual).

Referring to the use of a DBF file as an information base, VP-EXPERT's manual states in page 5.3: "One of VP-EXPERT's most important and powerful features is its ability to interact with database files created using VP-Info, dBASE II, III, III+, or any work-alike database management system." And in page 5.4: "Expert systems frequently require a great amount of data that need period updating. ( . . . ) It's far more efficient to store the varying information in a database, and design the rule base to contain a single set of invariant rules. ( . . . ) VP-EXPERT's ability to employ this type of interaction is one of its greatest powers. Using the GET clause, data can be retrieved from the fields of a database and assigned as values of knowledge base variables. The PUT and APPEND clauses allow data to be transferred in the opposite direction; they copy values from knowledge base variables to the fields of a database. The MENU clause makes it possible to display menus offering values extracted directly from specified database fields. When a database is used in this fashion, it becomes an information base, and it is considered to be part of the overall knowledge base."

Another important reference is in page 5.21 of said user's manual: "Since VP-EXPERT™ permits the user to change data or add data to the knowledge base during a consultation, it can be said that, in a limited sense, the expert system is able to learn from experience. This capacity is significant, because the ability to 'learn' is an important criterion in defining an expert system."

The benefits of integrating the invention with existing expert system building tools are: (a) improved efficiency when handling multilayered logic and complex inference procedures and links through multiple indirect addressing, chained statements, and different alternatives and optimizing procedures for the backward or forward chaining logic; (b) user interaction services ideally suited to knowledge databases management, such as the definition of goals, the use of ASK statements to handle missing information, the operation of uncertainty through confidence factors; and finally, (c) tools for facilitating the understanding of the whole logic process. As the number of rules and their complexity grow, it has been shown that it is very hard to manipulate them and it is also hard to fully understand what they do. For this reason, existing expert system building tools incorporate graphic logic trees, trace services, HOW and WHY statements to inquire how the logic proceeds, etc. All these could be eventually integrated into the invention but, given that each particular expert system developing tool in the market today is stronger for a particular set of applications, it's better to allow the integration and add the power of independent inference engines to the invention.

Another artificial intelligence technique is that of NEURAL NETWORKS. Neural networks receive a set of stimuli (diagnostics or data which are defined as the input layer) to produce specific responses (new diagnostics which are defined as the output layer). However, neural networks don't require any kind of programming to determine the relation between stimuli and responses: they learn as they receive a large number of cases where the stimuli and the responses have already been defined. The invention's best embodiment implementation may hold up to sixty periods of data and its associated diagnostics, and the user may, beside all these cases, present the system with many more cases just so it learns. However, the use of a neural network seems to be most appropriate for the alternative configuration described in (C): different data structures for the data DBF file. In the case of the toy factory, or in other quality control applications such as those related to attention to the public, it may be important to determine whether a data record in the data DBF file represent adequate quality or not. These applications are particularly well suited to neural network applications, since sometimes past experience with a large number of cases where it's already well known whether quality was adequate or not may be the best guide to determine what is adequate quality for the future.

The integration scheme of neural networks with the invention is very similar to that of expert systems with the invention: the invention would retain its structure and operation as stated in the best embodiment implementation, and the alternative implementation described in section (C): different data structures for the data DBF file. The data DBF file tabla.dbf, all diagnostics and summary diagnostics and all query operations would be common to the neural system and the invention's best embodiment implementation.

In such an implementation, the neural network would obtain its stimuli from the diagnostics DBF file result.dbf, and optionally also from the data DBF file tabla.dbf. It would run through its input layer, intermediate layer probabilities and the response layer and it would finally generate a set of responses (diagnostics). These diagnostics would be written as new diagnostics in the diagnostics DBF file result.dbf, using the best embodiment's scheme: a reference (or a list of reference) to the data items involved, and an identifier for the ensuing diagnostic. For compatibility with the invention's current structure, a test DBF file entry would also be generated whenever the corresponding test is missing. The test entry will contain the test's short and long description, and the associated classes, triggers and actions, as described. Thus, the user will be able to also reach the diagnostics generated by the neural network by using the querying engine and the corresponding coordinated diagnostic browse views in the same way described previously. The neural network's diagnostics could be distinguished from all others by using appropriate values for the CLASS1, CLASS2 and CLASS3 fields in file prueba.dbf.

Accordingly, the scope of the invention should be determined by the appended claims and their legal equivalents.

Section A—Files of Source Code Given In Appendix A

| | | |
|---|---|---|
| 1. | vcambio.prg | Creates and activates main menus |
| 2. | vmenu.prg | Calls program routines from main menu in vcambio.prg |
| 3. | vacti.prg | Calls diagnostics menu routines from vcambio.prg |
| 4. | vdrive.prg | Change application path default. Create missing files. |
| 5. | vverif.prg | Checks structure for each file by comparing against reference files |
| 6. | vcond.prg | Add/modify line tests |
| 7. | vcondg.prg | Add/modify group tests |
| 8. | vdup.prg | Duplicate a line test |
| 9. | vapl.prg | Apply line tests |
| 10. | vaplg.prg | Apply group tests |
| 11. | vaplr.prg | Apply summary tests |
| 12. | vman.prg | Data browse view |
| 13. | vmanr.prg | Diagnostics browse view |
| 14. | vresu.prg | Frequency browse view |
| 15. | vsumm.prg | Summary browse view |
| 16. | vbases.prg | File import from ASCII file |
| 17. | lista.prg | Calls file print routines |
| 18. | vano.prg | Moves data twelve periods back |

Section B—Short description of each procedure's operation

Vcambio.prg

Creates and activates main menus. Calls procedures through indirect calls at vmenu.prg and vacti.prg.

Steps

1. Initializes variables
2. Defines menu bars
3. Calls procedures to be executed Diagnostics menu options are routed through module vacti.prg All other options are routed through module vmenu.prg vmenu.prg Calls all program routines from the main menu in vcamblo.prg. Vmenu.prg assigns all menu options and procedures except those under menu option 'Diagnostics' from vcamblo.prg to their respective procedures.

vactl.prg

Calls diagnostics menu routines from vcambio.prg vdrive.prg

Change application path (since each path holds all files for a different application, this is equivalent to choosing an existing or creating a new application). If there are any missing files in the selected directory, vdrive.prg generates these files automatically.

Steps

1. Generate application pick list
2. Accept user selection
3. If User selects empty directory, create all files copying from reference files
4. If directory isn't empty, check files structure against reference files
5. Activate file directory and select file tabla.dbf vverif.prg Checks each file's structure by comparing against reference files. That is, vverif.prg verifies the length for each field in each database file. This is run as soon as an application is selected by vdrive.prg.

If there are no reference files to check the application's files against, this same procedure also creates file 'struexte' containing information about all fields in each database file, from 1 to 12.

vcond.prg

Add/modify line tests. This module allows the user to modify any existing line tests, or to add new line tests.

vcondg.prg

Add/modify group tests. This module allows the user to modify any existing group tests, or to add new group tests.

vdup.prg

Duplicate a line test.—This module generates a line test by copying an existing line test, so as to allow the user to modify it later. This is good for creating new tests that are very similar to old tests. This option is particularly useful for those line tests that need to be assigned to more than one data item in the data database.

vapl,prg

Applies line tests to all data In selected periods.

Note: In the best embodiment implementation, line tests and group tests are always executed together. Line tests first, and then followed by group tests. After executing vapl.prg, the program will Immediately execute vaplg.prg and vapl-r.prg.

vaplg.prg

Applies group tests to all data in selected periods.

veplr.prg

Applies summary definitions and creates summary diagnostics.

This module (module VAPLR) applies summary definitions in files presumen.dbf and dresumen.dbf. This module is executed immediately after the vapl.prg and vaplg.prg modules. Module vaplr.prg reads the diagnostics just generated by vapl.prg and vaplg.prg, and compares them with the summary definitions in files presumen.dbf and dresumen.dbf. It finally writes results to files prresult.dbf and drresult.dbf.

vman.prg

Data browse view.—This module executes the data browse view command option from the Diagnostics menu.

vmanr.prg

Diagnostics browse view.—This module executes the diagnostics browse view command option from the diagnostics menu.

vresu.prg

Frequency browse view.—This module executes the data browse view command option from the diagnostics menu.

vsumm.prg

Summary browse view.—This module executes the data browse view command option from the diagnostics menu.

vbases.prg

File Import—Reads one data period from an ASCII file, and writes it to the desired data period in file tabla.prg, vlista.prg Calls the printing routines.

vann.prg

Maintenance—Release one year of information: erases the first twelve months of information and moves all data and related diagnostics twelve months back into the past, thus leaving free space for twelve new months.

Section C—Description of formula application procedure

In the summary description of the intention, formula application procedures are simply referred to by the term procedure Apply_formulas.

In the best embodiment Implementation shown in FIG. 84, this procedure becomes three procedures: line tests, group tests and summary tests. These three procedures are always executed one Immediately after the other, and in that order. The procedures involved are: vapl.prg for line tests, vaplg.prg for group tests and vaplr.prg for summary tests.

| | |
|---|---|
| vapl.prg | Applies line tests to all data in selected periods. |
| vpalg.prg | Applies group tests to all data in selected periods. |
| vaplr.prg | Applies summary definitions and creates summary diagnostics. |

Important related flies:

| | |
|---|---|
| line tests | data.dbf (37), prueba.dbf (39), result.dbf (38) |
| group tests | data.dbf (37), prueba.dbf (39), result.dbf (38) and detalle.dbf (41) |
| summary tests | result.dbf (38), presumen.dbf (45), dresumen.dbf (46), prresult.dbf (47), drresult.dbf (48). |

Notice that file prueba.dbf (39) contains both line and group tests, but it does NOT contain summary tests, which must be treated separately. Summary tests are defined and stored in files presumen.dbf (45) and dresumen.dbf (46).

Module VAPL.PRG

Uses

Files data.dbf (37), prueba.dbf (39), result.dbf (38).

Steps

0. The user indicates for which period or periods to run the tests. Each period corresponds to a different data fields in the data DBF file (37), tabla.dbf. All tests will only be run for the particular periods indicated by the user. The program will now erase all diagnostics for the selected periods before applying the tests. This ensures there will not be any duplicate diagnostics.

1, identify line tests in prueba.dbf (39): those that contain a data item identifier i.e. a record identifier—field LINEA—, and have the group identifier blank—field GRUPO—

2. operate all line tests in file prueba.dbf (39), one by one in sequence, and for each line test:

a) identify the data items involved in the formula and perform the formula (if— then condition)

b) if the formula condition is FALSE, goto next test in file prueba.dbf c) if the formula condition is TRUE, generate diagnostic, that is: write a new record in the diagnostics DBF file (38) result.dbf. This record will only contain the data item identifier (i.e. the line record, field LINEA), the test identifier (field PRUEBA) and the period number Identifier.

Module VAPL.PRG

Uses

Files data.dbf (37), prueba.dbf (39), result.dbf (38), detelle.dbf (41)

Steps

0. The user indicates for which period or periods to run the tests. Each period corresponds to a different data field in the data DBF file, tabla.dbf. All tests will only be run for the particular periods Indicated by the user. The program will now erase all diagnostics for the selected periods before applying the tests. This ensures there will not be any duplicate diagnostics.

1. Identify group tests In prueba.dbf (those that contain a group identifier—field GRUPO—and don't contain a data item identifier, i.e. a. record identifier—field LINEA—).

2. Operate all group tests in file prueba.dbf, one by one In sequence, and for each group test:

a) read the group identifier in file prueba—field GRUPO— b) search for the next occurrence of that group identifier in file detalle.dbf c) if this is the end of file detalle.dbf, goto next test in file prueba.dbf d) if the group identifier was found, now read the corresponding data item Identifier—field LINEA— e) perform the formula (if—then condition) with the data item pointed to by the value of identifier LINEA just read and the CURRENT period f) if the formula condition is FALSE, goto (b), I.e., search for next occurrence of that group identifier in file detalle.dbf g) if the formula condition is TRUE, generate diagnostic, that is: write a new record in the diagnostics DBF file result.dbf. This record will only contain the data item identifier (i.e. the line record, field LINEA), the test identifier (field PRUEBA) and the period number identifier.

Module VAPLR.PRQ

Uses

Files result.dbf (38), presumen.dbf (45), dresumen.dbf (46), prresult.dbf (47), drresult.dbf (48).

Steps

0. The program will first erase all diagnostics for the selected periods before applying the summary tests. This ensures there will not be any duplicate summary diagnostics.

1. Operate all summary tests in file presumen.dbf, one by one in sequence, and for each summary test:

a) delete all records from temporary DBF file memory.dbf b) read the summary test identifier in file presumen,dbf— field ANALISIS— c) identify tests; that is:
   i) search for the next occurrence in file dresumen.dbf of the summary test identifier just read at file presumen.dbf
   ii) if this is the end of file dresumen.dbf, go to (d): check number or occurrences
   iii) if the summary test identifier was found, now read the corresponding test identifier (18)—field PRUEBA—
   iv) identify all occurrences of the test Identifier (18) in file result.dbf and store all contents of these records in file memory.dbf
   v) go to step (i): search for next occurrence of summary test identifier in dresumen.dbf d) check number of occurrences
   i) eliminate all duplicate tests in file memory.dbf. Notice that the criteria for duplicate tests can be defined by the user. This is done simply because the summary test requires a minimum number of non Identical tests in order to be true.
   ii) If the number of records in file memory.dbf is smaller than field PMIN for the current summary test in file presumen.dbf, immediately go to next summary test, i.e. go to step (a), delete all records from temporary DBF file memory.dbf
   ii) if the number of records in file memory.dbf is greater or equal than field PMIN in file presumen.dbf, then keep going
   iii) write a new record in file prresult.dbf, containing the summary test identifier—field ANALISIS— and the period number identifier—field NPER—
   iv) for each one of the occurrences, generate a new record In file drresult.dbf, containing the summary test identifier—field ANALISIS—, the period number identifier—field NPER—, the test identifier (18, field PRUEBA), the data item identifier—field LINEA— and write code 'P' In field POSITIVA.
   v) for each test identifier (18) in file drresult.dbf related to the current summary test that doesn't happen in any occurrence in the previous step, generate a new record in file drresult.dbf with the same information, except that field POSITIVA goes blank. This field indicates a TRUE test ('P') or a test that didn't turn TRUE (blank).
   vi) go to next summary test, i.e. go to step (a), delete all records from temporary DBF file memory.dbf In summary, module vaplr.prg applies summary definitions in files presumen.dbf and dresumen.dbf. For each summary test, it identifies the individual tests that have turned true (i.e. that have associated diagnostics). If these are more than the minimum threshold number PMIN defined In presumen.dbf, then it writes the corresponding records in prresult.dbf and drresult.dbf.

Section D—Description of diagnostic browse operations

Data browse view (vman.prg)

steps

1. Setup screen options variables initialization 2. Activate files

Select 1: file tabla.dbf (37)

Select 2: file result.dbf (38)

Select 3: file prueba.dbf (39)

3. Define windows in screen tabla (72, 74, 77 In FIGS. 75, 76, 77)—Upper half of the screen. This will contain selected data from file Select 1, tabla.dbf (37), the data database file (13) result (73 in FIG. 75)—Lower half of the screen. This will contain selected data from file Select 2, result.dbf, the diagnostics database file result1 (75, 78 in FIGS. 76, 77)—May be used instead of 'result'. It occupies only 25% of the total screen area, at the lower left corner. When active, contains selected data from file Select 2, result.dbf, the diagnostics database file. At the right of window result1, the program shows related results (76, 79 in FIGS. 76, 77) of prueba.dbf, indexed by the test indicator (i.e., prueba.codigo=result.prueba)

Note: Window 'revisar' should be ignored at first when studying the algorithm. This serves mostly cosmetic purposes.

4. Filters selection

Present dialog box to user, for filter selection. Accept user selected filters on fields: linea, prueba, period, clase1, 2,3

5. Show first coordinated browses view

Structure:

Cursor control is in WINDOW 'tabla' (file TABLA.P-FIG).

Window 'result' is also active (file RESULT.PRG).

Action:

The cursor keys are browse keys

If the user presses the FS function key, goto step 6.

6. Show second coordinated browses view

Structure:

Cursor control is in WINDOW 'result' (file RESULT.PRG).

Window 'table' is also active (file TABLA.PRG).

Coordinated diagnostics descriptions (from file PRUEBA.PRG) also shows at the right of window 'result1'

Action:

The cursor keys are browse keys

If user presses F5, show first coordinated browses view (step 5)

If user presses F6, show third coordinated browse view (step 7)

The F6 option allows user to find all other data with the same diagnostics.

7. Third coordinated browses view
Structure:
  Cursor control is in WINDOW 'result1' (file RESULT-.PRG).
  Window 'table' is also active (file TABLA.PRG).
  Coordinated diagnostics descriptions (from file PRUEBA.PRG) also show at the fight of window 'result1'
Action:
  The cursor keys are browse keys
  If user presses F6, show second coordinated browse views (step 6)
  If user presses F5, show first coordinated browses view and (step 5)
  This is a special view that shows in window result1, all occurrences of the diagnostics with the same test identifier codes all throughout the application. That is, before selecting the third coordinated browses view, window result1 showed a few diagnostics (those associated with the data item that was previously selected in window table). After selecting the third coordinated browses view, these same diagnostics still show, but now the result1 window also contains all other occurrences of these diagnostics (those with the same test identifier codes) in all the application. If the user moves the cursor browsing this list of diagnostics, and then presses the F5 key, he will get the corresponding data items in the table window.
General notes
  a) F5 and F6 are both switches.
  b) If the user presses Escape twice at any time, the procedure ends.

Diagnostics browse view (vmanr.prg)

Steps

1. Setup screen options
variables initialization
2. Activate files
Select 1: file tabla.dbf (37)
Select 2: file result.dbf (38)
Select 3: file prueba.dbf (39)
3. Define windows in screen:
  table (80, 82 in FIGS. 78, 79)—Upper half of the screen. This will contain selected data from file select 2, result.dbf, the diagnostics DBF file, and from file select3, prueba.dbf, the tests DBF file. These files are synchronized by the relation result.prueba=prueba.codigo.
  result (81, 83 in FIGS. 78, 79)—Lower half of the screen. This will contain selected data from file select 1, tabla.dbf, the data DBF file
  Note: Windows revisar and revisar1 should be ignored at first when studying the algorithm. These serve mostly a cosmetic purpose.
4. Filters selection
Present dialog box to user, for filter selection.
Accept user selected filters on fields: lines, prueba, period, clase1,2,3
5. Show first coordinated browses view
Structure:
  Cursor control is in WINDOW 'result' (file result.prg).
  Window 'tabla' is also active (file tabla.prg).
Action:
  The cursor keys are browse keys
  If the user presses the F5 function key, goto step 6.

6. Show second coordinated browses view
Structure:
  Cursor control is in WINDOW 'table' (file tabla.prg).
  Window 'result' is also active (file result.prg).
Action:
  The cursor keys are browse keys
  If the user presses the F5 function key, goto step 5.
General notes
  F5 acts like a switch.
  If the user presses Escape twice at any time, the procedure ends.

Frequency browse view (vresu.prg)

Steps

1. Setup screen options
variables initialization
2. Activate flies
Select 1: file tabla.dbf (37)
Select 2: file result.dbf (38)
Select 3: file prueba.dbf (39)
Select tamp: file temp.dbf, containing a frequency sum of result.dbf
Select tamp1: file temp1.dbf, containing an extract from result.dbf, the result of filtering all diagnostics by one or more class selections
3. Define windows in screen
  tabla (84, 86 in FIGS. 80, 81)—Upper half of the screen. This will contain selected data from file Select tamp: temp.dbf, the temporary diagnostic frequencies DBF file
  result (85 in FIG. 80)—Lower hall of the screen. This will contain selected data from file Select tamp1: temp1.dbf, the temporary diagnostics DBF file result1 (87 In FIG. 81)—May be used instead of 'result'. It occupies only 25% of the total screen area, at the lower left corner. When active, contains selected data from file Select tamp1:temp1.dbf, the temporary diagnostics DBF file. At the right of window result1, the program shows related results (88 in FIG. 81) of file Select 3: prueba.dbf, indexed by field prueba, the test identifier (18), by the relation prueba.codigo=temp1.prueba.
  Note: Window 'reviser' should be ignored at first when studying the algorithm. This is created mostly for cosmetic purposes.
4. Filters selection
Present dialog box to user, for filter selection.
  Accept user selected filters on fields: linea, prueba, period, clase1,2,3
5. Show first coordinated browses view
Structure:
  Cursor control is in WINDOW 'tabla' (file TABLA.P-FIG).
  Window 'result' is also active (file RESULT.PRG).
Action:
  The cursor keys are browse keys
  If the user presses the F5 function key, goto step 6.
6. Show second coordinated browses view
Structure:
  Cursor control is in WINDOW 'result1' (file temp1.prg)
  Coordinated diagnostics descriptions (from file prueba.prg) also shows at the right of window 'result1'
  Window 'table' remains in the screen, but won't refresh its data (file temp.prg).

Action:

The cursor keys are browse keys

If the user presses the F5 function key, goto step 5.

General notes

F5 acts like a switch.

In the best embodiment's code, variable cam represents the condition of the F5 switch.

If the user presses Escape twice at any time, the procedure ends.

Stylized code: The following pseudocode exemplifies simplified operation of this module:

```
IF cam=0
  SELE temp1
  BROW WIND tabla FIEL linea,prueba, clase1, clase2, clase3,
  prueba.nombre
  SELE temp
  'DIAGNOSTIC FREQUENCIES'
  BROW WIND result FIEL numero, &fclase, &fnombre:
ELSE
  SELE temp1
  'DIAGNOSTICS'
  BROW WIND result1 FIEL linea, prueba, clase1, clase2, clase3,
  prueba.nombre
ENDIF
```

Summary browse view (vsumm.prg)

Steps

1. Setup screen options variables initialization

2. Activate files

Summary diagnostics DBF file. This is file select 11: prresult.dbf (47). It may be shown in combination with prueba.dbf (39), to show more information related to each summary diagnostic Summary diagnostics elements DBF file. This is file select 12: drresult.dbf (48).

Summary test DBF file. This is file presumen.dbf (45).

3. Define windows in screen tabla (89, 92 in FIGS. 82, 83)—Upper half of the screen. This will contain selected data from file Select 11, prresult.dbf, the summary diagnostics definitions DBF file, indexed by presult.prueba=prueba.codigo to file prueba.dbf, the tests DBF file.

result (90, 93 in FIGS. 82, 83)—Lower half of the screen. This will contain selected data from file Select 12, drresult.dbf, the summary diagnostics elements DBF file The middle section of the screen (between windows tabla and result) is not a window, but the program will display the diagnostics descriptions there (91, 94 in FIGS. 82, 83).

Note: Window 'revisar' should be ignored when studying the algorithm. This is created for cosmetic purposes.

4. Show first coordinated browses view

Structure:

Cursor control 1s in WINDOW 'table' (files select 11: prresult.dbf end presumen.dbf).

Window 'result' is also active (files select 12: drresult.dbf and prueba.dbf).

Description window at the middle of the screen, dynamically moving indexed by prresult.analisis=presumen.analisls with cursor control (file: presumen.dbf)

Action:

The cursor keys are browse keys

If the user presses the F5 function key, goto step 6.

5. Show second coordinated browses view

Structure;

Cursor control is in WINDOW 'result' (files select 12: drresult.dbf and prueba.dbf).

Window 'tabla' is also active, but immobile (files select 11: prresult.dbf and presumen.dbf).

Description window at the middle of the screen, dynamically moving Indexed by drresult.prueba=prueba.codigo with cursor control (file: presumen.dbf)

Action:

The cursor keys are browse keys

If the user presses the F5 function key, goto step 5.

RELATED DOCUMENTATION

FILE RELATIONS

Figures 73 and 74 show file structure and files relations as used throughout the invention. However, as it can be noted when looking at the code, these relations change frequently as different coordinated browse views of formula application schemes are executed. These changes have already been documented when describing which particular fields define the relations between all files, but their operation will be made more clear when examining the code.

CODE

Best embodiment's modules (.prg files) presented here:

1. *vcambio.prg*     Creates and activates main menus
2. *vmenu.prg*     Calls program routines from main menu in *vcambio.prg*
3. *vacti.prg*     Calls diagnostics menu routines from *vcambio.prg*
4. *vdrive.prg*     Change application path default. Create missing files.
5. *vverif.prg*     Checks structure for each file by comparing against reference files
6. *vcond.prg*     Add/modify line tests
7. *vcondg.prg*     Add/modify group tests
8. *vdup.prg*     Duplicate a line test
9. *vapl.prg*     Apply line tests
10. *vaplg.prg*     Apply group tests
11. *vaplr.prg*     Apply summary tests
12. *vman.prg*     Data browse view
13. *vmanr.prg*     Diagnostics browse view
14. *vresu.prg*     Frequency browse view
15. *vsumm.prg*     Summary browse view
16. *vbases.prg*     File import from *ASCII* file
17. *vlista.prg*     Calls file print routines
18. *vano.prg*     Moves data twelve periods back Other procedures that need separate commenting:

SETDBF - Clear (reset) all DBF file filters and define new filters and relations Other routines and procedures called by the previous modules and not included here contain only administrative operations, common to most database management programs and obvious for a programmer skilled in the art. The most important routines are discussed here.

PRG FILES AND THE CORRESPONDING PROCEDURES (MODULES):

TAB_OPEN - Maintenance operations, such as file routines performed after options File Backup and File Restore in the Maintenance menu. Called from vmenu.prg.
TAB_MMEN - Called from vdrive.prg. Complements menu operations; resets menu displays before exiting some commands and going back to the main menu
TAB_REPO - Create and print custom reports (see module VMENU.PRG). Option 'Print Help screens', under the Help menu. Other miscellaneous routines, such as: browse deleted records. Called from vmenu.prg.
TAB_INST - Options 'Browse settings', 'Password Setup', 'Printer Fonts' from the Maintenance menu, and other installation routines. Called from vmenu.prg.
TAB_MEM - Option 'Initial period' from the Maintenance menu. Called from vmenu.prg.
TAB_EDIT - Option 'Modify records' in Edit menu. Called from vmenu.prg.
TAB_APPE - Option 'Add records' (append) in Edit menu. Called from vmenu.prg.
TABLA - Contains TAB_PASS, PROTEJE, NBRO, SET_KEYS, CENTRA. See descriptions later in this text.
TAB_PROC - Contains TAB_FILE. See description later in this text.
TAB_INDE - Option 'Generate indexes' in 'Maintenance' menu option. Called from vmenu.prg.
TAB_REST - Option File Restore from the Maintenance menu. Called from vmenu.prg.
TAB_MISC - Miscellaneous maintenance functions, such as (a) file exporting to various formats (WKS, ASCII, XLS, etc), (b) pack deleted records. Called from vmenu.prg.
TAB_HELP - Custom Help (F1) routines. Called from vmenu.prg.
TAB_COND - Contains VEXPR, CONDEXIT, COUNTREC, WRAPPER. See descriptions later in this text.
TAB_BAK - Option File Backup from the Maintenance menu. Called from vmenu.prg.

SELECTED ROUTINES CONTAINED IN THESE FILES:

IM_MNCT - In tabla.prg, called by vcambio.prg, sets parameters for vmenu.prg.
VEXPR - In tab_cond.prg, called from vcambio.prg, vcond.prg, vcondg.prg. Builds the formula expression. Takes the ASCII expression stored in file prueba.dbf, and converts it to an executable formula.
COND_EXIT - In tab_cond.prg, called from vcond.prg, vcondg.prg. Allows the execution of hot-keys options, also mouse, escape, and ENTER. Menu procedure.
COUNTREC - In tab_cond.prg, called from vcond.prg and vcondg.prg, executed just after 'store new_expr to expr'. Calls type_error: 'hay error'. Validates the resulting formula expression (as built by VEXPR).
SETKEYS - In tabla.prg, called from vcond.prg, vcondg.prg. Activates all hot keys to their default options
WRAPPER - In tab_cond.prg, called from vcond.prg, vcondg.prg. Allows text wrapping with whole words; used to display test descriptions, group descriptions, etc NVL()     - Function in tabla.prg, called from vcond.prg, vcondg.prg, vdup.prg, vman.prg, etc. Natural vertical lookup. It opens all help tables.
TAB_AREA     - In tab_proc.prg, called by vlista.prg, vman.prg, vmanr.prg, etc. Resets all selected-areas parameters to their default values. The procedure is called as do tab_area with file_identification (such as 1 of Select 1).
Proteje     - Called from vmenu.prg. Non-essential option, executed last before returning to FoxPro environment to protect all database files from certain operations. Not in use now.
CENTRA - Centers text in window. In tabla.prg, called from vcond.prg, vcondg.prg, vdup.prg, vapl.prg, vaplg.prg, vaplr.prg, vman.prg, etc
TAB_FILE   - Select file and other file operations. Called from vmenu.prg.
TAB_PASS    - Various maintenance routines such as (a) option File Import from the File menu, and (b) preparing variables for the following options: (i) File Backup and File Restore from the Maintenance menu, (ii) option Release Fifth year from the Maintenance menu, (iii) Initial period, (iv) password setup. Called from vmenu.prg.
TAB_NBRO    - Option 'Browse records' in Edit menu. Called from vmenu.prg.
JKEY25.PLB, .FLL - Non-essential operation. Aids user interaction in picklists, by choosing the first element in the list matching the keys pressed by the user. DOS and Windows versions, respectively
JKEY.PLB, .FLL   - Same as JKEY25, for FoxPro 2.0.

```
*:************************************************************
*:************************************************************
*                           BEGINNING OF CODE
*:************************************************************
*:************************************************************
*                          ===============
*                          1. VCAMBIO.PRG
*                          ===============
*
*                    CREATES AND ACTIVATES MAIN MENUS
*:************************************************************
*:
*:      Program: VCAMBIO.PRG
*:
*:      Called by: TABLA.PRG
*:             : TAB_ASAY        (procedure in TAB_PROC.PRG)
*:             : TAB_BSAY        (procedure in TAB_PROC.PRG)
*:             : TAB_CSAY        (procedure in TAB_PROC.PRG)
*:             : TAB_DSAY        (procedure in TAB_PROC.PRG)
*:             : TAB_ESAY        (procedure in TAB_PROC.PRG)
*:             : TAB_FSAY        (procedure in TAB_PROC.PRG)
*:             : TAB_GSAY        (procedure in TAB_PROC.PRG)
*:             : TAB_HSAY        (procedure in TAB_PROC.PRG)
*:             : TAB_ISAY        (procedure in TAB_PROC.PRG)
*:             : TAB_JSAY        (procedure in TAB_PROC.PRG)
*:             : TAB_KSAY        (procedure in TAB_PROC.PRG)
*:             : TAB_LSAY        (procedure in TAB_PROC.PRG)
*:             : NVL()           (function  in TABLA.PRG)
*:             : TAB_EDIT.PRG
*:             : TAB_APPE.PRG
```

```
*:                : VEXPR              (procedure in TAB_COND.PRG)
*:
*:        Calls: VVERIF.PRG
*:             : IM_MNCT              (procedure in TABLA.PRG)
*:
*:   Memory Files: TAB_MEM.MEM
*:
*:      Documented 05/01/93 at 23:01          FoxDoc  version 2.10f
*:*****************************************************************

* This module builds the program's main menu bars, and executes calls
* by parametrized menu options.  Steps:
*
*    a) Initialize variables
*    b) Define menu bars
*    c) Calls to parametrized menu options.
#DEFINE USENGLISH .T.
#DEFINE SPANISH .F.
PARAMETER par
DO CASE
    CASE par='I'              && BEGIN PROGRAM
        STORE 'I' TO tcp
        DO vverif
        *   PUBLIC PATHBASE,PATHPROG
        SET PATH TO &pathbase;&pathprog
        STORE '▓' TO char
        STORE '▄' TO char1
        PUBLIC   mrgrupo,   mrlinea,   periodo,   peril,   mrlin1,   mrlin2,
mrprueba,mrclase1,mrclase2,mrclase3,mranal
        STORE SPACE(6) TO mrgrupo,mrprueba,mrclase1,mrclase2,mrclase3,mranal
        STORE 0 TO periodo, peril
        STORE SPACE(6) TO mprueba
        STORE SPACE(12) TO mlinea, mrlinea, mrlin1, mrlin2
        PUBLIC okcode, okdept
        STORE DATE() TO mfechai,mfechaf
        *   PUBLIC _titrep, _titprog
        *   STORE '  ' TO _titrep, _titprog
        PUBLIC tempo, tempo1
        STORE SYS(3) TO tempo      && Temporary file
        STORE SYS(3) TO tempo1     && Temporary file
        STORE 'S' TO v_rom
        STORE 'N' TO _proteje SET ESCAPE OFF
        IF FILE('TAB_MEM.MEM')
            RESTORE FROM tab_mem ADDITIVE
            STORE mem_mesdia TO diaomes
        ELSE
            STORE 'M' TO diaomes
        ENDIF
        STORE 'E' TO IDIOMA
        #IF _DOS .AND. USENGLISH                                  && _dos =
```

```
TRUE for DOS, FALSE for MS WINDOWS version
    *#IF USENGLISH              && 'E' => Spanish, .NOT.'E' => English
    DEFINE MENU mbartop1
    DEFINE PAD mbar1 OF mbartop1 AT 0,0  PROMPT ' \<File       '
    DEFINE PAD mbar2 OF mbartop1 AT 0,10 PROMPT ' \<Edit       '
    DEFINE PAD mbar3 OF mbartop1 AT 0,20 PROMPT ' \<Diagnostics '
    DEFINE PAD mbar4 OF mbartop1 AT 0,37 PROMPT ' \<Maintenance '
    DEFINE PAD mbar5 OF mbartop1 AT 0,54 PROMPT ' \<Options    '
    DEFINE PAD mbar6 OF mbartop1 AT 0,66 PROMPT ' \<Help       '

DEFINE POPUP mbar1 FROM 1,0 SHADOW
    DEFINE BAR 1 OF mbar1 PROMPT ' \<Application'
    DEFINE BAR 2 OF mbar1 PROMPT ' \<Open database'
    DEFINE BAR 3 OF mbar1 PROMPT ' \<Import'      SKIP FOR okpass<5
    DEFINE BAR 4 OF mbar1 PROMPT ' \<Export'      SKIP FOR RECCOUNT() = 0
OR okpass<5
    DEFINE BAR 5 OF mbar1 PROMPT '\-'
    DEFINE BAR 6 OF mbar1 PROMPT ' \<Print standard report    '
    DEFINE BAR 7 OF mbar1 PROMPT ' \<Create custom report'
    DEFINE BAR 8 OF mbar1 PROMPT ' Print custom \<Report'
    DEFINE BAR 9 OF mbar1 PROMPT '\-'
    DEFINE BAR 10 OF mbar1 PROMPT ' E\<xit '
    DEFINE BAR 11 OF mbar1 PROMPT ' \<Foxpro environment '

DEFINE POPUP mbar2 FROM 1,10 SHADOW
    DEFINE BAR 1 OF mbar2 PROMPT ' \<Browse records ' SKIP FOR RECCOUNT()
= 0
    DEFINE BAR 2 OF mbar2 PROMPT ' \<Modify records '         SKIP FOR
RECCOUNT() = 0
    DEFINE BAR 3 OF mbar2 PROMPT ' \<Add form'
    DEFINE BAR 4 OF mbar2 PROMPT '\-'
    DEFINE BAR 5 OF mbar2 PROMPT ' Browse \<Erased records '
    DEFINE BAR 6 OF mbar2 PROMPT ' \<Pack database'

DEFINE POPUP mbar3 FROM 1,20 SHADOW
    DEFINE BAR 1 OF mbar3 PROMPT ' \<Summary browse view '
    DEFINE BAR 2 OF mbar3 PROMPT ' \<Frequency browse view '
    DEFINE BAR 3 OF mbar3 PROMPT ' \<Diagnostics browse view '
    DEFINE BAR 4 OF mbar3 PROMPT ' Data \<Browse view '
    DEFINE BAR 5 OF mbar3 PROMPT '\-'
    DEFINE BAR 6 OF mbar3 PROMPT ' Add/modify \<Line test '
    DEFINE BAR 7 OF mbar3 PROMPT ' Add/modify \<Group test '
    DEFINE BAR 8 OF mbar3 PROMPT ' \<Copy test'
    DEFINE BAR 9 OF mbar3 PROMPT '\-'
    DEFINE BAR 10 OF mbar3 PROMPT ' \<Run tests'

DEFINE POPUP mbar4 FROM 1,37 SHADOW
    DEFINE BAR 1 OF mbar4 PROMPT ' \<Generate indexes '
    DEFINE BAR 2 OF mbar4 PROMPT '\-'
    DEFINE BAR 3 OF mbar4 PROMPT ' \<Backup databases'
    DEFINE BAR 4 OF mbar4 PROMPT ' \<Restore databases'      SKIP FOR
okpass<5
```

```
        DEFINE BAR 5 OF mbar4 PROMPT '\-'
        IF diaomes='M'
            DEFINE BAR  6 OF mbar4  PROMPT ' Release  the \<Fifth year
SKIP FOR okpass<5
        ELSE
            DEFINE BAR 6  OF mbar4 PROMPT  ' Release \<Twelve days
SKIP FOR okpass<5
        ENDIF DEFINE POPUP mbar5 FROM 1,54 SHADOW
        DEFINE BAR 1 OF mbar5 PROMPT ' \<Initial period'
        DEFINE BAR 2 OF mbar5 PROMPT '\-'
        DEFINE BAR 3 OF mbar5 PROMPT ' Password \<Setup '
        DEFINE BAR 4 OF mbar5 PROMPT ' \<Protection Enable
        DEFINE BAR 5 OF mbar5 PROMPT '\-'
        DEFINE BAR 6 OF mbar5 PROMPT ' Printer \<Fonts'
        DEFINE BAR 7 OF mbar5 PROMPT ' \<Browse settings'

DEFINE POPUP mbar6 FROM 1,59 SHADOW
        DEFINE BAR 1 OF mbar6 PROMPT ' \<Contents'
        DEFINE BAR 2 OF mbar6 PROMPT ' \<Print '
        DEFINE BAR 3 OF mbar6 PROMPT ' \<Modify Help '
        DEFINE BAR 4 OF mbar6 PROMPT '\-'
        DEFINE BAR 5 OF mbar6 PROMPT ' \<Technical summary

#ELIF _DOS .AND.(.NOT.USENGLISH) &&   #ELSE
        DEFINE MENU mbartop1
        DEFINE PAD mbar1 OF mbartop1 AT 0,0 PROMPT ' \<Archivo '
        DEFINE PAD mbar2 OF mbartop1 AT 0,11 PROMPT ' \<Modificar '
        DEFINE PAD mbar3 OF mbartop1 AT 0,24 PROMPT ' \<Diagnósticos '
        DEFINE PAD mbar4 OF mbartop1 AT 0,41 PROMPT ' \<Mantenimiento '
        DEFINE PAD mbar5 OF mbartop1 AT 0,59 PROMPT ' \<Opciones '
        DEFINE PAD mbar6 OF mbartop1 AT 0,71 PROMPT ' \<Ayuda '

DEFINE POPUP mbar1 FROM 1,0 SHADOW
        DEFINE BAR 1 OF mbar1 PROMPT ' \<Aplicación'
        DEFINE BAR 2 OF mbar1 PROMPT ' \<Base de Datos'
        DEFINE BAR 3 OF mbar1 PROMPT ' \<Importar'       SKIP FOR okpass<5
        DEFINE BAR 4 OF mbar1  PROMPT ' \<Exportar'      SKIP  FOR RECCOUNT( ) =
0 OR okpass<5
        DEFINE BAR 5 OF mbar1 PROMPT '\-'
        DEFINE BAR 6 OF mbar1 PROMPT ' \<Reportes normales
        DEFINE BAR 7 OF mbar1 PROMPT ' \<Create Reportes especiales'
        DEFINE BAR 8 OF mbar1 PROMPT ' \<Imprime Reportes especiales
        DEFINE BAR 9 OF mbar1 PROMPT '\-'
        DEFINE BAR 10 OF mbar1 PROMPT ' \<Salida del sistema Experto '
        DEFINE BAR 11 OF mbar1 PROMPT ' Salida a \<Foxpro'

DEFINE POPUP mbar2 FROM 1,11 SHADOW
        DEFINE  BAR 1  OF  mbar2 PROMPT  '  \<Browse  de  records  '   SKIP  FOR
RECCOUNT( ) = 0
        DEFINE BAR  2 OF mbar2 PROMPT ' \<Modificar-Ver records  '       SKIP FOR
```

```
RECCOUNT() = 0
          DEFINE BAR 3 OF mbar2 PROMPT ' \<Agregar records'
          DEFINE BAR 4 OF mbar2 PROMPT '\-'
          DEFINE BAR 5 OF mbar2 PROMPT ' Browse records \<Marcados '
          DEFINE BAR 6 OF mbar2 PROMPT ' \<Eliminar records marcados DEFINE POPUP mbar3 FROM 1,24 SHADOW
          DEFINE BAR 1 OF mbar3 PROMPT ' \<1 Browse de resumen '
          DEFINE BAR 2 OF mbar3 PROMPT ' \<2 Browse de frecuencias '
          DEFINE BAR 3 OF mbar3 PROMPT ' \<3 Browse de diagnósticos '
          DEFINE BAR 4 OF mbar3 PROMPT ' \<4 Browse de datos '
          DEFINE BAR 5 OF mbar3 PROMPT '\-'
          DEFINE BAR 6 OF mbar3 PROMPT ' Agregar/modificar pruebas de \<Línea '
          DEFINE BAR  7 OF mbar3 PROMPT   ' Agregar/modificar pruebas de  \<Grupo DEFINE BAR 8 OF mbar3 PROMPT ' \<Copiar pruebas'
          DEFINE BAR 9 OF mbar3 PROMPT '\-'
          DEFINE BAR 10 OF mbar3 PROMPT ' \<Aplicar pruebas'

DEFINE POPUP mbar4 FROM 1,41 SHADOW
          DEFINE BAR 1 OF mbar4 PROMPT ' \<Generar índices      '
          DEFINE BAR 2 OF mbar4 PROMPT '\-'
          DEFINE BAR 3 OF mbar4 PROMPT ' \<Backup de datos'
          DEFINE BAR 4 OF mbar4 PROMPT ' \<Restaurar datos'     SKIP FOR okpass<5
          DEFINE BAR 5 OF mbar4 PROMPT '\-'
          IF diaomes='M'
              DEFINE BAR 6  OF mbar4 PROMPT ' \<Eliminar  primer año    '     SKIP
FOR okpass<5
          ELSE
              DEFINE BAR 6 OF mbar4 PROMPT ' \<Eliminar primer semana    '    SKIP
FOR okpass<5
          ENDIF DEFINE POPUP mbar5 FROM 1,54 SHADOW
          DEFINE BAR 1 OF mbar5 PROMPT ' \<Período inicial'
          DEFINE BAR 2 OF mbar5 PROMPT '\-'
          DEFINE BAR 3 OF mbar5 PROMPT ' \<Control de Password     '
          DEFINE BAR 4 OF mbar5 PROMPT ' \<Activar protección'
          DEFINE BAR 5 OF mbar5 PROMPT '\-'
          DEFINE BAR 6 OF mbar5 PROMPT ' \<Fonts de impresora'
          DEFINE BAR 7 OF mbar5 PROMPT ' \<Modificar Browses'

DEFINE POPUP mbar6 FROM 1,59 SHADOW
          DEFINE BAR 1 OF mbar6 PROMPT ' \<Contenido'
          DEFINE BAR 2 OF mbar6 PROMPT ' \<Imprimir '
          DEFINE BAR 3 OF mbar6 PROMPT ' \<Modificar contenido    '
          DEFINE BAR 4 OF mbar6 PROMPT '\-'
          DEFINE BAR 5 OF mbar6 PROMPT ' \<Diagrama de flujo'

*#ELIF _WINDOWS.AND.  #ENDIF
*#ELSE            && MS WINDOWS version
```

```
#ELIF _WINDOWS .AND.USENGLISH &&*#IF USENGLISH
    DEFINE MENU mbartop1   COLOR SCHEME 3
    DEFINE PAD mbar1 OF mbartop1 PROMPT '  \<File      ' COLOR SCHEME 3
    DEFINE PAD mbar2 OF mbartop1 PROMPT '  \<Edit      ' COLOR SCHEME 3
    DEFINE PAD mbar3 OF mbartop1 PROMPT '  \<Diagnostics ' COLOR SCHEME 3
    DEFINE PAD mbar4 OF mbartop1 PROMPT '  \<Maintenance ' COLOR SCHEME 3
    DEFINE PAD mbar5 OF mbartop1 PROMPT '  \<Options   ' COLOR SCHEME 3
    DEFINE PAD mbar6 OF mbartop1 PROMPT '  \<Help      ' COLOR SCHEME 3

DEFINE POPUP mbar1 FROM 1,0 SHADOW COLOR SCHEME 3
    DEFINE BAR 1 OF mbar1 PROMPT ' \<Application' COLOR SCHEME 4
    DEFINE BAR 2 OF mbar1 PROMPT ' \<Open database' COLOR SCHEME 4
    DEFINE BAR 3 OF mbar1  PROMPT ' \<Import'     SKIP  FOR okpass<5 COLOR SCHEME 4
    DEFINE BAR  4 OF mbar1 PROMPT ' \<Export'     SKIP FOR RECCOUNT() = 0 OR okpass<5 COLOR SCHEME 4
    DEFINE BAR 5 OF mbar1 PROMPT '\-' COLOR SCHEME 4
    DEFINE BAR  6 OF  mbar1 PROMPT '   \<Print standard   report     ' COLOR SCHEME 4
    DEFINE BAR 7 OF mbar1 PROMPT ' \<Create custom report' COLOR SCHEME 4
    DEFINE BAR 8 OF mbar1 PROMPT ' Print custom \<Report' COLOR SCHEME 4
    DEFINE BAR 9 OF mbar1 PROMPT '\-' COLOR SCHEME 4
    DEFINE BAR 10 OF mbar1 PROMPT ' \<Foxpro environment ' COLOR SCHEME 4
    DEFINE BAR 11 OF mbar1 PROMPT ' E\<xit ' COLOR SCHEME 4

DEFINE POPUP mbar2 FROM 1,10 SHADOW COLOR SCHEME 3
    DEFINE BAR 1 OF mbar2 PROMPT ' \<Browse records   '  SKIP FOR RECCOUNT() = 0 COLOR SCHEME 4
    DEFINE  BAR  2 OF  mbar2 PROMPT ' \<Modify records  '     SKIP FOR RECCOUNT() = 0 COLOR SCHEME 4
    DEFINE BAR 3 OF mbar2 PROMPT ' \<Add form' COLOR SCHEME 4
    DEFINE BAR 4 OF mbar2 PROMPT '\-' COLOR SCHEME 4
    DEFINE  BAR 5  OF  mbar2 PROMPT  ' Browse  \<Erased records    ' COLOR SCHEME 4
    DEFINE BAR 6 OF mbar2 PROMPT ' \<Pack database' COLOR SCHEME 4

DEFINE POPUP mbar3 FROM 1,20 SHADOW  COLOR SCHEME 3
    DEFINE BAR 1 OF mbar3 PROMPT ' \<Summary browse view ' COLOR SCHEME 4
    DEFINE BAR 2 OF  mbar3 PROMPT ' \<Frequency browse view   ' COLOR SCHEME 4
    DEFINE  BAR 3 OF  mbar3 PROMPT   ' \<Diagnostics browse  view    ' COLOR SCHEME 4
    DEFINE BAR 4 OF mbar3 PROMPT ' Data \<Browse view ' COLOR SCHEME 4
    DEFINE BAR 5 OF mbar3 PROMPT '\-' COLOR SCHEME 4
    DEFINE BAR 6 OF mbar3 PROMPT ' Add/modify \<Line test ' COLOR SCHEME 4
    DEFINE BAR 7 OF mbar3 PROMPT  ' Add/modify \<Group test ' COLOR SCHEME 4
    DEFINE BAR 8 OF mbar3 PROMPT ' \<Copy test' COLOR SCHEME 4
    DEFINE BAR 9 OF mbar3 PROMPT '\-' COLOR SCHEME 4
    DEFINE BAR 10 OF mbar3 PROMPT ' \<Run tests' COLOR SCHEME 4
```

```
            DEFINE POPUP mbar4 FROM 1,37 SHADOW COLOR SCHEME 3
            DEFINE BAR 1 OF mbar4 PROMPT ' \<Generate indexes ' COLOR SCHEME 4
            DEFINE BAR 2 OF mbar4 PROMPT '\-' COLOR SCHEME 4
            DEFINE BAR 3 OF mbar4 PROMPT ' \<Backup databases' COLOR SCHEME 4
            DEFINE  BAR  4 OF  mbar4 PROMPT  '   \<Restore databases'       SKIP FOR
okpass<5 COLOR SCHEME 4
            DEFINE BAR 5 OF mbar4 PROMPT '\-' COLOR SCHEME 4
            IF diaomes='M'
                DEFINE BAR  6 OF mbar4  PROMPT ' Release  the \<Fifth year
SKIP FOR okpass<5 COLOR SCHEME 4
            ELSE
                DEFINE BAR 6 OF  mbar4 PROMPT ' Release  \<Twelve days
SKIP FOR okpass<5 COLOR SCHEME 4
            ENDIF DEFINE POPUP mbar5 FROM 1,54 SHADOW COLOR SCHEME 3
            DEFINE BAR 1 OF mbar5 PROMPT ' \<Initial period' COLOR SCHEME 4
            DEFINE BAR 2 OF mbar5 PROMPT '\-' COLOR SCHEME 4
            DEFINE BAR 3 OF mbar5 PROMPT ' Password \<Setup ' COLOR SCHEME 4
            DEFINE BAR 4 OF mbar5 PROMPT ' \<Protection Enable   ' COLOR SCHEME 4
            DEFINE BAR 5 OF mbar5 PROMPT '\-' COLOR SCHEME 4
            DEFINE BAR 6 OF mbar5 PROMPT ' Printer \<Fonts' COLOR SCHEME 4
            DEFINE BAR 7 OF mbar5 PROMPT ' \<Browse settings' COLOR SCHEME 4

DEFINE POPUP mbar6 FROM 1,59 SHADOW COLOR SCHEME 3
            DEFINE BAR 1 OF mbar6 PROMPT ' \<Contents' COLOR SCHEME 4
            DEFINE BAR 2 OF mbar6 PROMPT ' \<Print ' COLOR SCHEME 4
            DEFINE BAR 3 OF mbar6 PROMPT ' \<Modify Help ' COLOR SCHEME 4
            DEFINE BAR 4 OF mbar6 PROMPT '\-' COLOR SCHEME 4
            DEFINE BAR 5 OF mbar6 PROMPT ' \<Technical summary    ' COLOR SCHEME 4
            inst_c1=''
            inst_c2=''
            inst_c3=''
            inst_c4=''
            inst_c5=''
            char= ''
            char1='--'
            screenatr=''
            statusatr=''
            windowatr=''
            promptatr=''
            hiliteatr=''
            promptbar=''

#ELSE
            DEFINE MENU mbartop1 BAR COLOR SCHEME 2
            DEFINE PAD mbar1 OF mbartop1 PROMPT ' \<Archivo ' COLOR SCHEME 3
            DEFINE PAD mbar2 OF mbartop1 PROMPT ' \<Modificar ' COLOR SCHEME 3
            DEFINE PAD mbar3 OF mbartop1 PROMPT ' \<Diagnósticos ' COLOR SCHEME 3
            DEFINE PAD mbar4 OF  mbartop1 PROMPT ' \<Mantenimiento ' COLOR SCHEME
3
            DEFINE PAD mbar5 OF mbartop1 PROMPT ' \<Opciones ' COLOR SCHEME 3
```

```
            DEFINE PAD mbar6 OF mbartop1  PROMPT ' \<Ayuda ' COLOR SCHEME 3

DEFINE POPUP mbar1 FROM 1,0 SHADOW  COLOR SCHEME 3
            DEFINE BAR 1 OF mbar1 PROMPT ' \<Aplicación' COLOR SCHEME 4
            DEFINE BAR 2 OF mbar1 PROMPT ' \<Base de Datos' COLOR SCHEME 4
            DEFINE BAR  3 OF  mbar1 PROMPT '  \<Importar'       SKIP FOR  okpass<5
COLOR SCHEME 4
            DEFINE BAR 4 OF mbar1 PROMPT  ' \<Exportar'       SKIP FOR RECCOUNT() =
0 OR okpass<5 COLOR SCHEME 4
            DEFINE BAR 5 OF mbar1 PROMPT '\-' COLOR SCHEME 4
            DEFINE BAR 6 OF mbar1 PROMPT ' \<Reportes normales    ' COLOR SCHEME 4
            DEFINE BAR  7 OF  mbar1 PROMPT  '  \<Create  Reportes especiales' COLOR
SCHEME 4
            DEFINE BAR  8 OF  mbar1 PROMPT  ' \<Imprime  Reportes especiales  COLOR
SCHEME 4 '
            DEFINE BAR 9 OF mbar1 PROMPT '\-' COLOR SCHEME 4
            DEFINE BAR 10  OF mbar1 PROMPT '   \<Salida del sistema Experto   ' COLOR
SCHEME 4
            DEFINE BAR 11 OF mbar1 PROMPT ' Salida a \<Foxpro' COLOR SCHEME 4

DEFINE POPUP mbar2 FROM 1,11 SHADOW  COLOR SCHEME 3
            DEFINE BAR  1  OF  mbar2 PROMPT  '  \<Browse de  records   '   SKIP   FOR
RECCOUNT() = 0  COLOR SCHEME 4
            DEFINE BAR 2 OF mbar2  PROMPT ' \<Modificar-Ver records '       SKIP FOR
RECCOUNT() = 0 COLOR SCHEME 4
            DEFINE BAR 3 OF mbar2 PROMPT ' \<Agregar records' COLOR SCHEME 4
            DEFINE BAR 4 OF mbar2 PROMPT '\-' COLOR SCHEME 4
            DEFINE BAR  5  OF  mbar2  PROMPT   ' Browse  records \<Marcados   ' COLOR
SCHEME 4
            DEFINE BAR 6  OF mbar2 PROMPT '  \<Eliminar records marcados     ' COLOR
SCHEME 4

DEFINE POPUP mbar3 FROM 1,24 SHADOW  COLOR SCHEME 3
            DEFINE BAR 1 OF mbar3 PROMPT ' \<1 Browse de resumen ' COLOR SCHEME 4
            DEFINE  BAR 2  OF mbar3  PROMPT '   \<2  Browse de  frecuencias ' COLOR
SCHEME 4
            DEFINE BAR  3 OF  mbar3 PROMPT  '  \<3  Browse de  diagnósticos ' COLOR
SCHEME 4
            DEFINE BAR 4 OF mbar3 PROMPT ' \<4 Browse de datos ' COLOR SCHEME 4
            DEFINE BAR 5 OF mbar3 PROMPT '\-' COLOR SCHEME 4
            DEFINE BAR  6 OF mbar3 PROMPT ' Agregar/modificar  pruebas de \<Línea '
COLOR SCHEME 4
            DEFINE  BAR 7 OF  mbar3 PROMPT ' Agregar/modificar   pruebas de \<Grupo
' COLOR SCHEME 4
            DEFINE BAR 8 OF mbar3 PROMPT ' \<Copiar pruebas' COLOR SCHEME 4
            DEFINE BAR 9 OF mbar3 PROMPT '\-' COLOR SCHEME 4
            DEFINE BAR 10 OF mbar3 PROMPT ' \<Aplicar pruebas' COLOR SCHEME 4

DEFINE POPUP mbar4 FROM 1,41 SHADOW  COLOR SCHEME 3
            DEFINE BAR 1 OF mbar4 PROMPT ' \<Generar indices   ' COLOR SCHEME 4
            DEFINE BAR 2 OF mbar4 PROMPT '\-' COLOR SCHEME 4
            DEFINE BAR 3 OF mbar4 PROMPT ' \<Backup de datos' COLOR SCHEME 4
```

```
            DEFINE BAR 4  OF mbar4 PROMPT ' \<Restaurar datos'    SKIP FOR okpass<5
COLOR SCHEME 4
            DEFINE BAR 5 OF mbar4 PROMPT '\-' COLOR SCHEME 4
            IF diaomes='M'
                DEFINE BAR 6  OF mbar4 PROMPT ' \<Eliminar  primer año      '      SKIP
FOR okpass<5 COLOR SCHEME 4
            ELSE
                DEFINE BAR 6 OF mbar4 PROMPT ' \<Eliminar primer semana     '      SKIP
FOR okpass<5 COLOR SCHEME 4
            ENDIF DEFINE POPUP mbar5 FROM 1,54 SHADOW   COLOR SCHEME 3
            DEFINE BAR 1 OF mbar5 PROMPT ' \<Período inicial' COLOR SCHEME 4
            DEFINE BAR 2 OF mbar5 PROMPT '\-' COLOR SCHEME 4
            DEFINE BAR 3 OF mbar5 PROMPT  ' \<Control de Password      ' COLOR SCHEME
4
            DEFINE BAR 4 OF mbar5 PROMPT ' \<Activar protección' COLOR SCHEME 4
            DEFINE BAR 5 OF mbar5 PROMPT '\-' COLOR SCHEME 4
            DEFINE BAR 6 OF mbar5 PROMPT ' \<Fonts de impresora' COLOR SCHEME 4
            DEFINE BAR 7 OF mbar5 PROMPT ' \<Modificar Browses' COLOR SCHEME 4

DEFINE POPUP mbar6 FROM 1,59 SHADOW   COLOR SCHEME 3
            DEFINE BAR 1 OF mbar6 PROMPT ' \<Contenido' COLOR SCHEME 4
            DEFINE BAR 2 OF mbar6 PROMPT ' \<Imprimir ' COLOR SCHEME 4
            DEFINE BAR 3  OF mbar6 PROMPT ' \<Modificar contenido    ' COLOR SCHEME
4
            DEFINE BAR 4 OF mbar6 PROMPT '\-' COLOR SCHEME 4
            DEFINE BAR 5 OF mbar6 PROMPT ' \<Diagrama de flujo' COLOR SCHEME 4
            inst_c1=''
            inst_c2=''
            inst_c3=''
            inst_c4=''
            inst_c5=''
            char= ''
            char1='--'
            screenatr=''
            statusatr=''
            windowatr=''
            promptatr=''
            hiliteatr=''
            promptbar=''

*#ENDIF
    #ENDIF

ON PAD mbar1 OF mbartop1 ACTIVATE POPUP mbar1
    ON PAD mbar2 OF mbartop1 ACTIVATE POPUP mbar2
    ON PAD mbar3 OF mbartop1 ACTIVATE POPUP mbar3
    ON PAD mbar4 OF mbartop1 ACTIVATE POPUP mbar4
    ON PAD mbar5 OF mbartop1 ACTIVATE POPUP mbar5
    ON PAD mbar6 OF mbartop1 ACTIVATE POPUP mbar6
```

```
*
STORE 0 TO choice_x, choice_y
ON SELECTION POPUP mbar1 DO im_mnct WITH 1,BAR()
ON SELECTION POPUP mbar2 DO im_mnct WITH 2,BAR()
ON SELECTION POPUP mbar3 DO im_mnct WITH 3,BAR()
ON SELECTION POPUP mbar4 DO im_mnct WITH 4,BAR()
ON SELECTION POPUP mbar5 DO im_mnct WITH 5,BAR()
ON SELECTION POPUP mbar6 DO im_mnct WITH 6,BAR()
*
CASE par='C'      && COND
CASE par='S' AND RECCOUNT()>0      && SAYS
    DO CASE
        CASE dbfarea='1 '
            *@8,35 say 'Valor ->Formato x Factor'
            @8,60 SAY valor*MULT() PICTURE formato() COLOR N+/W
        CASE dbfarea='2 '
            STORE RECNO() TO numrec
            SELE tabla
            SET RELA OFF INTO result
            SELE prueba
            SET RELA OFF INTO clase1
            SET RELA OFF INTO clase2
            SET RELA OFF INTO clase3
            SELE result
            GO numrec
            SET RELA TO linea INTO tabla ADDI
            SET RELA TO clase1 INTO clase1 ADDI
            SET RELA TO clase2 INTO clase2 ADDI
            SET RELA TO clase3 INTO clase3 ADDI
            @5,26 SAY LTRIM(tabla.nombre)
            @6,26 SAY LTRIM(fldarray[NPER])
            @7,26 SAY prueba.nombre
            @8,26 SAY clase1.nombre1
            @9,26 SAY clase2.nombre2
            @10,26 SAY clase3.nombre3
            @13,18 SAY prueba.condnote SIZE 4,50
            SET RELA OFF INTO clase1
            SET RELA OFF INTO clase2
            SET RELA OFF INTO clase3
            SET RELA OFF INTO tabla
            SELE prueba
            SET RELA TO clase1 INTO clase1 ADDI
            SET RELA TO clase2 INTO clase2 ADDI
            SET RELA TO clase3 INTO clase3 ADDI
            SELE tabla
            SET RELA TO linea INTO result ADDI
            SELE result
            GO numrec
        CASE dbfarea='3 '
            STORE RECNO() TO numrec
            SELE tabla
            SET RELA OFF INTO result
```

```
                    SELE prueba
                    GO numrec
                    SET RELA TO linea INTO tabla ADDI
                    SET RELA TO grupo INTO grupos ADDI
                    @6,27 SAY LTRIM(tabla.nombre)
                    @7,27 SAY grupos.nombre
                    @8,27 SAY clase1.nombre1
                    @9,27 SAY clase2.nombre2
                    @10,27 SAY clase3.nombre3
                    SET RELA OFF INTO tabla
                    SET RELA OFF INTO grupos
                    SELE tabla
                    SET RELA TO linea INTO result ADDI
                    SELE prueba
                    GO numrec
                CASE dbfarea='5 '
                    @5,30 SAY grupos.nombre
                    @6,30 SAY LTRIM(tabla.nombre)
                CASE dbfarea='10 '
                    SET RELA TO prueba INTO prueba ADDI
                    SET RELA TO analisis INTO presumen ADDI
                    @5,26 SAY presumen.nombre
                    @6,26 SAY prueba.nombre
                    SET RELA OFF INTO prueba
                    SET RELA OFF INTO presumen
                CASE dbfarea='11 '
                    @5,26 SAY presumen.nombre
                    @6,26 SAY LTRIM(fldarray[NPER])
                    @8,26 SAY presumen.condnote SIZE 4,50
                CASE dbfarea='12 '
                    SET RELA TO analisis INTO presumen ADDI
                    @5,26 SAY presumen.nombre
                    @6,26 SAY LTRIM(fldarray[NPER])
                    @7,26 SAY prueba.nombre
                    @11,26 SAY presumen.condnote SIZE 4,50
                    SET RELA OFF INTO presumen
            ENDCASE
        CASE par='R'      && REPL
        CASE par='Q'      && REPL up
        CASE par='J'      && KEYS up
        CASE par='N'      && NVL  up
        CASE par='K'      && NVL
ENDCASE
RETURN

*: EOF: VCAMBIO.PRG

*:***************************************************************
*:***************************************************************
*                         ============
*                         2. VMENU.PRG
```

```
*                        ============
*
*       CALLS PROGRAM ROUTINES FROM MAIN MENU IN VCAMBIO.PRG
*:***************************************************************
*:
*: Procedure file: VMENU.PRG
*:
*:   Procs & Fncts: SETDBF
*:
*:         Set by: IM_MNCT            (procedure in TABLA.PRG)
*:
*:          Calls: TAB_FILE           (procedure in TAB_PROC.PRG)
*:               : TAB_PASS           (procedure in TABLA.PRG)
*:               : VBASES.PRG
*:               : SETDBF             (procedure in VMENU.PRG)
*:               : TAB_MISC.PRG
*:               : VLISTA.PRG
*:               : TAB_REPO.PRG
*:               : PROTEJE            (procedure in TABLA.PRG)
*:               : TAB_NBRO           (procedure in TABLA.PRG)
*:               : TAB_EDIT.PRG
*:               : TAB_APPE.PRG
*:               : VACTI.PRG
*:               : TAB_INDE.PRG
*:               : TAB_BAK.PRG
*:               : TAB_OPEN.PRG
*:               : TAB_REST.PRG
*:               : VANO.PRG
*:               : TAB_MEM.PRG
*:               : TAB_INST.PRG
*:               : SAYLINE            (procedure in TABLA.PRG)
*:               : TAB_HELP.PRG
*:
*:          Uses: TAB_HELP.DBF
*:              : HELP_1.DBF
*:
*:       Indexes: TAB_HELP.IDX
*:
*:   Other Files: FOXHELP
*:
*:       Documented 05/01/93 at 23:01         FoxDoc  version 2.10f
*:***************************************************************

* This module assigns most menu options from VCAMBIO to Procedures.
* All options and procedures are assigned, except those under menu
* option 'Diagnostics'. These are assigned in procedure VACTI.PRG. See.
***************************************************************
#DEFINE USENGLISH .T.
#DEFINE SPANISH .F.
SELE &dbfarea
DO CASE
    CASE choice_x = 1                              && FILE CHOICES
```

```
DO CASE
    CASE choicey = 1
        * ---BROWSE SETTINGS
        * DO tab_pass WITH 5
        DO tab_inst WITH 'D'
    CASE choicey = 2
        * ---DO SELECT FILE.
        DO tab_file WITH 18,choice
    CASE choicey = 3
        * ---DO IMPORT ASCII FILE
        STORE 'R' TO tcp
        SAVE SCRE TO panta
        DO tab_pass WITH 5
        CLEAR
        DO vbases
        DO setdbf
        REST SCRE FROM panta
    CASE choicey = 4
        * ---DO EXPORT MANY FEW FILE FORMATS
        DO tab_misc WITH 6
    CASE choicey = 6
        * ---DO STANDARD REPORTS
        DO vlista
    CASE choicey = 7
        * ---CREATE CUSTOM REPORTS
        DO tab_repo WITH 3
    CASE choicey = 8
        * ---PRINT CUSTOM REPORTS
        DO tab_repo WITH 2
    CASE choicey = 11
        * ---FOXPRO ENVIROMENT
        STORE '  ' TO mpass
        STORE 'GUS' TO msale
        @WROWS()-1,0
        SET COLOR TO W+/R
        @WROWS()-1,35 SAY 'Password ?'
        STORE SUBSTR(screenatr,AT("/",screenatr)+1,1) TO sombra
        SET COLOR TO &sombra/&sombra,&sombra/&sombra
        @WROWS()-1,46 GET mpass PICTURE '!!!'
        READ
        SET COLOR TO (promptatr)
        IF mpass=msale
            SET COLOR TO
            ?SYS(2002,1)
            SET FUNCTION 2 TO
            SET FUNCTION 3 TO
            SET FUNCTION 4 TO
            SET FUNCTION 5 TO
            SET FUNCTION 6 TO
            SET FUNCTION 7 TO
            SET FUNCTION 8 TO
            SET FUNCTION 9 TO
```

```
                SET FUNCTION 10 TO
                SET HELP ON
                ON KEY LABEL f1
                ON KEY LABEL f3
                ON KEY LABEL f4
                SET HELP TO foxhelp
                mainmenu = .F.
                SET TALK ON
                DEACTIVATE MENU
                RETURN
            ENDIF mpass=msale
        CASE choicey = 10
            * ---EXIT
            SET COLOR TO
            DO proteje
            QUIT
    ENDCASE   && M_FILE
CASE choice_x = 2                                   && EDIT CHOICES
    DO CASE
        CASE choicey = 1
            * ---DO BROWSE/VIEW.
            DO tab_nbro
        CASE choicey = 2
            * ---DO EDIT/VIEW.
            isedited = .F.
            DO tab_edit WITH isedited
        CASE choicey = 3
            * ---DO APPEND.
            DO tab_appe
        CASE choicey = 5
            * ---BROWSE DELETED RECORDS
            DO tab_repo WITH 1
        CASE choicey = 6
            * ---PACK DATABASE
            DO tab_misc WITH 4
    ENDCASE
CASE choice_x = 3                                   && DIAGNOSTICS CHOICES
    * ---DO DIAGNOSTICS
    * DO TAB_LABE WITH CHOICEY
    DO CASE
        CASE choicey = 2
            * ---FREQUENCY REPORT
            DO vacti WITH 8
        CASE choicey = 3
            * ---DIAGNOSTICS BROWSE VIEW
            DO vacti WITH 9
        CASE choicey = 4
            * ---DATA BROWSE VIEW
            DO vacti WITH 4
        CASE choicey = 1
            * ---SUMMARY REPORT
            DO vacti WITH 10
```

```
            CASE choicey = 6
                * ---ADD/MODIFY LINE TEST
                DO vacti WITH 1
            CASE choicey = 7
                * ---ADD/MODIFY GROUP TEST
                DO vacti WITH 5
            CASE choicey = 8
                * ---COPY TEST
                DO vacti WITH 2
            CASE choicey = 10
                * ---RUN TESTS LINE AND GROUP
                DO vacti WITH 3
        ENDCASE
    CASE choice_x = 4                                   && MAINTENANCE CHOICES
        DO CASE
            CASE choicey = 1
                * ---DO INDEX.
                DO tab_inde WITH 23
            CASE choicey = 3
                *---BACKUP
                DO tab_pass WITH 2
                CLOSE DATABASE
                SET CONFIRM ON
                DO tab_bak
                SET CONFIRM OFF
                DO tab_open
            CASE choicey = 4
                *---RESTORE
                DO tab_pass WITH 2
                CLOSE DATABASE
                SET CONFIRM ON
                DO tab_rest
                SET CONFIRM OFF
                DO tab_open
            CASE choicey = 6
                *---RELEASE THE FIFTH YEAR
                STORE 'R' TO tcp
                SAVE SCRE TO panta
                DO tab_pass WITH 5
                CLEAR
                DO vano
                DO setdbf
                REST SCRE FROM panta
        ENDCASE
    CASE choice_x = 5                                   && OPTIONS CHOICES
        DO CASE
            CASE choicey = 1
                * ---INITIAL PERIOD
                DO tab_pass WITH 5
                @23,0
                SET COLOR TO (windowatr)
                DO tab_mem
```

```
            CASE choicey = 3
                * ---PASSWORD SETUP
                DO tab_pass WITH 5
                DO tab_inst WITH 'P'
            CASE choicey = 4
                * ---PROTECTION ENABLE
                STORE 0 TO okpass
            CASE choicey = 6
                * ---PRINTER FONTS
                DO tab_pass WITH 5
                DO tab_inst WITH 'C'
            CASE choicey = 7
                * ---BROWSE SETTINGS
                DO tab_pass WITH 5
                DO tab_inst WITH 'B'
            CASE choicey = 8
                * ---BROWSE SETTINGS
                DO tab_pass WITH 5
                DO tab_inst WITH 'D'
        ENDCASE
    CASE choice_x = 6                                           && HELP CHOICES
        DO CASE
            CASE choicey = 1
                * ---HELP CONTENTS
                SET TOPIC TO
                HELP
            CASE choicey = 2
                * ---HELP PRINT
                SET HELP TO
                SELECT 25
                USE tab_help
                STORE 6 TO choicey
                STORE  "HELP DEL PROGRAMA" TO mtitler
                STORE 'help.frX' TO filenr
                STORE ' ' TO fcond
                STORE 'N' TO indi,FILT,indifilt
                DO tab_repo WITH choicey
                USE
                SET HELP TO tab_help
            CASE choicey = 3
                * ---MODIFY HELP FILE
                SET HELP TO
                SELECT 25
                USE tab_help
                INDEX ON orden TO tab_help
                DO sayline WITH 24, " Modificar el Help ", "C"
                DEFI WINDO keyswin FROM 4,50 TO 10,77 SHADOW COLOR SCHEME 10
                ACTIVATE WINDO keyswin
                #IF USENGLISH
                    @ 0,0 SAY " [Ctrl] T  Delete"
                    @ 1,0 SAY " [Ctrl] N  Add      "
                    @ 2,0 SAY " [Ctrl] W  Record & End"
```

```
                @ 3,0 SAY " [Ctrl] F1 Change text "
                @ 4,0 SAY " [Esc]      Exit           "
            #ELSE
                @ 0,0 SAY " [Ctrl] T  Borrar"
                @ 1,0 SAY " [Ctrl] N  Agregar"
                @ 2,0 SAY " [Ctrl] W  Sale y Graba"
                @ 3,0 SAY " [Ctrl] F1 Cambia Texto"
                @ 4,0 SAY " [Esc]      Sale no Graba "
            #ENDIF
            DEFI WINDO memowin FROM 13,14 TO 23,70 COLOR SCHEME 10   TITLE
'Texto del Help'
            MODIFY MEMO details WIND memowin NOWAIT SAVE
            DEFI WINDO browwin FROM 0,0 TO 11,47 SHADOW COLOR SCHEME 10  TITLE
'Tópicos del Help'
            BROW WIND browwin
            DEACT WIND keyswin
            COPY TO help_1 FOR NOT DELE()
            DELE ALL
            PACK
            APPE FROM help_1
            ERASE help_1.dbf
            USE
            SET HELP TO tab_help
        CASE choicey = 5
            CLEAR
            DO tab_help WITH "DOC"
        ENDCASE
        IF WEXIST('KEYSWIN')
            RELE WIND keyswin
        ENDIF
        IF WEXIST('BROWWIN')
            RELE WIND browwin
        ENDIF
        IF WEXIST('MEMOWIN')
            RELE WIND memowin
        ENDIF
ENDCASE
RETURN

*!*******************************************************************
*!
*!      Procedure: SETDBF
*!
*!      Called by: VMENU.PRG
*!               : VACTI.PRG
*!               : RETMAST         (procedure in VAPL.PRG)
*!
*!          Calls: TAB_AREA        (procedure in TAB_PROC.PRG)
*!
*!*******************************************************************
PROCEDURE setdbf
    SELE 5
```

```
         SET FILTER TO
         SET ORDER TO 1
         SELE 4
         SET FILTER TO
         SET ORDER TO 1
         SELE 3
         SET FILTER TO
         SET ORDER TO 1
         SELE 2
         SET FILTER TO
         SET ORDER TO 1
         SELE 1
         SET FILTER TO
         SET ORDER TO 1
         STORE '1 ' TO dbfarea
         DO tab_area
         RETURN
         *: EOF: VMENU.PRG
```

```
*:*****************************************************************
*:*****************************************************************
*                          ============
*                          3. VACTI.PRG
*                          ============
*
*         CALLS DIAGNOSTICS MENU ROUTINES FROM VCAMBIO.PRG
*:*****************************************************************
*:
*: Procedure file: VACTI.PRG
*:
*:         Set by: VMENU.PRG
*:
*:          Calls: TAB_PASS            (procedure in TABLA.PRG)
*:               : VCOND.PRG
*:               : VDUP.PRG
*:               : VAPL.PRG
*:               : VMAN.PRG
*:               : VCONDG.PRG
*:               : VBASES.PRG
*:               : VANO.PRG
*:               : VRESU.PRG
*:               : VMANR.PRG
*:               : VSUMM.PRG
*:               : SETDBF             (procedure in VMENU.PRG)
*:
*:      Documented 05/01/93 at 23:01           FoxDoc  version 2.10f
*:*****************************************************************
*

* This module assigns the Diagnostics menu options from VCAMBIO to
* the respective procedures.
```

```
PARAMETERS choice_y
STORE 'R' TO tcp
DECLARE fldarray[60]    && *** ***
FOR i = 1 TO 60
    IF diaomes='M'
        fldarray[i] = ' '+SUBSTR(CMONTH(GOMONTH(mfei,i-1)),1,3)+STR(YEAR(GOMONTH(mfei,i-1))-1900,3,0)+STR(i,3,0)
    ELSE
        fldarray[i] = ' '+DTOC(mfei+i-1)
    ENDIF
ENDFOR                  && *** ***
SAVE SCRE TO panta
DO CASE
    CASE choice_y = 1
        DO tab_pass WITH 2
        CLEAR
        DO vcond
    CASE choice_y = 2
        DO tab_pass WITH 3
        CLEAR
        DO vdup
    CASE choice_y = 3
        DO tab_pass WITH 3
        CLEAR
        DO vapl
    CASE choice_y = 4
        DO tab_pass WITH 3
        CLEAR
        DO vman
    CASE choice_y = 5
        DO tab_pass WITH 3
        CLEAR
        DO vcondg
    CASE choice_y = 6
        DO tab_pass WITH 5
        CLEAR
        DO vbases
    CASE choice_y = 7
        DO tab_pass WITH 5
        CLEAR
        DO vano
    CASE choice_y = 8
        DO tab_pass WITH 5
        CLEAR
        DO vresu
    CASE choice_y = 9
        DO tab_pass WITH 5
        CLEAR
        DO vmanr
    CASE choice_y = 10
        DO tab_pass WITH 5
```

```
        CLEAR
        DO vsumm
ENDCASE
DO setdbf
REST SCRE FROM panta
RETURN

*!*****************************************************************
*!
*!     Procedure: SETDBF
*!
*!     Called by: VMENU.PRG
*!              : VACTI.PRG
*!              : RETMAST           (procedure in VAPL.PRG)
*!
*!        Calls: TAB_AREA           (procedure in TAB_PROC.PRG)
*!
*!*****************************************************************
PROCEDURE setdbf
    SELE 5
    SET FILTER TO
    SET ORDER TO 1
    SELE 4
    SET FILTER TO
    SET ORDER TO 1
    SELE 3
    SET FILTER TO
    SET ORDER TO 1
    SELE 2
    SET FILTER TO
    SET ORDER TO 1
    SELE 1
    SET FILTER TO
    SET ORDER TO 1

SELECT 1
    SET RELATION TO linea INTO result
    SELECT 2
    SET RELATION TO prueba INTO prueba
    SELECT 3
    SET RELATION TO clase1 INTO clase1
    SET RELATION TO clase2 INTO clase2 ADDITIVE
    SET RELATION TO clase3 INTO clase3 ADDITIVE
    SELECT 5
    SET RELATION TO grupo INTO grupos
    SET RELATION TO linea INTO tabla ADDITIVE SELECT 1
    STORE '1 ' TO dbfarea
    DO tab_area
    RETURN
```

```
*: EOF: VACTI.PRG

*:****************************************************************
*:****************************************************************
*                       =============
*                       4. VDRIVE.PRG
*                       =============
*
*       CHANGE APPLICATION PATH DEFAULT.   CREATE MISSING FILES.
*:****************************************************************
*:
*: Procedure file: VDRIVE.PRG
*:
*:  Procs & Fncts: BROWDIR
*:               : DIREXIST
*:               : ERRMEN
*:               : FILEIN
*:               : TABLAIN
*:
*:      Set by: TAB_INST.PRG
*:
*:       Calls: SHADE              (procedure in TABLA.PRG)
*:            : DATE4              (procedure in TABLA.PRG)
*:            : BROWDIR            (procedure in VDRIVE.PRG)
*:            : ERRMEN             (procedure in VDRIVE.PRG)
*:            : FILEIN             (procedure in VDRIVE.PRG)
*:            : TAB_OPEN.PRG
*:            : VVERIF.PRG
*:            : TAB_MMEN.PRG
*:
*: Memory Files: TAB_INST.MEM
*:
*:      Documented 05/01/93 at 23:01          FoxDoc   version 2.10f
*:****************************************************************

* VDRIVE.PRG - This module changes the application's default path,
* and generates any missing files.  Steps:
*
*   a) Generate application pick list
*   b) Accept user selection
*   c) If user selects empty directory, create all files copying from
*      reference files
*   d) If directory isn't empty, check files structure against reference
*      files
*   e) Activate selected directory and select file TABLA.DBF

* ----DRIVE SPEC, & BACK UP FILES

#DEFINE USENGLISH .T.
#DEFINE SPANISH   .F.
```

```
STORE "" TO mdrive
DO WHILE .T.
    DO shade
    SET COLOR TO (hiliteatr)
    STORE date4(DATE()) TO sysdate
    @ 22,0 SAY SPACE(80)    &&CLEAR LINE
    @ 22,1 SAY SPACE(30)+SPACE(48-LEN(sysdate))+sysdate
    SET COLOR TO (screenatr)
    STORE 0 TO err
    DO browdir
    STORE TRIM(inst_drive) TO inst_drive
    STORE inst_drive+"TABLA.DBF" TO drive_i
    IF err=0
        ON ERROR DO errmen
        SET DEFAULT TO &mdrive
        IF err=1
            LOOP
        ENDIF
        ON ERROR
        SAVE TO tab_inst.mem ALL LIKE inst_*
        STORE 0 TO okpass
        EXIT
    ENDIF
ENDDO
*DO VCAMBIO WITH "P"
SET PATH TO &pathprog
DO filein
DO tab_open
DO vverif
DO tab_mmen
SET PATH TO &pathbase;&pathprog
RETURN

*!*******************************************************
*!
*!      Procedure: BROWDIR
*!
*!      Called by: VDRIVE.PRG
*!
*!          Calls: DIREXIST            (procedure in VDRIVE.PRG)
*!
*!           Uses: AREA.DBF
*!
*!   Memory Files: TAB_INST.MEM
*!
*!*******************************************************
PROC browdir
    #IF USENGLISH
        STORE "Applications listing  " TO tit
    #ELSE
        STORE "Listado de Aplicaciones" TO tit
    #ENDIF
```

```
#IF _DOS.AND.USENGLISH
    @17,20 TO 20,61
    @18,21 SAY ´ [Esc]     Select application and leave ´
    @19,21 SAY ´ [Ctrl] N  Add new application
#ELIF _DOS.AND.SPANISH
    @17,20 TO 20,61
    @18,21 SAY ´ [Esc]     Escoge Aplicación y Regresa ´
    @19,21 SAY ´ [Ctrl] N  Agrega una Aplicación
#ENDIF
#IF _DOS
    DEFI WIND revisar ZOOM FROM 3,5 TO 14,74 COLOR SCHE 10 SHADOW
#ENDIF
#IF _WINDOWS
    @17,26 FILL TO 21,66 COLOR RGB(0,0,0,192,192,192)
    @17,26 TO 21,66 COLOR RGB(0,0,0,192,192,192)  PEN 0
    @17+.5, 26+1.3 TO 21-.5,66-1.3 COLOR RGB(255,255,255,192,192,192)  PEN 0
    @17+.5, 26+1.3 TO 17+.5,66-1.3 COLOR RGB(0,0,0,192,192,192)  PEN 0
    @17+.5, 26+1.3 TO 21-.5,26+1.3 COLOR RGB(0,0,0,192,192,192)  PEN 0
#ENDIF
#IF _WINDOWS.AND.USENGLISH
        @18,28.5 SAY ´ ESC       - Select application and leave ´   FONT ´helv´,
10 COLOR RGB(0,0,0,192,192,192)
        @19,28.5 SAY ´ Ctrl-N  - Add new application              ´   FONT ´helv´,
10 COLOR RGB(0,0,0,192,192,192)
    #ELIF _WINDOWS.AND.SPANISH
        @18,28.5 SAY ´ ESC       - Escoge aplicacion y regresa ´    FONT ´helv´,
10 COLOR RGB(0,0,0,192,192,192)
        @19,28.5 SAY ´ Ctrl-N  - Agrega una aplicacion           ´    FONT ´helv´,
10 COLOR RGB(0,0,0,192,192,192
    #ENDIF
    #IF _WINDOWS
        DEFI WIND revisar ZOOM  FROM 3,20  TO 15,WCOLS()-21 COLOR  SCHE 10  SHADOW
FONT ´ARIAL´,8  TITLE tit
    #ENDIF SELE 0
    USE area
    #IF USENGLISH
        BROW  WIND revisar TITL tit FIEL nombre:W=direxist():H="     Application´s
name ", drivedir:v=direxist():F:H=´Disco y directorio´
    #ELSE
        BROW  WIND  revisar  TITL  tit  FIEL  nombre:W=direxist():H=´Nombre de la
Aplicación´, drivedir:v=direxist():F:H=´Disco y directorio´
    #ENDIF SET PATH TO &pathprog
    IF FILE(´TAB_INST.MEM´)
       RESTORE FROM tab_inst ADDITIVE && *** ***
       STORE mem_mesdia TO diaomes
    ENDIF
    SET PATH TO &pathbase;&pathprog
    STORE ALLTRIM(drivedir) TO inst_drive
```

```
    IF LEN(inst_drive)>0
        STORE ALLTRIM(nombre) TO inst_nomb
    ELSE
        STORE "" TO inst_nomb
    ENDIF
    DEAC WIND &tit
    DEAC WIND revisar
    RELE WIND &tit
    RELE WIND revisar
    IF RIGHT(inst_drive,1)<>'\'
        STORE inst_drive+'\' TO inst_drive
        REPLACE drivedir WITH inst_drive
    ENDIF
    DELE FOR LEN(ALLTRIM(drivedir))=0
    PACK
    USE
    SELE &dbfarea
    RETURN

*!***************************************************************
    *!
    *!       Procedure: DIREXIST
    *!
    *!       Called by: BROWDIR            (procedure in VDRIVE.PRG)
    *!
    *!           Calls: ERRMEN             (procedure in VDRIVE.PRG)
    *!

*!***************************************************************
PROCEDURE direxist
    STORE 0 TO err
    ON ERROR DO errmen
    STORE TRIM(drivedir) TO mdrive
    SET DEFAULT TO &mdrive
    ON ERROR
    *IF err=1
    *    RETURN .F.
    *ELSE
    *    RETURN .T.
    *ENDIF
    RETURN

*!***************************************************************
    *!
    *!       Procedure: ERRMEN
    *!
    *!       Called by: VDRIVE.PRG
    *!                : DIREXIST           (procedure in VDRIVE.PRG)
    *!
    *!           Calls: CENTRA             (procedure in TABLA.PRG)
```

```
    *!

*!*************************************************************
PROCEDURE errmen
    *STORE 1 TO err
    DO centra WITH  'ESE DIRECTORIO NO EXISTE, DEBE  CREAR EL DIRECTORIO PRIMERO',
24,'S','S'
    STORE GETDIR('','Seleccione el disco y el directorio') TO mdrivedir
    IF LEN(mdrivedir)>0
        REPLACE drivedir WITH mdrivedir
    ENDIF
    RETURN

*!*************************************************************
    *!
    *!    Procedure: FILEIN
    *!
    *!    Called by: TAB_INST.PRG
    *!             : VDRIVE.PRG
    *!
    *!        Calls: TABLAIN           (procedure in VDRIVE.PRG)
    *!
    *!         Uses: RESULT.DBF        Alias: RESULT
    *!             : PRUEBA.DBF        Alias: PRUEBA
    *!             : GRUPOS.DBF        Alias: GRUPOS
    *!             : DETALLE.DBF       Alias: DETALLE
    *!             : CLASE1.DBF        Alias: CLASE1
    *!             : CLASE2.DBF        Alias: CLASE2
    *!             : CLASE3.DBF        Alias: CLASE3
    *!             : PRESUMEN.DBF      Alias: PRESUMEN
    *!             : DRESUMEN.DBF      Alias: DRESUMEN
    *!             : PRRESULT.DBF      Alias: PRRESULT
    *!             : DRRESULT.DBF      Alias: DRRESULT
    *!
    *!    CDX files: RESULT.CDX
    *!             : PRUEBA.CDX
    *!             : GRUPOS.CDX
    *!             : DETALLE.CDX
    *!             : CLASE1.CDX
    *!             : CLASE2.CDX
    *!             : CLASE3.CDX
    *!             : PRESUMEN.CDX
    *!             : DRESUMEN.CDX
    *!             : PRRESULT.CDX
    *!             : DRRESULT.CDX
    *!

*!*************************************************************
PROCEDURE filein
    CLOSE DATA
    IF .NOT. FILE('TABLA.DBF')
```

```
       DO tablain
       CLOSE DATA
ENDIF

IF .NOT. FILE('RESULT.DBF')
    CREATE CURSOR xxxx  ( linea C(12),;
        nper N(2),;
        prueba C(6),;
        clase1 C(6),;
        clase2 C(6),;
        clase3 C(6) )
    COPY TO result
    CLOSE DATA
ENDIF IF .NOT. FILE('PRUEBA.DBF')
    CREATE CURSOR xxxx ( codigo C(6),;
        nombre C(50),;
        linea C(12),;
        grupo C(6),;
        condexpr C(254),;
        condnote C(200),;
        clase1 C(6),;
        clase2 C(6),;
        clase3 C(6) )
    COPY TO prueba
    CLOSE DATA
ENDIF IF .NOT. FILE('GRUPOS.DBF')
    CREATE CURSOR xxxx ( codigo C(6),;
        nombre C(35) )
    COPY TO grupos
    CLOSE DATA
ENDIF IF .NOT. FILE('DETALLE.DBF')
    CREATE CURSOR xxxx ( grupo C(6),;
        linea C(12) )
    COPY TO detalle
    CLOSE DATA
ENDIF IF .NOT. FILE('CLASE1.DBF')
    CREATE CURSOR xxxx ( clase1 C(6),;
        nombre1 C(35) )
    COPY TO clase1
    CLOSE DATA
ENDIF IF .NOT. FILE('CLASE2.DBF')
    CREATE CURSOR xxxx ( clase2 C(6),;
```

```
         nombre2 C(35) )
      COPY TO clase2
      CLOSE DATA
   ENDIF

IF .NOT. FILE('CLASE3.DBF')
      CREATE CURSOR xxxx ( clase3 C(6),;
          nombre3 C(35) )
      COPY TO clase3
      CLOSE DATA
   ENDIF IF .NOT. FILE('PRESUMEN.DBF')
      CREATE CURSOR xxxx ( analisis C(6),;
          nombre C(50),;
          condnote C(200),;
          pmin N(2) )
      COPY TO presumen
      CLOSE DATA
   ENDIF IF .NOT. FILE('DRESUMEN.DBF')
      CREATE CURSOR xxxx ( analisis C(6),;
          prueba C(6) )
      COPY TO dresumen
      CLOSE DATA
   ENDIF IF .NOT. FILE('PRRESULT.DBF')
      CREATE CURSOR xxxx ( analisis C(6),;
          nper N(2) )
      COPY TO prresult
      CLOSE DATA
   ENDIF IF .NOT. FILE('DRRESULT.DBF')
      CREATE CURSOR xxxx ( analisis C(6),;
          nper N(2),;
          prueba C(6),;
          linea C(12),;
          positiva C(1) )
      COPY TO drresult
      CLOSE DATA
   ENDIF
   RETURN

*!*****************************************************************
*!
*!      Procedure: TABLAIN
*!
```

```
*!        Called by: FILEIN          (procedure in VDRIVE.PRG)
*!
*!*****************************************************************
PROC tablain
    CREATE CURSOR xxxx  ( linea C(12),;
        nombre C(30),;
        p1 N(14,3),;
        p2 N(14,3),;
        p3 N(14,3),;
        p4 N(14,3),;
        p5 N(14,3),;
        p6 N(14,3),;
        p7 N(14,3),;
        p8 N(14,3),;
        p9 N(14,3),;
        p10 N(14,3),;
        p11 N(14,3),;
        p12 N(14,3),;
        p13 N(14,3),;
        p14 N(14,3),;
        p15 N(14,3),;
        p16 N(14,3),;
        p17 N(14,3),;
        p18 N(14,3),;
        p19 N(14,3),;
        p20 N(14,3),;
        p21 N(14,3),;
        p22 N(14,3),;
        p23 N(14,3),;
        p24 N(14,3),;
        p25 N(14,3),;
        p26 N(14,3),;
        p27 N(14,3),;
        p28 N(14,3),;
        p29 N(14,3),;
        p30 N(14,3),;
        p31 N(14,3),;
        p32 N(14,3),;
        p33 N(14,3),;
        p34 N(14,3),;
        p35 N(14,3),;
        p36 N(14,3),;
        p37 N(14,3),;
        p38 N(14,3),;
        p39 N(14,3),;
        p40 N(14,3) )

CREATE CURSOR yyyy  ( linea C(12), ;
        p41 N(14,3),;
        p42 N(14,3),;
        p43 N(14,3),;
```

```
            p44 N(14,3),;
            p45 N(14,3),;
            p46 N(14,3),;
            p47 N(14,3),;
            p48 N(14,3),;
            p49 N(14,3),;
            p50 N(14,3),;
            p51 N(14,3),;
            p52 N(14,3),;
            p53 N(14,3),;
            p54 N(14,3),;
            p55 N(14,3),;
            p56 N(14,3),;
            p57 N(14,3),;
            p58 N(14,3),;
            p59 N(14,3),;
            p60 N(14,3),;
            valor N(14,3),;
            FORMAT C(12),;
            factor C(12),;
            tyface C(12) )
         SELE xxxx
         JOIN WITH yyyy FOR linea=yyyy.linea TO tabla
         RETURN
         *: EOF: VDRIVE.PRG

*:*******************************************************************
*:*******************************************************************
*                        ==============
*                        5. VVERIF.PRG
*                        ==============
*
*       CHECKS STRUCTURE FOR EACH FILE BY COMPARING AGAINST REFERENCE FILES
*:*******************************************************************
*:
*: Procedure file: VVERIF.PRG
*:
*:  Procs & Fncts: ERR1
*:
*:         Set by: VCAMBIO.PRG
*:              : VDRIVE.PRG
*:
*:          Calls: ERR1            (procedure in VVERIF.PRG)
*:               : SAYLINE         (procedure in TABLA.PRG)
*:               : CENTRA          (procedure in TABLA.PRG)
*:
*:           Uses: STRUEXT1.DBF
*:               : STRU.DBF
*:
*:        Indexes: STRUEXT.IDX
*:
*:     Documented 05/01/93 at 23:01         FoxDoc  version 2.10f
```

```
*:********************************************************
*  VVERIF.PRG - This module verifies the length for each field in each
*  database file.

*  This procedure creates file 'struexte' containing information about
*  all fields in each database file, from 1 to 12.
#DEFINE USENGLISH .T.
#DEFINE SPANISH .F.
CREATE CURSOR struext (field_name C(10),;
    field_type C(1),;
    field_len N(3,0),;
    field_dec N(3,0),;
    file_name C(10) )

FOR i=1 TO 12
    STORE LTRIM(STR(i,2,0)) TO ic
    SELE &ic
    COPY STRU EXTE TO struext1
    STORE ALIAS() TO filen
    SELE struext
    APPE FROM struext1
    REPLACE file_name WITH filen FOR file_name=SPACE(10)
ENDFOR SELE struext
IF NOT FILE('STRU.DBF')
    COPY TO &pathprog\stru
ENDIF
INDEX ON file_name+field_name TO struext
GO TOP
SELE 0
USE STRU STORE 0 TO err
STORE 2 TO ROW
SCAN
    IF .NOT. SEEK(file_name+field_name,'STRUEXT')
        DO err1
        #IF USENGLISH
            DO  sayline WITH ROW, '         Field    '+ALLTRIM(field_name) + '->'
+ ALLTRIM(file_name) +' missing','L'
        #ELSE
            DO  sayline WITH ROW, '         El campo '+ALLTRIM(field_name) + '->'
+ ALLTRIM(file_name) +' no esta','L'
        #ENDIF
    ENDIF
    IF field_type<>struext.field_type
        DO err1
        #IF USENGLISH
            DO  sayline WITH ROW, '         Field    '+ALLTRIM(field_name) + '->'
```

```
              + ALLTRIM(file_name) + ´ tiene tipo incorrecto´,´L´
            #ELSE
                DO sayline WITH ROW, ´              El campo ´+ALLTRIM(field_name)  + ´->´
  + ALLTRIM(file_name) + ´ has incorrect type      ´,´L´
            #ENDIF
        ENDIF
        IF field_len<>struext.field_len
            DO err1
            #IF USENGLISH
                DO  sayline WITH ROW, ´           Field    ´+ALLTRIM(field_name) + ´->´
  + ALLTRIM(file_name) + ´ has length    ´+ ALLTRIM(STR(struext.field_len)) + ´but
  it should be´+ ALLTRIM(STR(stru.field_len)),´L´
            #ELSE
                DO sayline WITH ROW, ´              El campo ´+ALLTRIM(field_name) + ´->´
  + ALLTRIM(file_name) + ´ tiene longitud ´+ ALLTRIM(STR(struext.field_len)) + ´ y
  debiera ser ´+ ALLTRIM(STR(stru.field_len)),´L´
            #ENDIF
        ENDIF
        IF field_dec<>struext.field_dec
            DO err1
            #IF USENGLISH
                DO  sayline WITH ROW, ´           Field    ´+ALLTRIM(field_name) + ´->´
  + ALLTRIM(file_name) + ´  has     ´+ ALLTRIM(STR(struext.field_dec)) + ´decimal
  positions; these should be ´ + ALLTRIM(STR(stru.field_dec)),´L´
            #ELSE
                DO sayline WITH ROW, ´              El campo ´+ALLTRIM(field_name) + ´->´
  + ALLTRIM(file_name) + ´ tiene ´+ ALLTRIM(STR(struext.field_dec)) + ´ decimales y
  debieran ser ´ + ALLTRIM(STR(stru.field_dec)),´L´
            #ENDIF
        ENDIF
ENDS IF err=1
    DO centra WITH ´LA ESTRUCTURA DE SUS DATOS  NO ES CORRECTA, REVISE PARA PODER
CONTINUAR´,24,´S´,´S´
ENDIF
SELE struext
USE
SELE STRU
USE
SELE 1
RETURN

*!*******************************************************************
*!
*!      Procedure: ERR1
*!
*!      Called by: VVERIF.PRG
*!
*!          Calls: CENTRA            (procedure in TABLA.PRG)
*!
*!*******************************************************************
```

```
PROC err1
    IF err=0
        CLEAR
        DO centra WITH 'ERRORES ENCONTRADOS',0,'N','N'
    ENDI
    STORE 1 TO err
    STORE ROW+1 TO ROW
    IF ROW>22 OR ROW = 2
        IF ROW>22
            DO centra WITH ' PRESIONE ENTER PARA CONTINUAR' ,24, 'S','S'
            @1,0 CLEAR
            STORE 2 TO ROW
        ENDIF
    ENDIF
    RETURN
*: EOF: VVERIF.PRG

*:****************************************************************
*                      ============
*                      6. VCOND.PRG
*                      ============
*
*                  ADD/MODIFY LINE TESTS
*:****************************************************************
*:
*: Procedure file: VCOND.PRG
*:
*:   Procs & Fncts: FFIN
*:                : F()
*:                : TYPEERROR
*:
*:          Set by: VACTI.PRG
*:
*:           Calls: COND_EXIT           (procedure in TAB_COND.PRG)
*:                : SETKEYS             (procedure in TABLA.PRG)
*:                : VEXPR               (procedure in TAB_COND.PRG)
*:                : COUNTREC            (procedure in TAB_COND.PRG)
*:                : CENTRA              (procedure in TABLA.PRG)
*:                : WRAPPER             (procedure in TAB_COND.PRG)
*:                : NVL()               (function  in TABLA.PRG)
*:
*:      Documented 05/01/93 at 23:01         FoxDoc  version 2.10f
*:****************************************************************

* VCOND.PRG - This module allows the user to modify any existing line tests,
* or to add new line tests.

PARAMETER expr,notes
PRIVATE ROW,rowtop,recnum,recnumtop
PRIVATE newexpr,newnote,exprtotal
```

```
STORE 1 TO condrec
STORE 30 TO periodo
STORE '    ' TO mperi

#DEFINE USENGLISH .T.
#DEFINE SPANISH .F.

IF WEXIST('BRO')
   HIDE WIND bro
ENDIF
IF WEXIST(browin)
   HIDE WIND &browin
ENDIF
ACTIVATE SCREE
SET COLOR TO (statusatr)
@ 0,0
SET COLOR TO (promptatr)
#IF _DOS.AND.USENGLISH
    @ 24,0 SAY '  Add        Modify        Select                      cLear   B/Erase   Escape '
    SET COLOR TO (hiliteatr)
    @ 24, 2 SAY "A"
    @ 24,12 SAY "M"
    @ 24,25 SAY "S"
    @ 24,51 SAY "L"
    @ 24,62 SAY "B"
    @ 24,71 SAY "[Escape]"
#ELIF _DOS.AND.SPANISH
    @ 24,0 SAY '  Agrega     Modifica     Selecciona                  Limpia   Borra     Escape '
    SET COLOR TO (hiliteatr)
    @ 24, 2 SAY "A"
    @ 24,12 SAY "M"
    @ 24,25 SAY "S"
    @ 24,51 SAY "L"
    @ 24,62 SAY "B"
    @ 24,71 SAY "[Escape]"
#ELIF _WINDOWS.AND.USENGLISH            && MS WINDOWS version
    _W=WROW()-1
    @_W,0    SAY 'A' STYLE 'U'
    @_W,COL() SAY 'dd   '+SPACE(4)
    @_W,COL() SAY 'M' STYLE 'U'
    @_W,COL() SAY 'odify  '+SPACE(4)
    @_W,COL() SAY 'S' STYLE 'U'
    @_W,COL() SAY 'elect    '+SPACE(4)
    @_W,COL() say 'c' STYLE 'U'
    @_W,COL() SAY 'Lear '+SPACE(4)
    @_W,COL() SAY 'B' STYLE 'U'
    @_W,COL() SAY '.Erase'+SPACE(2)
    @_w,COL() SAY 'E' STYLE 'U'
    @_W,COL() SAY 'scape'+SPACE(68)
    RELEASE _W
```

```
#ELIF _WINDOWS.AND.SPANISH
    _W=WROW()-1
    @_W,0 SAY 'A' STYLE 'U'
    @_W,COL() SAY 'grega'+SPACE(4)
    @_W,COL() SAY 'M' STYLE 'U'
    @_W,COL() SAY 'odifica' +SPACE(4)
    @_W,COL()  SAY 'S' STYLE 'U'
    @_W,COL() SAY 'elecciona'+SPACE(4)
    @_W,COL() say 'L' STYLE 'U'
    @_W,COL() SAY 'impia'+SPACE(4)
    @_W,COL() SAY 'B' STYLE 'U'
    @_W,COL() SAY 'orra'+SPACE(4)
    @_W,COL() SAY 'E' STYLE 'U'
    @_W,COL() SAY 'scape'+SPACE(68)
    RELEASE _W
ENDIF WORKAREA = SUBSTR(ALLTRIM(STR(SELECT(),2,0))+' ',1,2)
SELE 3
*USE PRUEBA
SET FILTER TO grupo = SPACE(6)
STORE "" TO expr, notes, newexpr, newnote
#IF _DOS.AND.USENGLISH
    DEFI WINDO browwin FROM 0,0 TO 17,78 SHADOW COLOR  SCHEME 10   TITLE ' FORMULAS
'
    DEFI WINDO slctwin FROM 20,2 TO 23,77 COLOR SCHEME 10 TITLE " Selected     "
#ELIF _DOS.AND.SPANISH
    DEFI WINDO browwin FROM 0,0 TO 17,78 SHADOW COLOR SCHEME 10   TITLE ' FORMULAS
'
    DEFI WINDO slctwin FROM 20,2 TO 23,77 COLOR SCHEME 10 TITLE " Seleccionado "
#ELIF _WINDOWS.AND.USENGLISH
    DEFI WINDO browwin FROM 0,0 TO 17,78 SHADOW COLOR SCHEME 10   TITLE ' FORMULAS
'
    DEFI WINDO slctwin FROM 20,2 TO 23,77 COLOR SCHEME 10 TITLE " SELECTED     "
#ELIF _WINDOWS.AND.SPANISH
    DEFI  WINDO browwin FROM 0,0 TO 17,78 SHADOW COLOR SCHEME 10   TITLE ' FORMULAS
'
    DEFI WINDO slctwin FROM 20,2 TO 23,77 COLOR SCHEME 10 TITLE " SELECCIONADO "
ENDIF SAVE SCREE TO panta
*
DO WHILE .T.
   REST SCREE FROM panta
   SET COLOR TO (statusatr)
   @ 0,55 SAY 'Total Records: '+ LTRIM(STR(RECCOUNT()))
   ACTIVATE WINDO slctwin
   @ 0,0 SAY SPACE(69)
   IF "" = TRIM( expr )
      #IF USENGLISH
         @ 0,0 SAY " Haven't selected filter   "
      #ELSE
```

```
          @ 0,0 SAY " No ha seleccionado filtro"
       #ENDIF
    ELSE
       @ 0,0 SAY expr
    ENDIF
    ACTIVATE SCREEN

* ---Set Hot Keys
    ON KEY LABEL A DO cond_exit
    ON KEY LABEL m DO cond_exit
    ON KEY LABEL s DO cond_exit
    ON KEY LABEL enter DO cond_exit
    ON KEY LABEL C DO cond_exit
    ON KEY LABEL 1 DO cond_exit
    ON KEY LABEL B DO cond_exit
    * ON KEY LABEL R DO cond_exit
    ON KEY LABEL E DO cond_exit
    ON KEY LABEL MOUSE DO cond_exit
    BROW  FIELDS codigo, linea, nombre, condexpr:H='Descripción de la Formula',
condnote:H='Descripción de la prueba' ;
       NOEDIT NODELETE NOAPPEND NOCLEAR WIND browwin
    ON KEY
    DO setkeys
    DEACT WINDO slctwin
    DO CASE
    CASE choice = 'R' .OR. LASTKEY() = 27
       * --- QUIT
       SELE 3
       SET FILTER TO
       IF choice='R'
          * keyb chr(27)
       ENDIF
       RELE WINDO browwin
       RELE WINDO slctwin
       STORE 0 TO periodo
       EXIT
    CASE choice = "A"
       * ---Add new CONDITION.
       SAVE SCREEN TO condscrn
       ?? SYS(2002,1)
       SELE &workarea
       STORE "" TO newexpr,expr
       SELE 1
       DO vexpr WITH newexpr
       IF "" <> TRIM(newexpr)
          STORE 'N' TO hayerror
          STORE newexpr TO expr
          DO countrec
          IF hayerror='S'
             DO centra WITH ' NO SE GRABARA LA FORMULA ', 0,'S','S'
             STORE "" TO newexpr, expr
          LOOP
```

```
    ENDIF

DO wrapper WITH newexpr, 60, 15, 9, .T.
    newnote = SPACE(200)
    STORE SPACE(12) TO mlinea
    STORE SPACE(6) TO mcodigo
    STORE SPACE(50) TO mnombre
    #IF _DOS.AND.USENGLISH
       @ 3,38 CLEAR TO 10,76
       @ 3,38 TO 10,76 DOUB
       @ 4,41 SAY '           Test code' GET mcodigo PICTURE '@!'
       @ 5,41 SAY '          Assigned line' GET mlinea    PICTURE  '@!' VALID
nvl(32,'TABLA' ,2,' ',0,0,'_NADA', "LINEA +' '+NOMBRE")
       @ 7,41 SAY '   Test description'
       @ 8,41 GET mnombre SIZE 2,25
    #ELIF _DOS.AND.SPANISH
       @ 3,38 CLEAR TO 10,76
       @ 3,38 TO 10,76 DOUB
       @ 4,41 SAY ' Código de la Prueba' GET mcodigo PICTURE '@!'
       @ 5,41 SAY '          Linea asignada' GET mlinea    PICTURE  '@!' VALID
nvl(32,'TABLA' ,2,' ',0,0,'_NADA', "LINEA +' '+NOMBRE")
       @ 7,41 SAY ' Nombre de la Prueba'
       @ 8,41 GET mnombre SIZE 2,25
    #ENDIF
    #IF _DOS
       @ 22, 0 CLEAR
       @19,14 CLEAR TO 24,70
       @ 19,14 TO 24,70
    #ENDIF
    #IF _DOS .AND. USENGLISH
       @ 19,16 SAY ' Test description
       @ 20,15 GET newnote SIZE 4,55
    #ELIF _DOS.AND.SPANISH
       @ 19,16 SAY ' Descripción de la Prueba '
       @ 20,15 GET newnote SIZE 4,55
    #ENDIF

#IF _DOS
       READ
    #ENDIF

#IF _WINDOWS
       DEFINE WINDOW _TEMP AT 3,38 SIZE   10,76-38 FONT 'SYSTEM',10 IN SCREEN
TITLE 'DATOS PRUEBA'
       ACTI WIND _TEMP
    #ENDIF
    #IF _WINDOWS .AND. USENGLISH
       @ 2,3 SAY '                Test code    ' GET mcodigo PICTURE '@!'
       @ 3,3 SAY ' Line to  assign test to  ' GET mlinea PICTURE '@!' VALID
nvl(32,'TABLA' ,2,' ',0,0,'_NADA', "LINEA +' '+NOMBRE")
       @ 5,3 SAY ' Test description
```

```
        @ 6,4 GET mnombre SIZE 2,25
    #ELIF _WINDOWS.AND.SPANISH
        @ 2,3 SAY '         Código de la Prueba   ' GET mcodigo PICTURE '@!'
        @ 3,3 SAY ' Linea a  la cual se  asigna' GET  mlinea  PICTURE  '@!' VALID
nvl(32,'TABLA' ,2,' ',0,0,'_NADA', "LINEA + '+NOMBRE")
        @ 5,3 SAY ' Nombre de la Prueba         '
        @ 6,4 GET mnombre SIZE 2,25
    #ENDIF
    #IF _WINDOWS
        DEFINE WINDOW _TEMP2 AT 19,14 SIZE  24,65-11 FONT  'SYSTEM',10 IN  SCREEN
TITLE 'DESCRIPCION'
        ACTIVATE WINDOW _TEMP2
        @ WROW()-3, 0 CLEAR
    #ENDIF
    #IF _WINDOWS.AND.USENGLISH
        @ 1,3 SAY '         Test description '
    #ELIF _WINDOWS.AND.SPANISH
        @ 1,3 SAY ' Descripción de la Prueba '
    #ENDIF
    #IF _WINDOWS
        @ 2,2 GET newnote SIZE 4,50
        READ
        DEACT WINDOW _TEMP2
        DEACT WINDOW _TEMP
        DEACT WINDOW _TEMP2
        RELEASE WINDOW _TEMP
        RELEASE WINDOW _TEMP2
    #ENDIF
        SELE 3
        IF mcodigo=SPACE(6) OR mlinea=SPACE(12)
            DO centra WITH ' NO SE PUEDE DEJAR EN BLANCO: El Código de la prueba ni la
Línea ', 0, 'S','S'
            STORE '' TO newexpr, expr
            LOOP
        ELSE
            STORE mcodigo+mlinea TO busque
            SEEK busque
            IF FOUND()
                DO centra  WITH '  Ese código  de fórmula  ya se  utilizó para  esa
línea ', 0,'S','S'
                LOOP
            ENDIF
        ENDIF
        SELE 3
        STORE newexpr TO expr
        DO countrec
        IF hayerror='N'
            APPEND BLANK
            REPLACE  condexpr WITH expr,  condnote  WITH  newnote,  nombre  WITH
mnombre, codigo WITH mcodigo, linea WITH mlinea
        ENDIF
    ENDIF
```

```
    SELE 3
    ?? SYS(2002)
    RESTORE SCREEN FROM condscrn
CASE choice = "M"
    * ---Edit CONDITION.
    ?? SYS(2002,1)
    *       IF RECNO() > 0 .AND. condarea = WORKAREA
    * IF RECNO() > 0
    STORE RECNO() TO recnum
    COUNT TO numrec
    IF numrec > 0
    GO recnum
    #IF _DOS
      SAVE SCREEN TO condscrn
      @ 9,7 CLEAR TO 15,64
      @ 9,7 TO 15,64
      @ 18,7 CLEAR TO 23,64
      @ 18,7 TO 23,64
    #ENDIF
    #IF _DOS.AND.USENGLISH
      @ 9,9 SAY ' Modify formula       '
      @ 18,9 SAY ' Modify description  '
      @ 10,8 GET condexpr PICT "@!" SIZE 5,55
      @ 19,8 GET condnote SIZE 4,55
    #ELIF _DOS.AND.SPANISH
      @ 9,9 SAY ' Modificar la Fórmula '
      @ 18,9 SAY ' Modificar la Descripción '
      @ 10,8 GET condexpr PICT "@!" SIZE 5,55
      @ 19,8 GET condnote SIZE 4,55
    #ENDIF
    #IF _DOS
      READ
      RESTORE SCREEN FROM condscrn
    #ENDIF
    #IF _WINDOWS
      DEFINE WINDOW _TEMP AT 12,7 SIZE 24,56 IN SCREEN  FONT 'SYSTEM',10 TITLE
'MODIFICAR'
      ACTI WINDOW _TEMP
    #ENDIF
    #IF _WINDOWS.AND.USENGLISH
      @ 1,2 SAY ' Modify formula       '
      @ 7,2 SAY ' Modify description   '
      @ 2,3 GET condexpr PICT "@S64" SIZE 4,50
      @ 8,3 GET condnote SIZE 4,50
    #ELIF _WINDOWS.AND.SPANISH
      @ 1,2 SAY ' Modificar la Fórmula '
      @ 7,2 SAY ' Modificar la Descripción '
      @ 2,3 GET condexpr PICT "@S64" SIZE 4,50
      @ 8,3 GET condnote SIZE 4,50
    #ENDIF
    #IF _WINDOWS
      READ
```

```
      DEACTI WINDOW _TEMP
      RELEASE WINDOW _TEMP
   #ENDIF expr = condexpr
   Notes = CondNote
    ENDIF
    ?? SYS(2002)
 CASE choice = "S"
    * ---Select CONDITION.
    ?? SYS(2002,1)
    *      IF RECNO() = 0 .OR. condarea <> WORKAREA
    *IF RECNO() = 0
    STORE RECNO() TO recnum
    COUNT TO numrec
    IF numrec = 0
       expr = ""
       notas = ""
       LOOP
    ELSE
       GO recnum
       DO countrec
    ENDIF
    SELE 3
    GO condrec
    ?? SYS(2002)
 CASE choice = 'B'
    * ---Delete the record.
    *      IF RECNO() > 0 .AND. condarea = WORKAREA
    *IF RECNO() = 0
    STORE RECNO() TO recnum
    COUNT TO numrec
    IF numrec > 0
       GO recnum
       DELETE
       PACK
       *GOTO TOP
    ENDIF
 CASE choice = "ZC"
    * ---Count the # of Records
    STORE condexpr TO filtemp
    SELE &workarea
    condrec = IIF(BOF() OR EOF(), 1, RECNO() )
    SET COLOR TO (statusatr)
    @ WROWS()-3,0
    #IF USENGLISH
        @ WROWS()-3,0 SAY "Counting..."
    #ELSE
        @ WROWS()-3,0 SAY "Contando..."
    #ENDIF
    condcount = RECCOUNT()
    DO CASE
```

```
      CASE LEN(TRIM(expr)) >0
   IF TYPE( expr ) = "L"
      SET FILTER TO &expr
      COUNT ALL TO condcount
   ELSE
      @ WROWS()-3,0
      @ WROWS()-2,0
      #IF USENGLISH
         @ WROWS()-3,0 SAY "     Filter not valid    " COLOR W+/R
         WAIT ´   Press    [ENTER] to continue   ....´ WINDOW
      #ELSE
         @ WROWS()-3,0 SAY "   El filtro no es válido" COLOR W+/R
         WAIT ´   Presione [ENTER] para continuar ....´ WINDOW
      #ENDIF
      @ WROWS()-3,0
      @ WROWS()-2,0
   ENDIF
    CASE LEN(TRIM(filtemp)) >0
   IF TYPE( filtemp ) = "L"
      SET FILTER TO &filtemp
      COUNT ALL TO condcount
   ELSE
      @WROWS()-5,0
      #IF USENGLISH
         @ WROWS()-5,0 SAY "    Filter not valid    " COLOR W+/R
         WAIT ´Press    [ENTER] to continue   ....´ WINDOW
      #ELSE
         @ WROWS()-5,0 SAY "El filtro no es válido" COLOR W+/R
         WAIT ´Presione [ENTER] para continuar ....´ WINDOW
      #ENDIF
      @WROWS()-5,0
      @WROWS()-4,0
   ENDIF
    ENDCASE
    @ WROWS()-3,0
    GOTO condrec
    msg = LTRIM(STR(condcount))+´ Records cumplen la condición´
    @0,WROWS()-2 SAY msg COLOR W+/R
    READ
    SET FILTER TO
    SELE 3
  CASE choice = "L"
     * ---cLear the Condition
     STORE "" TO expr, notes, newexpr, newnote
  ENDCASE
ENDDO
expr = TRIM( expr )
Notes = TRIM( Notes )
SELE &workarea
RETURN
*!*******************************************************************
*!
```

```
*!        Procedure: COND_EXIT
*!
*!        Called by: TAB_COND.PRG
*!                 : VCOND.PRG
*!                 : VCONDG.PRG
*!
*!***************************************************************
#IF _DOS
    PROCEDURE cond_exit
    DO CASE
    CASE MROW() = 24 .AND. ( MCOL() >= 12 .AND. MCOL() <= 19 )
       * ---Edit Clicked
       choice = 'M'
       KEYBOARD CHR(23)
    CASE LASTKEY() = 77 .OR. LASTKEY() = 109
       *---E Pressed
       choice = 'M'
       KEYBOARD CHR(23)
    CASE MROW() = 24 .AND. ( MCOL() >= 2 .AND. MCOL() <= 7 )
       * ---Add Clicked
       choice = 'A'
       KEYBOARD CHR(23)
    CASE LASTKEY() = 65 .OR. LASTKEY() = 97
       *---A Pressed
       choice = 'A'
       KEYBOARD CHR(23)
    CASE MROW() = 24 .AND. ( MCOL() >= 25 .AND. MCOL() <= 34 )
       * ---Select Clicked
       choice = 'S'
       KEYBOARD CHR(23)
    CASE LASTKEY() = 83 .OR. LASTKEY() = 115 .OR. LASTKEY() = 13
       *---S Pressed
       choice = 'S'
       KEYBOARD CHR(23)
       *CASE MROW() = 24 .AND. ( MCOL() >= 40 .AND. MCOL() <= 45 )
       *   * ---Count Clicked
       *   choice = 'C'
       *   KEYBOARD CHR(23)
       *CASE LASTKEY() = 67 .OR. LASTKEY() = 99
       *   *---C Pressed
       *   choice = 'C'
       *   KEYBOARD CHR(23)
    CASE MROW() = 24 .AND. ( MCOL() >= 51 .AND. MCOL() <= 56 )
       * ---cLear Clicked
       choice = 'L'
       KEYBOARD CHR(23)
    CASE LASTKEY() = 76 .OR. LASTKEY() = 108
       *---L Pressed
       choice = 'L'
       KEYBOARD CHR(23)
    CASE MROW() = 24 .AND. ( MCOL() >= 62 .AND. MCOL() <= 66 )
       * ---B Clicked
```

```
            choice = 'B'
            KEYBOARD CHR(23)
         CASE LASTKEY() = 66 .OR. LASTKEY() = 98
            *---B Pressed
            choice = 'B'
            KEYBOARD CHR(23)
         CASE MROW() = 24 .AND. ( MCOL() >= 72 .AND. MCOL() <= 77 )
            * ---R Clicked
            KEYBOARD CHR(23)
            choice = 'R'
            *CASE LASTKEY() = 82 .OR. LASTKEY() = 114
         CASE LASTKEY() = 69 .OR. LASTKEY() = 101
            *---R Pressed
            choice = 'R'
            KEYBOARD CHR(23)
         OTHERWISE
            RETURN
         ENDCASE
         RETURN
#ELSE
      PROCEDURE cond_exit
      DO CASE CASE     MROW()      >      WROWS()-1.AND.MROW()<WROWS()       .AND.
MCOL()>TXTW('Agrega'+SPACE(4)) .AND. MCOL() <TXTW('Agrega'+SPACE(4)+'Modifica'  )
            * ---Edit Clicked
            choice = 'M'
            KEYBOARD CHR(23)
         CASE LASTKEY() = 77 .OR. LASTKEY() = 109
            *---E Pressed
            choice = 'M'
            KEYBOARD CHR(23)
         CASE         MROW()>=WROWS()-1         .AND.        MROW()       <WROWS()
.AND.MCOL()>0.AND.MCOL()<TXTW('Agrega')
            choice = 'A'
            KEYBOARD CHR(23)
         CASE LASTKEY() = 65 .OR. LASTKEY() = 97
            *---A Pressed
            choice = 'A'
            KEYBOARD CHR(23)
         CASE    MROW()    >=WROWS()-1.AND.MROW()<=WROWS()       .AND.    (   MCOL()
>TXTWI('Agrega'+space(4)+'Modifica'+space(4))         .AND.        MCOL()        <=
txtwi('Agrega'+space(4)+'Modifica'+space(4)+'Selecciona') )
            * ---Select Clicked
            choice = 'S'
            KEYBOARD CHR(23)
         CASE LASTKEY() = 83 .OR. LASTKEY() = 115 .OR. LASTKEY() = 13
            *---S Pressed
            choice = 'S'
            KEYBOARD CHR(23)
         CASE    MROW()    >=WROWS()-1.AND.MROW()<=WROWS().AND.       (    MCOL()   >=
TXTW('Agrega'+space(4)+'Modifica'+space(4)+'Selecciona'+space(4)) .AND. MCOL() <=
```

```
txtwi('Agrega'+space(4)+'Modifica'+space(4)+'Selecciona'+space(4)+'Limpia'))
     * ---cLear Clicked
        choice = 'L'
        KEYBOARD CHR(23)
    CASE LASTKEY() = 76 .OR. LASTKEY() = 108
        *---L Pressed
        choice = 'L'
        KEYBOARD CHR(23)
    CASE      MROW()>=WROWS()-1.AND.MROW()<=WROW().AND.     (      MCOL()
>TXTW('Agrega'+space(4)+'Modifica'+space(4)+'Selecciona'+space(4)+'Limpia'+space(
4 )  )  .   A  N  D  .  M  C  O  L  (  )  <
txtw('Agrega'+space(4)+'Modifica'+space(4)+'Selecciona'+space(4)+'Limpia'+Space(4
)+'Borra') )
     * ---B Clicked
        choice = 'B'
        KEYBOARD CHR(23)
    CASE LASTKEY() = 66 .OR. LASTKEY() = 98
        *---B Pressed
        choice = 'B'
        KEYBOARD CHR(23)
    CASE      MROW()>=WROWS()-1.AND.MROW()<=WROW().AND.     (      MCOL()    >=
TXTWI('Agrega'+space(4)+'Modifica'+space(4)+'Selecciona'+space(4)+'Limpia'+space(
4 ) + 'B o r r a' + S p a c e ( 4 ))     . A N D .     M C O L ( )     <
txtwi('Agrega'+space(4)+'Modifica'+space(4)+'Selecciona'+space(4)+'Limpia'+space(
4)+'Borra'+Space(4)+'Return') )
     * ---R Clicked
        KEYBOARD CHR(23)
        choice = 'R'
    CASE LASTKEY() = 82 .OR. LASTKEY() = 114
        *---R Pressed
        choice = 'R'
        KEYBOARD CHR(23)
    OTHERWISE
        RETURN
    ENDCASE
    RETURN
ENDIF

*!**********************************************************************
*!
*!      Procedure: VEXPR
*!
*!      Called by: TAB_COND.PRG
*!               : VCOND.PRG
*!               : VCONDG.PRG
*!
*!      Calls: SHADE            (procedure in TABLA.PRG)
*!           : VCAMBIO.PRG
*!           : SAYLINE          (procedure in TABLA.PRG)
*!           : FEXPR            (procedure in TAB_COND.PRG)
*!           : MSA_PHRA         (procedure in TAB_COND.PRG)
*!           : WRAPPER          (procedure in TAB_COND.PRG)
```

```
*!              : FFIN             (procedure in VCOND.PRG)
*!              : JKEYINIT()       (function in ?)
*!              : JKEYCANC()       (function in ?)
*!
*!***************************************************************
PROCEDURE vexpr
PARAMETER expr
PRIVATE ROW,fldnum,phrase,connector
CLEAR
DO shade
ROW = 20
expr = ""
phrase = ""
connector = " "
STORE '1 ' TO dbfarea
SELE &dbfarea
* ---LOAD ARRAY
*DECLARE fldarray[RECCOUNT()]
*GO TOP
*SCAN
*  *   fldarray[RECNO()] = ' F("'+linea+'")'
*      fldarray[RECNO()] = 'F("'+linea+'",'
*ENDSCAN

*DECLARE lblarray[RECCOUNT()]
*SCAN
*    lblarray[RECNO()] = '  '+PROPER(nombre)
*ENDSCAN

*** Aqui se cambian los labels para customizar el filtro
*DO VCAMBIO WITH 'C'
DO CASE
CASE dbfarea='1'
    * STORE ' Ejemplo Label' to lblarray[1]
CASE dbfarea='2'
ENDCASE IF RECCOUNT() = 0
   DO sayline WITH WROWS()-2,"No hay campos para hacer filtro", "C"
   WAIT 'Presione [ENTER] para continuar' WINDOW
   RETURN
ENDIF DO WHILE .T.
   STORE 0 TO salec
   *SET COLOR TO (ScreenAtr)
   *@ 2,23,14,78 BOX "▓▓▓▓▓▓▓▓▓"
   #IF _DOS
    @ 2,23,14,78 BOX REPLICATE(char,9)
   #ENDIF
   #IF USENGLISH
    msg = '    CREATE INDIVIDUAL TESTS
```

```
#ELSE
  msg = '     CREAR PRUEBAS INDIVIDUALES
#ENDIF
DO sayline WITH 0, msg, "C"
fldnum = 0
**** section marker BEGIN
@ WROWS()-3,0 CLEAR
#IF USENGLISH
    @ WROWS()-1,0 SAY "Select line with [ENTER] or press [Esc] for manual
input."
    STORE 'Data lines    ' TO tit
#ELSE
    @ WROWS()-1,0 SAY "Seleccione  la Linea con  [Enter] o presione  [Esc] para
INGRESO MANUAL."
    STORE 'Lineas de Datos' TO tit
#ENDIF
DEFI WIND ffin FROM 2,5 TO 13,45 COLOR SCHE 2 SHADOW TITLE tit DOUB
ON KEY LABEL enter DO ffin
STORE 0 TO escoje
STORE '' TO pg_jkey
=jkeyinit("U",pg_jkey)
BROW FIEL linea,nombre NOMO WIND ffin
=jkeycanc()
IF escoje=1
    STORE RECNO() TO fldnum
ENDIF
ON KEY LABEL enter
DEAC WIND ffin
DEAC WIND &tit
RELE WIND ffin
RELE WIND &tit
**** section marker END
*IGNORE @ 22,0 CLEAR
*IGNORE @ 24,0 SAY "Seleccione el Campo o presione [Esc] para INGRESO MANUAL."
*IGNORE @ 3,3 MENU   lblarray,RECCOUNT(),MIN(RECCOUNT(),10) TITLE  "  Campos  "
SHADOW
   *IGNORE READ MENU TO fldnum SAVE
   IF fldnum > 0   && a field selected
      * ---Build Phrase with field value
      @ WROWS()-3,0 CLEAR
      #IF USENGLISH
          @ WROWS()-1,0 SAY "[Esc] to end            "
          @WROWS()-3,10 SAY 'WHICH PERIOD   ' GET mperi PICTURE '#99'
      #ELSE
          @ WROWS()-1,0 SAY "[Esc] para terminar"
          @WROWS()-3,10 SAY 'DE CUAL PERIODO' GET mperi PICTURE '#99'
      #ENDIF
      READ
      @WROWS()-3,0

IF mperi=SPACE(3)
         STORE '0 ' TO mperi
```

```
    ENDIF
    IF LASTKEY()=27
       expr = ''
       EXIT
       * STORE '0 ' TO MPERI
    ENDIF
    phrase = phrase+ 'F("'+linea+'",' + ALLTRIM(mperi)+') '
    *      phrase = phrase+ fldarray[FLDNUM] + ALLTRIM(mperi)+') '
ENDIF
****
STORE SPACE(40) TO fldget
* ---Get manual ENTRY
@ WROWS()-3,0 CLEAR
#IF USENGLISH
    @ WROWS()-3,0 SAY "Input data operator (><*/+-):" GET fldget PICT '@!'
    @ WROWS()-1,0 SAY "Leave blank to end         "
#ELSE
    @ WROWS()-3,0 SAY "Ingrese operador a utilizar: " GET fldget PICT '@!'
    @ WROWS()-1,0 SAY "Deje en blanco para terminar"
#ENDIF
READ
@ WROWS()-3,0 CLEAR
#IF USENGLISH
    @ WROWS()-1,0 SAY "Select field or press [Esc] for manual input.

#ELSE
    @ WROWS()-1,0 SAY "Seleccione  el  campo o  presione  [Esc]  para INGRESO
MANUAL."
#ENDIF
STORE 0 TO salec
IF fldget=SPACE(40)
    STORE 1 TO salec
ENDIF
* ---Build Phrase with user value
phrase = phrase+ UPPER(TRIM(fldget))+' '
****
STORE phrase TO expr
* ---Display expression.
IF "" <> expr
    DO wrapper WITH expr, 60, 15, 9, .T.
ENDIF
IF LEN(expr) > 254
    EXIT
ENDIF
IF salec=1
    EXIT
ENDIF
IF LEN(TRIM(expr))=0
    * ---ABORT
    expr = ''
    EXIT
ENDIF
```

```
ENDDO
SELE 3
@ 0,0
RETURN

*!****************************************************************
*!
*!      Procedure: FFIN
*!
*!      Called by: VEXPR              (procedure in TAB_COND.PRG)
*!
*!****************************************************************
PROCEDURE ffin
KEYB CHR(23)
STORE 1 TO escoje
RETURN

*!****************************************************************
*!
*!      Procedure: COUNTREC
*!
*!      Called by: TAB_COND.PRG
*!               : VCOND.PRG
*!               : VCONDG.PRG
*!
*!      Calls: TYPEERROR             (procedure in VCOND.PRG)
*!
*!****************************************************************
PROCEDURE countrec
IF choice <> "A"
   expr = condexpr
ENDIF
STORE ALLTRIM(expr) TO texpr
*SELE &workarea
condrec = IIF(BOF() OR EOF(), 1, RECNO() )
*condcount = RECCOUNT()
ON ERROR DO typeerror
STORE &texpr TO testexpr
ON ERROR
RETURN

*!****************************************************************
*!
*!      Procedure: WRAPPER
*!
*!      Called by: TAB_COND.PRG
*!               : VEXPR              (procedure in TAB_COND.PRG)
*!               : WAITWIN            (procedure in TAB_COND.PRG)
*!               : VCOND.PRG
*!               : VCONDG.PRG
*!
*!****************************************************************
```

```
PROCEDURE wrapper
* ---String Wrapper
PARAMETERS strg,WIDTH,ROW,COL,inbox
PRIVATE ROW,COL,WIDTH
STORE 1 TO linebegin
estlines = ROUND((LEN(strg)/WIDTH)* 1.20,0)
IF inbox
   * ---DRAW BOX
   #IF _DOS
    @ ROW, COL, ROW+estlines+2, COL+WIDTH+1 BOX '┌─┤┤=┤ '
   #ELSE
    @ ROW, COL TO  ROW+estlines+4, COL+WIDTH+1  PEN 6,5 PATTERN 6
   #ENDIF
ENDIF
DO WHILE .T.
   * ---FIND OCCURRANCE OF BLANK AT Width MARK
   lineend = WIDTH+linebegin
   IF lineend > LEN(strg)
      lineend = LEN(strg)+1
   ELSE
      curend = lineend
      DO WHILE SUBSTR(strg,lineend,1) <> ' '
         lineend = lineend -1
         IF lineend = 0
            * ---NO BLANKS FOUND TRUNCATE
            lineend = curend
            EXIT
         ENDIF
      ENDDO
   ENDIF
   *--- DISPLAY STRING
   @ ROW+1, COL+1 SAY SUBSTR(strg,linebegin,lineend-linebegin)
   *--- RESET MemVarS
   ROW = ROW + 1
   IF lineend > LEN(strg) .OR. (SUBSTR(strg,lineend,1) = SPACE(1))
      linebegin = lineend + 1
   ELSE
      linebegin = lineend
   ENDIF
   IF linebegin > LEN(strg)
      EXIT
   ENDIF
ENDDO
RETURN

*!*******************************************************************
*!
*!      Function: F()
*!
*!         Calls: CENTRA           (procedure in TABLA.PRG)
*!              : RETMAST          (procedure in VAPL.PRG)
```

```
*!
*!**************************************************************
FUNCTION F
PARAMETER par, per
IF PARAMETERS()<2
   STORE 0 TO per
ENDIF

* Module to convert tag ('etiqueta') to the assigned value
* F('primera',1) / F('quinta',2) > 2 use file TABLA
IF SEEK(par,1)
   STORE LTRIM(STR(periodo + per,3,0)) TO perrel
   STORE 'Tabla.p'+perrel TO pper
   STORE &pper TO gus
   RETURN &pper
ELSE
   RETURN 0
ENDIF

*!**************************************************************
*!
*!      Procedure: TYPEERROR
*!
*!      Called by: COUNTREC          (procedure in TAB_COND.PRG)
*!               : VAPL.PRG
*!
*!          Calls: CENTRA            (procedure in TABLA.PRG)
*!               : RETMAST           (procedure in VAPL.PRG)
*!
*!**************************************************************
PROCEDURE typeerror
SAVE SCRE TO panta
DO centra WITH 'HAY UN ERROR EN LA EXPRESION' ,WROWS()-6,'S','S'
STORE 'S' TO hayerror
REST SCRE FROM panta
RETURN
*: EOF: VCOND.PRG
*:**************************************************************
*:**************************************************************
*                      ==============
*                      7. VCONDG.PRG
*                      ==============
*
*                      ADD/MODIFY GROUP TESTS
*:**************************************************************
*:
*: Procedure file: VCONDG.PRG
*:
*:   Procs & Fncts: G()
*:
*:          Set by: VACTI.PRG
*:
```

```
*:         Calls: COND_EXIT          (procedure in TAB_COND.PRG)
*:              : SETKEYS            (procedure in TABLA.PRG)
*:              : VEXPR              (procedure in TAB_COND.PRG)
*:              : COUNTREC           (procedure in TAB_COND.PRG)
*:              : CENTRA             (procedure in TABLA.PRG)
*:              : WRAPPER            (procedure in TAB_COND.PRG)
*:
*:         Documented 05/01/93 at 23:02           FoxDoc  version 2.10f
*:********************************************************************

* VCOND.PRG - This module allows the user to modify any existing group tests,
* or to add new group tests.

#DEFINE USENGLISH .T.
#DEFINE SPANISH .F.
PARAMETER expr,notes
#IF _WINDOWS
    PRIVATE _R
ENDIF PRIVATE ROW,rowtop,recnum,recnumtop
PRIVATE newexpr,newnote,exprtotal
SELE 4
IF RECCOUNT()=0
  #IF USENGLISH
     DO CENTRA WITH ' YOU MUST CREATE GROUPS BEFORE CREATING GROUP FORMULAS
  ',WROWS()-1,'S','S'
  #ELSE
     DO CENTRA WITH ' DEBE CREAR PRIMERO  LOS GRUPOS ANTES DE  HACER FORMULAS DE
GRUPO',WROWS()-1,'S','S'
  #ENDIF
  SELE &DBFAREA
  RETURN
ENDIF
STORE '1 ' TO dbfarea
SELE 1
STORE 1 TO condrec
STORE 30 TO periodo
STORE '  ' TO mperi
IF WEXIST('BRO')
   HIDE WIND bro
ENDIF
IF WEXIST(browin)
   HIDE WIND &browin
ENDIF
ACTIVATE SCREE
SET COLOR TO (statusatr)
#IF _DOS.AND.USENGLISH
    @ 0,0
    SET COLOR TO (promptatr)
    @ 24,0 SAY '  Add       Modify      Select                              cLear
B.Erase   Escape '
```

```
        SET COLOR TO (hiliteatr)
        @ 24, 2 SAY "A"
        @ 24,12 SAY "M"
        @ 24,25 SAY "S"
        @ 24,51 SAY "L"
        @ 24,62 SAY "B"
        @ 24,71 SAY "[Escape]"
#ELIF _DOS.AND.SPANISH
        @ 0,0
        SET COLOR TO (promptatr)
        @ 24,0 SAY ' Agrega      Modifica     Selecciona                       Limpia
Borra     Escape '
        SET COLOR TO (hiliteatr)
        @ 24, 2 SAY "A"
        @ 24,12 SAY "M"
        @ 24,25 SAY "S"
        @ 24,51 SAY "L"
        @ 24,62 SAY "B"
        @ 24,71 SAY "[Escape]"
#ELIF _WINDOWS.AND.USENGLISH
        _W=WROW()-1
        @_W,0 SAY 'A' STYLE 'U'
        @_W,COL() SAY 'dd  '+SPACE(4)
        @_W,COL() SAY 'M' STYLE 'U'
        @_W,COL() SAY 'odify ' +SPACE(4)
        @_W,COL()  SAY 'S' STYLE 'U'
        @_W,COL() SAY 'elect   '+SPACE(4)
        @_W,COL() say 'c' STYLE 'U'
        @_W,COL() SAY 'Lear '+SPACE(4)
        @_W,COL() SAY 'B' STYLE 'U'
        @_W,COL() SAY '.Erase'+SPACE(2)
        @_w,COL() SAY 'E' STYLE 'U'
        @_W,COL() SAY 'scape'+SPACE(68)
        RELEASE _W
#ELIF _WINDOWS.AND.SPANISH
        _W=WROW()-1
        @_W,0 SAY 'A' STYLE 'U'
        @_W,COL() SAY 'grega'+SPACE(4)
        @_W,COL() SAY 'M' STYLE 'U'
        @_W,COL() SAY 'odifica' +SPACE(4)
        @_W,COL()  SAY 'S' STYLE 'U'
        @_W,COL() SAY 'elecciona'+SPACE(4)
        @_W,COL() say 'L' STYLE 'U'
        @_W,COL() SAY 'impia'+SPACE(4)
        @_W,COL() SAY 'B' STYLE 'U'
        @_W,COL() SAY 'orra'+SPACE(4)
        @_w,COL() SAY 'E' STYLE 'U'
        @_W,COL() SAY 'scape'+SPACE(68)
        RELEASE _W
ENDIF
WORKAREA = SUBSTR(ALLTRIM(STR(SELECT(),2,0))+' ',1,2)
SELE 3
```

```
SET ORDER TO 4
SET FILTER TO grupo<>SPACE(6)
STORE "" TO expr, notes, newexpr, newnote
#IF _DOS.AND.USENGLISH
    DEFI WINDO browwin  FROM 0,0 TO 17,78 SHADOW COLOR SCHEME 10  TITLE ' FORMULAS
'
    DEFI WINDO slctwin FROM 20,2 TO 23,77 COLOR SCHEME 10 TITLE " Selected    "
#ELIF _DOS.AND.SPANISH
    DEFI WINDO browwin  FROM 0,0  TO 17,78 SHADOW COLOR SCHEME 10  TITLE ' FORMULAS
'
    DEFI WINDO slctwin FROM 20,2 TO 23,77 COLOR SCHEME 10 TITLE " Seleccionado "
#ELIF _WINDOWS.AND.USENGLISH
    DEFI  WINDO browwin FROM  0,0 TO 19,WCOLS()  SHADOW COLOR  SCHEME 10    TITLE '
FORMULAS '  FONT 'ARIAL',8
    DEFI WINDO slctwin  FROM 19,0  TO WROWS()-1,WCOLS()  COLOR SCHEME  10 TITLE "
SELECTED    "  FONT 'SYSTEM',10
#ELIF _WINDOWS.AND.SPANISH
    DEFI WINDO browwin  FROM 0,0 TO  19,WCOLS() SHADOW  COLOR SCHEME 10    TITLE  '
FORMULAS '  FONT 'ARIAL',8
    DEFI WINDO  slctwin FROM  19,0 TO  WROWS()-1,WCOLS() COLOR  SCHEME 10  TITLE "
SELECCIONADO"  FONT 'SYSTEM',10
ENDIF SAVE SCREE TO panta
*
DO WHILE .T.
   REST SCREE FROM panta
   SET COLOR TO (statusatr)
   @ 0,55 SAY 'Total Records: '+ LTRIM(STR(RECCOUNT()))
   ACTIVATE WINDO slctwin
   @ 0,0 SAY SPACE(69)
   IF "" = TRIM( expr )
      @ 0,0 SAY " No ha seleccionado filtro"
   ELSE
      @ 0,0 SAY expr
   ENDIF
   ACTIVATE SCREEN

* ---Set Hot Keys
   ON KEY LABEL A DO cond_exit
   ON KEY LABEL m DO cond_exit
   ON KEY LABEL s DO cond_exit
   ON KEY LABEL enter DO cond_exit
   ON KEY LABEL C DO cond_exit
   ON KEY LABEL l DO cond_exit
   ON KEY LABEL B DO cond_exit
   ON KEY LABEL E DO cond_exit
   ON KEY LABEL MOUSE DO cond_exit
      BROW FIELDS codigo, grupo, nombre, condexpr:H='Descripción de  la  Formula',
condnote:H='Descripción de la prueba' ;
         NOEDIT NODELETE NOAPPEND NOCLEAR WIND browwin
      ON KEY
```

```
DO setkeys
DEACT WINDO slctwin
DO CASE
CASE choice = ´R´ .OR. LASTKEY() = 27
   * --- QUIT
   SELE 3
   SET ORDER TO 1
   SET FILTER TO
   IF choice=´R´
      * keyb chr(27)
   ENDIF
   RELE WINDO browwin
   RELE WINDO slctwin
   EXIT
CASE choice = "A"
   * ---Add new CONDITION.
   SAVE SCREEN TO condscrn
   ?? SYS(2002,1)
   SELE &workarea
   STORE ´´ TO newexpr,expr
   SELE 1
   DO vexpr WITH newexpr
   IF "" <> TRIM(newexpr)
      STORE ´N´ TO hayerror
      STORE newexpr TO expr
      DO countrec
   IF hayerror=´S´
      DO centra WITH ´ NO SE GRABARA LA FORMULA ´, 0,´S´,´S´
      STORE ´´ TO newexpr, expr
      LOOP este LOOP debe estar activo
   ENDIF DO wrapper WITH newexpr, 60, 15, 9, .T.
   newnote = SPACE(200)
   STORE SPACE(12) TO mlinea
   STORE SPACE(6) TO mcodigo
   STORE SPACE(50) TO mnombre
   #IF _DOS.AND.USENGLISH
      @ 3,38 CLEAR TO 10,76
      @ 3,38 TO 10,76 DOUB
      @ 4,41 SAY ´         Test code ´ GET mcodigo PICTURE ´@!´
   *IGNORE @ 5,41 SAY ´       Line to assign to ´ get mlinea picture ´@!´
      @ 7,41 SAY ´   Test description ´
      @ 8,41 GET mnombre SIZE 2,25

@ 22, 0 CLEAR
      @ 19,14 CLEAR TO 24,70
      @ 19,14 TO 24,70
      @ 19,16 SAY ´ Descripción de la Prueba ´
      @ 20,15 GET newnote SIZE 4,55
      READ
   #ELIF _DOS.AND.SPANISH
```

```
        @ 3,38 CLEAR TO 10,76
     @ 3,38 TO 10,76 DOUB
     @ 4,41 SAY ' Código de la Prueba' GET mcodigo PICTURE '@!'
   *IGNORE @ 5,41 SAY ' Linea a la cual se asigna' get mlinea picture '@!'
     @ 7,41 SAY ' Nombre de la Prueba'
     @ 8,41 GET mnombre SIZE 2,25

@ 22, 0 CLEAR
     @ 19,14 CLEAR TO 24,70
     @ 19,14 TO 24,70
     @ 19,16 SAY ' Descripción de la Prueba '
     @ 20,15 GET newnote SIZE 4,55
     READ
   #ELIF _WINDOWS.AND.USENGLISH
     DEFINE WINDOW _TEMP AT 3,38 SIZE 10,76 FONT 'SYSTEM',10 TITLE 'AGREGAR'
     ACTI WINDOW _TEMP
     @ 1,3 SAY '         Test code ' GET mcodigo PICTURE '@!'
     @ 4,3 SAY '    Test description '
     @ 5,3 GET mnombre SIZE 2,25

DEFINE WINDOW _TEMP2 AT 19,14 SIZE 24,65 FONT 'SYSTEM' ,10 TITLE
   'DESCRIPTION'
     ACTI WIND _TEMP2
     @ 1,1 SAY '         Test description '
     @ 2,2 GET newnote SIZE 4,50
     READ
     DEACTIVATE WINDOW _TEMP2
     DEACTIVATE WINDOW _TEMP
     RELEASE WINDOW _TEMP2
     RELEASE WINDOW _TEMP
   #ELIF _WINDOWS.AND.SPANISH
     DEFINE WINDOW _TEMP AT 3,38 SIZE 10,76 FONT 'SYSTEM',10 TITLE 'AGREGAR'
     ACTI WINDOW _TEMP
     @ 1,3 SAY ' Código de la Prueba' GET mcodigo PICTURE '@!'
     @ 4,3 SAY ' Nombre de la Prueba'
     @ 5,3 GET mnombre SIZE 2,25

DEFINE WINDOW _TEMP2 AT 19,14 SIZE 24,65 FONT 'SYSTEM' ,10 TITLE
   'DESCRIPCION'
     ACTI WIND _TEMP2
     @ 1,1 SAY ' Descripción de la Prueba '
     @ 2,2 GET newnote SIZE 4,50
     READ
     DEACTIVATE WINDOW _TEMP2
     DEACTIVATE WINDOW _TEMP
     RELEASE WINDOW _TEMP2
     RELEASE WINDOW _TEMP
   #ENDIF SELE 3
   IF mcodigo=SPACE(6)
      DO centra WITH ' NO SE PUEDE DEJAR EN BLANCO: El Código de la prueba ', 0,
```

```
'S','S'
        STORE '' TO newexpr, expr
        LOOP
    ELSE
            STORE mcodigo+mgrupo TO busque
            SEEK busque
            IF FOUND()
                DO centra WITH ' Ese código  de fórmula  ya se  utilizó para _esa
grupo ', 0,'S','S'
                LOOP
            ENDIF
        ENDIF
        SELE 3
        STORE newexpr TO expr
        DO countrec
        IF hayerror='N'
            APPEND BLANK
            REPLACE condexpr WITH expr, condnote WITH  newnote, nombre WITH
mnombre, codigo WITH mcodigo, grupo WITH UPPER(mgrupo)
        ENDIF
    ENDIF
    SELE 3
    ?? SYS(2002)
    RESTORE SCREEN FROM condscrn
 CASE choice = "M"
    * ---Edit CONDITION.
    ?? SYS(2002,1)
    *       IF RECNO() > 0 .AND. condarea = WORKAREA
    *IF RECNO() > 0
    STORE RECNO() TO recnum
    COUNT TO numrec
    IF numrec > 0
        GO recnum
        SAVE SCREEN TO condscrn
        @ 9,7 CLEAR TO 15,64
        @ 9,7 TO 15,64
        @ 18,7 CLEAR TO 23,64
        @ 18,7 TO 23,64
        @ 9,9 SAY ' Modificar la Fórmula '
        @ 18,9 SAY ' Modificar la Descripción '
        @ 10,8 GET condexpr PICT "@!" SIZE 5,55
        @ 19,8 GET condnote SIZE 4,55
        READ
        RESTORE SCREEN FROM condscrn
        expr = condexpr
        Notes = CondNote
    ENDIF
    ?? SYS(2002)
 CASE choice = "S"
    * ---Select CONDITION.
    ?? SYS(2002,1)
    *       IF RECNO() = 0 .OR. condarea <> WORKAREA
```

```
      *IF RECNO() = 0
      STORE RECNO() TO recnum
      COUNT TO numrec
      IF numrec = 0
         expr = ""
         notas = ""
         LOOP
      ELSE
         GO recnum
         DO countrec
      ENDIF
      SELE 3
      GO condrec
      ?? SYS(2002)
   CASE choice = 'B'
      * ---Delete the record.
      *       IF RECNO() > 0 .AND. condarea = WORKAREA
      *IF RECNO() > 0
      STORE RECNO() TO recnum
      COUNT TO numrec
      IF numrec > 0
         GO recnum
         DELETE
         PACK
         *GOTO TOP
      ENDIF
   CASE choice = "L"
      * ---Clear the condition
      STORE "" TO expr, notes, newexpr, newnote
   ENDCASE
ENDDO
expr = TRIM( expr )
Notes = TRIM( Notes )
SELE &workarea
RETURN

*!*************************************************************
*!
*!     Procedure: COND_EXIT
*!
*!     Called by: TAB_COND.PRG
*!              : VCOND.PRG
*!              : VCONDG.PRG
*!
*!*************************************************************
#IF _DOS
   PROCEDURE cond_exit
   DO CASE
   CASE MROW() = 24 .AND. ( MCOL() >= 12 .AND. MCOL() <= 19 )
      * ---Edit Clicked
      choice = 'M'
      KEYBOARD CHR(23)
```

```
CASE LASTKEY() = 77 .OR. LASTKEY() = 109
   *---E Pressed
    choice = 'M'
    KEYBOARD CHR(23)
CASE MROW() = 24 .AND. ( MCOL() >= 2 .AND. MCOL() <= 7 )
   *   ---Add Clicked
    choice = 'A'
    KEYBOARD CHR(23)
CASE LASTKEY() = 65 .OR. LASTKEY() = 97
   *---A Pressed
    choice = 'A'
    KEYBOARD CHR(23)
CASE MROW() = 24 .AND. ( MCOL() >= 25 .AND. MCOL() <= 34 )
   * ---Select Clicked
    choice = 'S'
    KEYBOARD CHR(23)
CASE LASTKEY() = 83 .OR. LASTKEY() = 115 .OR. LASTKEY() = 13
   *---S Pressed
    choice = 'S'
    KEYBOARD CHR(23)
   *   CASE MROW() = 24 .AND. ( MCOL() >= 40 .AND. MCOL() <= 45 )
   *   * ---Count Clicked
   *     choice = 'C'
   *     KEYBOARD CHR(23)
   *CASE LASTKEY() = 67 .OR. LASTKEY() = 99
   *   *---C Pressed
   *     choice = 'C'
   *     KEYBOARD CHR(23)
CASE MROW() = 24 .AND. ( MCOL() >= 51 .AND. MCOL() <= 56 )
   * ---cLear Clicked
    choice = 'L'
    KEYBOARD CHR(23)
CASE LASTKEY() = 76 .OR. LASTKEY() = 108
   *---L Pressed
    choice = 'L'
    KEYBOARD CHR(23)
CASE MROW() = 24 .AND. ( MCOL() >= 62 .AND. MCOL() <= 66 )
   * ---B Clicked
    choice = 'B'
    KEYBOARD CHR(23)
CASE LASTKEY() = 66 .OR. LASTKEY() = 98
   *---B Pressed
    choice = 'B'
    KEYBOARD CHR(23)
CASE MROW() = 24 .AND. ( MCOL() >= 71 .AND. MCOL() <= 78 )
   * ---R Clicked
    KEYBOARD CHR(23)
    choice = 'R'
   *CASE LASTKEY() = 82 .OR. LASTKEY() = 114
CASE LASTKEY() = 69 .OR. LASTKEY() = 101
   *---R Pressed
    choice = 'R'
```

```
        KEYBOARD CHR(23)
    OTHERWISE
        RETURN
    ENDCASE
    RETURN

#ELSE

PROCEDURE cond_exit
    DO CASE

* For FoxPro Windows, coordinates are not single points but (x,y) ranges.
    * This required changing MROW() and MCOL(), and using TXTWIDTH because of
    * proportional spacing fonts.

CASE      MROW()      >      WROWS()-1.AND.MROW()<WROWS()      .AND.
    MCOL()>TXTW('Agrega'+SPACE(4)) .AND. MCOL() <TXTW('Agrega'+SPACE(4)+'Modifica' )
            * ---Edit Clicked
            choice = 'M'
            KEYBOARD CHR(23)
        CASE LASTKEY() = 77 .OR. LASTKEY() = 109
            *---E Pressed
            choice = 'M'
            KEYBOARD CHR(23)
        CASE      MROW()>=WROWS()-1      .AND.      MROW()      <WROWS()
    .AND.MCOL()>0.AND.MCOL()<TXTW('Agrega')
            choice = 'A'
            KEYBOARD CHR(23)
        CASE LASTKEY() = 65 .OR. LASTKEY() = 97
            *---A Pressed
            choice = 'A'
            KEYBOARD CHR(23)
        CASE      MROW()      >=WROWS()-1.AND.MROW()<=WROWS()      .AND.   (   MCOL()
    >TXTWI('Agrega'+space(4)+'Modifica'+space(4))      .AND.      MCOL()      <=
    txtwi('Agrega'+space(4)+'Modifica'+space(4)+'Selecciona') )
            * ---Select Clicked
            choice = 'S'
            KEYBOARD CHR(23)
        CASE LASTKEY() = 83 .OR. LASTKEY() = 115 .OR. LASTKEY() = 13
            *---S Pressed
            choice = 'S'
            KEYBOARD CHR(23)
        *CASE MROW() = 24 .AND. ( MCOL() >= 40 .AND. MCOL() <= 45 )
        *    * ---Count Clicked
        *    choice = 'C'
        *    KEYBOARD CHR(23)
        *CASE LASTKEY() = 67 .OR. LASTKEY() = 99
        *    *---C Pressed
        *    choice = 'C'
        *    KEYBOARD CHR(23)
        CASE      MROW()      >=WROWS()-1.AND.MROW()<=WROWS().AND.   (   MCOL()   >=
    TXTW('Agrega'+space(4)+'Modifica'+space(4)+'Selecciona'+space(4))   .AND. MCOL() <=
```

```
txtwi('Agrega'+space(4)+'Modifica'+space(4)+'Selecciona'+space(4)+'Limpia'))
    * ---cLear Clicked
      choice = 'L'
      KEYBOARD CHR(23)
   CASE LASTKEY() = 76 .OR. LASTKEY() = 108
      *---L Pressed
      choice = 'L'
      KEYBOARD CHR(23)
   CASE      MROW()>=WROWS()-1.AND.MROW()<=WROW().AND.     (     MCOL()
>TXTW('Agrega'+space(4)+'Modifica'+space(4)+'Selecciona'+space(4)+'Limpia'+space(
4    )    )  .   A   N   D .   M   C   O   L   (   )   <
txtw('Agrega'+space(4)+'Modifica'+space(4)+'Selecciona'+space(4)+'Limpia'+Space(4
)+'Borra') )
    * ---B Clicked
      choice = 'B'
      KEYBOARD CHR(23)
   CASE LASTKEY() = 66 .OR. LASTKEY() = 98
      *---B Pressed
      choice = 'B'
      KEYBOARD CHR(23)
   CASE     MROW()>=WROWS()-1.AND.MROW()<=WROW().AND.      (    MCOL()    >=
TXTWI('Agrega'+space(4)+'Modifica'+space(4)+'Selecciona'+space(4)+'Limpia'+space(
4 ) + ' B o r r a ' + S p a c e ( 4 ) )      . A N D .    M C O L ( )         <
txtwi('Agrega'+space(4)+'Modifica'+space(4)+'Selecciona'+space(4)+'Limpia'+space(
4)+'Borra'+Space(4)+'Return') )
    * ---R Clicked
      KEYBOARD CHR(23)
      choice = 'R'
   CASE LASTKEY() = 82 .OR. LASTKEY() = 114
      *---R Pressed
      choice = 'R'
      KEYBOARD CHR(23)
   OTHERWISE
      RETURN
   ENDCASE
   RETURN
ENDIF

*!*******************************************************************
*!
*!    Procedure: VEXPR
*!
*!    Called by: TAB_COND.PRG
*!             : VCOND.PRG
*!             : VCONDG.PRG
*!
*!        Calls: SHADE          (procedure in TABLA.PRG)
*!             : VCAMBIO.PRG
*!             : SAYLINE        (procedure in TABLA.PRG)
*!             : FEXPR          (procedure in TAB_COND.PRG)
*!             : MSA_PHRA       (procedure in TAB_COND.PRG)
```

```
*!                : WRAPPER         (procedure in TAB_COND.PRG)
*!                : FFIN            (procedure in VCOND.PRG)
*!                : JKEYINIT()      (function in ?)
*!                : JKEYCANC()      (function in ?)
*!
*!*******************************************************************
PROCEDURE vexpr
PARAMETER expr
PRIVATE ROW,fldnum,phrase,connector
DO shade
ROW = 20
expr = ""
phrase = ""
connector = " "
SELECT 4
* ---LOAD ARRAY
COUNT FOR codigo <> SPACE(6) TO numfilt
DECLARE fldarray[NUMFILT]
STORE 0 TO j
GO TOP
*FOR i = 1 TO RECCOUNT()
FOR i = 1 TO numfilt
    IF codigo<>SPACE(6)
        STORE j + 1 TO j
        fldarray[J] = PROPER(codigo)
    ENDIF
    SKIP
ENDFOR DECLARE lblarray[NUMFILT]
FOR i = 1 TO numfilt
    lblarray[i] = '    '+fldarray[i]
ENDFOR
SELE 3
IF numfilt = 0
    #IF USENGLISH
        DO sayline WITH WROWS()-2,"There are no fields for filter ", "C"
        WAIT 'Press    [ENTER] to continue   ' WINDOW
    #ELSE
        DO sayline WITH WROWS()-2,"No hay campos para hacer filtro", "C"
        WAIT 'Presione [ENTER] para continuar' WINDOW
    #ENDIF
    RETURN
ENDIF STORE 0 TO salec
*SET COLOR TO (ScreenAtr)
*@ 2,23,14,78 BOX "▓▓▓▓▓▓▓▓▓"
@ 2,23,14,78 BOX REPLICATE(char,9)
#IF USENGLISH
    msg = '    CREATE GROUP TESTS
#ELSE
```

```
            msg = "       CREAR PRUEBAS DE GRUPO
#ENDIF
DO sayline WITH 0, msg, "C"
fldnum = 0
@ WROWS()-3,0 CLEAR
#IF USENGLISH
    @ WROWS()-1,0 SAY "Select group on which formula will execute    "
    @ 3,3 MENU lblarray,numfilt,MIN(numfilt,10) TITLE "    Groups    " SHADOW
#ELSE
    @ WROWS()-1,0 SAY "Escoja el grupo al cual va a hacer la fórmula"
    @ 3,3 MENU lblarray,numfilt,MIN(numfilt,10) TITLE "    Grupos    " SHADOW
#ENDIF
READ MENU TO fldnum SAVE
IF fldnum = 0
    expr = ""
    RETURN
ENDIF
STORE fldarray[fldnum] TO mgrupo
DO WHILE .T.
    * ---Build Phrase with field value
    @ WROWS()-3,0 CLEAR
    #IF USENGLISH
        @ WROWS()-1,0 SAY "[Esc] to end         "
        @WROWS()-3,10 SAY "WHICH PERIOD   " GET mperi PICTURE "#99"
    #ELSE
        @ WROWS()-1,0 SAY "[Esc] para terminar"
        @WROWS()-3,10 SAY "DE CUAL PERIODO" GET mperi PICTURE "#99"
    #ENDIF
    READ
    @WROWS()-3,0

IF mperi=SPACE(3)
        STORE "0  " TO mperi
    ENDIF
    IF LASTKEY()=27
        *EXIT
    ELSE
        phrase = phrase+ "G("+ALLTRIM(mperi)+")"
    ENDIF
    ****
    STORE phrase TO expr
    * ---Display expression.
    IF "" <> expr
        DO wrapper WITH expr, 60, 15, 9, .T.
    ENDIF

* ---Build Phrase with user value
    STORE SPACE(40) TO fldget
    * ---Get field VALUE.
    IF LASTKEY()<>27
        @ WROWS()-3,0 CLEAR
        #IF USENGLISH
```

```
            @ WROWS()-3,0 SAY "Input value to compare:   " GET fldget PICT '@!'
            @ WROWS()-1,0 SAY "[Esc] to end               "
         #ELSE
            @ WROWS()-3,0 SAY "Ingrese valor a comparar: " GET fldget PICT '@!'
            @ WROWS()-1,0 SAY "[Esc] para terminar"
         #ENDIF
         READ
      ENDIF
      @ WROWS()-3,0 CLEAR
      #IF USENGLISH
         @ WROWS()-1,0 SAY "Select field or press [Escc] for manual input.
      #ELSE
         @ WROWS()-1,0 SAY "Seleccione el campo o presione [Esc] para INGRESO
MANUAL."
      #ENDIF STORE 0 TO salec
      IF fldget=SPACE(40)
         STORE 1 TO salec
         STORE ALLTRIM(phrase) TO phrase
         IF RIGHT(phrase,1)='+'
            STORE SUBSTR(phrase,1, LEN(phrase)-1 ) TO phrase
         ENDIF
      ELSE
         phrase = phrase+ "+ '" + UPPER(ALLTRIM(fldget))+"' +"
      ENDIF

*** G(+1) + "+" + g(1) + "<2"
      ****
      STORE phrase TO expr
      * ---Display expression.
      IF "" <> expr
         DO wrapper WITH expr, 60, 15, 9, .T.
      ENDIF
      IF LEN(expr) > 254
         EXIT
      ENDIF
      IF salec=1
         EXIT
      ENDIF
      IF LEN(TRIM(expr))=0
         * ---ABORT
         expr = ''
         EXIT
      ENDIF
ENDDO
SELE 3
@ 0,0
RETURN

*!*************************************************************
```

```
*!
*!      Procedure: COUNTREC
*!
*!      Called by: TAB_COND.PRG
*!               : VCOND.PRG
*!               : VCONDG.PRG
*!
*!         Calls: TYPEERROR        (procedure in VCOND.PRG)
*!
*!***************************************************************
PROCEDURE countrec
ON ERROR DO typeerror
IF choice <> "A"
   expr = condexpr
ENDIF
STORE &expr TO exprm
STORE ALLTRIM(exprm) TO texpr
*SELE &workarea
condrec = IIF(BOF() OR EOF(), 1, RECNO() )
*condcount = RECCOUNT()
STORE &texpr TO testexpr
ON ERROR
RETURN

*!***************************************************************
*!
*!      Procedure: WRAPPER
*!
*!      Called by: TAB_COND.PRG
*!               : VEXPR           (procedure in TAB_COND.PRG)
*!               : WAITWIN         (procedure in TAB_COND.PRG)
*!               : VCOND.PRG
*!               : VCONDG.PRG
*!
*!***************************************************************
PROCEDURE wrapper
* ---String Wrapper
PARAMETERS strg,WIDTH,ROW,COL,inbox
PRIVATE ROW,COL,WIDTH
STORE 1 TO linebegin
estlines = ROUND((LEN(strg)/WIDTH)* 1.20,0)
IF inbox
   * ---DRAW BOX
   #IF _DOS
     @ ROW, COL, ROW+estlines+2, COL+WIDTH+1 BOX '     '
   #ELSE
     @ ROW, COL  TO  ROW+estlines+4, COL+WIDTH+1  PEN 6,5 PATTERN 6
   #ENDIF
ENDIF
DO WHILE .T.
   * ---FIND OCCURANCE OF BLANK AT Width MARK
   lineend = WIDTH+linebegin
```

```
    IF lineend > LEN(strg)
        lineend = LEN(strg)+1
    ELSE
        curend = lineend
        DO WHILE SUBSTR(strg,lineend,1) <> ' '
            lineend = lineend -1
            IF lineend = 0
                * ---NO BLANKS FOUND TRUNCATE
                lineend = curend
                EXIT
            ENDIF
        ENDDO
    ENDIF
    *--- DISPLAY STRING
    @ ROW+1, COL+1 SAY SUBSTR(strg,linebegin,lineend-linebegin)
    *--- RESET MemVarS
    ROW = ROW + 1
    IF lineend > LEN(strg) .OR. (SUBSTR(strg,lineend,1) = SPACE(1))
        linebegin = lineend + 1
    ELSE
        linebegin = lineend
    ENDIF
    IF linebegin > LEN(strg)
        EXIT
    ENDIF
ENDDO
RETURN

*!***********************************************************
*!
*!      Procedure: TYPEERROR
*!
*!      Called by: COUNTREC          (procedure in TAB_COND.PRG)
*!               : VAPL.PRG
*!
*!      Calls: CENTRA                (procedure in TABLA.PRG)
*!           : RETMAST               (procedure in VAPL.PRG)
*!
*!***********************************************************
PROCEDURE typeerror
SAVE SCRE TO panta
DO centra WITH 'HAY UN ERROR EN LA EXPRESION' ,WROWS()-6,'S','S'
STORE 'S' TO hayerror
REST SCRE FROM panta
RETURN

*!***********************************************************
*!
*!      Function: G()
*!
*!***********************************************************
```

```
FUNCTION G
PARAMETER per
STORE LTRIM(STR(periodo + per,3,0)) TO perrel
STORE 'Tabla.p'+perrel TO pper
RETURN pper

*: EOF: VCONDG.PRG
*:****************************************************************
*:****************************************************************
*                      ============
*                      8. VDUP.PRG
*                      ============
*
*                   ADD/DUPLICATE A LINE TEST
*:****************************************************************
*:
*: Procedure file: VDUP.PRG
*:
*:   Procs & Fncts: FIN
*:
*:          Set by: VACTI.PRG
*:
*:           Calls: FIN          (procedure in VDUP.PRG)
*:                : NVL()        (function  in TABLA.PRG)
*:                : CENTRA       (procedure in TABLA.PRG)
*:
*:       Documented 05/01/93 at 23:01          FoxDoc  version 2.10f
*:****************************************************************

* VDUP - This module duplicates a line formula so as to modify it later
* This module generates a line formula by copying an existing line formula,
* so as to allow the user to modify it later. This option is particularly
* useful for those line formulas that need to be assigned to more than one
* data item in the data database.

#DEFINE USENGLISH .T.
#DEFINE SPANISH .F.

#IF _WINDOWS.AND.USENGLISH
    DEFINE WINDOW _duplicar  FROM 0,0 TO  12,WCOLS() TITLE 'DUPLICATE   TEST' FLOAT ZOOM FONT 'SYSTEM',10
#ELIF _WINDOWS.AND.SPANISH
    DEFINE WINDOW _duplicar FROM 0,0 TO 12,WCOLS()  TITLE 'DUPLICAR PRUEBA' FLOAT ZOOM FONT 'SYSTEM',10
ENDIF STORE SPACE(12) TO mlinea, mlineal
STORE SPACE(6) TO mcodigo
STORE SPACE(50) TO mnombre
CLEAR
```

```
SET CURSOR ON
SELE 3
SET ORDER TO 1
DO WHILE .T.
    SET COLOR TO &screenatr
    ON KEY LABEL esc DO fin
    #IF _DOS.AND.USENGLISH
        @ 2,30 SAY 'TEST DUPLICATOR'
        @ 3,0 TO 18,79
        @ 4,1 SAY '           Test code ' GET mcodigo PICTURE '@!' VALID
nvl(25,'prueba',2,' ',2,0,' Name ', 'codigo+" "+nombre+" "+linea+" "+grupo')
        @ 5,5 SAY '          Apply to line ' GET mlinea PICTURE '@!' VALID
nvl(38,'tabla',2,' ',2,0,' Name ','linea+" "+nombre')
        @ 6,5 SAY '      Duplicate to line ' GET mlinea1 PICTURE '@!' VALID
nvl(38,'tabla',2,' ',2,0,' Name ','linea+" "+nombre')
        @ 22,27 SAY 'Esc to exit'
    #ELIF _DOS.AND.SPANISH
        @ 2,30 SAY 'DUPLICADOR DE FORMULA'
        @ 3,0 TO 18,79
        @ 4,1   SAY   ' Código  de  Prueba' GET mcodigo  PICTURE  '@!'   VALID
nvl(25,'prueba',2,' ',2,0,'NOMBRE', 'codigo+" "+nombre+" "+linea+" "+grupo')
        @ 5,5 SAY ' Aplicada  a la Linea' GET mlinea PICTURE '@!'   VALID
nvl(38,'tabla',2,' ',2,0,'NOMBRE','linea+" "+nombre')
        @ 6,5 SAY ' Duplicar  a la Linea' GET mlinea1 PICTURE '@!' VALID
nvl(38,'tabla',2,' ',2,0,'NOMBRE','linea+" "+nombre')
        @ 22,27 SAY 'Esc para regresar al menu'
    #ENDIF
    #IF _DOS
        READ
    #ENDIF
    #IF _WINDOWS .AND. USENGLISH
        @ WROWS()-1,_cc('Esc to exit            ' ) SAY 'Esc to exit ACTI WINDOW _duplicar
        @ 2,_cc('TEST DUPLICATOR       ' ) SAY 'TEST DUPLICATOR      ' STYLE 'BU'
        @ 4,1 SAY '           Test code ' GET mcodigo PICTURE '@!' VALID
nvl(25,'prueba',2,' ',2,0,' Name ', 'codigo+" "+nombre+" "+linea+" "+grupo')
        @ 5,11 SAY '         Apply to line ' GET mlinea PICTURE '@!' VALID
nvl(38,'tabla',2,' ',2,0,' Name ','linea+" "+nombre')
        @ 6,11 SAY '      Duplicate to line ' GET mlinea1 PICTURE '@!' VALID
nvl(38,'tabla',2,' ',2,0,' Name ','linea+" "+nombre')
    #ELIF _WINDOWS.AND.SPANISH
        @ WROWS()-1,_cc('Esc para regresar al menu' ) SAY 'Esc para regresar  al
menu'
        ACTI WINDOW _duplicar
        @ 2,_cc('DUPLICADOR DE FORMULA' ) SAY 'DUPLICADOR DE FORMULA' STYLE 'BU'
        @ 4,1   SAY   ' Código  de  Prueba' GET mcodigo  PICTURE  '@!'   VALID
nvl(25,'prueba',2,' ',2,0,'NOMBRE', 'codigo+" "+nombre+" "+linea+" "+grupo')
        @ 5,11 SAY ' Aplicada a la Linea' GET mlinea PICTURE '@!'   VALID
nvl(38,'tabla',2,' ',2,0,'NOMBRE','linea+" "+nombre')
        @ 6,11 SAY ' Duplicar  a la Linea' GET mlinea1 PICTURE '@!' VALID
nvl(38,'tabla',2,' ',2,0,'NOMBRE','linea+" "+nombre')
```

```
ENDIF
#IF _WINDOWS
    READ
    DEACTI WINDOW _duplicar
    RELEASE WINDOW _duplicar
#ENDIF
ON KEY LABEL esc
IF mcodigo=SPACE(6) OR mlinea=SPACE(12) OR mlinea1=SPACE(12)
    EXIT
ENDIF
STORE mcodigo+mlinea1 TO busque
SEEK busque
STORE 'S' TO unica
IF FOUND()
    #IF USENGLISH
        DO centra WITH 'This test  code already exists  for line to  duplicate
to',WROWS()-1,'N','N'
    #ELSE
        DO  centra WITH  'Ese  código  de prueba  ya  existe  para la  línea a
duplicar',WROWS()-1,'N','N'
    #ENDIF
    STORE 'N' TO unica
ENDIF
STORE mcodigo+mlinea TO busque
SEEK busque
IF NOT FOUND()
    #IF USENGLISH
        DO centra  WITH 'This test  code already  exists for line  to duplicate
to',WROWS()-1,'N','N'
    #ELSE
        DO  centra WITH  'Ese  código  de prueba  ya  existe  para la  línea a
duplicar',WROWS()-1,'N','N'
    #ENDIF
    LOOP
ENDIF
STORE 'N' TO son
STORE condexpr TO mexpr
STORE condnote TO mnote
STORE nombre TO mnombre
#IF USENGLISH
    @ 8,11 SAY '       Name' GET mnombre
    @ 9,11 SAY 'Description' GET mnote SIZE 4,50
    @14,11 SAY '    Formula' GET mexpr SIZE 4,50
#ELSE
    @ 8,11 SAY '     Nombre' GET mnombre
    @ 9,11 SAY 'Descripción' GET mnote SIZE 4,50
    @14,11 SAY '    Formula' GET mexpr SIZE 4,50
#ENDIF
CLEAR GETS
IF unica='S'
    #IF USENGLISH
        @ 8,11 SAY '       Name' GET mnombre
```

```
            @ 9,11 SAY 'Description' GET mnote SIZE 4,50
            @14,11 SAY '    Formula' GET mexpr SIZE 4,50
            @19,27 SAY 'Will  duplicate?   (Y/N)' GET son PICTURE '!' VALID  son $
'YN'
        #ELSE
            @ 8,11 SAY '     Nombre' GET mnombre
            @ 9,11 SAY 'Descripción' GET mnote SIZE 4,50
            @14,11 SAY '    Formula' GET mexpr SIZE 4,50
            @19,27 SAY 'Quiere duplicarla (S/N)' GET  son PICTURE '!' VALID  son $
'SN'
        #ENDIF
        READ
        IF son='N'
            LOOP
        ENDIF
        APPE BLANK
        REPLACE nombre WITH mnombre,;
            condexpr WITH mexpr,;
            condnote WITH mnote,;
            linea WITH mlinea1,;
            codigo WITH mcodigo
    ELSE
        READ
    ENDIF
    @24,0
ENDDO
SET CURSOR OFF
SELE &dbfarea
RETURN

*!***********************************************************
*!
*!      Procedure: FIN
*!
*!      Called by: VDUP.PRG
*!               : VAPL.PRG
*!               : VMAN.PRG
*!               : VMANR.PRG
*!               : VSUMM.PRG
*!               : RBROW              (procedure in VRESU.PRG)
*!
*!***********************************************************
PROCEDURE fin
    ON KEY LABEL esc
    STORE SPACE(6) TO mcodigo
    KEYB CHR(27)
    RETURN

*!***********************************************************
*!
*!      Function:  _cc
```

```
*!
*!**********************************************************************

#IF _WINDOWS
    ** Function _cc returns column position where a particular message
    ** should be placed in order to center it in a window FUNCTION _cc
        PARAMETERS mensaje                              && Message
to be centered PRIVATE fname,FSIZE,fstyle ,COL                 && Font and style fname=WFONT(1,WOUTPUT())
        FSIZE=WFONT(2,WOUTPUT())
        fstyle=WFONT(3,WOUTPUT())

COL=(WCOLS()-TXTWI(mensaje,fname,FSIZE,fstyle)*FONTMETRIC(6,fname,FSIZE,fstyle)/F
ONTMETRIC(6))/2
        RETURN COL

#ENDIF

*: EOF: VDUP.PRG

*:**********************************************************************
*:**********************************************************************
*                       ===========
*                       9. VAPL.PRG
*                       ===========
*
*                       APPLY LINE TESTS
*:**********************************************************************
*:
*: Procedure file: VAPL.PRG
*:
*:   Procs & Fncts: VVPER
*:              : RETMAST
*:
*:         Set by: VACTI.PRG
*:
*:          Calls: FIN            (procedure in VDUP.PRG)
*:              : VVPER           (procedure in VAPL.PRG)
*:              : CENTRA          (procedure in TABLA.PRG)
*:              : TYPEERROR       (procedure in VCOND.PRG)
*:              : VAPLG.PRG
*:              : VAPLR.PRG
*:
*:     Documented 05/01/93 at 23:02       FoxDoc  version 2.10f
*:**********************************************************************
** este modulo permite aplicar las formulas a la tabla de datos de un periodo
```

```
especifico
#DEFINE USENGLISH .T.
#DEFINE SPANISH .F.
*SAVE SCRE TO panta
SELE 2
SET ORDER TO 1
SELE 3
STORE 0 TO periodo
CLEAR
DO WHILE .T.
    SET COLOR TO &screenatr
    ON KEY LABEL esc DO fin
    SET CURSOR ON
    STORE 0 TO periodo,periodo1
    @3,0 TO 8,79
    #IF USENGLISH
        @2,20 SAY '       FORMULAS APPLICATION         '
        @5,20 SAY 'First  period to apply formulas        ' GET  periodo PICTURE
'99' VALID vvper(periodo) RANGE 0,60
        @6,20 SAY 'Last   period to apply formulas        ' GET periodo1 PICTURE
'99' VALID vvper(periodo1) RANGE 0,60
        @ 22,28 SAY 'Esc to exit            '
    #ELSE
        @2,20 SAY '       APLICACION DE LAS FORMULAS'
        @5,20 SAY  'Desde cual período aplica  las fórmulas' GET periodo  PICTURE
'99' VALID vvper(periodo) RANGE 0,60
        @6,20 SAY  'Hasta cual período aplica  las fórmulas' GET periodo1 PICTURE
'99' VALID vvper(periodo1) RANGE 0,60
        @ 22,28 SAY 'Esc para regresar al menu'
    #ENDIF
    READ
    ON KEY LABEL esc
    @22,0
    SET CURSOR OFF
    IF periodo=0
        RETURN
    ENDIF
    DO WHILE periodo<=periodo1
        @12,0 CLEAR
        #IF USENGLISH
            @12,20 SAY 'Applying formulas to period    --------> '+STR(periodo,2,0)
        #ELSE
            @12,20 SAY 'Aplicando fórmulas al período --------> '+STR(periodo,2,0)
        #ENDIF
        STORE '"P'+ALLTRIM(STR(periodo,2,0))+'"' TO busque
        SELE 1
        IF TYPE(&busque)<>'N'
            #IF USENGLISH
                DO centra WITH 'This period isn't in the data table
',24,'S','S'
            #ELSE
                DO centra WITH 'Ese período no esta en la tabla de datos
```

```
´,24,´S´,´S´
            #ENDIF
            RETURN
        ENDIF
        @9,0 SAY ´´
        SELE 11
        SET TALK ON
        DELE ALL FOR nper=periodo
        SET TALK OFF
        PACK
        @9,0 SAY ´´
        SELE 12
        SET TALK ON
        DELE ALL FOR nper=periodo
        SET TALK OFF
        PACK
        @9,0 SAY ´´
        SELE 2
        SET TALK ON
        DELE ALL FOR nper=periodo
        SET TALK OFF
        PACK
        SELE 3
        SET FILTER TO grupo=SPACE(6)
        *set order to 0
        GO TOP
        ON ERROR DO typeerror
        STORE 0 TO numrec1
        STORE 0 TO ERROR
        @9,0 SAY ´´
        SCAN
            STORE RECNO() TO numrec
            STORE numrec1+1 TO numrec1
            #IF USENGLISH
                @14,10  SAY ´Processing  ´+STR(numrec1,8,0)+´ ----> Corresponds to
indiv.record ´++LTRIM(STR(numrec,8,0))
            #ELSE
                @14,10  SAY ´Procesando  ´+STR(numrec1,8,0)+´ ----> Corresponde al
record Indi. ´++LTRIM(STR(numrec,8,0))
            #ENDIF
            STORE ALLTRIM(condexpr) TO mcond
            STORE linea+codigo+STR(periodo,2,0) TO busque
            STORE clase1 TO mclase1
            STORE clase2 TO mclase2
            STORE clase3 TO mclase3
            STORE linea TO mlinea
            STORE codigo TO mcodigo
            STORE nombre TO mnombre
            IF &mcond
                IF ERROR=0
                    IF SEEK(busque,2)
                    ELSE
```

```
                        SELE 2
                        APPE BLANK
                        REPL linea WITH mlinea,;
                            prueba WITH mcodigo,;
                            nper WITH periodo,;
                            clase1 WITH mclase1,;
                            clase2 WITH mclase2,;
                            clase3 WITH mclase3
                    ENDIF
                ELSE
                    STORE 0 TO ERROR
                ENDIF
            ENDIF
            SELE 3
            GO numrec
        ENDSCAN
        SET ORDER TO 1
        ON ERROR
        *@17,0 CLEAR
        IF USENGLISH
            DO centra WITH ' All individual  tests have  already been applied  to
period  # '+LTRIM(STR(periodo,3,0)),23,'N','N'
        #END      #ELSE
            DO centra WITH ' Ya  se aplicaron todas  las formulas  individuales al
período # '+LTRIM(STR(periodo,3,0)),23,'N','N'
        #ENDIF
        DO vaplg
        DO vaplr
        STORE periodo+1 TO periodo
    ENDDO
ENDDO
RETURN

*!*************************************************************
*!
*!      Procedure: VVPER
*!
*!      Called by: VAPL.PRG
*!
*!*************************************************************
PROCEDURE vvper
    PARAMETER npar
    IF npar=0
        @ROW(), 63 SAY SPACE(10)
    ELSE
        @ROW(), 63 SAY LTRIM(fldarray[NPAR])
    ENDIF
    RETURN

*!*************************************************************
    *!
```

```
*!        Function: F()
*!
*!           Calls: CENTRA           (procedure in TABLA.PRG)
*!                : RETMAST          (procedure in VAPL.PRG)
*!
*!****************************************************************
FUNCTION F
    PARAMETER par, per
    IF PARAMETERS()<2
       STORE 0 TO per
    ENDIF
    ** modulo para convertir la etiqueta al valor asignado
    ** F('primera',1) / F('quinta',2) > 2 utilizando la base TABLA
    IF SEEK(par,1)
       STORE LTRIM(STR(periodo + per,3,0)) TO perrel
       STORE 'Tabla.p'+perrel TO pper
       STORE &pper TO gus
       RETURN &pper
    ELSE
       @18,0 TO 24,79
       #IF USENGLISH
          @21,5 SAY 'Test code        = ' + mcodigo
          @22,5 SAY 'Data record      = ' + mlinea
          @23,5 SAY 'Test description = '+ mnombre
          DO centra WITH ' ERROR IN FORMULA EXPRESSION:   THIS LINE DOESN'T EXIST
       ' ,17,'N','S'
       #ELSE
          @21,5 SAY 'Código de la Prueba=' + mcodigo
          @22,5 SAY 'Línea que se Aplica=' + mlinea
          @23,5 SAY 'Nombre la la Prueba='+ mnombre
          DO centra WITH '  HAY UN ERROR EN LA EXPRESION  DE LA FORMULA, LA LINEA
NO EXISTE ' ,17,'N','S'
       #ENDIF DO retmast
       RETURN 0
    ENDIF

*!****************************************************************
*!
*!       Procedure: RETMAST
*!
*!       Called by: F()              (function  in VCOND.PRG)
*!                : TYPEERROR        (procedure in VCOND.PRG)
*!                : VAPLG.PRG
*!                : TYPEERROR1       (procedure in VAPLG.PRG)
*!
*!           Calls: SETDBF           (procedure in VMENU.PRG)
*!
*!****************************************************************
PROCEDURE retmast
```

```
    STORE 'S' TO son
    STORE 1 TO ERROR
    SET CURSOR ON
    #IF USENGLISH
        @24,14 SAY 'End formula application procedure? (Y/N)'       ' GET son
PICTURE '!' VALID son $'YN'
    #ELSE
        @24,14 SAY 'Quiere finalizar la aplicación de fórmulas (S/N)' GET son
PICTURE '!' VALID son $'SN'
    #ENDIF
    READ
    SET CURSOR OFF
    @18,0 TO 24,79
    IF son='S'
        ON ERROR
        REST SCRE FROM panta
        DO setdbf
        RETURN TO tabla
    ENDIF
    RETURN

*!**************************************************************************
    *!
    *!      Procedure: TYPEERROR
    *!
    *!      Called by: COUNTREC          (procedure in TAB_COND.PRG)
    *!               : VAPL.PRG
    *!
    *!      Calls: CENTRA                (procedure in TABLA.PRG)
    *!           : RETMAST               (procedure in VAPL.PRG)
    *!
*!**************************************************************************
PROCEDURE typeerror
    SELE 1
    STORE 1 TO ERROR
    DO centra WITH ' HAY UN ERROR EN LA EXPRESION DE LA FORMULA ' ,17,'N','N'
    @18,0 CLEAR
    @18,0 TO 24,79
    #IF USENGLISH
        @19,5 SAY mcond SIZE 2,70 COLOR GR+/B
        @21,5 SAY 'Test code        = ' + mcodigo
        @22,5 SAY 'Data line        = ' + mlinea
        @23,5 SAY 'Test description = '+ mnombre
    #ELSE
        @19,5 SAY mcond SIZE 2,70 COLOR GR+/B
        @21,5 SAY 'Código de la Prueba=' + mcodigo
        @22,5 SAY 'Línea que se Aplica=' + mlinea
        @23,5 SAY 'Nombre la la Prueba='+ mnombre
    #ENDIF
```

```
      DO retmast
RETURN

*!***************************************************************
*!
*!     Procedure: FIN
*!
*!     Called by: VDUP.PRG
*!              : VAPL.PRG
*!              : VMAN.PRG
*!              : VMANR.PRG
*!              : VSUMM.PRG
*!              : RBROW              (procedure in VRESU.PRG)
*!
*!***************************************************************
PROCEDURE fin
    ON KEY LABEL esc
    STORE 0 TO periodo, periodo1
    KEYB CHR(27)
RETURN

*: EOF: VAPL.PRG

*:***************************************************************
*:***************************************************************
*                        =============
*                        10. VAPLG.PRG
*                        =============
*
*                        APPLY GROUP TESTS
*:***************************************************************
*:
*: Procedure file: VAPLG.PRG
*:
*:   Procs & Fncts: TYPEERROR1
*:
*:         Set by: VAPL.PRG
*:
*:          Calls: TYPEERROR1        (procedure in VAPLG.PRG)
*:               : CENTRA            (procedure in TABLA.PRG)
*:               : RETMAST           (procedure in VAPL.PRG)
*:
*:      Documented 05/01/93 at 23:02          FoxDoc  version 2.10f
*:***************************************************************
** este modulo aplica las formulas de grupo
*STORE 3 TO periodo
#DEFINE USENGLISH .T.
#DEFINE SPANISH .F.
STORE 0 TO ERROR
SELE 5            && detalle del grupo
SET ORDER TO 1
```

```
SELE 3              && formulas de grupo
SET ORDER TO 1
SET FILTER TO grupo<>SPACE(6)
GO TOP
SCAN FOR grupo<>SPACE(6)
    STORE clase1 TO mclase1
    STORE clase2 TO mclase2
    STORE clase3 TO mclase3
    STORE grupo TO mgrupo
    STORE codigo TO mcodigo
    STORE nombre TO mnombre
    STORE SPACE(12) TO mlinea
    STORE '' TO cond_
    STORE TRIM(condexpr) TO mcond_
    ON ERROR DO typeerror1
    STORE EVAL(mcond_) TO cond
    ON ERROR
    STORE RECNO() TO numrec && RECORD EN FORMULAS
    IF ERROR=1
        STORE 0 TO ERROR
        LOOP
    ENDIF
    SELE 5
    SEEK mgrupo
    IF FOUND()
        STORE RECNO() TO numrec1 && RECORD EN DEFINICION DE GRUPOS
        #IF USENGLISH
            @15,10 SAY 'Processing '+STR(numrec1,8,0)+' ----> Corresponds to group record '++LTRIM(STR(numrec,8,0))
        #ELSE
            @15,10 SAY 'Procesando '+STR(numrec1,8,0)+' ----> Corresponde al record Grupo '++LTRIM(STR(numrec,8,0))
        #ENDIF
        SCAN WHILE grupo = mgrupo
            @15,68 SAY RECNO()
            STORE linea TO mlinea
            SELE 1
            SEEK mlinea
            IF FOUND()
                ON ERROR DO typeerror1
                IF &cond
                    IF ERROR=1
                        STORE 0 TO ERROR
                        SELE 5
                        LOOP
                    ENDIF
                    ON ERROR
                    STORE mlinea+mcodigo+STR(periodo,2,0) TO busque
                    IF SEEK(busque,2)
                    ELSE
                        SELE 2
                        APPE BLANK
```

```
                    REPL linea WITH mlinea, prueba WITH mcodigo, nper WITH
periodo, clase1 WITH mclase1, clase2 WITH mclase2, clase3 WITH mclase3
                ENDIF
            ELSE
                *DO    CENTRA    WITH    ´    NO    ES    VERDADERA    LA    AFIRMACION
´+COND,24,´S´,´S´
            ENDIF
        ELSE
            DO centra WITH ´ NO SE ENCONTRO LA LINEA ´+mlinea,17,´N´,´N´
            @18,0 TO 24,79
            @20,5 SAY SUBSTR(mcond_,1,70) COLOR GR+/B
            #IF USENGLISH
                @21,5 SAY ´Test code         = ´ + mcodigo
                @22,5 SAY ´Group             = ´ + mgrupo
                IF mlinea<>SPACE(12)
                    @22,40 SAY ´Line =´ + mlinea
                ENDIF
                @23,5 SAY ´Test description   =´ + mnombre
            #ELSE
                @21,5 SAY ´Código de la Prueba=´ + mcodigo
                @22,5 SAY ´Grupo que se Aplica=´ + mgrupo
                IF mlinea<>SPACE(12)
                    @22,40 SAY ´Linea=´ + mlinea
                ENDIF
                @23,5 SAY ´Nombre la la Prueba=´ + mnombre
            #ENDIF
            DO retmast
        ENDIF
        SELE 5
    ENDSCAN
    GO numrec1
ELSE
    #IF USENGLISH
        DO centra WITH ´ NO LINES WERE FOUND FOR THIS GROUP            =
´+mgrupo,17,´S´,´S´
    #ELSE
        DO   centra   WITH   ´   NO   SE   ENCONTRO   EL   GRUPO   LINEAS   DEL
GRUPO=´+mgrupo,17,´S´,´S´
    #ENDIF
    DO retmast
ENDIF
SELE 3
GO numrec
ENDSCAN
DO centra WITH ´ Ya se aplicaron las Pruebas de Grupo ´, 24,´N´,´N´
*@15,0 clear
RETURN

*!*******************************************************************
*!
*!      Procedure: TYPEERROR1
*!
```

```
*!      Called by: VAPLG.PRG
*!
*!         Calls: CENTRA           (procedure in TABLA.PRG)
*!              : RETMAST          (procedure in VAPL.PRG)
*!
*!*****************************************************************
PROCEDURE typeerror1
    DO centra WITH ' HAY UN ERROR EN LA EXPRESION DE LA FORMULA ' ,17,'N','N'
    STORE 1 TO ERROR
    @18,0 CLEAR
    @18,0 TO 24,79
    #IF USENGLISH
        @19,5 SAY mcond_ SIZE 2,70 COLOR GR+/B
        @21,5 SAY 'Test code          = ' + mcodigo
        @22,5 SAY 'Group              = ' + mgrupo
        IF mlinea<>SPACE(12)
            @22,40 SAY 'Linea=' + mlinea
        ELSE
            @19, 5 SAY condexpr SIZE 2,70 COLOR GR+/B
        ENDIF
        @23,5 SAY 'Nombre la la Prueba=' + mnombre
    #ELSE
        @19,5 SAY mcond_ SIZE 2,70 COLOR GR+/B
        @21,5 SAY 'Código de la Prueba=' + mcodigo
        @22,5 SAY 'Grupo que se Aplica=' + mgrupo
        IF mlinea<>SPACE(12)
            @22,40 SAY 'Linea=' + mlinea
        ELSE
            @19, 5 SAY condexpr SIZE 2,70 COLOR GR+/B
        ENDIF
        @23,5 SAY 'Nombre la la Prueba=' + mnombre
    #ENDIF
    DO retmast
RETURN

*!*****************************************************************
*!
*!       Function: G()
*!
*!*****************************************************************
FUNCTION G
    PARAMETER per
    STORE LTRIM(STR(periodo + per,3,0)) TO perrel
    STORE 'Tabla.p'+perrel TO pper
    RETURN pper

*: EOF: VAPLG.PRG

*:*****************************************************************
*:*****************************************************************
*                        =============
*                        11. VAPLR.PRG
```

```
*                          ==============
*
*                          APPLY SUMMARY TESTS
*:****************************************************************
*:
*:      Program: VAPLR.PRG
*:
*:      Called by: VAPL.PRG
*:
*:         Calls: CENTRA           (procedure in TABLA.PRG)
*:
*:         Uses: TEMP.DBF
*:
*:****************************************************************

* APLR - Apply summary definitions and creates summary diagnostics
*
* This module applies summary definitions in files PRESUMEN and DRESUMEN.
* This module is executed immediately after the VAPL and VAPLG modules.
* Module APLR reads the diagnostics just generated by VAPL and VAPLG, and
* compares them with the summary definitions in files PRESUMEN and DRESUMEN.
* It finally writes results to files PRRESULT and DRRESULT.
*****************************************************************
#DEFINE USENGLISH .T.
#DEFINE SPANISH .F.

SELE 2          && Summary diagnostics definitions database file
SET ORDER TO 2
SET FILTER TO nper=periodo
SELE 9          && Summary diagnostics definitions database file
SET ORDER TO 1
SELE 10         && Summary diagnostics elements database file
SET ORDER TO 1
SELE 9
GO TOP
STORE 0 TO numrec
SCAN
    STORE numrec+1 TO numrec
    STORE analisis TO manalisis
    STORE pmin TO mpmin
    STORE RECNO() TO numrec9
    #IF USENGLISH
        @16,10 SAY `Processing `+STR(numrec,8,0)+`  ----> Corresponde al record
Resum `++LTRIM(STR(numrec9,8,0))
    #ELSE
        @16,10 SAY `Procesando `+STR(numrec,8,0)+`  ----> Corresponde al record
Resum `++LTRIM(STR(numrec9,8,0))
    #ENDIF
    CREATE CURSOR gus (prueba C(6),;
        analisis C(6),;
        nper N(2),;
        positiva C(1) )
```

```
    STORE 0 TO posit
    SELE 10
    SEEK manalisis
    SCAN FOR analisis=manalisis
        STORE RECNO() TO numrec10
        STORE prueba TO mprueba
        SELE 2
        IF SEEK(mprueba,2)
            SELE gus
            APPE BLANK
            REPLACE  prueba  WITH  mprueba,analisis  WITH  manalisis,nper  WITH
periodo,positiva WITH 'P'
            STORE posit + 1 TO posit
        ELSE
            SELE gus
            APPE BLANK
            REPLACE prueba WITH mprueba,analisis WITH manalisis,nper WITH periodo
        ENDIF
        SELE 10
        GO numrec10
    ENDSCAN
    IF posit>=mpmin
        SELE 11
        APPE BLANK
        REPLACE analisis WITH manalisis,nper WITH periodo
        SELE gus
        COPY TO temp
        USE
        SELE 12
        APPE FROM temp
    ELSE
        SELE gus
        USE
    ENDIF
    SELE 9
    GO numrec9
ENDSCAN
#IF USENGLISH
    DO centra WITH ' All summary tests have been applied ', 24,'N','N'
#ELSE
    DO centra WITH ' Ya se aplicaron las Pruebas Resumen ', 24,'N','N'
#ENDIF
SELE 2
SET ORDER TO 1
SET FILTER TO
RETURN
*: EOF: VAPLR.PRG

*:****************************************************************
*:****************************************************************
*                          ============
*.                         12. VMAN.PRG
```

```
*                      ============
*
*                      DATA BROWSE VIEW
*:********************************************************************
*:
*: Procedure file: VMAN.PRG
*:
*:  Procs & Fncts: FIN3
*:              : CAMBIA
*:              : CMESES()
*:              : KEY
*:              : PPER()
*:              : VPRUEBA()
*:
*:        Set by: VACTI.PRG
*:
*:         Calls: FIN3               (procedure in VMAN.PRG)
*:              : NVL()              (function  in TABLA.PRG)
*:              : TAB_AREA           (procedure in TAB_PROC.PRG)
*:              : CENTRA             (procedure in TABLA.PRG)
*:              : FIN                (procedure in VDUP.PRG)
*:              : CAMBIA             (procedure in VMAN.PRG)
*:              : CMESES()           (function  in VMAN.PRG)
*:              : KEY                (procedure in VMAN.PRG)
*:              : PPER()             (function  in VMAN.PRG)
*:              : VPRUEBA()          (function  in VMAN.PRG)
*:
*:    Documented 05/01/93 at 23:02           FoxDoc   version 2.10f
*:********************************************************************

* VMAN   - Data browse view
*
* This module executes the data browse view command option from the
* Diagnostics menu.  Steps:
*
*
* 1)  Setup screen options
*
* 2) Activate files:
*    Select 1 (file: TABLA.DBF)
*    Select 2 (file: RESULT.DBF)
*    Select 3 (file: PRUEBA.DBF)
*
* 3) Define three windows in screen:
*
*    1. tabla - Upper half; will contain selected data from file Select 1:
*    TABLA (the data database file)
*    2. result - Lower half; will contain selected data from file Select 2:
*    RESULT (the diagnostics database file).
*    3. result1 - May be used instead of 'result'. It occupies only 25% of
*    the total screen area, at the lower left corner. When active, contains
```

```
*    selected data from file Select 2: RESULT (the diagnostics database file).
*    At the right of window result1, the program shows related results of
*    prueba.dbf, indexed by the test indicator.
*
*    Note: Window 'revisar' should be ignored when studying the algorythm.
*    This is created for color background.
*
* 4) Present dialog box to user, for filter selection
* Accept user selected filters on fields:  linea, prueba, period, clase1,2,3
*
* 5) Show first coordinated browses view.
*
* First coordinated browses view:
* - Cursor control is in WINDOW 'tabla' (file TABLA.PRG).
* - Window 'result' is also active (file RESULT.PRG).
*
* 6) If user presses F5, show second coordinated browses view.
*
* Second coordinated browses view:
* - Cursor control is in WINDOW 'result' (file RESULT.PRG).
* - Window 'tabla' is also active (file TABLA.PRG).
* - Coordinated diagnostics descriptions (from file PRUEBA.PRG) also shows
* at the right of window 'result1'
*
* 7) If user presses F5, show first coordinated browses view and goto step 6
* or if user presses F6, show third coordinated browse view and goto step 8
* F6 option allows user to find all other data with the same diagnostics.
*
* Third coordinated browses view:
* - Cursor control is in WINDOW 'result1' (file RESULT.PRG).
* - Window 'tabla' is also active (file TABLA.PRG).
* - Coordinated diagnostics descriptions (from file PRUEBA.PRG) also shows
* at the right of window 'result1'
*
* 8) If user presses F6, show second coordinated browse views
* or if user presses F5, show first coordinated browses view and goto step 6
*
* General notes:
* a) F5 and F6 are both switches.
* b) If the user presses Escape twice at any time, the procedure ends.

* ------------------         Procedure BEGIN
#DEFINE USENGLISH .T.
#DEFINE SPANISH .F.
*STORE 'E' TO tcp
SET SAFETY OFF
SET TALK OFF
SET FUNCTION 2 TO ""
SET FUNCTION 3 TO ""
SET FUNCTION 4 TO ""
SET FUNCTION 5 TO ""
SET FUNCTION 6 TO ""
```

```
SET FUNCTION 7 TO ""
SET FUNCTION 8 TO ""
SET FUNCTION 9 TO ""
SET FUNCTION 10 TO ""
CLEAR
*CLEAR ALL
SELE 1
*USE tabla
*INDEX ON linea TO gus COMP
SET ORDER TO 1
@23,0 CLEAR
@22,0 SAY ''
CLEAR
SELE 2
*USE result
*INDEX ON linea TO result
*INDEX ON prueba TO resul2
*SET INDEX TO result, resul2
SET ORDER TO 1
STORE 0 TO recnum
SELE 3
*USE prueba
*INDEX ON codigo TO prueba
SET ORDER TO 1
#IF USENGLISH
    STORE 'DATA TABLE' TO tit
    STORE 'DIAGNOSTICS' TO tit2
    STORE 'DIAGNOSTICS' TO tit3
#ELSE
    STORE 'TABLA DE DATOS' TO tit
    STORE 'DIAGNOSTICOS' TO tit2
    STORE 'DIAGNOSTICOS' TO tit3
ENDIF STORE WROWS()-2 TO rows
STORE WROWS()-1 -INT(WROWS()/3) TO row3
STORE row3 - 2 TO row2
#IF _DOS
    DEFI WIND revisar FROM 5,5 TO 13,74 COLOR SCHE 10 SHADOW
    DEFI WIND tabla FROM 0,0 TO row2,78 ZOOM PANEL COLOR SCHE 10 TITL tit SHADOW
    DEFI WIND result FROM row3,0 TO rows,78 PANEL COLOR SCHE 10 TITL tit2
    DEFI WIND result1 FROM row3,0 TO rows,47 ZOOM PANEL COLOR SCHE 10 TITL tit3
#ELSE                    && MS Windows version
    DEFI WIND  revisar SYSTEM FROM 7,12 TO  15,WCOLS()-13 TITLE "RESULTADOS DE LAS
PRUEBAS" COLOR RGB(0,0,0,192,192,192) FONT 'SYSTEM',10
    DEFI WIND tabla FROM 0,0 TO 19,WCOL() ZOOM PANEL COLOR SCHE 10 TITL tit SHADOW
FONT 'ARIAL',8
    DEFI  WIND result FROM  19,0 TO WROWS(),WCOL()  PANEL COLOR SCHE  10 TITL tit2
FONT 'ARIAL',8
    DEFI WIND result1 FROM  19,0 TO WROWS(),47 ZOOM PANEL COLOR  SCHE 10 TITL tit3
FONT 'ARIAL',8
#ENDIF
```

```
SELE 2
*SET RELA TO prueba INTO prueba
SELE 1
*STORE SPACE(6) TO mprueba
*STORE SPACE(12) TO mlinea
*STORE 0 TO periodo
STORE 0 TO pel
STORE 0 TO salec
STORE 60 TO npermax && Maximum number of periods in the Data database file
DO WHILE .T.
    ON KEY LABEL esc DO fin3
    SET COLOR TO &screenatr
    ACTI WIND revisar
    SET CURSOR ON
    #IF _DOS
        SET COLOR TO &screenatr
    #ENDIF SET COLOR TO &screenatr
    CLEAR
    #IF _DOS.AND.USENGLISH
        @1,22 SAY 'DIAGNOSTICS'
        @3, 2 SAY 'Line  to  search      ' GET mlinea PICTURE '@!' VALID
nvl(35,'tabla',2,' ',0,-6,'_NADA','linea+" "+nombre') COLOR , W+/N
        @3,33 SAY ' Test  ' GET mprueba PICTURE '!!!!!!' VALID nvl(35,'prueba',2,'
',0,-5,'_NADA', 'codigo+" "+nombre+" "+linea+" "+grupo') COLOR ,W+/N
        @3,51 SAY 'Period ' GET periodo PICTURE '99' COLOR , W+/N RANGE 0, npermax
        @4, 2 SAY '              Class1' GET mrclase1 PICTURE '!!!!!!' VALID
nvl(35,'clase1',2,' ',0,-6,'_NADA') COLOR , W+/N
        @4,33 SAY 'Class2' GET mrclase2 PICTURE '!!!!!!' VALID nvl(35,'clase2',2,'
',0,-6,'_NADA') COLOR , W+/N
        @4,51 SAY '    Class3   ' GET  mrclase3  PICTURE  '!!!!!!'  VALID
nvl(35,'clase3',2,' ',0,-6,'_NADA') COLOR , W+/N
        @6,23 SAY '    Esc=End     '
        ***
    #ELIF _DOS.AND.SPANISH
        @1,22 SAY 'DIAGNOSTICOS'
        @3, 2 SAY 'Cual busca, línea' GET mlinea PICTURE '@!' VALID
nvl(35,'tabla',2,' ',0,-6,'_NADA','linea+" "+nombre') COLOR , W+/N
        @3,33 SAY 'prueba' GET mprueba PICTURE '!!!!!!' VALID nvl(35,'prueba',2,'
',0,-5,'_NADA', 'codigo+" "+nombre+" "+linea+" "+grupo') COLOR ,W+/N
        @3,51 SAY 'Período' GET periodo PICTURE '99' COLOR , W+/N RANGE 0, npermax
        @4, 2 SAY '              Clase1' GET  mrclase1 PICTURE '!!!!!!' VALID
nvl(35,'clase1',2,' ',0,-6,'_NADA') COLOR , W+/N
        @4,33 SAY 'Clase2' GET mrclase2 PICTURE '!!!!!!' VALID nvl(35,'clase2',2,'
',0,-6,'_NADA') COLOR , W+/N
        @4,51 SAY '    Clase3   ' GET  mrclase3  PICTURE  '!!!!!!'  VALID
nvl(35,'clase3',2,' ',0,-6,'_NADA') COLOR , W+/N
        @6,23 SAY '    Esc=Finaliza'
        ***
    #ELIF _WINDOWS.AND.USENGLISH
        @1,8.2 SAY 'Line   ' GET mlinea PICTURE '!!!!!!' VALID nvl(35,'tabla',2,'
```

```
´,0,-6,´_NADA´,´linea+" "+nombre´) COLOR , W+/N SIZE 1,6
      @1,28.8 SAY    ´Test     ´    GET  mprueba PICTURE  ´!!!!!!´  VALID
nvl(35,´prueba´,2,´  ´,0,-5,´_NADA´, ´codigo+" "+nombre+" "+linea+"  "+grupo´)
COLOR ,W+/N SIZE 1,6
      @1,47 SAY ´Period ´ GET periodo PICTURE ´99´ COLOR , W+/N RANGE 0, npermax
SIZE 1,2.5
      @2,8 SAY ´Class1´ GET mrclase1 PICTURE ´!!!!!!´ VALID nvl(35,´clase1´,2,´
´,0,-6,´_NADA´) COLOR , W+/N SIZE 1,6
      @2,29 SAY ´Class2´ GET mrclase2 PICTURE ´!!!!!!´ VALID nvl(35,´clase2´,2,´
´,0,-6,´_NADA´) COLOR , W+/N SIZE 1,6
      @2,47.1  SAY   ´Class3   ´   GET   mrclase3  PICTURE   ´!!!!!!´   VALID
nvl(35,´clase3´,2,´ ´,0,-6,´_NADA´) COLOR , W+/N SIZE 1,6
      @5,28 SAY ´Esc=End         ´
   #ELIF _WINDOWS.AND.SPANISH
      @1,8.2 SAY ´Línea   ´ GET mlinea PICTURE ´!!!!!!´ VALID nvl(35,´tabla´,2,´
´,0,-6,´_NADA´,´linea+" "+nombre´) COLOR , W+/N SIZE 1,6
      @1,28.8  SAY      ´Prueba´      GET    mprueba   PICTURE   ´!!!!!!´   VALID
nvl(35,´prueba´,2,´ ´,0,-5,´_NADA´, ´codigo+" "+nombre+" "+linea+"  "+grupo´)
COLOR ,W+/N SIZE 1,6
      @1,47 SAY ´Período´ GET periodo PICTURE ´99´ COLOR , W+/N RANGE 0, npermax
SIZE 1,2.5
      @2,8 SAY ´Clase1´ GET mrclase1 PICTURE ´!!!!!!´ VALID nvl(35,´clase1´,2,´
´,0,-6,´_NADA´) COLOR , W+/N SIZE 1,6
      @2,29 SAY ´Clase2´ GET mrclase2 PICTURE ´!!!!!!´ VALID nvl(35,´clase2´,2,´
´,0,-6,´_NADA´) COLOR , W+/N SIZE 1,6
      @2,47.1  SAY    ´Clase3    ´   GET   mrclase3  PICTURE   ´!!!!!!´   VALID
nvl(35,´clase3´,2,´ ´,0,-6,´_NADA´) COLOR , W+/N SIZE 1,6
      @5,28 SAY ´Esc=Finaliza´
   #ENDIF
   SET COLOR TO &screenatr
   READ
   STORE 1 TO per0
   IF periodo=0
      STORE 0 TO per0
      #IF _DOS.AND.USENGLISH
         @5,23 SAY ´Data period        ´ GET periodo PICTURE ´99´ COLOR , W+/N
RANGE 0, npermax
      #ELIF _DOS.AND.SPANISH
         @5,23 SAY ´Periodo de  los Datos´ GET periodo PICTURE ´99´ COLOR , W+/N
RANGE 0, npermax
      #ELIF _WINDOWS.AND.USENGLISH
         @3,23 SAY ´Data period        ´ GET periodo PICTURE ´99´ COLOR , W+/N
RANGE 0, npermax
      #ELIF _WINDOWS.AND.SPANISH
         @3,23 SAY ´Periodo de  los Datos´ GET periodo PICTURE ´99´ COLOR , W+/N
RANGE 0, npermax
      #ENDIF
      READ
   ENDIF
   STORE periodo TO pperau
   IF pperau<13
      STORE 13 TO pperau
```

```
ENDIF
DEAC WIND revisar
SET CURSOR OFF
IF salec=1
    SELE 2
    SET FILTER TO
    SELE 1
    ON KEY LABEL esc
    DEAC WIND result
    DEAC WIND result1
    DEAC WIND &tit2
    DEAC WIND &tit3
    RELE WIND result
    RELE WIND result1
    RELE WIND &tit2
    RELE WIND &tit3
    DEAC WIND &tit
    RELE WIND &tit
    DEAC WIND &tit
    DEAC WIND revisar
    RELE WIND revisar
    DEAC WIND tabla
    RELE WIND tabla DO tab_area
    *KEYB CHR(27)
    EXIT
ENDIF
SELE 2
SET ORDER TO 1
STORE ' .T. ' TO fcond
IF mrclase1<>SPACE(6)
    STORE fcond + ' AND CLASE1=TRIM(MRCLASE1) ' TO fcond
ENDIF
IF mrclase2<>SPACE(6)
    STORE fcond + ' AND CLASE2=TRIM(MRCLASE2) ' TO fcond
ENDIF
IF mrclase3<>SPACE(6)
    STORE fcond + ' AND CLASE3=TRIM(MRCLASE3) ' TO fcond
ENDIF
SELE 2
IF periodo=0 OR per0 = 0
    SET FILTER TO &fcond
ELSE
    SET FILTER TO nper=periodo &fcond
ENDIF GO TOP
STORE YEAR(DATE())*12+MONTH(DATE())-YEAR(mfei)*12-MONTH(mfei)+1 TO pmeses
DO CASE
    CASE periodo=0
        STORE pmeses TO p
```

```
        OTHER
            STORE periodo TO p
    ENDCASE
    STORE p TO q
    IF q<3
        STORE 3 TO q
    ENDIF
    IF p<13
        STORE 13 TO p
    ENDIF
    IF mprueba<>SPACE(6)
        SELE 2
        SET ORDER TO 2
        SEEK TRIM(mprueba)
        IF FOUND()
            STORE linea TO mlinea
            SET ORDER TO 1
        ELSE
            SET ORDER TO 1
            DO centra WITH ´ NO HAY RESULTADOS PARA ESA PRUEBA ´,row2+1,´S´,´S´
            LOOP
        ENDIF
    ENDIF
    SELE 1 && 23
    SET NEAR ON
    SEEK TRIM(mlinea)
    SET NEAR OFF
    ON KEY LABEL esc DO fin
    *ON KEY LABEL esc KEYB CHR(13)
    ON KEY LABEL f5 DO cambia
    STORE 0 TO fin,cam
    ***
    DECLARE fldarray[FCOUNT()]
    DECLARE flbarray[FCOUNT()]
    *store ctod(´15/01/93´) to mfei
    FOR i = 1 TO FCOUNT()
        IF diaomes=´M´
            fldarray[i] = ´
´+SUBSTR(CMONTH(GOMONTH(mfei,i-1)),1,3)+STR(YEAR(GOMONTH(mfei,i-1))-1900,3,0)+STR
(i,3,0)
        ELSE
            fldarray[i] = ´ ´+DTOC(mfei+i-1)
        ENDIF
        flbarray[i] = ´P´+LTRIM(STR(i,3,0))
    ENDFOR
    STORE 0 TO recnum
    ***
    STORE ´tabla.linea´ TO keych
    DO WHILE fin=0
        IF cam=0
            ON KEY LABEL f6
            SELE 2
```

```
        #IF _DOS.AND.USENGLISH
            @24,1 SAY "DATA TABLE         F5: Switch window     Ctl-F10: Zoom
ESC: Exit
        #ELIF _DOS.AND.SPANISH
            @24,1 SAY "TABLA DE DATOS     F5: Cambiar ventana   Ctl-F10: Zoom
ESC: Salir
        #ELIF _WINDOWS.AND.USENGLISH
            SET MESSAGE TO  "DATA TABLE            F5: Switch window
Ctl-F10: Zoom      ESC: Exit"
        #ELIF _WINDOWS.AND.SPANISH
            SET MESSAGE TO  "TABLA DE DATOS        F5: Cambiar ventana
Ctl-F10: Zoom      ESC: Salir"
        #ENDIF
        BROW SAVE NOMENU NOWAIT WIND result FIEL linea, gg=cmeses(nper):H="
Período", prueba, prueba.nombre KEY tabla.linea
        #IF _DOS.AND.USENGLISH
            @24,1 SAY "DATA TABLE         F5: Switch window     Ctl-F10: Zoom
ESC: Exit
        #ELIF _DOS.AND.SPANISH
            @24,1 SAY "TABLA DE DATOS     F5: Cambiar ventana   Ctl-F10: Zoom
ESC: Salir
        #ELIF _WINDOWS.AND.USENGLISH
            SET MESSAGE TO  "DATA TABLE            F5: Switch window
Ctl-F10: Zoom      ESC: Exit"
        #ELIF _WINDOWS.AND.SPANISH
            SET MESSAGE TO "TABLA DE  DATOS        F5: Cambiar  ventana
Ctl-F10: Zoom      ESC: Salir"
        #ENDIF SELE 1
        SET RELA TO linea INTO result
        ON KEY LABEL rightarrow KEYB CHR(9)
        ON KEY LABEL leftarrow KEYB "{BACKTAB}"
        #IF _DOS.AND.USENGLISH
            @24,1 SAY "DATA TABLE         F5: Switch window     Ctl-F10: Zoom
ESC: Exit
        #ELIF _DOS.AND.SPANISH
            @24,1 SAY "TABLA DE DATOS     F5: Cambiar ventana   Ctl-F10: Zoom
ESC: Salir
        #ELIF _WINDOWS.AND.USENGLISH
            SET MESSAGE TO  "DATA TABLE            F5: Switch window
Ctl-F10: Zoom      ESC: Exit"
        #ELIF _WINDOWS.AND.SPANISH
            SET  MESSAGE TO "TABLA DE  DATOS       F5: Cambiar ventana
Ctl-F10: Zoom      ESC: Salir"
        #ENDIF
        BROW  SAVE NOCLEAR  NOMODIFY  NOMENU WIND  tabla  LOCK  2  FIEL
linea:W=.F.,nombre:W=.F.,;

c12=EVAL(flbarray[P-12])*MULT():H=fldarray[P-12]:W=pper[P-12]:p=formato(),;

c11=EVAL(flbarray[P-11])*MULT():H=fldarray[P-11]:W=pper[P-11]:p=formato(),;
```

```
c10=EVAL(flbarray[P-10])*MULT():H=fldarray[P-10]:W=pper[P-10]:p=formato(),;

c9=EVAL(flbarray[P-9])*MULT():H=fldarray[P-9]:W=pper[P-9]:p=formato(),;

c8=EVAL(flbarray[P-8])*MULT():H=fldarray[P-8]:W=pper[P-8]:p=formato(),;

c7=EVAL(flbarray[P-7])*MULT():H=fldarray[P-7]:W=pper[P-7]:p=formato(),;

c6=EVAL(flbarray[P-6])*MULT():H=fldarray[P-6]:W=pper[P-6]:p=formato(),;

c5=EVAL(flbarray[P-5])*MULT():H=fldarray[P-5]:W=pper[P-5]:p=formato(),;

c4=EVAL(flbarray[P-4])*MULT():H=fldarray[P-4]:W=pper[P-4]:p=formato(),;

c3=EVAL(flbarray[P-3])*MULT():H=fldarray[P-3]:W=pper[P-3]:p=formato(),;

c2=EVAL(flbarray[P-2])*MULT():H=fldarray[P-2]:W=pper[P-2]:p=formato(),;

c1=EVAL(flbarray[P-1])*MULT():H=fldarray[P-1]:W=pper[P-1]:p=formato(),;
        c0=EVAL(flbarray[P   ])*MULT():H=fldarray[P   ]:W=pper[P   ]:p=formato()

#IF _DOS.AND.USENGLISH
                @24,1 SAY 'DATA TABLE        F5: Switch window     Ctl-F10: Zoom    ESC: Exit'
            #ELIF _DOS.AND.SPANISH
                @24,1 SAY 'TABLA DE DATOS    F5: Cambiar ventana   Ctl-F10: Zoom    ESC: Salir'
            #ELIF _WINDOWS.AND.USENGLISH
                SET MESSAGE TO 'DATA TABLE             F5: Switch window     Ctl-F10: Zoom        ESC: Exit'
            #ELIF _WINDOWS.AND.SPANISH
                SET MESSAGE TO 'TABLA DE  DATOS        F5: Cambiar  ventana  Ctl-F10: Zoom        ESC: Salir'
            #ENDIF ON KEY LABEL rightarrow
            ON KEY LABEL leftarrow
            SET RELA OFF INTO result
        ELSE
            *
c2=eval(flbarray[Q-2])*MULT():H=fldarray[Q-2]:W=pper(q-2):p=formato(),
            ON KEY LABEL f6 DO KEY
            SELE 1
            #IF _DOS.AND.USENGLISH
                @24,1 SAY 'DIAGNOSTICS    F5, F6: Switch window   Ctl-F10: Zoom    ESC: Exit'
                SET MESSAGE TO 'DIAGNOSTICS     F5, F6: Switch window    Ctl-F10: Zoom     ESC: Exit'
            #ELIF _DOS.AND.SPANISH
                @24,1 SAY 'DIAGNOSTICOS   F5, F6: Cambiar ventana Ctl-F10: Zoom
```

```
ESC: Salir´
        *SET MESSAGE TO ´DIAGNOSTICOS      F5, F6: Cambiar ventana  Ctl-F10:
Zoom    ESC: Salir´
        #ELIF _WINDOWS.AND.USENGLISH
                SET MESSAGE TO ´DIAGNOSTICS     F5, F6: Switch window
Ctl-F10: Zoom   ESC: Exit´
        #ELIF _WINDOWS .AND. SPANISH
                SET MESSAGE TO ´DIAGNOSTICOS      F5, F6: Cambiar ventana
Ctl-F10: Zoom   ESC: Salir´
        #ENDIF BROW    SAVE    NOMODIFY    NOMENU    NOWAIT    WIND    tabla   FIEL
linea:W=.F.,nombre:W=.F.,;

c1=EVAL(flbarray[Q-1])*MULT():H=fldarray[Q-1]:W=pper(q-1):p=formato(),;
        c0=EVAL(flbarray[Q      ])*MULT():H=fldarray[Q      ]:W=pper(q
):p=formato()
        #IF _DOS.AND.USENGLISH
                @24,1 SAY ´DIAGNOSTICS     F5, F6: Switch window    Ctl-F10: Zoom
ESC: Exit´
                SET MESSAGE TO ´DIAGNOSTICS     F5, F6: Switch window     Ctl-F10:
Zoom    ESC: Exit´
        #ELIF _DOS.AND.SPANISH
                @24,1 SAY ´DIAGNOSTICOS     F5, F6: Cambiar ventana  Ctl-F10: Zoom
ESC: Salir´
                *SET MESSAGE TO ´DIAGNOSTICOS      F5, F6: Cambiar ventana  Ctl-F10:
Zoom    ESC: Salir´
        #ELIF _WINDOWS.AND.USENGLISH
                SET MESSAGE TO ´DIAGNOSTICS     F5, F6: Switch window
Ctl-F10: Zoom   ESC: Exit´
        #ELIF _WINDOWS .AND. SPANISH
                SET MESSAGE TO ´DIAGNOSTICOS       F5, F6: Cambiar ventana
Ctl-F10: Zoom   ESC: Salir´
        #ENDIF SELE 2
        IF recnum<>0
           GO recnum
        ENDIF
        ON KEY LABEL rightarrow KEYB CHR(9)
        ON KEY LABEL leftarrow KEYB "{BACKTAB}"
        #IF USENGLISH
           BROW SAVE NOCLEAR NOMENU NOMODIFY WIND result1;
                FIEL       linea:W=vprueba(),gg=cmeses(nper):H=´          Period
´:W=vprueba(), prueba:W=vprueba():v=vprueba():F, ;
                clase1, clase2, clase3, prueba.nombre KEY &keych
        #ELSE
           BROW SAVE NOCLEAR NOMENU NOMODIFY WIND result1;
                FIEL                linea:W=vprueba(),gg=cmeses(nper):H=´
Período´:W=vprueba(), prueba:W=vprueba():v=vprueba():F, ;
                clase1, clase2, clase3, prueba.nombre KEY &keych
        #ENDIF
```

```
            #IF _DOS.AND.USENGLISH
                @24,1 SAY 'DIAGNOSTICS    F5, F6: Switch window    Ctl-F10: Zoom
ESC: Exit'
                SET MESSAGE TO 'DIAGNOSTICS    F5, F6: Switch window    Ctl-F10:
Zoom    ESC: Exit'
            #ELIF _DOS.AND.SPANISH
                @24,1 SAY 'DIAGNOSTICOS    F5, F6: Cambiar ventana  Ctl-F10: Zoom
ESC: Salir'
                *SET MESSAGE TO 'DIAGNOSTICOS    F5, F6: Cambiar ventana  Ctl-F10:
Zoom    ESC: Salir'
            #ELIF _WINDOWS.AND.USENGLISH
                SET MESSAGE TO 'DIAGNOSTICS       F5, F6: Switch window
Ctl-F10: Zoom    ESC: Exit'
            #ELIF _WINDOWS .AND. SPANISH
                SET MESSAGE TO 'DIAGNOSTICOS       F5, F6: Cambiar ventana
Ctl-F10: Zoom    ESC: Salir'
            #ENDIF ON KEY LABEL rightarrow
            ON KEY LABEL leftarrow
            IF NOT EOF()
                STORE RECNO() TO recnum
            ENDIF
            ON KEY LABEL f6
        ENDIF
    ENDDO
ENDDO
RETURN

*!*****************************************************************
*!
*!      Function: CMESES()
*!
*!      Called by: VMAN.PRG
*!               : VMANR.PRG
*!               : VSUMM.PRG
*!               : RBROW              (procedure in VRESU.PRG)
*!
*!*****************************************************************
FUNCTION cmeses
    PARAMETER npar
    IF npar=0
        RETURN ' '
    ENDIF
    RETURN fldarray[NPAR]
RETURN

*!*****************************************************************
*!
*!      Procedure: KEY
*!
```

```
*!      Called by: VMAN.PRG
*!
*!*********************************************************************
PROCEDURE KEY
    IF keych='tabla.linea'
        #IF USENGLISH
            @16,40 SAY 'All tests applied to same line'
        #ELSE
            @16,40 SAY 'Todas las pruebas de una linea'
        #ENDIF
        SELE 2
        SET ORDER TO 2
        STORE "'"+ prueba +"'" TO keych
        KEYB CHR(23)
    ELSE
        #IF USENGLISH
            @16,40 SAY 'All lines referred to test'
        #ELSE
            @16,40 SAY 'Todas lineas de la prueba'
        #ENDIF
        SELE 2
        SET ORDER TO 1
        STORE 'tabla.linea' TO keych
        KEYB CHR(23)
    ENDIF

*!*********************************************************************
*!
*!      Procedure: FIN3
*!
*!      Called by: VMAN.PRG
*!               : VRESU.PRG
*!               : VMANR.PRG
*!               : VSUMM.PRG
*!
*!*********************************************************************
PROCEDURE fin3
    ON KEY LABEL esc
    STORE 1 TO salec
    KEYB CHR(27)
RETURN

*!*********************************************************************
*!
*!      Procedure: FIN
*!
*!      Called by: VDUP.PRG
*!               : VAPL.PRG
*!               : VMAN.PRG
*!               : VMANR.PRG
```

```
*!                  : VSUMM.PRG
*!                  : RBROW            (procedure in VRESU.PRG)
*!
*!*****************************************************************
PROC fin
    KEYB CHR(23)
    STORE 1 TO fin
    ON KEY LABEL esc
    ON KEY LABEL f2
    ON KEY LABEL f5
    ON KEY LABEL f9
RETURN

*!*****************************************************************
*!
*!      Procedure: CAMBIA
*!
*!      Called by: VMAN.PRG
*!                 : VMANR.PRG
*!                 : VSUMM.PRG
*!                 : RBROW            (procedure in VRESU.PRG)
*!
*!*****************************************************************
PROCEDURE cambia
    IF cam=1
        STORE 0 TO cam
        =SEEK(linea,1)
    ELSE
        STORE 1 TO cam
    ENDIF
    KEYB CHR(23)
RETURN

*!*****************************************************************
*!
*!      Function: VPRUEBA()
*!
*!      Called by: VMAN.PRG
*!                 : VSUMM.PRG
*!                 : RBROW            (procedure in VRESU.PRG)
*!
*!*****************************************************************
FUNCTION vprueba
    CLEAR
    #IF _DOS
        @18,49 SAY prueba.condnote SIZE 7,31
    #ELSE
        @WROWS()-7,55 SAY prueba.condnote SIZE 7,31 COLOR N/W*

#ENDIF
    RETURN .T.
```

```
*!**************************************************************
*!
*!      Function: PPER()
*!
*!      Called by: VMAN.PRG
*!               : VMANR.PRG
*!
*!**************************************************************
FUNCTION pper
    PARAMETER nnper
    DO CASE
        CASE periodo=0
            RETURN .T.
        CASE LASTKEY()=4 OR LASTKEY()=19 OR LASTKEY()=9 OR LASTKEY()=15
            STORE pperau-VAL(SUBSTR(VARREAD(),2,2)) TO periodo
            KEYB CHR(23)
            RETURN .T.
        CASE nnper=periodo
            RETURN .T.
        OTHER
            return.f.
    ENDCASE STORE pperau-VAL(SUBSTR(VARREAD(),2,2)) TO periodo
    KEYB CHR(23)
    RETURN

*: EOF: VMAN.PRG
```

```
*:****************************************************************
*:****************************************************************
*                      =============
*                       13. VMANR.PRG
*                      =============
*
*                      DIAGNOSTICS BROWSE VIEW
*:****************************************************************
*:
*: Procedure file: VMANR.PRG
*:
*:        Set by: VACTI.PRG
*:
*:        Calls: FIN3          (procedure in VMAN.PRG)
*:             : NVL()         (function  in TABLA.PRG)
*:             : TAB_AREA      (procedure in TAB_PROC.PRG)
*:             : CENTRA        (procedure in TABLA.PRG)
*:             : FIN           (procedure in VDUP.PRG)
*:             : CAMBIA        (procedure in VMAN.PRG)
*:             : PPER()        (function  in VMAN.PRG)
*:             : CMESES()      (function  in VMAN.PRG)
*:
*:      Documented 05/01/93 at 23:02        FoxDoc  version 2.10f
```

```
*:*************************************************************
#DEFINE USENGLISH .T.
#DEFINE SPANISH .F.
*STORE 'R' TO tcp
SET SAFETY OFF
SET TALK OFF
SET FUNCTION 2 TO ""
SET FUNCTION 3 TO ""
SET FUNCTION 4 TO ""
SET FUNCTION 5 TO ""
SET FUNCTION 6 TO ""
SET FUNCTION 7 TO ""
SET FUNCTION 8 TO ""
SET FUNCTION 9 TO ""
SET FUNCTION 10 TO ""
CLEAR
SELE 1
*USE tabla
*INDEX ON linea TO gus COMP
SET ORDER TO 1
@23,0 CLEAR
@22,0 SAY ''
CLEAR
SELE 2
*USE result
*INDEX ON linea TO result
*INDEX ON prueba TO resul2
*SET INDEX TO result, resul2
SET ORDER TO 2
STORE 0 TO recnum
SELE 3
*USE prueba
*INDEX ON codigo TO prueba
SET ORDER TO 1
STORE 'TABLA DE DATOS' TO tit
STORE 'RESULTADOS DE LAS PRUEBAS' TO tit2
STORE 'RESULTADOS DE PRUEBAS 2' TO tit3

STORE WROWS()-2 TO rows
STORE WROWS()-1 -INT(WROWS()/3) TO row3
STORE row3 - 3 TO row2
#IF _DOS
    DEFI WIND revisar FROM 5,5 TO 13,74 COLOR SCHE 10 SHADOW TITLE "BROWSE DE
RESULTADOS DE LAS PRUEBAS" FONT 'SYSTEM',10
#ELSE
    DEFI WIND revisar FROM 5,5 TO 13,74  SHADOW TITLE "BROWSE DE RESULTADOS DE LAS
PRUEBAS" COLOR RGB(0,0,0,192,192,192) FONT 'SYSTEM',10
#ENDIF
DEFI WIND tabla FROM  row3,0 TO rows,78 ZOOM PANEL COLOR SCHE 10 TITL  tit SHADOW
FONT 'ARIAL',8
DEFI WIND  result FROM 0,0  TO row2,78  ZOOM PANEL COLOR  SCHE 10   TITL tit2  FONT
'ARIAL',8
```

```
DEFI WIND result1 FROM 0,0 TO row2,27 ZOOM PANEL COLOR SCHE 10 TITL tit3

SELE 1
*STORE SPACE(12) TO mlinea
*STORE SPACE(6) TO mprueba
*STORE 0 TO periodo
STORE 0 TO pe1
STORE 0 TO salec
STORE 60 TO npermax && Maximum number of periods in file TABLA, the data  database
file
DO WHILE .T.
    ON KEY LABEL esc DO fin3
    #IF ._DOS
       SET COLOR TO &screenatr
    #ENDIF
    ACTI WIND revisar
    SET CURSOR ON
    SET COLOR TO &screenatr
    CLEAR
    #IF _DOS.AND.USENGLISH
       @1,18 SAY 'DIAGNOSTICS BROWSE VIEW'
       @3, 2 SAY 'Line   to search      ' GET mlinea  PICTURE  '@!'  VALID
nvl(35,'tabla',2,' ',0,-6,'_NADA','linea+" "+nombre') COLOR , W+/N
       @3,33 SAY 'Test     ' GET mprueba PICTURE '!!!!!!'              VALID
nvl(35,'prueba',2,' ',0,-5,'_NADA', 'codigo+" "+nombre+" "+linea+"  "+grupo')
COLOR ,W+/N
       @3,51 SAY 'Periodo' GET periodo PICTURE '99' COLOR , W+/N RANGE 0, npermax
       @4, 2 SAY '              Class1' GET mrclase1 PICTURE  '!!!!!!' VALID
nvl(35,'clase1',2,' ',0,-6,'_NADA') COLOR , W+/N
       @4,33 SAY 'Class2' GET mrclase2 PICTURE '!!!!!!' VALID nvl(35,'clase2',2,'
',0,-6,'_NADA') COLOR , W+/N
       @4,51    SAY   '   Class3'    GET   mrclase3   PICTURE   '!!!!!!'   VALID
nvl(35,'clase3',2,' ',0,-6,'_NADA') COLOR , W+/N
       @6,23 SAY '      Esc=End        '
    #ELIF _DOS.AND.SPANISH
       @1,18 SAY 'BROWSE DE DIAGNOSTICOS'
       @3, 2 SAY 'Cual busca, linea' GET mlinea PICTURE   '@!'  VALID
nvl(35,'tabla',2,' ',0,-6,'_NADA','linea+" "+nombre') COLOR , W+/N
       @3,33 SAY 'prueba   ' GET mprueba PICTURE '!!!!!!'              VALID
nvl(35,'prueba',2,' ',0,-5,'_NADA', 'codigo+" "+nombre+" "+linea+"  "+grupo')
COLOR ,W+/N
       @3,51 SAY 'Período' GET periodo PICTURE '99' COLOR , W+/N RANGE 0, npermax
       @4, 2 SAY '              Clase1' GET mrclase1 PICTURE  '!!!!!!' VALID
nvl(35,'clase1',2,' ',0,-6,'_NADA') COLOR , W+/N
       @4,33 SAY 'Clase2' GET mrclase2 PICTURE '!!!!!!' VALID nvl(35,'clase2',2,'
',0,-6,'_NADA') COLOR , W+/N
       @4,51    SAY   '   Clase3'    GET   mrclase3   PICTURE   '!!!!!!'   VALID
nvl(35,'clase3',2,' ',0,-6,'_NADA') COLOR , W+/N
       @6,23 SAY '    Esc=Finaliza'
    #ENDIF
    #IF _DOS
```

```
        SET COLOR TO &screenatr
    #ENDIF
    #IF _WINDOWS.AND.USENGLISH
        @1,8.2 SAY 'Line    ' GET mlinea PICTURE '!!!!!!' VALID nvl(35,'tabla',2,'
',0,-6,'_NADA','linea+" "+nombre') COLOR , W+/N SIZE 1,6
        @1,28.8  SAY   'Test         '    GET    mprueba  PICTURE    '!!!!!!'    VALID
nvl(35,'prueba',2,'    ',0,-5,'_NADA', 'codigo+" "+nombre+" "+linea+"   "+grupo')
COLOR ,W+/N SIZE 1,6
        @1,47 SAY 'Period ' GET periodo PICTURE '99' COLOR , W+/N RANGE 0, npermax
SIZE 1,2.5
        @2,8 SAY 'Class1' GET mrclase1 PICTURE '!!!!!!' VALID nvl(35,'clase1',2,'
',0,-6,'_NADA') COLOR , W+/N SIZE 1,6
        @2,29 SAY 'Class2' GET mrclase2 PICTURE '!!!!!!' VALID nvl(35,'clase2',2,'
',0,-6,'_NADA') COLOR , W+/N SIZE 1,6
        @2,47.1    SAY    'Class3     '    GET    mrclase3   PICTURE    '!!!!!!'    VALID
nvl(35,'clase3',2,' ',0,-6,'_NADA') COLOR , W+/N SIZE 1,6
        @4,28 SAY 'Esc=End       '
    #ELIF _WINDOWS.AND.SPANISH
        @1,8.2 SAY 'Línea   ' GET mlinea PICTURE '!!!!!!' VALID nvl(35,'tabla',2,'
',0,-6,'_NADA','linea+" "+nombre') COLOR , W+/N SIZE 1,6
        @1,28.8   SAY    'Prueba'       GET    mprueba  PICTURE    '!!!!!!'    VALID
nvl(35,'prueba',2,'   ',0,-5,'_NADA', 'codigo+" "+nombre+" "+linea+"   "+grupo')
COLOR ,W+/N SIZE 1,6
        @1,47 SAY 'Período' GET periodo PICTURE '99' COLOR , W+/N RANGE 0, npermax
SIZE 1,2.5
        @2,8 SAY 'Clase1' GET mrclase1 PICTURE '!!!!!!' VALID nvl(35,'clase1',2,'
',0,-6,'_NADA') COLOR , W+/N SIZE 1,6
        @2,29 SAY 'Clase2' GET mrclase2 PICTURE '!!!!!!' VALID nvl(35,'clase2',2,'
',0,-6,'_NADA') COLOR , W+/N SIZE 1,6
        @2,47.1    SAY    'Clase3     '    GET    mrclase3   PICTURE    '!!!!!!'    VALID
nvl(35,'clase3',2,' ',0,-6,'_NADA') COLOR , W+/N SIZE 1,6
        @4,28 SAY 'Esc=Finaliza'
    #ENDIF
    READ
    STORE periodo TO pperau
    IF pperau<13
        STORE 13 TO pperau
    ENDIF
    DEAC WIND revisar
    SET CURSOR OFF
    *IF   mrclase1=SPACE(6)  AND   mrclase2=SPACE(6)   AND   mrclase3=SPACE(6)   AND
mlinea=SPACE(12) AND mprueba=SPACE(6) AND periodo=0
    IF salec=1
        SELE 2
        SET FILTER TO
        SELE 1
        ON KEY LABEL esc
        DEAC WIND result
        DEAC WIND result1
        DEAC WIND &tit2
        DEAC WIND &tit3
        RELE WIND result
```

```
    RELE WIND result1
    RELE WIND &tit2
    RELE WIND &tit3
    DEAC WIND &tit
    RELE WIND &tit
    DEAC WIND &tit
    DEAC WIND revisar
    RELE WIND revisar
    DEAC WIND tabla
    RELE WIND tabla DO tab_area
    *KEYB CHR(27)
    EXIT
ENDIF
STORE ' .T. ' TO fcond
IF mprueba<>SPACE(6)
    STORE fcond + ' AND PRUEBA=TRIM(MPRUEBA) ' TO fcond
ENDIF
IF mlinea<>SPACE(12)
    STORE fcond + ' AND LINEA=TRIM(MLINEA) ' TO fcond
ENDIF
IF mrclase1<>SPACE(6)
    STORE fcond + ' AND CLASE1=TRIM(MRCLASE1) ' TO fcond
ENDIF
IF mrclase2<>SPACE(6)
    STORE fcond + ' AND CLASE2=TRIM(MRCLASE2) ' TO fcond
ENDIF
IF mrclase3<>SPACE(6)
    STORE fcond + ' AND CLASE3=TRIM(MRCLASE3) ' TO fcond
ENDIF
SELE 2
IF periodo=0
    SET FILTER TO &fcond
ELSE
    SET FILTER TO nper=periodo &fcond
ENDIF
COUNT TO numrec
IF numrec=0
    #IF _USENGLISH
        DO centra WITH ' NO DIAGNOSTICS FOR THIS PERIOD     ',15,'S','S'
    #ELSE
        DO centra WITH 'NO HAY DIAGNOSTICOS PARA ESE PERIODO',15,'S','S'
    #ENDIF
    SET FILTER TO
    LOOP
ENDIF GO TOP
STORE YEAR(DATE())*12+MONTH(DATE())-YEAR(mfei)*12-MONTH(mfei)+1 TO pmeses
DO CASE
    CASE periodo=0
```

```
            STORE pmeses TO p
     OTHER
            STORE periodo TO p
ENDCASE
STORE p TO q
IF q<3
     STORE 3 TO q
ENDIF
IF p<13
     STORE 13 TO p
ENDIF IF mprueba<>SPACE(6)
     SELE 2
     SET ORDER TO 2
     SEEK TRIM(mprueba)
     IF FOUND()
          *    STORE linea TO mlinea
          *    SET ORDER TO 1
     ELSE
          SET ORDER TO 1
          SET FILTER TO
          DO centra WITH ' NO HAY RESULTADOS PARA ESA PRUEBA ',15,'S','S'
          LOOP
     ENDIF
ENDIF
SET ORDER TO 2
SELE 1
ON KEY LABEL esc DO fin
ON KEY LABEL f5 DO cambia
STORE 0 TO fin,CAM
***
DECLARE fldarray[FCOUNT()]
DECLARE flbarray[FCOUNT()]
*store ctod('15/01/93') to mfei
FOR i = 1 TO FCOUNT()
     IF diaomes='M'
          fldarray[i] = '
'+SUBSTR(CMONTH(GOMONTH(mfei,i-1)),1,3)+STR(YEAR(GOMONTH(mfei,i-1))-1900,3,0)+STR(i,3,0)
     ELSE
          fldarray[i] = ' '+DTOC(mfei+i-1)
     ENDIF
     flbarray[i] = 'P'+LTRIM(STR(i,3,0))
ENDFOR
STORE 0 TO recnum
***
STORE 'tabla.linea' TO keych
STORE 1 TO entra
DO WHILE fin=0
     IF cam=0
          ON KEY LABEL f6
```

```
        SELE 1
        *
c2=eval(flbarray[Q-2])*MULT():H=fldarray[Q-2]:W=pper(q-2):p=formato(),;

ON KEY LABEL rightarrow KEYB CHR(9)
        ON KEY LABEL leftarrow KEYB "{BACKTAB}"
        #IF _DOS.AND.USENGLISH
              @24,1 SAY 'DIAGNOSTICS        F5: Switch window       Ctl-F10: Zoom
ESC: Exit '
              *SET MESSAGE TO 'DIAGNOSTICS        F5: Switch window       Ctl-F10: Zoom
  ESC: Exit '
        #ELIF _DOS.AND.SPANISH
              @24,1 SAY 'DIAGNOSTICOS       F5: Cambiar ventana     Ctl-F10: Zoom
ESC: Salir'
              *SET MESSAGE TO 'DIAGNOSTICOS       F5: Cambiar ventana     Ctl-F10: Zoom
  ESC: Salir'
        #ELIF _WINDOWS.AND.USENGLISH
              SET MESSAGE TO 'DIAGNOSTICS           F5: Switch window         Ctl-F10:
Zoom    ESC: Exit '
        #ELIF _WINDOWS.AND.SPANISH
              SET MESSAGE TO 'DIAGNOSTICOS          F5: Cambiar ventana       Ctl-F10:
Zoom    ESC: Salir'
        #ENDIF BROW     SAVE     NOWAIT    NOMODIFY    NOMENU    WIND    tabla    FIEL
linea:W=.F.,nombre:W=.F.,;

c1=EVAL(flbarray[Q-1])*MULT():H=fldarray[Q-1]:W=pper(q-1):p=formato(),;
        c0=EVAL(flbarray[Q ])*MULT():H=fldarray[Q ]:W=pper(q ):p=formato()
        ON KEY LABEL rightarrow
        ON KEY LABEL leftarrow

*   &flbarray[Q-2]:H=fldarray[Q-2]:W=pper(q-2),;
        *   &flbarray[Q-1]:H=fldarray[Q-1]:W=pper(q-1),;
        *   &flbarray[Q ]:H=fldarray[Q ]:W=pper(q  )
        SET RELA OFF INTO result
        SELE 2
        IF entra=1
             GO TOP
        ELSE
             GO recnum
        ENDIF
        SET RELA TO linea INTO tabla
        SET RELA TO prueba INTO prueba ADDI
        ON KEY LABEL rightarrow KEYB CHR(9)
        ON KEY LABEL leftarrow KEYB "{BACKTAB}"
        #IF _DOS.AND.USENGLISH
              @24,1 SAY 'DIAGNOSTICS        F5: Switch window       Ctl-F10: Zoom
ESC: Exit '
              *SET MESSAGE TO 'DIAGNOSTICS        F5: Switch window       Ctl-F10: Zoom
  ESC: Exit '
        #ELIF _DOS.AND.SPANISH
```

```
            @24,1 SAY ´DIAGNOSTICOS      F5: Cambiar  ventana    Ctl-F10: Zoom
ESC: Salir´
           *SET MESSAGE TO ´DIAGNOSTICOS     F5: Cambiar  ventana   Ctl-F10: Zoom
  ESC: Salir´
      #ELIF _WINDOWS.AND.USENGLISH
            SET MESSAGE TO  ´DIAGNOSTICS       F5:  Switch window       Ctl-F10:
Zoom    ESC: Exit ´
      #ELIF _WINDOWS.AND.SPANISH
            SET MESSAGE TO ´DIAGNOSTICOS       F5: Cambiar ventana      Ctl-F10:
Zoom    ESC: Salir´
      #ENDIF

#IF USENGLISH
         BROW SAVE  NOMENU NOCLEAR WIND  result FIEL linea,  gg=cmeses(nper):H=´
Period ´, prueba, prueba.nombre, clase1, clase2, clase3
      #ELSE
         BROW SAVE  NOMENU NOCLEAR WIND  result FIEL linea,  gg=cmeses(nper):H=´
Periodo´, prueba, prueba.nombre, clase1, clase2, clase3
      #ENDIF

#IF _DOS.AND.USENGLISH
           @24,1 SAY ´DIAGNOSTICS       F5: Switch window      Ctl-F10: Zoom
ESC: Exit ´
           *SET MESSAGE TO ´DIAGNOSTICS       F5: Switch window    Ctl-F10: Zoom
   ESC: Exit ´
      #ELIF _DOS.AND.SPANISH
           @24,1 SAY ´DIAGNOSTICOS      F5: Cambiar  ventana     Ctl-F10: Zoom
ESC: Salir´
           *SET MESSAGE TO ´DIAGNOSTICOS      F5: Cambiar ventana  Ctl-F10: Zoom
    ESC: Salir´
      #ELIF _WINDOWS.AND.USENGLISH
            SET MESSAGE TO  ´DIAGNOSTICS       F5:  Switch window       Ctl-F10:
Zoom    ESC: Exit ´
      #ELIF _WINDOWS.AND.SPANISH
            SET MESSAGE TO ´DIAGNOSTICOS       F5: Cambiar ventana      Ctl-F10:
Zoom    ESC: Salir´
      #ENDIF ON KEY LABEL rightarrow
      ON KEY LABEL leftarrow
      STORE RECNO() TO recnum
      STORE 0 TO entra
      * KEY tabla.linea
      * SET RELA OFF INTO TABLA
      SET RELA OFF INTO prueba
   ELSE
      SELE 2
      *    IF recnum<>0
      *        GO recnum
      *    ENDIF
      *           BROW    SAVE   NOWAIT  NOMENU   NOMODIFY   WIND   result  FIEL
linea:W=vprueba(),gg=cmeses(nper):H=´                    Período´:W=vprueba(),
```

```
prueba:W=vprueba():v=vprueba():F, prueba.nombre
     *   KEY &keych
     *   IF NOT EOF()
     *       STORE RECNO() TO recnum
     *   ENDIF
         SELE 1
         ON KEY LABEL rightarrow KEYB CHR(9)
         ON KEY LABEL leftarrow KEYB "{BACKTAB}"
         #IF _DOS.AND.USENGLISH
             @24,1 SAY 'DATA     F5: Switch window   Ctl-F10: Zoom     ESC: Exit '
             *SET MESSAGE TO 'DATA     F5: Switch window   Ctl-F10: Zoom     ESC: Exit '
         #ELIF _DOS.AND.SPANISH
             @24,1 SAY 'DATOS F5: Cambiar ventana Ctl-F10: Zoom     ESC: Salir'
             *SET MESSAGE TO 'DATOS    F5: Cambiar ventana Ctl-F10: Zoom     ESC: Salir'
         #ELIF _WINDOWS.AND.USENGLISH
             SET MESSAGE TO 'DATA TABLE        F5: Switch window   Ctl-F10: Zoom     ESC: Exit '
         #ELIF _WINDOWS.AND.SPANISH
             SET MESSAGE TO 'TABLA DE DATOS    F5: Cambiar ventana Ctl-F10: Zoom     ESC: Salir'
         #ENDIF
         BROW   SAVE   NOCLEAR   NOMODIFY   NOMENU   WIND  tabla   LOCK   2   FIEL
linea:W=.F..nombre:W=.F.,;

c12=EVAL(flbarray[P-12])*MULT():H=fldarray[P-12]:W=pper[P-12]:p=formato(),;

c11=EVAL(flbarray[P-11])*MULT():H=fldarray[P-11]:W=pper[P-11]:p=formato(),;

c10=EVAL(flbarray[P-10])*MULT():H=fldarray[P-10]:W=pper[P-10]:p=formato(),;

c9=EVAL(flbarray[P-9])*MULT():H=fldarray[P-9]:W=pper[P-9]:p=formato(),;

c8=EVAL(flbarray[P-8])*MULT():H=fldarray[P-8]:W=pper[P-8]:p=formato(),;

c7=EVAL(flbarray[P-7])*MULT():H=fldarray[P-7]:W=pper[P-7]:p=formato(),;

c6=EVAL(flbarray[P-6])*MULT():H=fldarray[P-6]:W=pper[P-6]:p=formato(),;

c5=EVAL(flbarray[P-5])*MULT():H=fldarray[P-5]:W=pper[P-5]:p=formato(),;

c4=EVAL(flbarray[P-4])*MULT():H=fldarray[P-4]:W=pper[P-4]:p=formato(),;

c3=EVAL(flbarray[P-3])*MULT():H=fldarray[P-3]:W=pper[P-3]:p=formato(),;

c2=EVAL(flbarray[P-2])*MULT():H=fldarray[P-2]:W=pper[P-2]:p=formato(),;

c1=EVAL(flbarray[P-1])*MULT():H=fldarray[P-1]:W=pper[P-1]:p=formato(),;
         c0=EVAL(flbarray[P  ])*MULT():H=fldarray[P  ]:W=pper[P  ]:p=formato()
     #IF _DOS.AND.USENGLISH
         @24,1 SAY 'DATA     F5: Switch window   Ctl-F10: Zoom     ESC: Exit '
```

```
              *SET MESSAGE TO 'DATA      F5: Switch window     Ctl-F10: Zoom     ESC:
Exit '
       #ELIF _DOS.AND.SPANISH
              @24,1 SAY 'DATOS    F5: Cambiar ventana  Ctl-F10: Zoom    ESC: Salir'
              *SET   MESSAGE TO 'DATOS    F5: Cambiar  ventana Ctl-F10: Zoom     ESC:
Salir'
       #ELIF _WINDOWS.AND.USENGLISH
              SET MESSAGE TO 'DATA TABLE       F5: Switch window     Ctl-F10: Zoom
   ESC: Exit '
       #ELIF _WINDOWS.AND.SPANISH
              SET MESSAGE TO 'TABLA DE DATOS    F5: Cambiar ventana   Ctl-F10: Zoom
   ESC: Salir'
       #ENDIF ON KEY LABEL rightarrow
       ON KEY LABEL leftarrow
       *         c12=EVAL(flbarray[P-12]):H=fldarray[P-12]:W=pper[P-12],;
       *         c11=EVAL(flbarray[P-11]):H=fldarray[P-11]:W=pper[P-11],;
       *         c10=EVAL(flbarray[P-10]):H=fldarray[P-10]:W=pper[P-10],;
       *         c9=EVAL(flbarray[P-9]):H=fldarray[P-9]:W=pper[P-9],;
       *         c8=EVAL(flbarray[P-8]):H=fldarray[P-8]:W=pper[P-8],;
       *         c7=EVAL(flbarray[P-7]):H=fldarray[P-7]:W=pper[P-7],;
       *         c6=EVAL(flbarray[P-6]):H=fldarray[P-6]:W=pper[P-6],;
       *         c5=EVAL(flbarray[P-5]):H=fldarray[P-5]:W=pper[P-5],;
       *         c4=EVAL(flbarray[P-4]):H=fldarray[P-4]:W=pper[P-4],;
       *         c3=EVAL(flbarray[P-3]):H=fldarray[P-3]:W=pper[P-3],;
       *         c2=EVAL(flbarray[P-2]):H=fldarray[P-2]:W=pper[P-2],;
       *         c1=EVAL(flbarray[P-1]):H=fldarray[P-1]:W=pper[P-1],;
       *         c0=EVAL(flbarray[P  ]):H=fldarray[P  ]:W=pper[P  ]
     ENDIF
ENDDO
SELE 2
SET RELA OFF INTO tabla
ENDDO
RETURN

*!*********************************************************************
*!
*!     Function: CMESES()
*!
*!     Called by: VMAN.PRG
*!              : VMANR.PRG
*!              : VSUMM.PRG
*!              : RBROW            (procedure in VRESU.PRG)
*!
*!*********************************************************************
FUNCTION cmeses
    PARAMETER npar
    IF npar=0
       RETURN ' '
    ENDIF
    RETURN fldarray[NPAR]
```

```
RETURN

*!***************************************************************
*!
*!      Procedure: FIN3
*!
*!      Called by: VMAN.PRG
*!               : VRESU.PRG
*!               : VMANR.PRG
*!               : VSUMM.PRG
*!
*!***************************************************************
PROCEDURE fin3
    ON KEY LABEL esc
    STORE 1 TO salec
    KEYB CHR(27)
RETURN

*!***************************************************************
*!
*!      Procedure: FIN
*!
*!      Called by: VDUP.PRG
*!               : VAPL.PRG
*!               : VMAN.PRG
*!               : VMANR.PRG
*!               : VSUMM.PRG
*!               : RBROW              (procedure in VRESU.PRG)
*!
*!***************************************************************
PROC fin
    *IF CAM=0
    KEYB CHR(23)
    *ENDIF
    STORE 1 TO fin
    ON KEY LABEL esc
    ON KEY LABEL f2
    ON KEY LABEL f5
    ON KEY LABEL f9
RETURN

*!***************************************************************
*!
*!      Procedure: CAMBIA
*!
*!      Called by: VMAN.PRG
*!               : VMANR.PRG
*!               : VSUMM.PRG
*!               : RBROW              (procedure in VRESU.PRG)
```

```
*!
*!***********************************************************
PROCEDURE cambia
    IF cam=1
        STORE 0 TO cam
        =SEEK(linea,1)
    ELSE
        STORE 1 TO cam
    ENDIF
    KEYB CHR(23)
RETURN

*!***********************************************************
*!
*!      Function: VPRUEBA()
*!
*!      Called by: VMAN.PRG
*!                : VSUMM.PRG
*!                : RBROW           (procedure in VRESU.PRG)
*!
*!***********************************************************
FUNCTION vprueba
    CLEAR
    #IF _DOS
        @18,49 SAY prueba.condnote SIZE 7,31
    #ELSE
        @WROWS()-7,30 SAY prueba.condnote SIZE 7,31

#ENDIF

RETURN .T.

*!***********************************************************
*!
*!      Function: PPER()
*!
*!      Called by: VMAN.PRG
*!                : VMANR.PRG
*!
*!***********************************************************
FUNCTION pper
    PARAMETER nnper
    DO CASE
        CASE periodo=0
            RETURN .T.
        CASE LASTKEY()=4 OR LASTKEY()=19 OR LASTKEY()=9 OR LASTKEY()=15
            *   STORE pperau-val(substr(VARREAD(),2,2)) TO periodo
            *   keyb chr(23)
            RETURN .T.
        CASE nnper=periodo
            RETURN .T.
        OTHER
```

```
        return.f.
    ENDCASE

*: EOF: VMANR.PRG

*:********************************************************************
*:********************************************************************
*                    ============
*                    14. VRESU.PRG
*                    ============
*
*                    FREQUENCY BROWSE VIEW
*:********************************************************************
*:
*: Procedure file: VRESU.PRG
*:
*:  Procs & Fncts: RBROW
*:
*:         Set by: VACTI.PRG
*:
*:          Calls: FIN3            (procedure in VMAN.PRG)
*:               : NVL()           (function  in TABLA.PRG)
*:               : TAB_AREA        (procedure in TAB_PROC.PRG)
*:               : CENTRA          (procedure in TABLA.PRG)
*:               : RBROW           (procedure in VRESU.PRG)
*:
*:           Uses: RESULT.DBF           Alias: RESULT
*:               : TEMP1.DBF
*:               : TEMP.DBF
*:
*:        Indexes: TEMP.IDX
*:               : TEMP1.IDX
*:
*:      CDX files: RESULT.CDX
*:
*:     Documented 05/01/93 at 23:02          FoxDoc   version 2.10f
*:********************************************************************
#DEFINE USENGLISH .T.
#DEFINE SPANISH .F.
SELE 1
DECLARE fldarray[FCOUNT()]
FOR i = 1 TO FCOUNT()
    IF diaomes='M'
        fldarray[i] = SUBSTR(CMONTH(GOMONTH(mfei,i-1)),1,3)+STR(YEAR(GOMONTH(mfei,i-1))-1900,3,0)+STR(i,3,0)
        * fldarray[i] = SUBSTR(CMONTH(GOMONTH(mfei,i-1)),1,3)+STR(YEAR(GOMONTH(mfei,i-1))-1900,3,0)
    ELSE
        fldarray[i] = ' '+DTOC(mfei+i-1)
    ENDIF
ENDFOR
```

```
STORE 'RESULTADOS' TO tit
STORE 'FRECUENCIAS DE RESULTADOS' TO tit2
STORE 'RESULTADOS' TO tit3

STORE WROWS()-2 TO rows
STORE WROWS()-1 -INT(WROWS()/3) TO row3
STORE row3 - 3 TO row2
#IF _DOS
    DEFI WIND revisar FROM 5,5 TO 13,74 COLOR SCHE 10 SHADOW
#ENDIF

#IF _WINDOWS.AND.USENGLISH
    DEFI WIND revisar  SYSTEM FROM  7,12 TO  15,WCOLS()-13 TITLE  "FRECUENCIES OF
DIAGNOSTICS" COLOR RGB(0,0,0,192,192,192) FONT 'SYSTEM',10
#ELIF _WINDOWS.AND.SPANISH
    DEFI  WIND revisar  SYSTEM FROM 7,12  TO 15,WCOLS()-13 TITLE "FRECUENCIASS DE
DIAGNOSTICOS" COLOR RGB(0,0,0,192,192,192) FONT 'SYSTEM',10
#ENDIF
DEFI  WIND tabla FROM  row3,0 TO rows,WCOLS()-1 ZOOM PANEL  COLOR SCHE 10 TITL tit
SHADOW FONT 'ARIAL',8
DEFI WIND result  FROM 0,0 TO  row2,WCOLS()-1 ZOOM  COLOR SCHE 10   TITL tit2  FONT
'ARIAL',8
DEFI WIND result1  FROM row3,0 TO rows,WCOLS()/2+6  ZOOM PANEL COLOR SCHE 10   TITL
tit3 FONT 'ARIAL',8
SELE 3
SET RELA OFF INTO clase1
SET RELA OFF INTO clase2
SET RELA OFF INTO clase3

SELE 2
STORE 60 TO npermax
*STORE SPACE(12) TO mlinea
*STORE SPACE(6) TO mprueba
*STORE 0 TO periodo
STORE 0 TO salec
DO WHILE .T.
    ON KEY LABEL esc DO fin3
    #IF _DOS
        SET COLOR TO &screenatr
    #ENDIF
    ACTI WIND revisar
    SET CURSOR ON
    #IF _DOS
        SET COLOR TO &screenatr
    #ENDIF
    CLEAR
    #IF _DOS.AND.USENGLISH
        @1,22 SAY 'FREQUENCIES OF DIAGNOSTICS'
        @3, 2 SAY 'Line  to  search      ' GET  mlinea  PICTURE  '@!'  VALID
nvl(35,'tabla',2,' ',0,-6,'_NADA','linea+" "+nombre') COLOR , W+/N
        @3,33 SAY 'Test    '  GET  mprueba PICTURE '!!!!!!'                VALID
nvl(35,'prueba',2,' ',0,-5,'_NADA', 'codigo+" "+nombre+" "+linea+"    "+grupo')
```

```
COLOR ,W+/N
        @3,51 SAY 'Period ' GET periodo PICTURE '99' COLOR , W+/N RANGE 0, npermax
        @4, 2 SAY '              Clase1' GET mrclase1 PICTURE '!!!!!!' VALID
nvl(35,'clase1',2,' ',0,-6,'_NADA') COLOR , W+/N
        @4,33 SAY 'Clase2' GET mrclase2 PICTURE '!!!!!!' VALID nvl(35,'clase2',2,'
',0,-6,'_NADA') COLOR , W+/N
        @4,51    SAY       ' Clase3'    GET    mrclase3    PICTURE    '!!!!!!'    VALID
nvl(35,'clase3',2,' ',0,-6,'_NADA') COLOR , W+/N
        @6,23 SAY '     Esc=End    '
    #ELIF _DOS.AND.SPANISH
        @1,22 SAY 'FRECUENCIAS DE DIAGNOSTICOS'
        @3, 2 SAY     'Cual busca,    linea' GET mlinea PICTURE      '@!'    VALID
nvl(35,'tabla',2,' ',0,-6,'_NADA','linea+" "+nombre') COLOR , W+/N
        @3,33 SAY     'prueba'    GET mprueba PICTURE '!!!!!!'              VALID
nvl(35,'prueba',2,' ',0,-5,'_NADA', 'codigo+" "+nombre+" "+linea+" "+grupo')
COLOR ,W+/N
        @3,51 SAY 'Período' GET periodo PICTURE '99' COLOR , W+/N RANGE 0, npermax
        @4, 2 SAY '              Clase1' GET mrclase1 PICTURE '!!!!!!' VALID
nvl(35,'clase1',2,' ',0,-6,'_NADA') COLOR , W+/N
        @4,33 SAY 'Clase2' GET mrclase2 PICTURE '!!!!!!' VALID nvl(35,'clase2',2,'
',0,-6,'_NADA') COLOR , W+/N
        @4,51    SAY       ' Clase3'    GET    mrclase3    PICTURE    '!!!!!!'    VALID
nvl(35,'clase3',2,' ',0,-6,'_NADA') COLOR , W+/N
        @6,23 SAY '    Esc=Finaliza'
    #ENDIF

#IF _DOS=.T.
        SET COLOR TO &screenatr
    #ENDIF

#IF _WINDOWS.AND.USENGLISH
        @1,8.2 SAY 'Line    ' GET mlinea PICTURE '!!!!!!' VALID nvl(35,'tabla',2,'
',0,-6,'_NADA','linea+" "+nombre') COLOR , W+/N SIZE 1,6
        @1,28.8   SAY       'Test      '    GET    mprueba PICTURE    '!!!!!!'    VALID
nvl(35,'prueba',2,' ',0,-5,'_NADA', 'codigo+" "+nombre+" "+linea+" "+grupo')
COLOR ,W+/N SIZE 1,6
        @1,47 SAY 'Period ' GET periodo PICTURE '99' COLOR , W+/N RANGE 0, npermax
SIZE 1,2.5
        @2,8 SAY 'Clase1' GET mrclase1 PICTURE '!!!!!!' VALID nvl(35,'clase1',2,'
',0,-6,'_NADA') COLOR , W+/N SIZE 1,6
        @2,29 SAY 'Clase2' GET mrclase2 PICTURE '!!!!!!' VALID nvl(35,'clase2',2,'
',0,-6,'_NADA') COLOR , W+/N SIZE 1,6
        @2,47.1    SAY      'Clase3     '    GET    mrclase3    PICTURE    '!!!!!!'    VALID
nvl(35,'clase3',2,' ',0,-6,'_NADA') COLOR , W+/N SIZE 1,6
        @4,28 SAY 'Esc=End   '
    #ELIF _WINDOWS.AND.SPANISH
        @1,8.2 SAY 'Línea   ' GET mlinea PICTURE '!!!!!!' VALID nvl(35,'tabla',2,'
',0,-6,'_NADA','linea+" "+nombre') COLOR , W+/N SIZE 1,6
        @1,28.8   SAY       'Prueba'    GET    mprueba PICTURE    '!!!!!!'    VALID
nvl(35,'prueba',2,' ',0,-5,'_NADA', 'codigo+" "+nombre+" "+linea+" "+grupo')
COLOR ,W+/N SIZE 1,6
```

```
     @1,47 SAY 'Período' GET periodo PICTURE '99' COLOR , W+/N RANGE 0, npermax
SIZE 1,2.5
     @2,8 SAY 'Clase1'  GET mrclase1 PICTURE '!!!!!!' VALID nvl(35,'clase1',2,'
',0,-6,'_NADA') COLOR , W+/N SIZE 1,6
     @2,29 SAY 'Clase2' GET mrclase2 PICTURE '!!!!!!' VALID nvl(35,'clase2',2,'
',0,-6,'_NADA') COLOR , W+/N SIZE 1,6
     @2,47.1   SAY   'Clase3'    GET   mrclase3  PICTURE   '!!!!!!'   VALID
nvl(35,'clase3',2,' ',0,-6,'_NADA') COLOR , W+/N SIZE 1,6
     @4,28 SAY 'Esc=Finaliza'
  #ENDIF
  READ
  DEAC WIND revisar
  SET CURSOR OFF
  *IF mlinea=SPACE(12) AND mprueba=SPACE(6) AND periodo=0
  IF salec=1
     SELE 2
     SET FILTER TO
     SELE 1
     ON KEY LABEL esc
     DEAC WIND result
     DEAC WIND result1
     DEAC WIND &tit2
     DEAC WIND &tit3
     RELE WIND result
     RELE WIND result1
     RELE WIND &tit2
     RELE WIND &tit3
     DEAC WIND &tit
     RELE WIND &tit
     DEAC WIND &tit
     DEAC WIND revisar
     RELE WIND revisar
     DEAC WIND tabla
     RELE WIND tabla
     DO tab_area
     *KEYB CHR(27)
     EXIT
  ENDIF
  STORE ' .T. ' TO fcond
  IF mprueba<>SPACE(6)
     STORE fcond + ' AND PRUEBA=TRIM(MPRUEBA) ' TO fcond
  ENDIF
  IF mlinea<>SPACE(12)
     STORE fcond + ' AND LINEA=TRIM(MLINEA) ' TO fcond
  ENDIF
  IF mrclase1<>SPACE(6)
     STORE fcond + ' AND CLASE1=TRIM(MRCLASE1) ' TO fcond
  ENDIF
  IF mrclase2<>SPACE(6)
     STORE fcond + ' AND CLASE2=TRIM(MRCLASE2) ' TO fcond
  ENDIF
  IF mrclase3<>SPACE(6)
```

```
        STORE fcond + ' AND CLASE3=TRIM(MRCLASE3) ' TO fcond
    ENDIF
    SELE 2
    IF periodo<>0
        STORE fcond + 'and VAL(nper)=periodo ' TO fcond1
        STORE fcond + 'and nper=periodo ' TO fcond
    ENDIF
    COUNT FOR &fcond TO numrec
    IF numrec=0
        DO centra WITH ' NO HAY RESULTADOS  PARA ESAS CONDICIONES ', row2+1, 'S',
'S'
        LOOP
    ENDIF
    CREATE CURSOR temp1 (numero N(6,0),;
        prueba C(6),;
        linea  C(12),;
        clase1 C(6),;
        clase2 C(6),;
        clase3 C(6),;
        nper N(3,0) )
    SELE 2
    STORE 0 TO fin, cam
    STORE 1 TO entra
    STORE '' TO keych
    DO CASE
        CASE mrclase1=SPACE(6)
            STORE 'TEMP.CLASE1' TO keych
            SELE temp1
            APPE FROM result FOR &fcond
            INDEX ON prueba+STR(nper,3,0)+clase1 TO temp UNIQ   && New
            REPLACE ALL numero WITH 1
            INDEX ON clase1 TO temp
            * TOTAL ON clase1 TO temp FOR NUMERO=1
            TOTAL ON clase1 TO temp
            COPY TO temp1
            USE temp1                   && related to file DRRESULT.DBF
            INDEX ON clase1 TO temp1
            SET RELA TO prueba INTO prueba
            SELE 0
            USE temp                    && related to file PRRESULT.DBF
            SET RELA TO clase1 INTO temp1
            SET RELA TO clase1 INTO clase1 ADDI
            SELE 2
            STORE 'CLASE1' TO fclase
            STORE 'CLASE1.NOMBRE1' TO fnombre
            STORE 'Clasificación 1' TO fnombrec
            DO rbrow
            SELE temp
            USE
            SELE temp1
            USE
            SELE 2
```

```
CASE mrclase2=SPACE(6)
    STORE 'TEMP.CLASE2' TO keych
    SELE temp1
    APPE FROM result FOR &fcond
    INDEX ON prueba+STR(nper,3,0)+clase2 TO temp UNIQ   && NUEVA
    REPLACE ALL numero WITH 1
    INDEX ON clase2 TO temp
    TOTAL ON clase2 TO temp FOR numero=1
    * TOTAL ON clase2 TO temp
    COPY TO temp1
    USE temp1                       && Related to file DRRESULT.DBF
    INDEX ON clase2 TO temp1
    SET RELA TO prueba INTO prueba
    SELE 0
    USE temp                        && Related to file PRRESULT.DBF
    SET RELA TO clase2 INTO temp1
    SET RELA TO clase2 INTO clase2 ADDI
    SELE 2
    STORE 'CLASE2' TO fclase
    STORE 'CLASE2.NOMBRE2' TO fnombre
    STORE 'Clasificación 2' TO fnombrec
    DO rbrow
    SELE temp
    USE
    SELE temp1
    USE
    SELE 2
CASE mrclase3=SPACE(6)
    STORE 'TEMP.CLASE3' TO keych
    SELE temp1
    APPE FROM result FOR &fcond
    INDEX ON prueba+STR(nper,3,0)+clase3 TO temp UNIQ   && New
    REPLACE ALL numero WITH 1
    INDEX ON clase3 TO temp
    TOTAL ON clase3 TO temp FOR numero=1
    *TOTAL ON clase3 TO temp
    COPY TO temp1
    USE temp1                       && Related to file DRRESULT.DBF
    INDEX ON clase3 TO temp1
    SET RELA TO prueba INTO prueba
    SELE 0
    USE temp                        && Related to file PRRESULT.DBF
    SET RELA TO clase3 INTO temp1
    SET RELA TO clase3 INTO clase3 ADDI
    SELE 2
    STORE 'CLASE3' TO fclase
    STORE 'CLASE3.NOMBRE3' TO fnombre
    STORE 'Clasificación 3' TO fnombrec
    DO rbrow
    SELE temp
    USE
    SELE temp1
```

```
        USE
        SELE 2
    ENDCASE
ENDDO

*!**************************************************************
*!
*!      Procedure: RBROW
*!
*!      Called by: VRESU.PRG
*!
*!         Calls: FIN            (procedure in VDUP.PRG)
*!              : CAMBIA         (procedure in VMAN.PRG)
*!              : CMESES()       (function  in VMAN.PRG)
*!              : VPRUEBA()      (function  in VMAN.PRG)
*!
*!**************************************************************
PROCEDURE rbrow
    ON KEY LABEL esc DO fin
    *ON KEY LABEL esc KEYB CHR(13)
    ON KEY LABEL f5 DO cambia
    DO WHILE fin=0
        IF cam=0
            ON KEY LABEL f6
            SELE temp1
            #IF _DOS.AND.USENGLISH
                *SET MESSAGE TO 'FRECUENCIES      F5: Switch window     Ctl-F10: Zoom    ESC: Exit '
                @24,1 SAY 'FRECUENCIES      F5: Switch window     Ctl-F10: Zoom    ESC: Exit '
            #ELIF _DOS.AND.SPANISH
                @24,1 SAY 'FRECUENCIAS      F5: Cambiar ventana    Ctl-F10: Zoom    ESC: Salir'
                *SET MESSAGE TO 'FRECUENCIAS     F5: Switch  window     Ctl-F10: Zoom    ESC: Salir'
            #ELIF _WINDOWS.AND.USENGLISH
                SET MESSAGE TO 'FRECUENCIES  OF DIAGNOSTICS     F5: Switch window    Ctl-F10: Zoom    ESC: Exit '
            #ELIF _WINDOWS.AND.SPANISH
                SET MESSAGE TO 'FRECUENCIAS DE DIAGNOSTICOS      F5: Cambiar ventana    Ctl-F10: Zoom    ESC: Salir'
            #ENDIF BROW   SAVE   NOWAIT   NOMODIFY   NOCLEAR   NOMENU   WIND   tabla    FIEL linea,prueba, clase1, clase2, clase3, gg=cmeses(nper):H='Periodo',prueba.nombre
            #IF _DOS.AND.USENGLISH
                *SET MESSAGE TO  'FRECUENCIES     F5: Switch window     Ctl-F10: Zoom    ESC: Exit '
                @24,1 SAY 'FRECUENCIES     F5: Switch  window    Ctl-F10: Zoom   ESC: Exit '
            #ELIF _DOS.AND.SPANISH
                @24,1 SAY 'FRECUENCIAS      F5: Cambiar ventana    Ctl-F10: Zoom
```

```
ESC: Salir'
          *SET MESSAGE TO 'FRECUENCIAS      F5: Switch window      Ctl-F10:
Zoom     ESC: Salir'
          #ELIF _WINDOWS.AND.USENGLISH
             SET MESSAGE TO 'FRECUENCIES OF DIAGNOSTICS     F5: Switch window
Ctl-F10: Zoom    ESC: Exit '
          #ELIF _WINDOWS.AND.SPANISH
             SET MESSAGE TO 'FRECUENCIAS DE DIAGNOSTICOS    F5: Cambiar ventana
Ctl-F10: Zoom    ESC: Salir'
          #ENDIF @row2+1,0
          SET RELA OFF INTO result
          SELE temp
          IF entra=1
             GO TOP
          ELSE
             GO recnum
          ENDIF
          ON KEY LABEL rightarrow KEYB CHR(9)
          ON KEY LABEL leftarrow KEYB "{BACKTAB}"
          BROW    SAVE    NOMENU    NOCLEAR    WIND    result    FIEL    numero:H='
#':p='99999',&fclase, &fnombre:H=fnombrec
          #IF _DOS.AND.USENGLISH
             *SET MESSAGE TO 'FRECUENCIES      F5: Switch window      Ctl-F10:
Zoom    ESC: Exit '
             @24,1 SAY 'FRECUENCIES      F5: Switch window      Ctl-F10: Zoom
ESC: Exit '
          #ELIF _DOS.AND.SPANISH
             @24,1 SAY 'FRECUENCIAS      F5: Cambiar ventana     Ctl-F10: Zoom
ESC: Salir'
             *SET MESSAGE TO 'FRECUENCIAS      F5: Switch window      Ctl-F10:
Zoom    ESC: Salir'
          #ELIF _WINDOWS.AND.USENGLISH
             SET MESSAGE TO 'FRECUENCIES OF DIAGNOSTICS     F5: Switch window
Ctl-F10: Zoom    ESC: Exit '
          #ELIF _WINDOWS.AND.SPANISH
             SET MESSAGE TO 'FRECUENCIAS DE DIAGNOSTICOS    F5: Cambiar ventana
Ctl-F10: Zoom    ESC: Salir'
          #ENDIF ON KEY LABEL rightarrow
          ON KEY LABEL leftarrow
          STORE RECNO() TO recnum
          STORE 0 TO entra
       ELSE
          SELE temp1
          ON KEY LABEL rightarrow KEYB CHR(9)
          ON KEY LABEL leftarrow KEYB "{BACKTAB}"
          @row2+1,0
          #IF _DOS.AND.USENGLISH
             *SET MESSAGE TO 'DIAGNOSTICS      F5: Switch window      Ctl-F10: Zoom
```

```
ESC: Exit '
            @24,1 SAY 'DIAGNOSTICS       F5: Switch window     Ctl-F10: Zoom
ESC: Exit '
          #ELIF _DOS.AND.SPANISH
            *SET MESSAGE TO 'DIAGNOSTICOS   F5: Cambiar ventana  Ctl-F10: Zoom
ESC: Salir'
            @24,1 SAY 'DIAGNOSTICOS    F5: Cambiar ventana  Ctl-F10: Zoom
ESC: Salir'
          #ELIF _WINDOWS.AND.USENGLISH
            SET MESSAGE TO 'DIAGNOSTICS       F5: Switch  window      Ctl-F10:
Zoom   ESC: Exit '
          #ELIF _WINDOWS.AND.SPANISH
            SET MESSAGE TO 'DIAGNOSTICOS      F5: Cambiar ventana     Ctl-F10:
Zoom   ESC: Salir'
          #ENDIF
          #IF USENGLISH
            BROW    SAVE    NOCLEAR    NOMODIFY   NOMENU    WIND result1     FIEL
linea:W=vprueba(), prueba, clase1, clase2, clase3, gg=cmeses(nper):H=' Period
',prueba.nombre  KEY EVAL(keych)
          #ELSE
            BROW    SAVE    NOCLEAR    NOMODIFY   NOMENU    WIND result1     FIEL
linea:W=vprueba(), prueba, clase1, clase2, clase3, gg=cmeses(nper):H=' Período
',prueba.nombre  KEY EVAL(keych)
          #ENDIF
          #IF _DOS.AND.USENGLISH
            *SET MESSAGE TO 'DIAGNOSTICS     F5: Switch window     Ctl-F10: Zoom
ESC: Exit '
            @24,1 SAY 'DIAGNOSTICS       F5: Switch window     Ctl-F10: Zoom
ESC: Exit '
          #ELIF _DOS.AND.SPANISH
            *SET MESSAGE TO 'DIAGNOSTICOS   F5: Cambiar ventana  Ctl-F10: Zoom
ESC: Salir'
            @24,1 SAY 'DIAGNOSTICOS    F5: Cambiar ventana  Ctl-F10: Zoom
ESC: Salir'
          #ELIF _WINDOWS.AND.USENGLISH
            SET MESSAGE TO 'DIAGNOSTICS       F5: Switch  window      Ctl-F10:
Zoom   ESC: Exit '
          #ELIF _WINDOWS.AND.SPANISH
            SET MESSAGE TO 'DIAGNOSTICOS      F5: Cambiar ventana     Ctl-F10:
Zoom   ESC: Salir'
          #ENDIF ON KEY LABEL rightarrow
          ON KEY LABEL leftarrow
        ENDIF
      ENDDO
      ON KEY LABEL f2
      ON KEY LABEL esc
      ON KEY LABEL f5
      RETURN

*!*******************************************************************
```

```
*!
*!      Function: VPRUEBA()
*!
*!      Called by: VMAN.PRG
*!               : VSUMM.PRG
*!               : RBROW              (procedure in VRESU.PRG)
*!
*!**********************************************************************
FUNCTION vprueba
    #IF _DOS
       @16,0 CLEAR
       @16,48 SAY prueba.condnote SIZE 7,32
    #ELSE
       @14,0 CLEAR
       @18,57 SAY prueba.condnote SIZE 7,32   COLOR N/W*
    #ENDIF
    @row3,0 CLEAR
    @row3+2,48 SAY prueba.condnote SIZE 7,32
RETURN .T.

*!**********************************************************************
*!
*!      Procedure: FIN3
*!
*!      Called by: VMAN.PRG
*!               : VRESU.PRG
*!               : VMANR.PRG
*!               : VSUMM.PRG
*!
*!**********************************************************************
PROCEDURE fin3
    ON KEY LABEL esc
    STORE 1 TO salec
    KEYB CHR(27)
RETURN

*!**********************************************************************
*!
*!      Procedure: FIN
*!
*!      Called by: VDUP.PRG
*!               : VAPL.PRG
*!               : VMAN.PRG
*!               : VMANR.PRG
*!               : VSUMM.PRG
*!               : RBROW              (procedure in VRESU.PRG)
*!
*!**********************************************************************
PROC fin
    KEYB CHR(23)
    STORE 1 TO fin
```

```
        ON KEY LABEL esc
        ON KEY LABEL f2
        ON KEY LABEL f5
        ON KEY LABEL f9
RETURN

*!***************************************************************
*!
*!      Procedure: CAMBIA
*!
*!      Called by: VMAN.PRG
*!               : VMANR.PRG
*!               : VSUMM.PRG
*!               : RBROW            (procedure in VRESU.PRG)
*!
*!***************************************************************
PROCEDURE cambia
    IF cam=1
        STORE 0 TO cam
        =SEEK(linea,1)
    ELSE
        STORE 1 TO cam
    ENDIF
    KEYB CHR(23)
RETURN

*!***************************************************************
*!
*!      Function: CMESES()
*!
*!      Called by: VMAN.PRG
*!               : VMANR.PRG
*!               : VSUMM.PRG
*!               : RBROW            (procedure in VRESU.PRG)
*!
*!***************************************************************
FUNCTION cmeses
    PARAMETER npar
    IF npar=0
        RETURN
    ENDIF
    RETURN fldarray[NPAR]
RETURN
*: EOF: VRESU.PRG

*:***************************************************************
*:***************************************************************
*                       =============
*                       15. VSUMM.PRG
*                       =============
*
*                       SUMMARY BROWSE VIEW
```

```
*:*******************************************************************
*:
*: Procedure file: VSUMM.PRG
*:
*:   Procs & Fncts: VPRUEBA1( )
*:
*:          Set by: VACTI.PRG
*:
*:           Calls: FIN3            (procedure in VMAN.PRG)
*:                : TAB_AREA        (procedure in TAB_PROC.PRG)
*:                : CENTRA          (procedure in TABLA.PRG)
*:                : FIN             (procedure in VDUP.PRG)
*:                : CAMBIA          (procedure in VMAN.PRG)
*:                : CMESES( )       (function  in VMAN.PRG)
*:                : VPRUEBA1( )     (function  in VSUMM.PRG)
*:                : VPRUEBA( )      (function  in VMAN.PRG)
*:
*:      Documented 05/01/93 at 23:02          FoxDoc   version 2.10f
*:*******************************************************************
#DEFINE USENGLISH .T.
#DEFINE SPANISH .F.
*STORE 'R' TO tcp
SET SAFETY OFF
SET TALK OFF
SET FUNCTION 2 TO ""
SET FUNCTION 3 TO ""
SET FUNCTION 4 TO ""
SET FUNCTION 5 TO ""
SET FUNCTION 6 TO ""
SET FUNCTION 7 TO ""
SET FUNCTION 8 TO ""
SET FUNCTION 9 TO ""
SET FUNCTION 10 TO ""
SELE 1
SET ORDER TO 1
CLEAR
SELE 2
*USE result
*INDEX ON linea TO result
*INDEX ON prueba TO resul2
*SET INDEX TO result, resul2
SET ORDER TO 2
STORE 0 TO recnum
SELE 3
*USE prueba
*INDEX ON codigo TO prueba
SET ORDER TO 1
#IF USENGLISH
    STORE 'DIAGNOSTICS' TO tit
    STORE 'SUMMARY DIAGNOSTICS' TO tit2
    STORE 'DIAGNOSTICS' TO tit3
#ELSE
```

```
    STORE 'DIAGNOSTICOS' TO tit
    STORE 'RESUMEN DE DIAGNOSTICOS' TO tit2
    STORE 'DIAGNOSTICOS' TO tit3
ENDIF
STORE WROWS()-2 TO rows
STORE WROWS()-1 -INT(WROWS()/3) TO row3
STORE row3 - 5 TO row2

#IF _DOS
    DEFI WIND revisar FROM 5,5 TO 13,74 COLOR SCHE 10 SHADOW
#ENDIF
#IF _WINDOWS.AND.USENGLISH
    DEFI WIND revisar SYSTEM FROM 7,12 TO 14,WCOLS()-13 TITLE "SUMMARY DIAGNOSTICS
BROWSE VIEW" COLOR RGB(0,0,0,192,192,192) FONT 'SYSTEM',10
#ELIF _WINDOWS.AND.SPANISH
    DEFI  WIND revisar SYSTEM FROM 7,12  TO 14,WCOLS()-13 TITLE "BROWSE DE RESUMEN
DE DIAGNOSTICOS" COLOR RGB(0,0,0,192,192,192) FONT 'SYSTEM',10
ENDIF DEFI  WIND tabla FROM row3,0 TO  rows,WCOLS()-2 ZOOM PANEL  COLOR SCHE 10 TITL tit
SHADOW FONT 'ARIAL',8
DEFI WIND result  FROM 0,0  TO row2,WCOLS()-2 ZOOM PANEL  COLOR SCHE 10 TITL  tit2
FONT 'ARIAL',8
*DEFI WIND result1 FROM 0,0 TO row2,_C2 ZOOM PANEL COLOR SCHE 10 TITL tit3
SELE 1
*STORE SPACE(12) TO mlinea
*STORE SPACE(6) TO mprueba
*STORE 0 TO periodo
*STORE 0 TO pe1
STORE 0 TO salec
STORE 60 TO npermax && NUMERO MAXIMO DE PERIODOS EN LA TABLA DE DATOS
DO WHILE .T.
    ON KEY LABEL esc DO fin3
    #IF _DOS
        SET COLOR TO &screenatr
    #ENDIF
    ACTI WIND revisar
    SET CURSOR ON
    #IF _DOS
        SET COLOR TO &screenatr
    #ENDIF
    CLEAR
    #IF _DOS.AND.USENGLISH
        @1,18 SAY 'SUMMARY DIAGNOSTICS BROWSE VIEW'
        @3,18 SAY 'Period to examine          ' GET periodo PICTURE '99' COLOR ,
W+/N RANGE 0, npermax
        @6,20 SAY '      Esc=End         '
    #ELIF _DOS.AND.SPANISH
        @1,18 SAY 'BROWSE DE RESUMEN DE DIAGNOSTICOS'
        @3,18 SAY '    Período que desea revisar' GET  periodo PICTURE '99' COLOR ,
W+/N RANGE 0, npermax
        @6,20 SAY '      Esc=Finaliza'
```

```
    #ENDIF
    #IF _DOS
        SET COLOR TO &screenatr
    #ENDIF
    #IF _WINDOWS.AND.USENGLISH
        @1,18 SAY '   Period to examine         ' GET periodo PICTURE '99' COLOR ,
W+/N RANGE 0, npermax
        @3,28 SAY 'Esc=End          '
    #ELIF _WINDOWS.AND.SPANISH
        @1,18 SAY '   Período que desea revisar' GET periodo PICTURE  '99' COLOR ,
W+/N RANGE 0, npermax
        @3,28 SAY 'Esc=Finaliza'
    #ENDIF
    READ
    STORE periodo TO pperau
    IF pperau<13
        STORE 13 TO pperau
    ENDIF
    DEAC WIND revisar
    SET CURSOR OFF
    IF salec=1
        SELE 2
        SET FILTER TO
        SELE 1
        ON KEY LABEL esc
        DEAC WIND result
        DEAC WIND result1
        DEAC WIND &tit2
        DEAC WIND &tit3
        RELE WIND result
        RELE WIND result1
        RELE WIND &tit2
        RELE WIND &tit3
        DEAC WIND &tit
        RELE WIND &tit
        DEAC WIND &tit
        DEAC WIND revisar
        RELE WIND revisar
        DEAC WIND tabla
        RELE WIND tabla DO tab_area
        EXIT
    ENDIF
    STORE ' .T. ' TO fcond
    SELE 12
    SET ORDER TO 3
    SELE 11
    IF periodo=0
        SET FILTER TO
    ELSE
        SET FILTER TO nper=periodo
```

```
ENDIF
COUNT TO numrec
IF numrec=0
    DO centra WITH ' NO HAY RESULTADOS PARA ESE PERIODO ',15,'S','S'
    SET FILTER TO
    LOOP
ENDIF
GO TOP STORE YEAR(DATE())*12+MONTH(DATE())-YEAR(mfei)*12-MONTH(mfei)+1 TO pmeses
*   SET ORDER TO 2
SELE 1
ON KEY LABEL esc DO fin
ON KEY LABEL f5 DO cambia
STORE 0 TO fin,cam
***
DECLARE fldarray[FCOUNT()]
DECLARE flbarray[FCOUNT()]
*store ctod('15/01/93') to mfei
FOR i = 1 TO FCOUNT()
    IF diaomes='M'
        fldarray[i] = '
'+SUBSTR(CMONTH(GOMONTH(mfei,i-1)),1,3)+STR(YEAR(GOMONTH(mfei,i-1))-1900,3,0)+STR(i,3,0)
    ELSE
        fldarray[i] = ' '+DTOC(mfei+i-1)
    ENDIF
    flbarray[i] = 'P'+LTRIM(STR(i,3,0))
ENDFOR
STORE 0 TO recnum
***
STORE 1 TO entra
DO WHILE fin=0
    IF cam=0
        ON KEY LABEL f6
        SELE 12
        ON KEY LABEL rightarrow KEYB CHR(9)
        ON KEY LABEL leftarrow KEYB "{BACKTAB}"
        #IF _DOS.AND.USENGLISH
            *SET MESSAGE TO 'SUMMARY DIAGNOSTICS   F5: Switch window  Ctl-F10: Zoom  ESC: Exit'
            @24,1 SAY 'SUMMARY DIAGNOSTICS   F5: Switch window  Ctl-F10: Zoom  ESC: Exit'
        #ELIF _DOS.AND.SPANISH
            @24,1 SAY 'DIAGNOSTICOS RESUMEN  F5: Cambia ventana  Ctl-F10: Zoom  ESC: Salir'
            *SET MESSAGE TO 'DIAGNOSTICOS RESUMEN  F5: Cambia ventana  Ctl-F10: Zoom  ESC: Salir'
        #ELIF _WINDOWS.AND.USENGLISH
            SET MESSAGE TO 'SUMMARY  DIAGNOSTICS    F5:  Switch window  Ctl-F10: Zoom   ESC: Exit'
        #ELIF _WINDOWS.AND.SPANISH
```

```
              SET MESSAGE TO 'RESUMEN  DE DIAGNOSTICOS       F5: Cambiar  ventana
Ctl-F10: Zoom     ESC: Salir'
          #ENDIF BROW  SAVE NOWAIT  NOMODIFY  NOMENU  WIND tabla  KEY  prresult.analisis
FIEL;
              analisis,prueba,  positiva:H='P',  prueba.clase1,  prueba.clase2,
prueba.clase3, prueba.nombre
          #IF _DOS.AND.USENGLISH
              *SET MESSAGE TO 'SUMMARY DIAGNOSTICS    F5: Switch window  Ctl-F10:
Zoom    ESC: Exit'
              @24,1 SAY 'SUMMARY DIAGNOSTICS    F5: Switch window  Ctl-F10: Zoom
ESC: Exit'
          #ELIF _DOS.AND.SPANISH
              @24,1 SAY 'DIAGNOSTICOS RESUMEN  F5: Cambia ventana    Ctl-F10: Zoom
ESC: Salir'
              *SET MESSAGE TO 'DIAGNOSTICOS RESUMEN  F5: Cambia ventana  Ctl-F10:
Zoom  ESC: Salir'
          #ELIF _WINDOWS.AND.USENGLISH
              SET MESSAGE TO 'SUMMARY   DIAGNOSTICS       F5:   Switch  window
Ctl-F10: Zoom     ESC: Exit'
          #ELIF _WINDOWS.AND.SPANISH
              SET MESSAGE TO 'RESUMEN DE DIAGNOSTICOS       F5: Cambiar ventana
Ctl-F10: Zoom     ESC: Salir'
          #ENDIF ON KEY LABEL rightarrow
              ON KEY LABEL leftarrow
              SELE 11
              IF entra=1
                  GO TOP
              ELSE
                  GO recnum
              ENDIF
              *SET RELA TO analisis INTO drresult
              ON KEY LABEL rightarrow KEYB CHR(9)
              ON KEY LABEL leftarrow KEYB "{BACKTAB}"
              DEACTI WINDOW REVISAR
              #IF _DOS.AND.USENGLISH
                  *SET  MESSAGE TO 'SUMMARY DIAGNOSTICS    F5: Switch window  Ctl-F10:
Zoom    ESC: Exit'
                  @24,1 SAY 'SUMMARY DIAGNOSTICS    F5: Switch window  Ctl-F10: Zoom
ESC: Exit'
              #ELIF _DOS.AND.SPANISH
                  @24,1 SAY 'DIAGNOSTICOS RESUMEN  F5: Cambia ventana    Ctl-F10: Zoom
ESC: Salir'
                  *SET MESSAGE TO 'DIAGNOSTICOS RESUMEN  F5: Cambia ventana  Ctl-F10:
Zoom  ESC: Salir'
              #ELIF _WINDOWS.AND.USENGLISH
                  SET MESSAGE TO  'SUMMARY   DIAGNOSTICS       F5:  Switch window
Ctl-F10: Zoom     ESC: Exit'
              #ELIF _WINDOWS.AND.SPANISH
```

```
            SET MESSAGE TO 'RESUMEN  DE DIAGNOSTICOS     F5: Cambiar  ventana
Ctl-F10: Zoom    ESC: Salir'
        #ENDIF
        #IF USENGLISH
            BROW SAVE NOMENU NOCLEAR WIND result FIEL;
                gg=cmeses(nper):H='Period               ':W=vpruebal(),
analisis:W=vpruebal(), presumen.nombre:W=vpruebal()
        #ELSE
            BROW SAVE NOMENU NOCLEAR WIND result FIEL;
                gg=cmeses(nper):H='Periodo':W=vpruebal(),
analisis:W=vpruebal(), presumen.nombre:W=vpruebal()
        #ENDIF
        #IF _DOS.AND.USENGLISH
            *SET MESSAGE TO 'SUMMARY DIAGNOSTICS     F5: Switch window   Ctl-F10:
Zoom   ESC: Exit'
            @24,1 SAY 'SUMMARY DIAGNOSTICS     F5: Switch window   Ctl-F10: Zoom
ESC: Exit'
        #ELIF _DOS.AND.SPANISH
            @24,1 SAY 'DIAGNOSTICOS RESUMEN  F5: Cambia ventana    Ctl-F10: Zoom
ESC: Salir'
            *SET MESSAGE TO 'DIAGNOSTICOS RESUMEN  F5: Cambia ventana   Ctl-F10:
Zoom  ESC: Salir'
        #ELIF _WINDOWS.AND.USENGLISH
            SET MESSAGE TO   'SUMMARY  DIAGNOSTICS      F5:  Switch window
Ctl-F10: Zoom    ESC: Exit'
        #ELIF _WINDOWS.AND.SPANISH
            SET MESSAGE TO 'RESUMEN  DE DIAGNOSTICOS     F5: Cambiar  ventana
Ctl-F10: Zoom    ESC: Salir'
        #ENDIF ON KEY LABEL rightarrow
            ON KEY LABEL leftarrow
            STORE RECNO() TO recnum
            STORE 0 TO entra
    ELSE
        SELE 11
        DEACTI WINDOW REVISAR
        #IF _DOS.AND.USENGLISH
            *SET MESSAGE TO 'DIAGNOSTICS     F5: Switch window   Ctl-F10: Zoom
ESC: Exit'
            @24,1 SAY 'DIAGNOSTICS    F5: Switch window   Ctl-F10: Zoom    ESC:
Exit'
        #ELIF _DOS.AND.SPANISH
            *SET MESSAGE TO 'DIAGNOSTICOS F5: Cambiar ventana  Ctl-F10: Zoom
ESC: Salir'
            @24,1 SAY 'DIAGNOSTICOS F5:  Cambiar ventana  Ctl-F10: Zoom   ESC:
Salir'
        #ELIF _WINDOWS.AND.USENGLISH
            SET MESSAGE TO 'DIAGNOSTICS       F5: Switch window       Ctl-F10: Zoom
    ESC: Exit '
        #ELIF _WINDOWS.AND.SPANISH
```

```
                SET MESSAGE TO 'DIAGNOSTICOS      F5: Cambiar  ventana    Ctl-F10:
Zoom    ESC: Salir'
        #ENDIF
        #IF USENGLISH
            BROW    SAVE    NOWAIT    NOMENU   NOMODIFY   WIND    result    FIEL
gg=cmeses(nper):H='Period ', analisis, presumen.nombre
        #ELSE
            BROW    SAVE    NOWAIT    NOMENU   NOMODIFY   WIND    result    FIEL
gg=cmeses(nper):H='Periodo', analisis, presumen.nombre
        #ENDIF
        #IF _DOS.AND.USENGLISH
            *SET MESSAGE TO 'DIAGNOSTICS    F5: Switch window    Ctl-F10: Zoom
ESC: Exit'
            @24,1 SAY 'DIAGNOSTICS    F5: Switch window    Ctl-F10: Zoom    ESC:
Exit'
        #ELIF _DOS.AND.SPANISH
            *SET MESSAGE TO 'DIAGNOSTICOS  F5: Cambiar ventana  Ctl-F10:  Zoom
ESC: Salir'
            @24,1 SAY 'DIAGNOSTICOS  F5: Cambiar ventana  Ctl-F10: Zoom   ESC:
Salir'
        #ELIF _WINDOWS.AND.USENGLISH
            SET MESSAGE TO 'DIAGNOSTICS       F5: Switch window    Ctl-F10: Zoom
    ESC: Exit '
        #ELIF _WINDOWS.AND.SPANISH
            SET MESSAGE TO  'DIAGNOSTICOS         F5: Cambiar  ventana   Ctl-F10:
Zoom    ESC: Salir'
        #ENDIF SELE 12
        ON KEY LABEL rightarrow KEYB CHR(9)
        ON KEY LABEL leftarrow KEYB "{BACKTAB}"
        BROW   SAVE  NOCLEAR   NOMODIFY  NOMENU   WIND   tabla  KEY   prresult.analisis
FIEL;
            a n a l i s i s : W = v p r u e b a ( ) ,
prueba:W=vprueba(),positiva:H='P':W=vprueba(),;
            prueba.clase1:W=vprueba(),        prueba.clase2:W=vprueba(),
prueba.clase3:W=vprueba(), prueba.nombre:W=vprueba()
        #IF _DOS.AND.USENGLISH
            *SET MESSAGE TO 'DIAGNOSTICS    F5: Switch window    Ctl-F10: Zoom
ESC: Exit'
            @24,1 SAY 'DIAGNOSTICS    F5: Switch window    Ctl-F10: Zoom    ESC:
Exit'
        #ELIF _DOS.AND.SPANISH
            *SET MESSAGE TO 'DIAGNOSTICOS  F5: Cambiar ventana   Ctl-F10: Zoom
ESC: Salir'
            @24,1 SAY 'DIAGNOSTICOS  F5: Cambiar ventana  Ctl-F10: Zoom   ESC:
Salir'
        #ELIF _WINDOWS.AND.USENGLISH
            SET MESSAGE TO 'DIAGNOSTICS       F5: Switch window    Ctl-F10: Zoom
    ESC: Exit '
        #ELIF _WINDOWS.AND.SPANISH
            SET MESSAGE TO  'DIAGNOSTICOS           F5: Cambiar  ventana    Ctl-F10:
```

```
Zoom       ESC: Salir
           #ENDIF

ON KEY LABEL rightarrow
           ON KEY LABEL leftarrow
       ENDIF
    ENDDO
    SELE 11
ENDDO
RETURN

*!***********************************************************
*!
*!      Function: CMESES()
*!
*!      Called by: VMAN.PRG
*!               : VMANR.PRG
*!               : VSUMM.PRG
*!               : RBROW              (procedure in VRESU.PRG)
*!
*!***********************************************************
FUNCTION cmeses
    PARAMETER npar
    IF npar=0
        RETURN '  '
    ENDIF
    RETURN fldarray[NPAR]
RETURN

*!***********************************************************
*!
*!      Procedure: FIN3
*!
*!      Called by: VMAN.PRG
*!               : VRESU.PRG
*!               : VMANR.PRG
*!               : VSUMM.PRG
*!
*!***********************************************************
PROCEDURE fin3
    ON KEY LABEL esc
    STORE 1 TO salec
    KEYB CHR(27)
RETURN

*!***********************************************************
*!
*!      Procedure: FIN
*!
*!      Called by: VDUP.PRG
```

```
*!              : VAPL.PRG
*!              : VMAN.PRG
*!              : VMANR.PRG
*!              : VSUMM.PRG
*!              : RBROW              (procedure in VRESU.PRG)
*!
*!**************************************************************
PROC fin
    KEYB CHR(23)
    STORE 1 TO fin
    ON KEY LABEL esc
    ON KEY LABEL f2
    ON KEY LABEL f5
    ON KEY LABEL f9
RETURN

*!**************************************************************
*!
*!      Procedure: CAMBIA
*!
*!      Called by: VMAN.PRG
*!               : VMANR.PRG
*!               : VSUMM.PRG
*!               : RBROW             (procedure in VRESU.PRG)
*!
*!**************************************************************
PROCEDURE cambia
    IF cam=1
        STORE 0 TO cam
        *   =SEEK(linea,1)
    ELSE
        STORE 1 TO cam
    ENDIF
    KEYB CHR(23)
    RETURN

*!**************************************************************
*!
*!      Function: VPRUEBA()
*!
*!      Called by: VMAN.PRG
*!               : VSUMM.PRG
*!               : RBROW             (procedure in VRESU.PRG)
*!
*!**************************************************************
FUNCTION vprueba
    CLEAR
    #IF _DOS
        @12,15 SAY prueba.condnote SIZE 4,50
    #ELSE
        @15,23 SAY prueba.condnote SIZE 4,50   COLOR N/W*
```

```
    #ENDIF
RETURN .T.

*!*****************************************************************
*!
*!      Function: VPRUEBA1()
*!
*!      Called by: VSUMM.PRG
*!
*!*****************************************************************
FUNCTION vpruebal
    CLEAR
    #IF _DOS
        @12,15 SAY presumen.condnote SIZE 4,50
    #ELSE
        @15,23 SAY presumen.condnote SIZE 4,50  COLOR N/W*
    #ENDIF
RETURN .T.
*: EOF: VSUMM.PRG

*:****************************************************************
*:****************************************************************
*                        ==============
*                        16. VBASES.PRG
*                        ==============
*
*                   FILE IMPORT FROM ASCII FILE
*:****************************************************************
*:
*:      Program: VBASES.PRG
*:
*:      Called by: VMENU.PRG
*:               : VACTI.PRG
*:
*:         Calls: CENTRA         (procedure in TABLA.PRG)
*:
*:          Uses: GUS.DBF
*:
*:    Other Files: TABLA.
*:
*:      Documented 05/01/93 at 23:01          FoxDoc  version 2.10f
*:****************************************************************
*** ESTE PROCEDIMIANTO  TRASLADA LOS DATOS DE UN  FILE ASCII DE  FORMATO FIJO A UN
FORMATO DBF PARA UN PERIODO ESPECIFICO
*** TABLA ES EL ASCII DE DONDE VIENEN LOS DATOS POR PERIODO
#DEFINE USENGLISH .T.
#DEFINE SPANISH .F.
CLEAR
#IF _DOS.AND.USENGLISH
    @3,0 TO 9,79
    SET CURSOR ON
    @5,28 SAY 'Reading input data  '
```

```
    @7,28 SAY 'Which period to update' GET periodo PICTURE '99'
    @ 22,0 SAY 'Select period 0 to exit'
#ELIF _DOS.AND.SPANISH
    @3,0 TO 9,79
    SET CURSOR ON
    @5,28 SAY '    Actualizar Datos'
    @7,28 SAY 'Cual periodo actualiza' GET periodo PICTURE '99'
    @ 22,0 SAY 'Período 0 para regresar'

#ELIF _WINDOWS.AND.USENGLISH
    @3,0 TO 9,WCOLS()-1 PEN 6,5 PATTERN 6
    SET CURSOR ON
    @5,_cc('Read input data ') SAY 'Read input data ' STYLE 'BU'
    @7,_cc('Which period to  update 99') SAY 'Which period to  update' GET periodo
PICTURE '99'
    @ WROWS()-3,0 SAY 'Select period 0 to exit'
#ELIF _WINDOWS.AND.SPANISH
    @3,0 TO 9,WCOLS()-1 PEN 6,5 PATTERN 6
    SET CURSOR ON
    @5,_cc('Actualizar Datos') SAY 'Actualizar Datos' STYLE 'BU'
    @7,_cc('Cual periodo actualiza 99') SAY 'Cual periodo actualiza' GET periodo
PICTURE '99'
    @ WROWS()-3,0 SAY 'Período 0 para regresar'
#ENDIF
READ
SET CURSOR OFF
IF periodo=0
    RETURN
ENDIF STORE '"P'+ALLTRIM(STR(periodo,2,0))+'"' TO busque
SELE 1
IF TYPE(&busque)<>'N'
    #IF _DOS.AND.USENGLISH
        DO centra WITH 'This period isn't present in data table ',24,'S','S'
    #ELIF _DOS.AND.USENGLISH
        DO centra WITH 'Ese período no esta en la tabla de datos ',24,'S','S'
    #ELIF _WINDOWS.AND.USENGLISH
        DO   centra   WITH   'This   period   isn't   present   in   data   table
',WROWS()-1,'S','S'
    #ELIF _WINDOWS.AND.SPANISH
        DO   centra   WITH   'Ese   período   no   esta   en   la   tabla   de   datos
',WROWS()-1,'S','S'
    #ENDIF
    RETURN
ENDIF
STORE EVAL(busque) TO busque1
SUM EVAL(busque1) TO stotal IF stotal>0
    STORE 'N' TO son
    SET CURSOR ON
```

```
    #IF USENGLISH
        @10,20 SAY 'This period already has information'
        @11,20 SAY 'Substitute for new information? (Y/N)' GET  son PICTURE '!'
VALID son $ 'YN'
    #ELSE
        @10,20 SAY 'Ese período ya contiene información'
        @11,20 SAY 'Quiere sustituirla con  la nueva (S/N)' GET  son PICTURE '!'
VALID son $ 'SN'
    #ENDIF
    READ
    SET CURSOR OFF
    IF son='N'
        RETURN
    ENDIF
ENDIF SET SAFETY OFF
SET DATE BRIT
SET TALK OFF
CLEAR
IF NOT FILE('TABLA.')
    #IF _DOS.AND.USENGLISH
        DO centra WITH 'ASCII FILE DOESN'T EXIST -->  TABLA.', 24,'S','S'
    #ELIF _DOS.AND.SPANISH
        DO centra WITH 'NO EXISTE EL FILE ASCII  -->  TABLA.', 24,'S','S'
    #ELIF _WINDOWS.AND.USENGLISH
        DO centra WITH 'ASCII FILE DOESN'T EXIST -->  TABLA.', WROWS()-1,'S','S'
    #ELIF _WINDOWS.AND.SPANISH
        DO centra WITH 'NO EXISTE EL FILE ASCII  -->  TABLA.', WROWS()-1,'S','S'
    #ENDIF
    RETURN ENDIF
** TABLA DE DATOS
#IF USENGLISH
    @5,10 SAY 'Processing ASCII file   Tabla. '
#ELIF SPANISH
    @5,10 SAY 'Procesando el file ASCII Tabla. '
ENDIF CREATE CURSOR gus (linea C(12),;
    nombre C(30),;
    valor N(14,3) )

APPE FROM tabla. SDF
DELE FOR linea=SPACE(12)
SET TALK ON
COPY TO gus FOR NOT DELE()
SET TALK OFF
@7,0 CLEAR
@6,10
#IF USENGLISH
```

```
    @6,10 SAY 'Data capture completed.
#ELIF SPANISH
    @6,10 SAY 'Finalizada la captura de datos'
#ENDIF
USE
SELE 1
SET ORDER TO 1
REPLACE ALL valor WITH 0
SELE 0
USE gus
SCAN
    IF SEEK(linea,1)
        SELE 1
        REPL valor WITH gus.valor
    ELSE
        SELE 1
        APPE BLANK
        REPL valor WITH gus.valor,;
            linea WITH gus.linea,;
            nombre WITH gus.nombre
    ENDIF
ENDSCAN
USE
SELE 1
REPLACE ALL &busque WITH valor
SELE 2
DELE FOR nper=periodo
PACK
DO  centra  WITH  '  Ya  finalizó  el  traslado-actualizaciòm  de  datos
',WROWS()-1,'S','S'
*: EOF: VBASES.PRG

*:*****************************************************************
*:*****************************************************************
*                       ==============
*                       17. VLISTA.PRG
*                       ==============
*
*               CALLS FILE PRINT ROUTINES
*:*****************************************************************
*:
*: Procedure file: VLISTA.PRG
*:
*:  Procs & Fncts: TPTO
*:               : VMESES()
*:
*:        Set by: VMENU.PRG
*:
*:         Calls: TAB_AREA        (procedure in TAB_PROC.PRG)
*:              : NVL()           (function  in TABLA.PRG)
*:              : TAB_REPO.PRG
*:              : TPTO            (procedure in VLISTA.PRG)
```

```
*:
*:       Documented 05/01/93 at 23:01            FoxDoc  version 2.10f
*:****************************************************************
#DEFINE USENGLISH .T.
#DEFINE SPANISH .F.
STORE '1' TO mrnum
DECLARE fldarray[60],fldfield[60]
*store ctod('15/01/93') to mfei
FOR i = 1 TO 60
    IF diaomes='M'
        f    l    d    a    r    r    a    y    [    i    ]    =    '
'+SUBSTR(CMONTH(GOMONTH(mfei,i-1)),1,3)+STR(YEAR(GOMONTH(mfei,i-1))-1900,3,0)+'-'
+LTRIM(STR(i,3,0))
        *    f    l    d    a    r    r    a    y    [    i    ]    =    '
'+SUBSTR(CMONTH(GOMONTH(mfei,i-1)),1,3)+STR(YEAR(GOMONTH(mfei,i-1))-1900,3,0)+STR
(i,3,0)
    ELSE
        fldarray[i] = DTOC(mfei+i-1)
    ENDIF
    fldfield[i] = 'tabla.p'+LTRIM(STR(i,3,0))
ENDFOR
SET DATE BRIT STORE dbfarea TO dbfareap
STORE 'S' TO indifilt   && VARIABLE  PARA INDICAR SI EL REPORTE FRX  SE HACE SOBRE
UNA BASE DE DATOS O SOBRE UNA BASE CREADA EN VLISTA
tcp ='R'
ON KEY LABEL esc
STORE '  ' TO gpn
STORE '  ' TO cind
STORE 'S' TO indi
STORE 0 TO mdias STORE 'I' TO iov
STORE 'P' TO poi
STORE 'D' TO dot
STORE 'S' TO mson
STORE '1' TO mcvi, filenr SAVE SCREE TO panta
DO WHILE .T.
    REST SCRE FROM panta
    @ WROWS()-2,0 CLEAR
    #IF USENGLISH
        @WROWS()-2,0 SAY ' Press [Esc] to end           ....'
    #ELSE
        @WROWS()-2,0 SAY ' Presione [Esc] para terminar ....'
    #ENDIF
    tcp ='R'
    STORE 'S' TO indifilt
    STORE 'S' TO indi.FILT
    SET COLOR TO &windowatr
```

```
STORE " " TO mtitler
DIMENSION list_ch(8)
#IF USENGLISH
    list_ch(1)=" 1  Data table         "
    list_ch(2)=" 2  Individual diagnostics    "
    list_ch(3)=" 3  Tests and formulas "
    list_ch(4)=" 4  Data groups        "
    list_ch(5)=" 5  Group elements (lines)"
    list_ch(6)=" 6  Classes"
    list_ch(7)=" 7  Summmary tests     "
    list_ch(8)=" 8  Summary diagnostics   "
    @ 2,25 MENUS list_ch,8,8 TITLE " PRE-DEFINED REPORTS     " SHADOW
#ELSE
    list_ch(1)=" 1  Tabla de Datos "
    list_ch(2)=" 2  Resultados de Pruebas    "
    list_ch(3)=" 3  Pruebas o Fórmulas "
    list_ch(4)=" 4  Grupos de Lineas"
    list_ch(5)=" 5  Detalle de los Grupos "
    list_ch(6)=" 6  Clases "
    list_ch(7)=" 7  Resumen de Pruebas "
    list_ch(8)=" 8  Resumen de Resultados "
    @ 2,25 MENUS list_ch,8,8 TITLE " REPORTES PRE-DEFINIDOS " SHADOW
#ENDIF
READ MENUS TO repchoice
@ WROWS()-2,0 CLEAR
SAVE SCREEN TO rep_scr
IF repchoice=0
    STORE dbfareap TO dbfarea
    DO tab_area
    STORE 'S' TO indi
    RETURN
ENDIF   repchoice=0
#IF _DOS
    STORE 6 TO CNT
    DO WHILE CNT < 22
        @ CNT,7 SAY REPLICATE(" ",72)
        STORE CNT + 1 TO CNT
    ENDDO
    @06,6 TO 21,79 DOUBLE
    @06,0 SAY ""
#ELSE
    DEFINE  WINDOW _temp FROM 06,6 TO WROWS()-4,WCOLS()-6 TITLE "" FONT
'SYSTEM',10
#ENDIF
DO CASE
    CASE repchoice=1 && '1'
        ?SYS(2002,1)
        STORE 'N' TO indi,son
        STORE 'S' TO indi
        STORE 0 TO periodo
        #IF _WINDOWS
            ACTI WINDOW _temp
```

```
            #ENDIF
            #IF _WINDOWS.AND.USENGLISH
               MODI WINDOW _temp TITLE 'Data table lines'
            #ELIF _WINDOWS.AND.SPANISH
               MODI WINDOW _temp TITLE 'Lineas de la Tabla de Datos'
            #ENDIF
            DO WHILE .T.
               SET COLOR TO &windowatr
               #IF _DOS .AND.USENGLISH
                  @6,0 SAY ''
                  @ROW(),14 SAY ' Data table lines          '
                  @ROW()+1,14 SAY '    Initial line  ' GET mrlin1 PICTURE "@!"  VALID
nvl(39,'TABLA',0,' ',3)
                  @ROW()+1,14 SAY '     Final line  ' GET mrlin2 PICTURE "@!"  VALID
nvl(39,'TABLA',0,' ',3)
                  @ROW()+1,14 SAY '    Group name  ' GET mrgrupo PICTURE "@!" VALID
nvl(33,'grupos',0,' ',3)
                  @ROW()+1,14 SAY '      Period #  ' GET periodo RANGE 1,60  PICTURE
'99'
                  READ
                  @20,29 SAY     'All OK?   (Y/N)' GET  son PICTURE '!' VALID son
$ 'YN'
                  READ
               #ELIF _DOS.AND.SPANISH
                  @6,0 SAY ''
                  @ROW(),14 SAY ' Lineas de la Tabla de Datos  '
                  @ROW()+1,14 SAY 'Linea Inicial' GET  mrlin1 PICTURE "@!"  VALID
nvl(39,'TABLA',0,' ',3)
                  @ROW()+1,14 SAY '   Linea Final' GET mrlin2 PICTURE "@!"  VALID
nvl(39,'TABLA',0,' ',3)
                  @ROW()+1,14 SAY ' Nombre  Grupo' GET mrgrupo PICTURE "@!" VALID
nvl(33,'grupos',0,' ',3)
                  @ROW()+1,14 SAY '# del Periodo' GET periodo RANGE 1,60  PICTURE
'99'
                  READ
                  @20,29 SAY      'Todo bien (S/N)' GET son PICTURE  '!' VALID son
$ 'SN'
                  READ
               #ENDIF
               #IF _WINDOWS.AND.USENGLISH
                  @(WROWS()-8)/2,0 SAY ''
                  _c=_cc('Nombre Grupo')
                  *@ROW(),14 SAY ' Data table lines          ' STYLE 'BU'
                  @ROW(),_c SAY 'Initial line       ' GET  mrlin1 PICTURE  "@!"
VALID nvl(33,'TABLA',0,' ',3)
                  @ROW()+2,_c-0.2 SAY 'Final  line         ' GET mrlin2 PICTURE
"@!" VALID nvl(33,'TABLA',0,' ',3)
                  @ROW()+2,_c SAY 'Group name     ' GET mrgrupo PICTURE "@!" VALID
nvl(33,'grupos',0,' ',3)
                  @ROW()+2,_c SAY 'Period #       ' GET periodo RANGE 1,60  PICTURE
'99' SIZE 1,TXTW('88')
                  READ
```

```
                    @WROWS()-2,_cc('All OK?   [Y/N] X') SAY       'All OK?    (Y/N)'
GET son PICTURE '!' VALID son $ 'YN' SIZE 1,TXTW('N')
        #ELIF _WINDOWS.AND.SPANISH
                    @(WROWS()-8)/2,0 SAY ''
                    _c=_cc('Nombre Grupo')
                    *@ROW(),14 SAY ' Lineas de la Tabla de Datos ' STYLE 'BU'
                    @ROW(),_c SAY  'Linea Inicial         ' GET mrlin1 PICTURE "@!"
VALID nvl(33,'TABLA',0,' ',3)
                    @ROW()+2,_c-0.2 SAY 'Linea  Final          ' GET mrlin2 PICTURE
"@!" VALID nvl(33,'TABLA',0,' ',3)
                    @ROW()+2,_c SAY 'Nombre  Grupo ' GET mrgrupo PICTURE "@!"  VALID
nvl(33,'grupos',0,' ',3)
                    @ROW()+2,_c SAY '# del Periodo' GET periodo RANGE 1,60  PICTURE
'99' SIZE 1,TXTW('88')
                    READ
                    @WROWS()-2,_cc('Todo bien [S/N] X')   SAY         'Todo bien (S/N)'
GET son PICTURE '!' VALID son $ 'SN' SIZE 1,TXTW('N')
        #ENDIF
            READ
        #ENDIF
        IF son='S'
            EXIT
        ENDIF
    ENDDO
    #IF _WINDOWS
        DEACTI WINDOW _temp
    #ENDIF
    STORE periodo TO p
    IF p<3
        STORE 3 TO p
    ENDIF
    SELE 5
    STORE '5 ' TO dbfarea
    STORE '.t.' TO fcond
    STORE '' TO mtitler
    STORE 0 TO tcount
    IF mrgrupo<>SPACE(6)
        STORE fcond + ' and GRUPO=TRIM(MRGRUPO)' TO fcond
        STORE mtitler+ ' GRUPO='+mrgrupo TO mtitler
    ELSE
        SELE 1
        STORE '1 ' TO dbfarea
    ENDIF
    IF mrlin2<>SPACE(6)
        STORE fcond + ' and LINEA>=MRLIN1 AND LINEA<= MRLIN2' TO fcond
        STORE mtitler+ ' DE LA LINEA=' + mrlin1 + ' HASTA LA=' + mrlin2 TO
mtitler
    ENDIF
    DO tab_area
    SET FILTER TO &fcond
    STORE 'TABLA.frx' TO filenr
    STORE 6 TO choice_y
```

```
            FLUSH
            DO tab_repo WITH choice_y
            SET FILTER TO
            STORE '' TO mtitler
        CASE repchoice=2 && '2'
            ?SYS(2002.1)
            STORE 'N' TO indi,son
            STORE 'S' TO indi
            #IF _WINDOWS
                ACTI WINDOW _temp
                MODI WINDOW _temp TITLE 'Resultados de las Pruebas'
            #ENDIF
            DO WHILE .T.
                SET COLOR TO &windowatr
                #IF _DOS.AND.USENGLISH
                    @6,0 SAY ''
                    @ROW(),14 SAY ' Diagnostics (test results)'
                    @ROW()+1,14 SAY 'Initial line ' GET mrlin1 PICTURE "@!" VALID
nvl(39,'TABLA',0,' ',3)
                    @ROW()+1,14 SAY '  Final line ' GET mrlin2 PICTURE "@!" VALID
nvl(39,'TABLA',0,' ',3)
                    @ROW()+1,14 SAY ' Group  name  ' GET  mrgrupo PICTURE "@!" VALID
nvl(33,'grupos',0,' ',3)
                    @ROW()+1,14 SAY 'First  period ' GET periodo RANGE 0,60  PICTURE
'99'
                    @ROW()  ,44 SAY 'Last period   ' GET peri1  RANGE 0,60  PICTURE
'99'
                    @ROW()+1,12 SAY 'Classification1' GET mrclase1 PICTURE '!!!!!!'
VALID nvl(33,'clase1',0,' ',3) COLOR , W+/N
                    @ROW()+1,12  SAY 'Classification2' GET mrclase2 PICTURE '!!!!!!'
VALID nvl(33,'clase2',0,' ',3) COLOR , W+/N
                    @ROW()+1,12 SAY 'Classification3' GET mrclase3  PICTURE '!!!!!!'
VALID nvl(33,'clase3',0,' ',3) COLOR , W+/N
                    READ
                    @20,29 SAY       'All  OK?  (Y/N)' GET son PICTURE '!' VALID son
$ 'YN'
                #ELIF _DOS.AND.SPANISH
                    @6,0 SAY ''
                    @ROW(),14 SAY ' Resultados de las Pruebas '
                    @ROW()+1,14 SAY 'Linea Inicial' GET  mrlin1 PICTURE "@!"  VALID
nvl(39,'TABLA',0,' ',3)
                    @ROW()+1,14 SAY '  Linea Final' GET  mrlin2 PICTURE "@!"  VALID
nvl(39,'TABLA',0,' ',3)
                    @ROW()+1,14 SAY '  Nombre Grupo' GET  mrgrupo PICTURE "@!" VALID
nvl(33,'grupos',0,' ',3)
                    @ROW()+1,14 SAY 'Desde Periodo' GET periodo  RANGE 0,60  PICTURE
'99'
                    @ROW()  ,44 SAY 'Hasta Periodo' GET peri1  RANGE 0,60  PICTURE
'99'
                    @ROW()+1,12 SAY 'Clasificación 1' GET mrclase1 PICTURE  '!!!!!!'
VALID nvl(33,'clase1',0,' ',3) COLOR , W+/N
                    @ROW()+1,12  SAY 'Clasificación 2' GET mrclase2 PICTURE '!!!!!!'
```

```
         VALID nvl(33,'clase2',0,' ',3) COLOR , W+/N
                    @ROW()+1,12 SAY 'Clasificación 3´  GET mrclase3 PICTURE '!!!!!!!´
         VALID nvl(33,'clase3',0,' ',3) COLOR , W+/N
                    READ
                    @20,29 SAY         'Todo bien (S/N)´ GET son PICTURE '!´ VALID son
$ 'SN´
              #ENDIF
              #IF _DOS
              READ
              #ENDIF
              #IF _WINDOWS.AND.USENGLISH
                  _c=_cc('Group name   HHHHHH´)
                  @(WROWS()-10)/2 -2, 0 SAY ''
                  @ROW()+1.5,_c SAY  'Initial line         ´ GET mrlin1 PICTURE "@!"
         VALID nvl(33,'TABLA',0,' ',3) SIZE 1,TXTWI('HHHHHH´)
                    @ROW()+1.5,_c-0.1 SAY 'Final line          ´ GET mrlin2 PICTURE
"@!" VALID nvl(33,'TABLA',0,' ',3) SIZE 1,TXTWI('HHHHHH´)
                    @ROW()+1.5,_c+0.1 SAY '   Group name ´ GET  mrgrupo PICTURE "@!"
         VALID nvl(33,'grupos',0,' ',3)
                    @ROW()+1.5,_c SAY '  First  period  ´ GET  periodo RANGE 0,60
PICTURE '99´ SIZE 1,TXTWI('88´)
                    @ROW() ,COL()+2 SAY ' Last period ´ GET peri1   RANGE 0,60
PICTURE '99´ SIZE 1,TXTWI('88´)
                    @ROW()+1.5,_c-2 SAY 'Classification1 ´ GET mrclase1 PICTURE
'!!!!!!!´ VALID nvl(33,'clase1',0,' ',3) COLOR , W+/N SIZE 1,TXTWI('HHHHHH´)
                    @ROW()+1.5,_c-2 SAY 'Classification2 ´ GET mrclase2 PICTURE
'!!!!!!!´ VALID nvl(33,'clase2',0,' ',3) COLOR , W+/N SIZE 1,TXTWI('HHHHHH´)
                    @ROW()+1.5,_c-2 SAY 'Classification3 ´ GET mrclase3 PICTURE
'!!!!!!!´ VALID nvl(33,'clase3',0,' ',3) COLOR , W+/N SIZE 1,TXTWI('HHHHHH´)
                    READ
                    @WROWS()-2,_cc('All OK? [Y/N] X´) SAY      'All OK?    (Y/N)´
GET son PICTURE '!´ VALID son $ 'YN´ SIZE 1,TXTWI('H´)
              #ELIF _WINDOWS.AND.SPANISH
                  _c=_cc('Nombre Grupo HHHHHH´)
                  @(WROWS()-10)/2 -2, 0 SAY ''
                  @ROW()+1.5,_c SAY 'Linea Inicial      ´ GET mrlin1 PICTURE  "@!"
         VALID nvl(33,'TABLA',0,' ',3) SIZE 1,TXTWI('HHHHHH´)
                    @ROW()+1.5,_c-0.1 SAY 'Linea Final          ´ GET mrlin2 PICTURE
"@!" VALID nvl(33,'TABLA',0,' ',3) SIZE 1,TXTWI('HHHHHH´)
                    @ROW()+1.5,_c+0.1 SAY ' Nombre Grupo´ GET mrgrupo PICTURE "@!"
         VALID nvl(33,'grupos',0,' ',3)
                    @ROW()+1.5,_c SAY 'Desde Periodo  ´ GET  periodo RANGE 0,60
PICTURE '99´ SIZE 1,TXTWI('88´)
                    @ROW() ,COL()+2 SAY 'Hasta Periodo´ GET peri1    RANGE 0,60
PICTURE '99´ SIZE 1,TXTWI('88´)
                    @ROW()+1.5,_c-2 SAY 'Clasificación 1 ´ GET  mrclase1 PICTURE
'!!!!!!!´ VALID nvl(33,'clase1',0,' ',3) COLOR , W+/N SIZE 1,TXTWI('HHHHHH´)
                    @ROW()+1.5,_c-2 SAY 'Clasificación 2 ´ GET mrclase2 PICTURE
'!!!!!!!´ VALID nvl(33,'clase2',0,' ',3) COLOR , W+/N SIZE 1,TXTWI('HHHHHH´)
                    @ROW()+1.5,_c-2 SAY 'Clasificación 3 ´ GET mrclase3 PICTURE
'!!!!!!!´ VALID nvl(33,'clase3',0,' ',3) COLOR , W+/N SIZE 1,TXTWI('HHHHHH´)
                    READ
```

```
                    @WROWS()-2,_cc('Todo bien [S/N] X')  SAY    'Todo bien (S/N)'
GET son PICTURE '!' VALID son $ 'SN' SIZE 1,TXTWI('H')
            #ENDIF
            #IF _WINDOWS
                READ
            #ENDIF
            #ENDIF
            IF son='S'
                EXIT
            ENDIF
        ENDDO
        #IF _WINDOWS
            DEACTI WINDOW _temp
        #ENDIF
        SELE 2
        STORE '2 ' TO dbfarea
        STORE '.t.' TO fcond
        STORE '' TO mtitler
        STORE 0 TO tcount
        IF mrprueba<>SPACE(6)
            STORE fcond + ' and PRUEBA=TRIM(MRPRUEBA)' TO fcond
            STORE mtitler+ ' PRUEBA='+mrprueba TO mtitler
        ENDIF
        IF periodo<>0
            STORE fcond + ' and NPER>=PERIODO and NPER<=PERI1' TO fcond
            STORE  mtitler+  '  Del  PERIODO='+LTRIM(STR(periodo,3,0))+' hasta
el='+LTRIM(STR(peril,3,0)) TO mtitler
            DO tpto
        ENDIF
        IF mrlin2<>SPACE(6)
            STORE fcond + ' and LINEA>=MRLIN1 AND LINEA<= MRLIN2' TO fcond
            STORE mtitler+ ' DE LA LINEA=' + mrlin1 + ' HASTA LA=' + mrlin2 TO
mtitler
        ENDIF
        IF mrclase1<>SPACE(6)
            STORE fcond + ' AND CLASE1=TRIM(MRCLASE1) ' TO fcond
            STORE mtitler + ' Clase 1='+mrclase1 TO mtitler
            DO tpto
        ENDIF
        IF mrclase2<>SPACE(6)
            STORE fcond + ' AND CLASE2=TRIM(MRCLASE2) ' TO fcond
            STORE mtitler + ' Clase 2='+mrclase2 TO mtitler
            DO tpto
        ENDIF
        IF mrclase3<>SPACE(6)
            STORE fcond + ' AND CLASE3=TRIM(MRCLASE3) ' TO fcond
            STORE mtitler + ' Clase 3='+mrclase3 TO mtitler
            DO tpto
        ENDIF
        DO tab_area
        SET FILTER TO &fcond
        STORE 'Result.frx' TO filenr
```

```
        STORE 6 TO choice_y
        FLUSH
        DO tab_repo WITH choice_y
        SET FILTER TO
        STORE '' TO mtitler
    CASE repchoice=3 && '3'
        ?SYS(2002,1)
        #IF _WINDOWS
            ACTI WINDOW _temp
            MODIFY WINDOW _temp TITLE 'Pruebas o F≤rmulas'
        #ENDIF
        STORE 'N' TO indi,son
        STORE 'S' TO indi
        DO WHILE .T.
            SET COLOR TO &windowatr
            #IF _DOS.AND.USENGLISH
                @6,0 SAY ''
                @ROW(),14 SAY ' Tests and formulas'
                @ROW()+1,14 SAY 'Initial line  ' GET mrlin1 PICTURE "@!" VALID
nvl(39,'TABLA',0,' ',3)
                @ROW()+1,14 SAY '  Last line  ' GET mrlin2 PICTURE "@!" VALID
nvl(39,'TABLA',0,' ',3)
                @ROW()+1,14 SAY ' Group name  ' GET mrgrupo PICTURE "@!" VALID
nvl(33,'grupos',0,' ',3)
                @ROW()+3,14 SAY 'Test descript' GET mrprueba PICTURE "@!" VALID
nvl(29,'PRUEBA',0,' ',3)
                @ROW()+1,12 SAY 'Classification1' GET mrclase1 PICTURE '!!!!!!!'
VALID nvl(33,'clase1',0,' ',3) COLOR , W+/N
                @ROW()+1,12 SAY 'Classification2' GET mrclase2 PICTURE '!!!!!!!'
VALID nvl(33,'clase2',0,' ',3) COLOR , W+/N
                @ROW()+1,12 SAY 'Classification3' GET mrclase3 PICTURE '!!!!!!!'
VALID nvl(33,'clase3',0,' ',3) COLOR , W+/N
                READ
                @20,29 SAY      'All OK?   (Y/N)' GET son PICTURE '!' VALID son
$ 'YN'
            #ELIF _DOS.AND.SPANISH
                @6,0 SAY ''
                @ROW(),14 SAY ' Pruebas o Fórmulas'
                @ROW()+1,14 SAY  'Linea Inicial' GET  mrlin1 PICTURE "@!"  VALID
nvl(39,'TABLA',0,' ',3)
                @ROW()+1,14 SAY '  Linea Final' GET mrlin2 PICTURE "@!"  VALID
nvl(39,'TABLA',0,' ',3)
                @ROW()+1,14 SAY ' Nombre  Grupo' GET mrgrupo PICTURE "@!" VALID
nvl(33,'grupos',0,' ',3)
                @ROW()+3,14 SAY 'Nombre Prueba' GET mrprueba PICTURE "@!" VALID
nvl(29,'PRUEBA',0,' ',3)
                @ROW()+1,12 SAY 'Clasificación 1' GET mrclase1 PICTURE '!!!!!!!'
VALID nvl(33,'clase1',0,' ',3) COLOR , W+/N
                @ROW()+1,12 SAY 'Clasificación  2' GET mrclase2 PICTURE '!!!!!!!'
VALID nvl(33,'clase2',0,' ',3) COLOR , W+/N
                @ROW()+1,12 SAY 'Clasificación 3' GET mrclase3 PICTURE '!!!!!!!'
VALID nvl(33,'clase3',0,' ',3) COLOR , W+/N
```

```
                    READ
                    @20,29 SAY         'Todo bien (S/N)' GET son PICTURE '!' VALID son
$ 'SN'
            #ENDIF
            #IF _DOS
                    READ
            #ENDIF
            #IF _WINDOWS.AND.USENGLISH
                    @(WROWS()-9)/2-2,0 SAY ''
                    _c=_cc('Test name    HHHHHH')
                    @ROW()+1,_c SAY  'Initial line      ' GET  mrlin1 PICTURE "@!"
VALID nvl(33,'TABLA',0,' ',3) SIZE 1,TXTWI('HHHHHH')
                    @ROW()+1,_c-0.1 SAY 'Final line        ' GET  mrlin2 PICTURE "@!"
VALID nvl(33,'TABLA',0,' ',3) SIZE 1,TXTWI('HHHHHH')
                    @ROW()+1,_c+0.1 SAY 'Group name        ' GET  mrgrupo PICTURE "@!"
VALID nvl(33,'grupos',0,' ',3) SIZE 1,TXTWI('HHHHHH')
                    @ROW()+3,_c-0.15 SAY 'Test name         ' GET mrprueba PICTURE "@!"
VALID nvl(29,'PRUEBA',0,' ',3) SIZE 1,TXTWI('HHHHHH')
                    @ROW()+1,_c SAY    'Classification1   ' GET  mrclase1  PICTURE
'!!!!!!' VALID nvl(33,'clase1',0,' ',3) COLOR , W+/N SIZE 1,TXTWI('HHHHHH')
                    @ROW()+1,_c SAY    'Classification2   ' GET  mrclase2  PICTURE
'!!!!!!' VALID nvl(33,'clase2',0,' ',3) COLOR , W+/N SIZE 1,TXTWI('HHHHHH')
                    @ROW()+1,_c SAY    'Classification3   ' GET  mrclase3  PICTURE
'!!!!!!' VALID nvl(33,'clase3',0,' ',3) COLOR , W+/N SIZE 1,TXTWI('HHHHHH')
                    READ
                    @WROWS()-2,_cc('All OK?   [Y/N] X') SAY       'Todo bien (S/N)'
GET son PICTURE '!' VALID son $ 'YN' SIZE 1,TXTWI('H')
            #ELIF _WINDOWS.AND.SPANISH
                    @(WROWS()-9)/2-2,0 SAY ''
                    _c=_cc('Test name    HHHHHH')
                    @ROW()+1,_c SAY  'Initial line      ' GET mrlin1 PICTURE "@!"
VALID nvl(33,'TABLA',0,' ',3) SIZE 1,TXTWI('HHHHHH')
                    @ROW()+1,_c-0.1 SAY 'Final line        ' GET mrlin2 PICTURE "@!"
VALID nvl(33,'TABLA',0,' ',3) SIZE 1,TXTWI('HHHHHH')
                    @ROW()+1,_c+0.1 SAY 'Group name        ' GET  mrgrupo PICTURE "@!"
VALID nvl(33,'grupos',0,' ',3) SIZE 1,TXTWI('HHHHHH')
                    @ROW()+3,_c-0.15 SAY 'Test name         ' GET mrprueba PICTURE "@!"
VALID nvl(29,'PRUEBA',0,' ',3) SIZE 1,TXTWI('HHHHHH')
                    @ROW()+1,_c SAY    'Classification1   ' GET  mrclase1  PICTURE
'!!!!!!' VALID nvl(33,'clase1',0,' ',3) COLOR , W+/N SIZE 1,TXTWI('HHHHHH')
                    @ROW()+1,_c SAY    'Classification2   ' GET  mrclase2  PICTURE
'!!!!!!' VALID nvl(33,'clase2',0,' ',3) COLOR , W+/N SIZE 1,TXTWI('HHHHHH')
                    @ROW()+1,_c SAY    'Classification3   ' GET  mrclase3  PICTURE
'!!!!!!' VALID nvl(33,'clase3',0,' ',3) COLOR , W+/N SIZE 1,TXTWI('HHHHHH')
                    READ
                    @WROWS()-2,_cc('All OK?   [Y/N] X') SAY       'All OK?    (Y/N)'
GET son PICTURE '!' VALID son $ 'YN' SIZE 1,TXTWI('H')
            #ENDIF
            #IF _WINDOWS
                    READ
            #ENDIF
```

```
            IF son='S'
                EXIT
            ENDIF
        ENDDO
        #IF _WINDOWS
            DEACTI WINDOW _temp
        #ENDIF
        SELE 3
        STORE '3 ' TO dbfarea
        STORE '.t.' TO fcond
        STORE '' TO mtitler
        STORE 0 TO tcount
        IF mrprueba<>SPACE(6)
            STORE fcond + ' and PRUEBA=TRIM(MRPRUEBA)' TO fcond
            STORE mtitler+ ' PRUEBA='+mrprueba TO mtitler
            DO tpto
        ENDIF
        IF mrgrupo<>SPACE(6)
            STORE fcond + ' and GRUPO=TRIM(MRGRUPO)' TO fcond
            STORE mtitler+ ' GRUPO='+mrgrupo TO mtitler
            DO tpto
        ENDIF
        IF mrlin2<>SPACE(6)
            STORE fcond + ' and LINEA>=MRLIN1 AND LINEA<= MRLIN2' TO fcond
            STORE mtitler+ ' DE LA LINEA=' + mrlin1 + ' HASTA LA=' + mrlin2 TO mtitler
            DO tpto
        ENDIF
        IF mrclase1<>SPACE(6)
            STORE fcond + ' AND CLASE1=TRIM(MRCLASE1) ' TO fcond
            STORE mtitler + ' Clase 1='+mrclase1 TO mtitler
            DO tpto
        ENDIF
        IF mrclase2<>SPACE(6)
            STORE fcond + ' AND CLASE2=TRIM(MRCLASE2) ' TO fcond
            STORE mtitler + ' Clase 2='+mrclase2 TO mtitler
            DO tpto
        ENDIF
        IF mrclase3<>SPACE(6)
            STORE fcond + ' AND CLASE3=TRIM(MRCLASE3) ' TO fcond
            STORE mtitler + ' Clase 3='+mrclase3 TO mtitler
            DO tpto
        ENDIF
        DO tab_area
        SET FILTER TO &fcond
        STORE 'PRUEBA.frx' TO filenr
        STORE 6 TO choice_y
        FLUSH
        DO tab_repo WITH choice_y
        SET FILTER TO
        STORE '' TO mtitler
    CASE repchoice=4 && '4'
```

```
?SYS(2002,1)
STORE 'N' TO indi,son
STORE 'S' TO indi
#IF _WINDOWS
    ACTI WINDOW _temp
    MODI WINDOW _temp TITLE 'Grupos'
ENDIF DO WHILE .T.
    SET COLOR TO &windowatr
    #IF _DOS.AND.USENGLISH
        @6,0 SAY ''
        @ROW(),14 SAY ' Groups '
        @ROW()+3,14 SAY ' Group name   ' GET mrgrupo PICTURE "@!" VALID
nvl(33,'grupos',0,' ',3)
        READ
        @20,29 SAY       'All OK?   (Y/N)' GET son PICTURE '!' VALID son
$ 'YN'
    #ELIF _DOS.AND.SPANISH
        @6,0 SAY ''
        @ROW(),14 SAY ' Grupos '
        @ROW()+3,14 SAY 'Grupo nombre  ' GET mrgrupo  PICTURE "@!" VALID
nvl(33,'grupos',0,' ',3)
        READ
        @20,29 SAY       'Todo bien (S/N)' GET son PICTURE '!' VALID son
$ 'SN'
    #ENDIF
    #IF _DOS
        READ
    #ENDIF
    #IF _WINDOWS.AND.USENGLISH
        @4,_cc('Group name    HHHHHH') SAY ' Group name   ' GET  mrgrupo
PICTURE "@!" VALID nvl(33,'grupos',0,' ',3) SIZE 1,TXTWI('HHHHHH')
        READ
        @WROWS()-2,_cc('All OK?   [Y/N] X') SAY        'All OK?   (Y/N)'
GET son PICTURE '!' VALID son $ 'YN' SIZE 1,TXTWI('H')
    #ELIF _WINDOWS.AND.SPANISH
        @4,_cc('Grupo nombre  HHHHHH') SAY 'Grupo  nombre ' GET  mrgrupo
PICTURE "@!" VALID nvl(33,'grupos',0,' ',3) SIZE 1,TXTWI('HHHHHH')
        READ
        @WROWS()-2,_cc('Todo bien [S/N] X') SAY      'Todo bien  (S/N)'
GET son PICTURE '!' VALID son $ 'SN' SIZE 1,TXTWI('H')
    #ENDIF
    #IF _WINDOWS
        READ
    #ENDIF IF son='S'
        EXIT
    ENDIF
ENDDO
#IF _WINDOWS
```

```
            DEACTI WINDOW _temp
        #ENDIF
        SELE 4
        STORE '4 ' TO dbfarea
        STORE '.t.' TO fcond
        STORE '' TO mtitler
        STORE 0 TO tcount
        IF mrgrupo<>SPACE(6)
            STORE fcond + ' and GRUPO=TRIM(MRGRUPO)' TO fcond
            STORE mtitler+ ' GRUPO='+mrgrupo TO mtitler
        ENDIF
        DO tab_area
        SET FILTER TO &fcond
        STORE 'grupos.frx' TO filenr
        STORE 6 TO choice_y
        FLUSH
        DO tab_repo WITH choice_y
        SET FILTER TO
        STORE '' TO mtitler
    CASE repchoice=5 && '5'
        ?SYS(2002,1)
        STORE 'N' TO indi,son
        STORE 'S' TO indi
        #IF _WINDOWS
            ACTI WINDOW _temp
            MODIFY WINDOW _temp TITLE 'Detalle de los Grupos'
        #ENDIF
        DO WHILE .T.
            SET COLOR TO &windowatr
            #IF _DOS.AND.USENGLISH
                @6,0 SAY ''
                @ROW(),14 SAY ' Group elements (lines)'
                @ROW()+1,14 SAY 'Initial line ' GET  mrlin1 PICTURE "@!"  VALID
nvl(39,'TABLA',0,' ',3)
                @ROW()+1,14 SAY '  Final line ' GET  mrlin2 PICTURE "@!"  VALID
nvl(39,'TABLA',0,' ',3)
                @ROW()+1,14  SAY ' Group name    ' GET mrgrupo PICTURE "@!" VALID
nvl(33,'grupos',0,' ',3)
                READ
                @20,29 SAY       'All OK?   (Y/N)' GET son PICTURE '!' VALID son
$ 'YN'
            #ELIF _DOS.AND.SPANISH
                @6,0 SAY ''
                @ROW(),14 SAY ' Detalle de los Grupos '
                @ROW()+1,14 SAY 'Linea Inicial' GET  mrlin1 PICTURE "@!"  VALID
nvl(39,'TABLA',0,' ',3)
                @ROW()+1,14 SAY '  Linea Final' GET  mrlin2 PICTURE "@!"  VALID
nvl(39,'TABLA',0,' ',3)
                @ROW()+1,14 SAY ' Nombre  Grupo' GET mrgrupo  PICTURE "@!" VALID
nvl(33,'grupos',0,' ',3)
                READ
                @20,29 SAY       'Todo bien (S/N)' GET son PICTURE '!' VALID son
```

```
$ 'SN'
            #ENDIF
            #IF _DOS
                READ
            #ENDIF
            #IF _WINDOWS.AND.USENGLISH
                SET COLOR TO &windowatr
                @2,0 SAY ''
                _c=_cc('Group name   HHHHHH')
                @ROW()+2,_c SAY 'Initial line      ' GET mrlin1 PICTURE "@!"
VALID nvl(33,'TABLA',0,' ',3) SIZE 1,TXTWI('HHHHHH')
                @ROW()+2,_c SAY 'Final   line      ' GET mrlin2 PICTURE "@!"
VALID nvl(33,'TABLA',0,' ',3) SIZE 1,TXTWI('HHHHHH')
                @ROW()+2,_c SAY 'Group name   ' GET mrgrupo PICTURE "@!" VALID
nvl(33,'grupos',0,' ',3) SIZE 1,TXTWI('HHHHH')
                READ
                @WROWS()-2,_cc('All OK?   [Y/N] X') SAY 'Todo bien (S/N)' GET
son PICTURE '!' VALID son $ 'YN' SIZE 1,TXTWI('H')
            #ELIF _WINDOWS.AND.SPANISH
                SET COLOR TO &windowatr
                @2,0 SAY ''
                _c=_cc('Nombre Grupo HHHHHH')
                @ROW()+2,_c SAY 'Linea Inicial     ' GET mrlin1 PICTURE "@!"
VALID nvl(33,'TABLA',0,' ',3) SIZE 1,TXTWI('HHHHHH')
                @ROW()+2,_c SAY 'Linea Final       ' GET mrlin2 PICTURE "@!"
VALID nvl(33,'TABLA',0,' ',3) SIZE 1,TXTWI('HHHHHH')
                @ROW()+2,_c SAY 'Nombre Grupo ' GET mrgrupo PICTURE "@!" VALID
nvl(33,'grupos',0,' ',3) SIZE 1,TXTWI('HHHHH')
                READ
                @WROWS()-2,_cc('Todo bien  [S/N] X') SAY  'Todo bien (S/N)' GET
son PICTURE '!' VALID son $ 'SN' SIZE 1,TXTWI('H')
            #ENDIF
            #IF _WINDOWS
                READ
            #ENDIF
            ********************

IF son='S'
                EXIT
            ENDIF
        ENDDO
        #IF _WINDOWS
            DEACTI WINDOW _temp
        #ENDIF
        SELE 5
        STORE '5 ' TO dbfarea
        STORE '.t.' TO fcond
        STORE '' TO mtitler
        STORE 0 TO tcount
        IF mrgrupo<>SPACE(6)
            STORE fcond + ' and GRUPO=TRIM(MRGRUPO)' TO fcond
            STORE mtitler+ ' GRUPO='+mrgrupo TO mtitler
```

```
              ENDIF
              IF mrlin2<>SPACE(6)
                  STORE fcond + ' and LINEA>=MRLIN1 AND LINEA<= MRLIN2' TO fcond
                  STORE mtitler+ ' DE LA LINEA=' + mrlin1 + ' HASTA LA=' + mrlin2 TO
mtitler
              ENDIF
              DO tab_area
              SET FILTER TO &fcond
              STORE 'dgrupo.frx' TO filenr
              STORE 6 TO choice_y
              FLUSH
              DO tab_repo WITH choice_y
              SET FILTER TO
              STORE '' TO mtitler CASE repchoice=6 && '6'
              ?SYS(2002,1)
              STORE 'N' TO indi,son
              STORE 'S' TO indi
              DO WHILE .T.
                  SET COLOR TO &windowatr
                  @6,0 SAY ''
                  #IF USENGLISH
                      @ROW(),14 SAY ' Classes'
                      @ROW()+5,14 SAY ' Select a class  ' GET mrnum PICTURE "!" VALID
mrnum $ '123'
                      READ
                      @WROWS()-5,29 SAY         'All OK?    (Y/N)' GET son PICTURE '!'
VALID son $ 'YN'
                  #ELSE
                      @ROW(),14 SAY ' Clases '
                      @ROW()+5,14 SAY ' Cual clase desea' GET mrnum PICTURE "!" VALID
mrnum $ '123'
                      READ
                      @WROWS()-5,29 SAY         'Todo bien  (S/N)' GET son PICTURE '!'
VALID son $ 'SN'
                  #ENDIF
                  READ
                  IF son='S'
                      EXIT
                  ENDIF
              ENDDO
              DO CASE
                  CASE mrnum='1'
                      SELE 6
                      STORE 'CLASE1.frx' TO filenr
                      STORE '6 ' TO dbfarea
                  CASE mrnum='2'
                      SELE 7
                      STORE 'CLASE2.frx' TO filenr
                      STORE '7 ' TO dbfarea
                  CASE mrnum='3'
```

```
            SELE 8
            STORE 'CLASE3.frx' TO filenr
            STORE '8 ' TO dbfarea
      ENDCASE
      DO tab_area
      STORE '' TO fcond
      STORE '' TO mtitler
      SET FILTER TO &fcond
      STORE 6 TO choice_y
      FLUSH
      DO tab_repo WITH choice_y
      SET FILTER TO
      STORE '' TO mtitler
   CASE repchoice=7 && '7'
      ?SYS(2002,1)
      STORE 'N' TO indi,son
      STORE 'S' TO indi
      DO WHILE .T.
         SET COLOR TO &windowatr
         @6,0 SAY ''
         #IF USENGLISH
            @ROW(),14 SAY ' Summary tests    '
            @ROW()+4,9   SAY 'Analysis' GET mranal PICTURE "@!" VALID
nvl(23,'presumen',0,' ',3)
            @ROW()+1,9 SAY '   Test     ' GET mrprueba PICTURE "@!" VALID
nvl(23,'PRUEBA',0,' ',3)
            READ
            @20,29 SAY      'All OK?   (Y/N)' GET son PICTURE '!' VALID son
$ 'YN'
         #ELSE
            @ROW(),14 SAY ' Pruebas Resumen '
            @ROW()+4,9   SAY 'Análisis' GET mranal PICTURE "@!" VALID
nvl(23,'presumen',0,' ',3)
            @ROW()+1,9 SAY '   Prueba' GET mrprueba PICTURE "@!" VALID
nvl(23,'PRUEBA',0,' ',3)
            READ
            @20,29 SAY      'Todo bien (S/N)' GET son PICTURE '!' VALID son
$ 'SN'
         #ENDIF
         READ
         IF son='S'
            EXIT
         ENDIF
      ENDDO
      SELE 10
      STORE '10 ' TO dbfarea
      SET RELA TO analisis INTO presumen ADDI
      SET RELA TO prueba   INTO prueba ADDI
      STORE '.t.' TO fcond
      STORE '' TO mtitler
      STORE 0 TO tcount
      IF mranal<>SPACE(6)
```

```
            STORE fcond + ' and analisis=trim(MRanal) ' TO fcond
            STORE mtitler+ ' ANALISIS='+mranal TO mtitler
        ENDIF
        IF mrprueba<>SPACE(6)
            STORE fcond + ' and PRUEBA=trim(MRPRUEBA)' TO fcond
            STORE mtitler+ ' PRUEBA='+mrprueba TO mtitler
            DO tpto
        ENDIF
        DO tab_area
        SET FILTER TO &fcond
        STORE 'Respru.frx' TO filenr
        STORE 6 TO choice_y
        FLUSH
        DO tab_repo WITH choice_y
        SET RELA OFF INTO presumen
        SET RELA OFF INTO prueba
        SET FILTER TO
        STORE '' TO mtitler
    CASE repchoice=8 && '8'
        ?SYS(2002,1)
        STORE 'N' TO indi.son
        STORE 'S' TO indi
        DO WHILE .T.
            SET COLOR TO &windowatr
            @6,0 SAY ''
            #IF USENGLISH
                @ROW(),14 SAY ' Summary diagnostics                    '
                @ROW()+4,14 SAY 'Name of analysis   ' GET mranal PICTURE "@!"
VALID nvl(33,'presumen',0,' ',3)
                @ROW()+1,14 SAY 'First  period ' GET periodo RANGE 0,60  PICTURE
'99'
                @ROW()  ,44 SAY 'Last period    ' GET peri1   RANGE 0,60  PICTURE
'99'
                READ
                @20,29 SAY      'All  OK?   (Y/N)' GET son PICTURE '!' VALID son
$ 'YN'
            #ELSE
                @ROW(),14 SAY ' Resultados Resumen de las Pruebas '
                @ROW()+4,14 SAY  'Nombre del Análisis' GET mranal PICTURE "@!"
VALID nvl(33,'presumen',0,' ',3)
                @ROW()+1,14 SAY 'Desde Periodo' GET  periodo RANGE 0,60  PICTURE
'99'
                @ROW()  ,44 SAY 'Hasta Periodo' GET peri1   RANGE 0,60  PICTURE
'99'
                READ
                @20,29 SAY      'Todo bien (S/N)' GET son PICTURE '!' VALID son
$ 'SN'
            #ENDIF
            READ
            IF son='S'
                EXIT
            ENDIF
```

```
            ENDDO
            SELE 12
            STORE '12 ' TO dbfarea
            SET RELA TO analisis INTO presumen ADDI
            STORE '.t.' TO fcond
            STORE '' TO mtitler
            STORE 0 TO tcount
            IF periodo<>0
                STORE fcond + ' and NPER>=PERIODO and NPER<=PERI1' TO fcond
                STORE  mtitler+ '  Del  PERIODO='+LTRIM(STR(periodo,3,0))+' hasta
el='+LTRIM(STR(peri1,3,0)) TO mtitler
                DO tpto
            ENDIF
            IF mranal<>SPACE(6)
                STORE fcond + ' and analisis=trim(MRanal) ' TO fcond
                STORE mtitler+ ' ANALISIS='+mranal TO mtitler
            ENDIF
            DO tab_area
            SET FILTER TO &fcond
            STORE 'ResRES.frx' TO filenr
            STORE 6 TO choice_y
            FLUSH
            DO tab_repo WITH choice_y
            SET RELA OFF INTO presumen
            SET FILTER TO
            STORE '' TO mtitler
        OTHERWISE
            RETURN
    ENDCASE
    RESTORE SCRE FROM rep_scr
ENDDO
#IF _WINDOWS
    IF WEXIST('_TEMP')
        RELEASE WINDOW _temp
    ENDIF
ENDIF STORE dbfareap TO dbfarea
DO tab_area
RETURN

*!*****************************************************************
*!
*!      Procedure: TPTO
*!
*!      Called by: VLISTA.PRG
*!
*!*****************************************************************
PROCEDURE tpto
    STORE tcount + 1 TO tcount
    IF tcount=2
        STORE mtitler+';' TO mtitler
```

```
        STORE 0 TO tcount
    ENDIF
    RETURN

*!*********************************************************
    *!
    *!      Function: VMESES()
    *!
*!*********************************************************
FUNCTION vmeses
    PARAMETER npar
    IF npar=0
        RETURN
    ENDIF
    RETURN fldarray[NPAR]
RETURN
IF _WINDOWS FUNCTION _cc  &&POR COLUMAN DEL CENTRO.
    PARAMETERS mensaje &&MENSAJE A CENTRARA PRIVATE fname,FSIZE,fstyle ,COL &&NOMRE ESTILO Y TAMA─O DE LA LETRA.

fname=WFONT(1,WOUTPUT())
    FSIZE=WFONT(2,WOUTPUT())
    fstyle=WFONT(3,WOUTPUT())

COL=(WCOLS()-TXTWI(mensaje,fname,FSIZE,fstyle)*FONTMETRIC(6,fname,FSIZE,fstyle)/F
ONTMETRIC(6))/2
    RETURN COL
    * * * * * * * * * * * * * * * * * * * * * * * * * F I N A L    D E    L A
FUNCION*******************************************
#ENDIF

*: EOF: VLISTA.PRG

*:*********************************************************************
*:*********************************************************************
*                          ============
*                          18. VANO.PRG
*                          ============
*
*                    MOVES DATA TWELVE PERIODS BACK
*:*********************************************************************
*:
*:      Program: VANO.PRG
*:
*:      Called by: VMENU.PRG
```

```
*:                : VACTI.PRG
*:
*:         Calls: CENTRA              (procedure in TABLA.PRG)
*:
*:   Memory Files: TAB_MEM.MEM
*:
*:         Documented 05/01/93 at 23:01          FoxDoc version 2.10f
*:**************************************************************
** Este procedimiento  permite correr los 60  periodos de historia, doce  periodos
hacia atras,
** en otras palabras  hace espacio para otro nuevo año de datos, desechando el año
mas antiguo
** de información en la base de TABLA.

#DEFINE USENGLISH .T.
#DEFINE SPANISH .F.
CLEAR

DO centra WITH ´ EL PROCESO DE CORRIMIENTO ES IRREVERSIBLE !!!, HAGA  BACKUP ANTES
DE INICIARLO ´,8,´N´,´N´
DO centra WITH  ´  El  proceso   de  corrimiento  consiste  en  hacer  lugar  en
´,10,´N´,´N´
IF diaomes=´M´
    DO centra WITH ´  la TABLA DE DATOS  para  un  nuevo año  de  información,
´,11,´N´,´N´
    DO centra WITH ´ DESECHADO  para  ello,  el año  mas  antiguo  que  está en
´,12,´N´,´N´
ELSE
    DO centra WITH ´  la TABLA  DE DATOS  para otros  siete dias  de información,
´,11,´N´,´N´
    DO centra WITH ´  DESECHADO para  ello, los  días mas antiguos  que están  en
´,12,´N´,´N´
ENDIF
DO centra WITH ´  la TABLA DE  DATOS.
´,13,´N´,´S´
STORE ´N´ TO son
SET CURSOR ON
#IF USENGLISH
    @24,20 SAY ´Confirm  one year data  shift?          (Y/N)´ GET son PICTURE ´!´
VALID son $ ´SN´ ERROR ´ Yes or Not ´
#ELSE
    @24,20 SAY  ´Quiere hacer el  corrimiento de  año (S/N)´ GET  son PICTURE  ´!´
VALID son $ ´SN´ ERROR ´ Si o No ´
#ENDIF
READ
SET CURSOR OFF
IF son = ´N´
    RETURN
ENDIF
SELE 1
@18,0 CLEAR
DO centra WITH ´ Trasladando los datos de la tabla ´,15,´N´,´N´
```

```
IF diaomes='M'
    DO corrmes
ELSE
    DO corrsem
ENDIF
RETURN

PROCEDURE corrsem
    REPLACE ALL p1 WITH p8;
        p2 WITH p9;
        p3 WITH p10;
        p4 WITH p11;
        p5 WITH p12;
        p6 WITH p13;
        p7 WITH p14;
        p8 WITH p15;
        p9 WITH p16;
        p10 WITH p17;
        p11 WITH p18;
        p12 WITH p19;
        p13 WITH p20;
        p14 WITH p21;
        p15 WITH p22;
        p16 WITH p23;
        p17 WITH p24;
        p18 WITH p25;
        p19 WITH p26;
        p20 WITH p27;
        p21 WITH p28;
        p22 WITH p29;
        p23 WITH p30;
        p24 WITH p31;
        p25 WITH p32;
        p26 WITH p33;
        p27 WITH p34;
        p28 WITH p35;
        p29 WITH p36;
        p30 WITH p37;
        p31 WITH p38;
        p32 WITH p39;
        p33 WITH p40;
        p34 WITH p41;
        p35 WITH p42;
        p36 WITH p43;
        p37 WITH p44;
        p38 WITH p45;
        p39 WITH p46;
        p40 WITH p47;
        p41 WITH p48;
        p42 WITH p49;
        p43 WITH p50;
        p44 WITH p51;
```

```
    p45 WITH p52;
    p46 WITH p53;
    p47 WITH p54;
    p48 WITH p55;
    p49 WITH p56;
    p50 WITH p57;
    p51 WITH p58;
    p52 WITH p59;
    p53 WITH p60;
    p54 WITH 0;
    p55 WITH 0;
    p56 WITH 0;
    p57 WITH 0;
    p58 WITH 0;
    p59 WITH 0;
    p60 WITH 0
SELE 2
DO centra WITH ´ Trasladando los resultados ´,16,´N´,´N´
DELE FOR nper <= 7
PACK
REPLACE ALL nper WITH nper-7
*STORE STR(VAL(mem_ano)+1,2,0) TO mem_ano SELE 11
DO centra WITH ´ Trasladando los resultados Resumen´,17,´N´,´N´
DELE FOR nper <= 7
PACK
REPLACE ALL nper WITH nper-7

SELE 12
DO centra WITH ´ Trasladando los resultados Resumen en detalle ´,18,´N´,´N´
DELE FOR nper <= 7
PACK
REPLACE ALL nper WITH nper-7

STORE STR(VAL(mem_ano)+1,2,0) TO mem_ano
IF diaomes=´M´
    STORE CTOD(´01/´+mem_mesn+´/´+mem_ano) TO mfei
ELSE
    STORE mfei+7 TO mfei, mem_mfei
ENDIF
@ 24,0 CLEAR
#IF USENGLISH
    @ 24,0 SAY ´Recording new base date              ´
    SAVE TO tab_mem.mem ALL LIKE mem_*
    DO centra WITH ´ Data shift was completed correctly      ´, 23,´S´,´S´
#ELSE
    @ 24,0 SAY ´Grabando la nueva fecha de base ´
    SAVE TO tab_mem.mem ALL LIKE mem_*
    DO centra WITH ´ El corrimiento fue hecho correctamente ´, 23,´S´,´S´
#ENDIF
RETURN
```

```
PROCEDURE corrmes
    REPLACE ALL p1 WITH p13;
        p2 WITH p14;
        p3 WITH p15;
        p4 WITH p16;
        p5 WITH p17;
        p6 WITH p18;
        p7 WITH p29;
        p8 WITH p20;
        p9 WITH p21;
        p10 WITH p22;
        p11 WITH p23;
        p12 WITH p24;
        p13 WITH p25;
        p14 WITH p26;
        p15 WITH p27;
        p16 WITH p28;
        p17 WITH p29;
        p18 WITH p30;
        p19 WITH p31;
        p20 WITH p32;
        p21 WITH p33;
        p22 WITH p34;
        p23 WITH p35;
        p24 WITH p36;
        p25 WITH p37;
        p26 WITH p38;
        p27 WITH p39;
        p28 WITH p40;
        p29 WITH p41;
        p30 WITH p42;
        p31 WITH p43;
        p32 WITH p44;
        p33 WITH p45;
        p34 WITH p46;
        p35 WITH p47;
        p36 WITH p48;
        p37 WITH p49;
        p38 WITH p50;
        p39 WITH p51;
        p40 WITH p52;
        p41 WITH p53;
        p42 WITH p54;
        p43 WITH p55;
        p44 WITH p56;
        p45 WITH p57;
        p46 WITH p58;
        p47 WITH p59;
        p48 WITH p60;
        p49 WITH 0;
        p50 WITH 0;
```

```
      p51 WITH 0;
      p52 WITH 0;
      p53 WITH 0;
      p54 WITH 0;
      p55 WITH 0;
      p56 WITH 0;
      p57 WITH 0;
      p58 WITH 0;
      p59 WITH 0;
      p60 WITH 0
SELE 2
DO centra WITH ' Trasladando los resultados ',16,'N','N'
DELE FOR nper <= 12
PACK
REPLACE ALL nper WITH nper-12
STORE STR(VAL(mem_ano)+1,2,0) TO mem_ano SELE 11
DO centra WITH ' Trasladando los resultados Resumen',17,'N','N'
DELE FOR nper <= 12
PACK
REPLACE ALL nper WITH nper-12

SELE 12
DO centra WITH ' Trasladando los resultados Resumen en detalle ',18,'N','N'
DELE FOR nper <= 12
PACK
REPLACE ALL nper WITH nper-12

STORE STR(VAL(mem_ano)+1,2,0) TO mem_ano
IF diaomes='M'
   STORE CTOD('01/'+mem_mesn+'/'+mem_ano) TO mfei
ELSE
   STORE mfei+12 TO mfei, mem_mfei
ENDIF
@ 24,0 CLEAR
#IF USENGLISH
   @ 24,0 SAY 'Recording new base date          '
   SAVE TO tab_mem.mem ALL LIKE mem_*
   DO centra WITH ' Data shift completed correctly.          ', 23,'S','S'
#ELSE
   @ 24,0 SAY 'Grabando la nueva fecha de base '
   SAVE TO tab_mem.mem ALL LIKE mem_*
   DO centra WITH ' El corrimiento fue hecho correctamente ', 23,'S','S'
#ENDIF
RETURN

*: EOF: VANO.PRG
```

```
*:**************************************************************
              END OF CODE INCLUDED IN PATENT APPLICATION
*:**************************************************************
```

What is claimed:

1. An apparatus for analyzing an array of data stored in a quantitative database, comprising:

a memory for storing said data of said quantitative database as a table in a relational database;

a computer coupled to said relational database and having a display and having an input device for receiving user input, said computer for execution of one or more programs so as to process data from said quantitative database;

a first program in execution on said computer for controlling said computer to receive user input defining one or more analysis rules to be performed on a subset of data, also specified by said user input, from said array of data stored in said quantitative database and for controlling said computer so as to analyze selected ones of said user specified subset of data items in accordance with selected ones of said one or more user specified analysis rules so as to generate one or more diagnostic records the text of which is also defined by said user input, each diagnostic record corresponding to a possible result of the application of a particular user specified analysis rule to the corresponding user selected subset of items of data from said array of data in said quantitative database, and wherein said first computer program controls said computer so as to automatically generate one or more link pointers for each said diagnostic record, each said link pointer linking a diagnostic record to the corresponding user selected subset of items of data from said quantitative database from which said diagnostic record was generated; and a second program in execution on said computer for controlling said computer so as to store each said diagnostic record in a diagnostic database in said memory and wherein said link pointer associated with each diagnostic record is programmable by said user, and wherein said first program includes one or more routines for controlling said computer to display at least first and second windows on said display, and for controlling said computer to display in said first window at least some of said items of data from said quantitative database and for controlling said computer to display in said second window at least some of said diagnostic records, and further comprising one or more routines in said first computer program for controlling said computer to display a pointer in said second window and to receive and process user data controlling the position in said second window of said pointer such that any diagnostic record displayed in said second window may be selected by said user using said pointer, and when any said displayed diagnostic record in said second window is so selected, for controlling said computer to display in said first window the corresponding subset of data items from said quantitative database associated by one or more of said link pointers with the selected diagnostic record.

2. The apparatus of claim 1 wherein said first program controls said computer to receive user input in the form of one or more programmable text strings to be stored in said memory with each user supplied alphanumeric text string corresponding to a possible result stemming from application of a particular analysis rule, each said programmable text string being a diagnostic statement which will be stored as one of said diagnostic records in said database if the result corresponding to said diagnostic statement occurs upon execution of the corresponding analysis rule.

3. The apparatus of claim 1 wherein each said analysis rule has only two possible results, true or false, which may be returned after application of said analysis rule to the corresponding user specified data from said quantitative database, and wherein said second computer program further comprises a routine for displaying on said display the diagnostic record(s) resulting from application of selected ones of said user specified analysis rules which returns a true result before, during or after recording said diagnostic record in said memory.

4. The apparatus of claim 1 wherein said second program includes a routine to store all said link pointers generated by said second program in carrying out processing defined by the user selected ones of said analysis rules to be executed, the resulting link pointer or pointers being stored in said memory, each said link pointer relating a particular user selectable subset of data in said quantitative database to a particular corresponding diagnostic record.

5. The apparatus of claim 1 wherein said first program includes a routine for receiving and processing user input in the form of commands to program each said analysis rule as a conditional branching test wherein a user selected subset of items of data from said quantitative database is compared to one or more test criteria using mathematical or logical operators or both and for receiving and processing commands entered by the user to define at least two transfer control branches for a particular user selected analysis rule to control transfer of processing by said computer to at least two different points in said first program depending upon the result of said comparison performed by said analysis rule, and wherein, for each said branch, a different diagnostic statement is displayed and stored in said memory as a diagnostic record.

6. The apparatus of claim 1 wherein said first program includes one or more routines for receiving and executing user input which defines a set of one or more expert test analysis rules each of which has at least two possible results, each of said expert test analysis rules for analyzing one or more user selectable diagnostic records from said diagnostic record database stored in said memory, each of said expert test analysis rules having a user defined diagnostic statement associated with at least one of said two or more possible results, each of said expert test analysis rules being an If-Then statement implementing a test condition wherein one or more of said diagnostic records are tested for satisfaction of a particular, user defined logical or mathematical relationship, and if the test condition is satisfied corresponding to a particular one of said two or more possible results, for entering a new diagnostic record in said diagnostic database comprised of the diagnostic statement associated with the test condition result which occurred.

7. The apparatus of claim 1 wherein said first computer program includes one or more routines which control said computer to process and execute user input which defines the link pointer associated with each said diagnostic record, and wherein said first program includes one or more programs for controlling said computer to display on said display at least a first window in which there is displayed a subset of data items from said quantitative database and a second window in which there is displayed at least one diagnostic record from said diagnostic database, and further comprising a query program in execution on said computer for controlling said computer to display on said display a pointer in said first window and for controlling said computer to receive and process user input data by which said pointer in said first window may be manipulated by said user to select a subset of data items displayed in said first window, and for controlling said computer to use any said link pointers associating the selected subset of data items to one or more of said diagnostic records for retrieving from said diagnostic database and displaying in said second window the diagnostic records associated with said selected subset of data items displayed in said first window.

8. An apparatus for analyzing an array of data stored in a quantitative database, comprising:

- a memory for storing said quantitative database data as a table in a relational database;
- a computer coupled to said relational database and having a display and having an input device for receiving user input, said computer for execution of one or more programs so as to process data from said quantitative database;
- a first program means for execution by said computer for controlling said computer to receive user input defining one or more analysis rules to be performed on one or more subsets of data items, also specified by said user input, from said array of data stored in said quantitative database] and for controlling said computer so as to analyze selected ones of said subsets of user specified data items in accordance with selected ones of said one or more user specified analysis rules so as to generate one or more diagnostic records the text of which is also defined by said user input, each diagnostic record corresponding to the application of a particular user specified analysis rule to the corresponding user selected subset of data items from said array of data in said quantitative database, and wherein said first computer program means includes means for controlling said computer so as to automatically generate one or more link pointers for each said diagnostic record, each said link pointer linking a diagnostic record to the corresponding user selected subset of data items from said quantitative database from which said diagnostic record was generated using the associated analysis rule; and
- a second program means for execution by said computer for controlling said computer so as to display on said display all diagnostic records resulting from carrying out said analysis rules selected by said user on the user selected subset of data items from the quantitative database and for controlling said computer to store said link pointers in an index pointer table in said memory, and for storing each said diagnostic record in a diagnostic database in said memory;

and wherein said first program means includes means for controlling said computer to receive and process user input data which defines the linkage between any particular analysis rule and the subset of data items from said quantitative database upon which said analysis rule is to be executed, said linkage being embodied in link definition data which is stored with the analysis rule defined by the user and which defines how said computer later generates a link pointer for any diagnostic record which resulted upon return by an analysis rule of a predetermined result and which defines which subset of data from said quantitative database is linked to said particular diagnostic record, and wherein said first program means includes means for controlling said computer to display at least first and second windows on said display, and for controlling said computer to display in said first window at least some of said subsets of data items from said quantitative database and for controlling said computer to display in said second window at least some of said diagnostic records, and further comprising means in said first computer program for controlling said computer to display a pointer in said second window and to receive and process user data controlling the position in said second window of said pointer such that any diagnostic record displayed in said second window may be selected by said user using said pointer, and when any said displayed diagnostic record in said second window is so selected, for controlling said computer to display in said first window the corresponding subset of data items from said quantitative database associated by one or more of said link pointers with the selected diagnostic record.

* * * * *